US011115708B2

United States Patent
Lee et al.

(10) Patent No.: US 11,115,708 B2
(45) Date of Patent: *Sep. 7, 2021

(54) BROADCAST RECEIVING DEVICE, METHOD OF OPERATING BROADCAST RECEIVING DEVICE, LINKING DEVICE FOR LINKING TO BROADCAST RECEIVING DEVICE, AND METHOD OF OPERATING LINKING DEVICE

(71) Applicant: LG ELECTRONICS INC., Seoul (KR)

(72) Inventors: Jinwon Lee, Seoul (KR); Seungryul Yang, Seoul (KR); Woosuk Ko, Seoul (KR); Sungryong Hong, Seoul (KR); Minsung Kwak, Seoul (KR); Kyoungsoo Moon, Seoul (KR); Seungjoo An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,684

(22) Filed: Feb. 4, 2020

(65) Prior Publication Data
US 2020/0177946 A1 Jun. 4, 2020

Related U.S. Application Data

(63) Continuation of application No. 15/317,359, filed as application No. PCT/KR2015/006640 on Jun. 29, 2015, now Pat. No. 10,582,255.
(Continued)

(51) Int. Cl.
H04N 21/43 (2011.01)
H04N 21/436 (2011.01)
(Continued)

(52) U.S. Cl.
CPC ....... *H04N 21/436* (2013.01); *H04N 21/2362* (2013.01); *H04N 21/4126* (2013.01);
(Continued)

(58) Field of Classification Search
CPC .......... H04N 21/4104; H04N 21/4126; H04N 21/41407
See application file for complete search history.

(56) References Cited

U.S. PATENT DOCUMENTS 7,907,213 B1 3/2011 Biere et al.
8,676,995 B1 3/2014 Andreasen et al.
(Continued)

FOREIGN PATENT DOCUMENTS

CN 103814579 A 5/2015
EP 2712187 A1 3/2014
(Continued)

*Primary Examiner* — Jefferey F Harold
*Assistant Examiner* — Timothy R Newlin
(74) *Attorney, Agent, or Firm* — Birch, Stewart, Kolasch & Birch, LLP

(57) ABSTRACT

A companion device interoperating with a broadcast reception device for receiving a broadcast service, includes a communication device configured to connect the companion device with the broadcast reception device; and a controller configured to receive emergency alert information from the broadcast reception device, the emergency alert information including identifier information for the emergency alert information, category information of the emergency alert information, and priority information for the emergency alert information, wherein a value of the priority information represents one of 5 levels of priority of the emergency alert information, the 5 levels represents the priority from low priority to high priority, and in response to a change of the priority, the controller receives changed emergency alert
(Continued)

information including changed priority information of which a value represents a level of the changed priority.

4 Claims, 131 Drawing Sheets

Related U.S. Application Data

(60) Provisional application No. 62/019,395, filed on Jun. 30, 2014.

(51) Int. Cl.
*H04N 21/478* (2011.01)
*H04N 21/2362* (2011.01)
*H04N 21/41* (2011.01)
*H04N 21/462* (2011.01)
*H04N 21/81* (2011.01)
*H04N 21/8543* (2011.01)
*H04N 21/858* (2011.01)

(52) U.S. Cl.
CPC ......... *H04N 21/462* (2013.01); *H04N 21/478* (2013.01); *H04N 21/814* (2013.01); *H04N 21/8543* (2013.01); *H04N 21/8586* (2013.01)

(56) References Cited

U.S. PATENT DOCUMENTS

| | | | |
|---|---|---|---|
| 2005/0229207 A1* | 10/2005 | Kendall | H04N 7/165 725/33 |
| 2006/0117379 A1* | 6/2006 | Bennett | H04N 21/2408 726/3 |
| 2006/0156332 A1* | 7/2006 | Kendall | H04H 60/25 725/33 |
| 2006/0200842 A1* | 9/2006 | Chapman | H04N 21/4882 725/34 |
| 2007/0094680 A1* | 4/2007 | Kim | H04N 21/8146 725/33 |
| 2007/0107009 A1* | 5/2007 | Kim | H04N 5/50 725/33 |
| 2007/0136743 A1 | 6/2007 | Hasek et al. | |
| 2008/0059998 A1* | 3/2008 | McClenny | H04N 21/814 725/33 |
| 2008/0229375 A1* | 9/2008 | Roberts | H04N 21/4347 725/100 |
| 2008/0291849 A1* | 11/2008 | Ostermeier | H04H 20/59 370/270 |
| 2009/0207305 A1* | 8/2009 | Fujita | H04N 21/41407 348/468 |
| 2009/0252253 A1* | 10/2009 | Choi | H04N 7/088 375/270 |
| 2010/0124409 A1* | 5/2010 | Moon | H04N 21/85406 386/241 |
| 2010/0146541 A1* | 6/2010 | Velazquez | H04N 21/25841 725/33 |
| 2010/0186029 A1 | 7/2010 | Kim et al. | |
| 2011/0167444 A1* | 7/2011 | Sun | H04N 7/17318 725/31 |
| 2012/0072942 A1* | 3/2012 | Satoh | H04N 21/814 725/14 |
| 2012/0159533 A1* | 6/2012 | Reddy | H04N 21/41407 725/31 |
| 2013/0132842 A1* | 5/2013 | Kashyap | G11B 27/28 715/719 |
| 2013/0291016 A1* | 10/2013 | Lazarski | H04N 21/43637 725/43 |
| 2013/0305292 A1* | 11/2013 | Chen | H04N 21/4307 725/54 |
| 2014/0075472 A1* | 3/2014 | Mitsuya | H04N 21/6543 725/32 |
| 2014/0150022 A1 | 5/2014 | Oh et al. | |
| 2014/0181887 A1 | 6/2014 | Moon et al. | |
| 2017/0085955 A1* | 3/2017 | Deshpande | H04N 21/4722 |
| 2017/0127115 A1 | 5/2017 | Lee et al. | |

FOREIGN PATENT DOCUMENTS

| | | |
|---|---|---|
| KR | 10-2006-0046886 A | 5/2006 |
| KR | 10-2006-0134739 A | 12/2006 |
| KR | 10-2007-0032110 A | 3/2007 |
| KR | 10-2010-0081714 A | 7/2010 |
| KR | 10-2013-0020874 A | 3/2013 |

* cited by examiner

FIG. 3
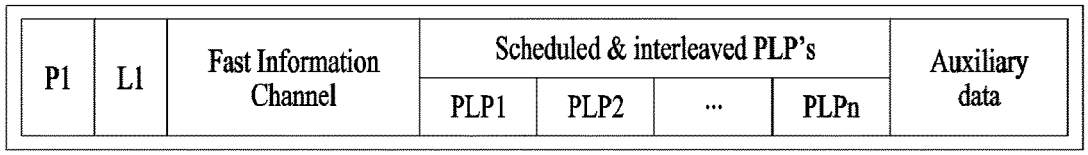
FIG. 4
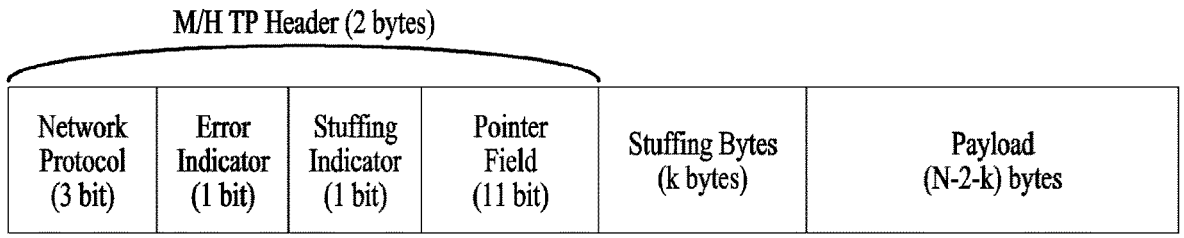
FIG. 5
| network_protocol Value | Meaning |
|---|---|
| 000 | IPv4 (conforming to RFC STD05 [5]) |
| 001-110 | ATSC reserved |
| 111 | framed_packet_type |

FIG. 9

| Syntax | No. of Bits | Format |
|---|---|---|
| service_map_table_section() { | | |
|    table_id | 8 | 0xDB |
|    section_syntax_indicator | 1 | '0' |
|    private_indicator | 1 | '1' |
|    reserved | 2 | '11' |
|    section_length | 12 | uimsbf |
|    table_id_extension { | | |
|      SMT_protocol_version | 8 | uimsbf |
|      reserved | 8 | uimsbf |
|    } | | |
|    reserved | 2 | '11' |
|    version_number | 5 | uimsbf |
|    current_next_indicator | 1 | bslbf |
|    section_number | 8 | uimsbf |
|    last_section_number | 8 | uimsbf |
|    num_services | 8 | uimsbf |
|    for (i=0; i<num_services; i++) | | |
|    { | | |
|      service_id | 16 | uimsbf |
|      reserved | 2 | '11' |
|      service_status | 2 | uimsbf |
|      SP_indicator | 1 | bslbf |
|      short_service_name_length /* m */ | 3 | uimsbf |
|      short_service_name | 16*m | bslbf |
|      reserved | 2 | '11' |
|      service_category | 6 | uimsbf |
|      reserved | 3 | '111' |
|      num_components | 5 | uimsbf |
|      for (j=0; j<num_components; j++) | | |
|      { | | |
|         essential_component_indicator | 1 | bsblf |
|         reserved | 3 | '111' |
|         num_component_level_descriptors | 4 | uimsbf |
|         for (k=0; k<num_component_level_descriptors; k++) | | |
|         { | | |
|            component_level_descriptor() | var | |
|         } | | |
|      } | | |
|      reserved | 4 | '1111' |
|      num_service_level_descriptors | 4 | uimsbf |
|      for (m=0; m<num_service_level_descriptors; m++) | | |
|      { | | |
|         service_level_descriptor() | var | |
|      } | | |
|    } | | |

FIG. 10

| service_category | Meaning |
|---|---|
| 0x00 | The service category is not specified |
| 0x01 | Basic TV |
| 0x02 | Basic Radio |
| 0x03 | RI service – Rights Issuer service |
| 0x04 | Not specified by the current version of this standard. |
| 0x05 | Not specified by the current version of this standard. |
| 0x06 | Not specified by the current version of this standard. |
| 0x07 | Not specified by the current version of this standard. |
| 0x08 | Service Guide – Service Guide (Announcement) |
| 0x09 | Emergency Alerting |
| 0x0A | Not specified by the current version of this standard. |
| 0x0B ~ 0xFF | Reserved for future use. |

FIG. 11

| Syntax | No. of Bits | Format |
|---|---|---|
| service_map_table_section() { | | |
|   table_id | 8 | 0xDB |
|     section_syntax_indicator | 1 | '0' |
|     private_indicator | 1 | '1' |
|     reserved | 2 | '11' |
|     section_length | 12 | uimsbf |
|   table_id_extension | | |
|       SMT_protocol_version | 8 | uimsbf |
|       ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_services | 8 | uimsbf |
|   for (i=0;i<num_services; i++) | | |
|   { | | |
|     service_id | 16 | uimsbf |
|     multi_ensemble_service | 2 | uimsbf |
|     service_status | 2 | uimsbf |
|     SP_indicator | 1 | bslbf |
|     short_service_name_length/* m */ | 3 | uimsbf |
|     short_service_name | 16*m | bslbf |
|     channel_number | 16 | uimsbf |
|     service_category | 6 | uimsbf |
|     reserved | 2 | '11' |
|     num_components | 5 | uimsbf |
|     for (j=0; j<num_components; j++) | | |
|     { | | |
|       essential_component_indicator | 1 | bsblf |
|       reserved | 3 | '111' |
|       num_component_level_descriptors | 4 | uimsbf |
|       for (k=0; k<num_component_level_descriptors; k++) | | |
|       { | | |
|         component_level_descriptor() | var | |
|       } | | |
|     } | | |
|     reserved | 4 | '1111' |
|     num_service_level_descriptors | 4 | uimsbf |
|     for (m=0;m<num_service_level_descriptors; m++) | | |
|     { | | |
|       service_level_descriptor() | var | |
|     } | | |
|   reserved | 4 | '1111' |
|   num_ensemble_level_descriptors | 4 | uimsbf |
|   for (n=0; n<num_ensemble_level_descriptors; n++) { | | |
|   { | | |
|     ensemble_level_descriptor() | var | |
|   } | | |
| } | | |

FIG. 12
| Syntax | No. of Bits | Format |
|---|---|---|
| stream_identifier_descriptor(){ | | |
| descriptor_tag | 8 | uimsbf |
| descriptor_length | 8 | uimsbf |
| component_tag | 8 | uimsbf |
| } | | |
FIG. 13
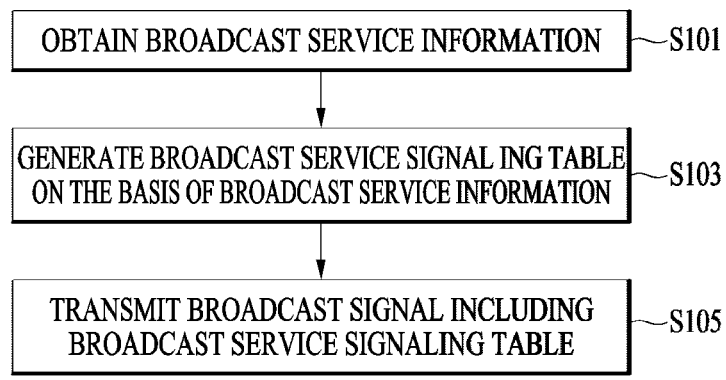
FIG. 14
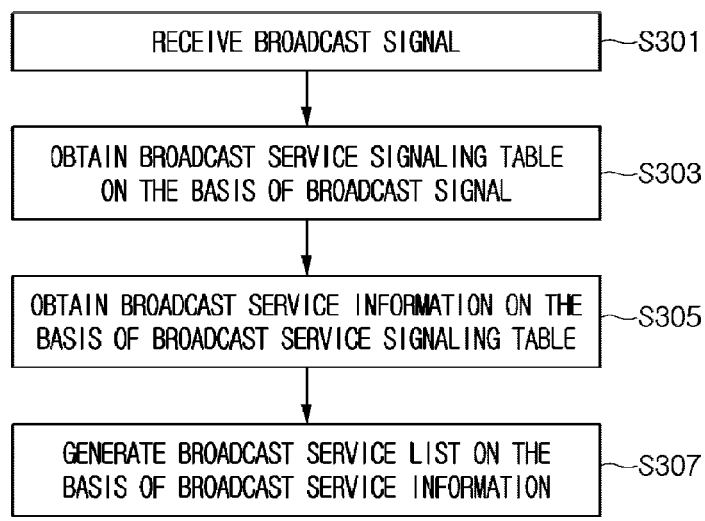

FIG. 15

| Syntax | No. of Bits | Format |
|---|---|---|
| data_path_descriptor( ) { | | |
|     descriptor_tag | 8 | uimsbf |
|     descriptor_length | 8 | uimsbf |
|     delivery_network_type | 8 | uimsbf |
|         data_path(delivery_network_type) | var | |
| } | | |

FIG. 16

| delivery_network_type value | |
|---|---|
| 0x00 | IPv4/IPv6 flows through same broadcast or over the cellular network |
| 0x01 | IPv4/IPv6 flows through different broadcast |
| 0x02 | FLUTE session through same broadcast |
| 0x03 | FLUTE session through different broadcast |
| 0x04 | MPEG-2 stream through different broadcast |
| 0x05 | packet-based flows through different broadcast |
| 0x06 | packet-based flows through IP-based broadcast network |
| 0x07 | URL |
| 0x08-0xFF | Reserved |

FIG. 17

| Syntax | No. of Bits | Format |
|---|---|---|
| data_path( ) { | | |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

FIG. 18

| Syntax | No. of Bits | Format |
|---|---|---|
| data_path( ) { | | |
|     transport_stream_id | 16 | uimsbf |
|     IP_version_flag | 1 | bslbf |
|     source_IP_address_flag | 1 | bslbf |
|     destination_IP_address_flag | 1 | bslbf |
|     reserved | 5 | '11111' |
|     if(source_IP_address_flag) | | |
|         source_IP_address | 32 or 128 | uimsbf |
|     if(destination_IP_address_flag) | | |
|         destination_IP_address | 32 or 128 | uimsbf |
|     port_num_count | 8 | |
|     if(port_num_count > 0) | | |
|         destination_UDP_port_num | 16 | uimsbf |
| } | | |

FIG. 19

| Syntax | No. of Bits | Format |
|---|---|---|
| data_path( ) { | | |
|     IP_version_flag | 1 | bslbf |
|     source_IP_address_flag | 1 | bslbf |
|     reserved | 6 | '111111' |
|     if(source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

FIG. 20

| Syntax | No. of Bits | Format |
|---|---|---|
| data_path( ) { | | |
|     transport_stream_id | 16 | uimsbf |
|     IP_version_flag | 1 | bslbf |
|     source_IP_address_flag | 1 | bslbf |
|     reserved | 6 | '111111' |
|     if(source_IP_address_flag) | | |
|         source_IP_address | 32 or 128 | uimsbf |
|     destination_IP_address | 32 or 128 | uimsbf |
|     destination_UDP_port_num | 16 | uimsbf |
|     tsi | 16 | uimsbf |
| } | | |

FIG. 21

| Syntax | No. of bits | Format |
|---|---|---|
| data_path( ) {<br>    transport_stream_id<br>    reserved<br>    pid<br>} | <br>16<br>3<br>13 | <br>uimsbf<br>bslbf<br>uimsbf |

FIG. 22

| Syntax | No. of Bits | Format |
|---|---|---|
| data_path( ) {<br>    transport_stream_id<br>    packet_id<br>} | <br>16<br>16 | <br>uimsbf<br>uimsbf |

FIG. 23

| Syntax | No. of Bits | Format |
|---|---|---|
| data_path( ) { | | |
|     IP_version_flag | 1 | bslbf |
|     source_IP_address_flag | 1 | bslbf |
|     reserved | 6 | '111111' |
|     if (source_IP_address_flag) | | |
|         source_IP_address | 32 or 128 | uimsbf |
|     destination_IP_address | 32 or 128 | uimsbf |
|     destination_UDP_port_num | 16 | uimsbf |
|     packet id | 16 | uimsbf |
| } | | |

FIG. 24

| Syntax | No. of bits | Format |
|---|---|---|
| data_path( ) { | | |
|     URL_length | 8 | |
|     for (i = 0; i < URL_length; i++){ | | |
|         URL_char | 8 | bslbf |
|     } | | |
| } | | |

FIG. 27

| Syntax | No. of Bits | Format |
|---|---|---|
| component_descriptor( ) { | | |
|     descriptor_tag | 8 | uimsbf |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     } | | |
|     transport_parameters_text_length | 8 | uimsbf |
|     transport_parameters_text() | var | |
|     component_data(component_type) | var | |
| } | | |

FIG. 28

| component_type | Meaning |
|---|---|
| 0-34 | Assigned or reserved by IANA, except that 20–24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-70 | [Unassigned by IANA and reserved by ATSC for possible future use] |
| 71-76 | Reserved by IANA |
| 77-95 | Unassigned by IANA |
| 96-127 | Designated by IANA for dynamic use |

FIG. 29

| Syntax | No. of Bits | Format |
|---|---|---|
| component_data( ) { | | |
|     version | 8 | uimsbf |
|     profile | 8 | uimsbf |
| } | | |

FIG. 30

| Content Component | Essence of a single type plus the relevant Metadata, e.g., a video track, an audio track, Closed Captions, a video enhancement layer, a webpage, an interactive application, etc. |
|---|---|
| Simple Audio Component | Audio component that is a single encoding of a sound sequence with a particular set of encoding parameters. |
| Simple Video Component | Video component that is a single encoding of a picture sequence with a particular set of encoding parameters. |
| Continuous Component | A component that is presented in a continuous stream (e.g., audio, video or closed captioning). |
| Elementary Component | A continuous component that is a single encoding (e.g., a single encoding of a sound sequence, or a single encoding of a picture sequence, or a single closed caption track). |
| Composite Component | A component that consists of a collection of continuous components which have the same media type, and which represent the same scene, and which are to be combined in some combination to produce a presentation (e.g., music, dialog and effects audio components that are to be mixed to give complete audio, or left and right 3D views that are to be combined to give 3D pictures). |
| Composite Audio Component | Compound component consisting of a collection of audio components which are to be combined to produce a sound sequence (e.g., a collection of audio components that are to be mixed). |
| Composite Video Component | Compound component consisting of a collection of video components which are to be combined to produce a picture sequence (e.g., a collection of 3D components that are to be combined to form 3D video; or a base video encoding along with one or more enhancement encodings). |
| Adaptive (alternatively called PickOne) Component | A component that consists of a collection of continuous components which have the same media type, and which represent the same scene, and one of which is to be selected to produce a presentation (e.g., a set of audio components encoded from the same sound sequence with different bitrates, or a set of video components encoded from the same picture sequence with different bit rates, or a regular closed caption track and an "easy reader" closed caption track for the same dialog). |
| Adaptive Audio Component | A component consisting of a collection of audio components, one of which is to be selected to produce a sound sequence (e.g., a collection of audio components encoded from the same sound sequence with different bitrates). |
| Adaptive Video Compone | A component consisting of a collection of video components, one of which is to be selected to produce a picture sequence (e.g., a collection of video components encoded from the same picture sequence with different encoding parameters). |
| Complex Component | Either a composite component or an adaptive component |

FIG. 34

| Continuous Component | A Content Component that is presented in a continuous stream (e.g., audio, video or closed captioning). |
|---|---|
| Elementary Component | A Continuous Component that is a single encoding (e.g., a single encoding of a sound sequence, or a single encoding of a picture sequence, or a single closed caption track). |
| Composite Component | A Content Component that consists of a collection of Continuous Components which have the same Content type, and which represent the same scene, and which are to be combined in some combination to produce a presentation (e.g., music, dialog and effects audio components that are to be mixed to give complete audio, or left and right 3D views that are to be combined to give 3D pictures). |
| PickOne Component | A Content Component that consists of a collection of Continuous Components which have the same Content type, and which represent the same scene, and exactly one of which is to be selected to produce a presentation (e.g., a set of audio components encoded from the same sound sequence with different bitrates, or a set of video components encoded from the same picture sequence with different bit rates, or a regular closed caption track and an "easy reader" closed caption track for the same dialog). |
| Complex Component | Either a Composite Component or a PickOne Component |
| Presentable Component | A Continuous Component that is intended for presentation to the user. Such a component can be an Elementary Component or a Complex Component. |

FIG. 35

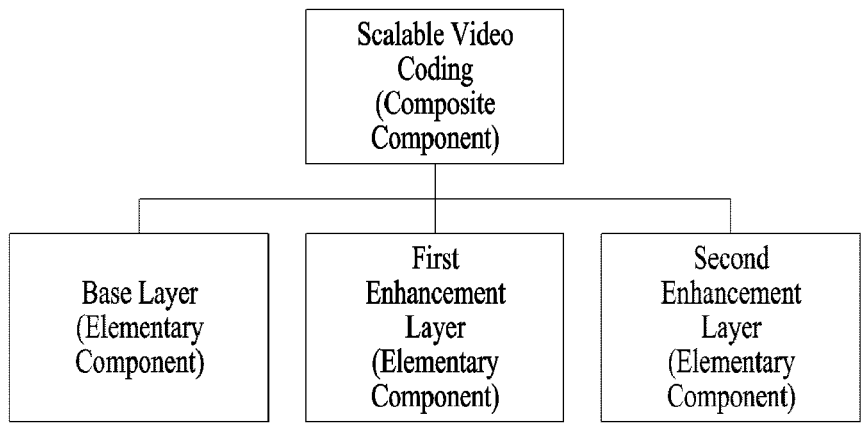

FIG. 42

| Syntax | No. of bits | Format |
|---|---|---|
| component_descriptor( ){ | | |
|     descriptor_tag | 8 | uimsbf |
|     descriptor_length | 8 | uimsbf |
|     component_type | 4 | uimsbf |
|     target_device_flag | 1 | bslbf |
|     if(target_device_flag == 0x01) { | | |
|         target_device | 3 | uimsbf |
|     } | | |
|     else { | | |
|         reserved | 3 | '111' |
|     } | | |
|     text_length | 8 | uimsbf |
|     for (i=0;i<text_length;i++){ | | |
|         text_char | 8 | uimsbf |
|     } | | |
|     if(component_type == 0x00) { | | |
|         component_data_type | 8 | uimsbf |
|         component_data(component_data_type) | var | |
|     } | | |
|     else if( component_type == 0x01 \|\| component_type == 0x02 ) { | | |
|         complex_component_data() | var | |
|     } | | |
| } | | |

FIG. 43

| component_data_type | Meaning |
|---|---|
| 0-34 | Assigned or reserved by IANA, except that 20–24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-69 | [Unassigned by IANA and reserved by ATSC for possible future use] |
| 70 | HEVC video stream component |
| 71 | ISO base media file format stream component |
| 72-76 | Reserved by IANA |
| 77-95 | Unassigned by IANA |
| 96-127 | Designated by IANA for dynamic use |

FIG. 44

| Syntax | No. of bits | Format |
|---|---|---|
| complex_component_data(){ | | |
|   aggregation_type | 3 | uimsbf |
|   reserved | 1 | '111111' |
|   target_device_flag | 1 | bslbf |
|   if(target_device_flag == 0x01) { | | |
|     target_device | 3 | uimsbf |
|   } | | |
|   else { | | |
|     reserved | 3 | '111' |
|   } | | |
|   num_sub_component | 8 | uimsbf |
|   for (i=0;i<num_sub_component;i++){ | | |
|     sub_component_id | 8 | uimsbf |
|     if(aggregation_type==0x01){ | | uimsbf |
|       general_media_type | 8 | uimsbf |
|       sub_component_role(general_media_type) | 8 | uimsbf |
|     } | | |
|     ... | | |
|   } | | |
| } | | |

FIG. 45

| Syntax | No. of bits | Format |
|---|---|---|
| complex_component_descriptor(){ | | |
|   descriptor_tag | 8 | uimsbf |
|   descriptor_length | 8 | uimsbf |
|   complex_component_data( ) | var | |
| } | | |

FIG. 46

| Syntax | No. of bits | Format |
|---|---|---|
| associated_component_list_descriptor( ){ | | |
|     descriptor_tag | 8 | uimsbf |
|     descriptor_length | 8 | uimsbf |
|     num_associated_component | 8 | uimsbf |
|     for (i=0;i<num_associated_component;i++){ | | |
|         component_id | 8 | uimsbf |
|         component_type | 4 | uimsbf |
|         if(component_type == 0x00) { | | |
|             component_data_type | 8 | uimsbf |
|         } | | |
|         general_media_type | 8 | uimsbf |
|         component_data_type | 8 | uimsbf |
|     } | | |
| } | | |

FIG. 47

| Syntax | No. Bits | Format |
|---|---|---|
| NRT_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     service_id | 16 | uimsbf |
|     NRT_information_block() | var | |
| } | | |

FIG. 48

| Syntax | No. Bits | Format |
|---|---|---|
| NRT_information_block(){ | | |
|     time_span_start | 32 | uimsbf |
|     time_span_length | 16 | uimsbf |
|     num_content_items_in_section | 8 | uimsbf |
|     for (j=0; j< num_content_items_in_section; j++) { | | |
|         content_id | 32 | uimsbf |
|         updates_available | 1 | bslbf |
|         content_security_conditions_indicator | 1 | bslbf |
|         master_item | 1 | bslbf |
|         playback_length_included | 1 | bslbf |
|         playback_delay_included | 1 | bslbf |
|         expiration_included | 1 | bslbf |
|         content_size_included | 1 | bslbf |
|         available_on_internet | 1 | bslbf |
|         available_in_broadcast | 1 | bslbf |
|         target_included | 1 | bslbf |
|         reserved | 6 | '111111' |
|         if (playback_length_included==1) { | | |
|             playback_length_in_seconds | 24 | uimsbf |
|         } | | |
|         if (playback_delay_included==1) { | | |
|             playback_delay | 24 | uimsbf |
|         } | | |
|         if (expiration_included==1) { | | |
|             expiration | 32 | uimsbf |
|         } | | |
|         if (content_size_included==1) { | | |
|             content_size | 40 | uimsbf |
|         } | | |
|         if (target_included==1) { | | |
|             target | 8 | uimsbf |
|         } | | |
|         content_name_length | 8 | uimsbf |
|         content_name_text() | var | |
|         num_content_descriptors | 8 | uimsbf |
|         for (i=0; i<num_content_descriptors; i++) { | | |
|             content_descriptor() | var | |
|         } | | |
|     } | | |
|     num_descriptors | 8 | uimsbf |
|     for (i=0; i<num_descriptors; i++) { | | |
|         descriptor() | var | |
|     } | | |
| } | | |

FIG. 49

| Syntax | No. of Bits | Format |
|---|---|---|
| NRT_service_descriptor( ) { | | |
|     descriptor_tag | 8 | uimsbf |
|     descriptor_length | 8 | uimsbf |
|     reserved | 2 | '11' |
|     consumption_model | 6 | uimsbf |
|     auto-update | 1 | bslbf |
|     storage_reservation_present | 1 | bslbf |
|     default_content_size_present | 1 | bslbf |
|     target_present | 1 | bslbf |
|     reserved | 4 | '1111' |
|     if (storage_reservation_present==1) { | | |
|         storage_reservation | 24 | uimsbf |
|     if (default_content_size_present==1) { | | |
|         default_content_size | 40 | uimsbf |
|     } | | |
|     if(target_device_present== 1) { | | |
|         target | 8 | uimsbf |
|     } | | |
|     for (j=0; j< N; j++) { | | |
|         reserved | 8 | bslbf |
|     } | | |
| } | | |

FIG. 50

| Syntax | No. of bits | Format |
|---|---|---|
| image_icon_descriptor( ) { | | |
|     descriptor_tag | 8 | uimsbf |
|     descriptor_length | 8 | uimsbf |
|     descriptor_number | 4 | uimsbf |
|     last_descriptor_number | 4 | uimsbf |
|     icon_id | 8 | uimsbf |
|     if (descriptor_number == 0x00) { | | |
|         icon_transport_mode | 2 | uimsbf |
|         position_flag | 1 | bslbf |
|         if (position_flag == 0x01) { | | |
|             coordinate_system | 3 | uimsbf |
|             icon_horizontal_origin | 13 | uimsbf |
|             icon_vertical_origin | 13 | uimsbf |
|         } | | |
|         else { | | |
|             reserved_future_use | 5 | '11111' |
|         } | | |
|         icon_type_length /*N*/ | 8 | uimsbf |
|         icon_type_chars() | 8*N | uimsbf |
|         if (icon_transport_mode == 0x00 ) { | | |
|             icon_data_length /*M*/ | 8 | uimsbf |
|             icon_data_bytes() | 8*M | uimsbf |
|         } | | |
|         else if (icon_transport_mode == 0x01 ) { | | |
|             url_length /*K*/ | 8 | uimsbf |
|             url() | 8*K | uimsbf |
|         } | | |
|         else if (icon_transport_mode == 0x02 ) { | | |
|             icon_content_linkage | 32 | uimsbf |
|         } | | |
|     } | | |
|     else { | | |
|         icon_data_length/*L*/ | 8 | uimsbf |
|         icon_data_bytes() | 8*L | uimsbf |
|     } | | |
| } | | |

FIG. 51

| Value | Meaning |
|---|---|
| 0x00 | The icon is delivered in the icon_data_bytes |
| 0x01 | The location of the icon file is identified by URL carried in the url_char sequence of bytes. |
| 0x02 | The icon file is delivered via a FLUTE session. |
| 0x03 | reserved |

FIG. 52

| Value | Meaning |
|---|---|
| 0x00 | The coordinate system is 720x576 |
| 0x01 | The coordinate system is 1280x720 |
| 0x02 | The coordinate system is 1920x1080 |
| 0x03 | The coordinate system is 3840x2160 |
| 0x04 | The coordinate system is 7680x4320 |
| 0x05 to 0x07 | reserved |

FIG. 53

| Syntax | No. of bits | Format |
|---|---|---|
| component_list_descriptor(){ | | |
|    descriptor_tag | 8 | uimsbf |
|    descriptor_length | 8 | uimsbf |
|    num_component | 8 | uimsbf |
|    for (i=0;i<num_component;i++){ | | |
|       component_id | 8 | uimsbf |
|       component_type | 4 | uimsbf |
|       general_media_type | 4 | uimsbf |
|    } | | |
| } | | |

FIG. 54

| Syntax | Number of bits | Identifier |
|---|---|---|
| URI_linkage_descriptor(){ | | |
|    descriptor_tag | 8 | uimsbf |
|    descriptor_length | 8 | uimsbf |
|    uri_length | 8 | uimsbf |
|    for (i=0;i<uri_length;i++) { | | |
|       uri_char | 8 | bslbf |
|    } | | |
|    for (i=0;i<N;i++) { | | |
|       private_data_byte | 8 | bslbf |
|    } | | |
| } | | |

FIG. 55

| Syntax | No. of bits | Format |
|---|---|---|
| targeting_criteria_descriptor( ){ | | |
|     descriptor_tag | 8 | uimsbf |
|     descriptor_length | 8 | uimsbf |
|     num_targeting_criteria | 8 | uimsbf |
|     for (i=0; i<num_targeting_criteria; i++) { | | |
|         criterion_id_length | 8 | uimsbf |
|         criterion_id | var | var |
|         criterion_type_code | 3 | uimsbf |
|         num_criterion_values | 5 | uimsbf |
|         for (j=0; j<num_criterion_values; j++) { | | |
|             criterion_value_length | 8 | uimsbf |
|             criterion_value | var | |
|         } | | |
|     } | | |
| } | | |

FIG. 56

| Syntax | No. of bits | Format |
|---|---|---|
| text_descriptor( ){ | | |
|     descriptor_tag | 8 | uimsbf |
|     descriptor_length | 8 | uimsbf |
|     descriptor_number | 4 | uimsbf |
|     last_descriptor_number | 4 | uimsbf |
|     description_id | 8 | uimsbf |
|     if (descriptor_number == 0x00) { | | |
|         language_code | 24 | bslbf |
|     } | | |
|     text_length | 8 | uimsbf |
|     for (i=0;i<text_length;i++){ | | |
|         text_char | 8 | uimsbf |
|     } | | |
| } | | |

FIG. 57

| Syntax | No. of bits | Format |
|---|---|---|
| title_descriptor( ){ | | |
|   descriptor_tag | 8 | uimsbf |
|   descriptor_length | 8 | uimsbf |
|   num_title | 8 | uimsbf |
|   for (i=0; i<num_title; i++) { | | |
|     language_code | 24 | bslbf |
|     title_length | 24 | uimsbf |
|     for (i=0;i<text_length;i++){ | | |
|       text_char | 8 or 16 | uimsbf |
|     } | | |
|   } | | |
| } | | |

FIG. 58

| Syntax | No. of bits | Format |
|---|---|---|
| genre_descriptor( ){ | | |
|   descriptor_tag | 8 | uimsbf |
|   descriptor_length | 8 | uimsbf |
|   num_genre | 8 | uimsbf |
|   for (i=0;i<num_genre;i++){ | | |
|     genre_value | 8 | uimsbf |
| } | | |

| Syntax | No. of bits | Format |
|---|---|---|
| targeting_descriptor(){ | | |
| descriptor_tag | 8 | uimsbf |
| descriptor_length | 8 | uimsbf |
| target_device | 8 | uimsbf |
| } | | |

FIG. 61

| Syntax | No. Bits | Format |
|---|---|---|
| show_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     show_id | 16 | uimsbf |
|     show_information_block() | var | |
| } | | |

FIG. 62

| Syntax | No. Bits | Format |
|---|---|---|
| show_information_block( ) { | | |
|     time_span_length | 16 | uimsbf |
|     title_text_length | 8 | uimsbf |
|     title_text() | var | |
|     num_segments | 8 | uimsbf |
|     for(i=0;i<num_segments;i++){ | | |
|         segment_information_block() | | |
|     } | | |
|     num_show_descriptors | 8 | uimsbf |
|     for(i=0;i<num_show_descriptors;i++){ | | |
|         descriptor() | var | |
|     } | | |
| } | | |

FIG. 63

| Syntax | No. Bits | Format |
|---|---|---|
| segment_information_block( ) { | | |
|     segment_id | 16 | uimsbf |
|     start_time | 32 | uimsbf |
|     time_span_length | 16 | uimsbf |
|     num_segment_descriptors | 8 | uimsbf |
|     i=0;i<num_program_descriptors;i++){ | | |
|         descriptor() | | |
|     } | | |
| } | | |

FIG. 66

| Syntax | No. Bits | Format |
|---|---|---|
| program_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     service_id | 16 | uimsbf |
|     program_information_block() | var | |
| } | | |

FIG. 67

| Syntax | No. Bits | Format |
|---|---|---|
| program_information_block( ) { | | |
|    num_program | 8 | uimsbf |
|    for(i=0;i<num_program;i++){ | | |
|       program_id | 16 | uimsbf |
|       time_span_start | 32 | uimsbf |
|       time_span_length | 16 | uimsbf |
|       time_text_length | 8 | uimsbf |
|       time_text() | var | |
|       num_program_descriptors | 8 | uimsbf |
|       for(i=0;i<num_program_descriptors;i++){ | | |
|          descriptor() | | |
|       } | | |
| } | | |

FIG. 68

| Syntax | No. Bits | Format |
|---|---|---|
| program_information_block( ) { | | |
|   num_program | 8 | uimsbf |
|   for(i=0;i<num_program;i++){ | | |
|     program_id | 16 | uimsbf |
|     time_span_start | 32 | uimsbf |
|     time_span_length | 16 | uimsbf |
|     associated_show_flag | 1 | bslbf |
|     reserved | 7 | '1111111' |
|     if (associated_show_flag==1) | | |
|       show_id | 16 | uimsbf |
|     title_text_length | 8 | uimsbf |
|     title_text() | var | |
|     num_program_descriptors | 8 | uimsbf |
|     for(i=0;i<num_program_descriptors;i++){ | | |
|       descriptor() | | |
|     } | | |
|   } | | |
| } | | |

FIG. 69

| Syntax | No. Bits | Format |
|---|---|---|
| program_information_block( ) { | | |
|   num_program | 8 | uimsbf |
|   for(i=0;i<num_program;i++){ | | |
|     program_id | 16 | uimsbf |
|     time_span_start | 32 | uimsbf |
|     time_span_length | 16 | uimsbf |
|     title_text_length | 8 | uimsbf |
|     title_text() | var | |
|     associated_show_flag | 1 | bslbf |
|     reserved | 7 | '1111111' |
|     if(associated_show_flag==1) | | |
|       show_id | 16 | uimsbf |
|     num_component | 8 | uimsbf |
|     for (k=0; k< num_component; k++) { | | |
|       component_id | 8 | uimsbf |
|       essential_component_indicator | 1 | bslbf |
|       ... | | |
|       num_component_descriptors | 8 | uimsbf |
|       for (i=0;i< num_component_descriptors; i++) { | | |
|         component_descriptor() | var | |
|       } | | |
|     } | | |
|     num_program_descriptors | 8 | uimsbf |
|     for (i=0;i< num_component_descriptors; i++) { | | |
|       descriptor() | | |
|     } | | |
| } | | |

FIG. 70

| Syntax | No. Bits | Format |
|---|---|---|
| program_information_block( ) { | | |
|    num_program | 8 | uimsbf |
|    for(i=0;i<num_program;i++){ | | |
|       program_id | 16 | uimsbf |
|       time_span_start | 32 | uimsbf |
|       time_span_length | 16 | uimsbf |
|       title_text_length | 8 | uimsbf |
|       title_text() | var | |
|       num_segments | 8 | uimsbf |
|       for(i=0;i<num_segments;i++){ | | |
|          segment_information_block() | | |
|       } | | |
|       num_program_descriptors | 8 | uimsbf |
|       for(i=0;i<num_program_descriptors;i++){ | | |
|          descriptor() | | |
|       } | | |
| } | | |

FIG. 71

| Syntax | No. Bits | Format |
|---|---|---|
| program_information_block( ) { | | |
|   num_program | 8 | uimsbf |
|   for(i=0;i<num_program;i++){ | | |
|     program_id | 16 | uimsbf |
|     time_span_start | 32 | uimsbf |
|     time_span_length | 16 | uimsbf |
|     title_text_length | 8 | uimsbf |
|     title_text() | var | |
|     associated_show_flag | 1 | bslbf |
|     reserved | 7 | '1111111' |
|     if(associated_show_flag==1) | | |
|       show_id | 16 | uimsbf |
|     num_segments | 8 | uimsbf |
|     for(i=0;i<num_segments;i++){ | | |
|       segment_information_block() | | |
|     } | | |
|     num_program_descriptors | 8 | uimsbf |
|     for(i=0;i<num_program_descriptors;i++){ | | |
|       descriptor() | | |
|     } | | |
| } | | |

FIG. 72

| Syntax | No. Bits | Format |
|---|---|---|
| segment_information_section{ | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         subnet_id | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     segment_information_block() | var | bslbf |
| } | | |

FIG. 73

| Syntax | No. Bits | Format |
|---|---|---|
| segment_information_block( ) { | | |
|     segment_id | 8 | uimsbf |
|     segment_type | 3 | uimsbf |
|     associated_program_flag | 1 | bslbf |
|     time_included | 1 | bslbf |
|     reserved | 3 | '111' |
|     if (associated_program_flag==1) | | |
|         program_id | 16 | uimsbf |
|     if (time_included==1) { | | |
|         time_span_start | 32 | uimsbf |
|         time_span_length | 16 | uimsbf |
|     } | | |
|     num_component | 8 | uimsbf |
|     for (k=0; k< num_component; k++) { | | |
|         component_id | 8 | uimsbf |
|         num_component_descriptors | 8 | uimsbf |
|         for (i=0;i< num_component_descriptors; i++) { | | |
|             component_descriptor() | var | |
|         } | | |
|     } | | |
|     num_descriptors | 8 | uimsbf |
|     for (i=0; i<num_descriptors; i++) { | | |
|         descriptor() | var | |
|     } | | |
| } | | |

FIG. 74

| Syntax | No. of bits | Format |
|---|---|---|
| targeting_segment_set_descriptor( ){ | | |
|   descriptor_tag | 8 | uimsbf |
|   descriptor_length | 8 | uimsbf |
|   time_span_start | 32 | uimsbf |
|   time_span_length | 16 | uimsbf |
|   num_segments | 8 | uimsbf |
|   for (i=0; i<num_segments; i++) { | | |
|     segment_id | 8 | uimsbf |
|     num_targeting_criteria | 8 | uimsbf |
|     for (i=0; i<targeting_criteria; i++) { | | |
|       criterion_id_length | 8 | uimsbf |
|       criterion_id | var | var |
|       criterion_type_code | 3 | uimsbf |
|       num_criterion_values | 5 | uimsbf |
|       for (j=0; j<num_criterion_values; j++) { | | |
|         criterion_value_length | 8 | uimsbf |
|         criterion_value | var | |
|       } | | |
|     } | | |
|   } | | |
| } | | |

FIG. 77

| Continuous Component <> represents a Continuous Component |
|---|
| Attributes |
|     ComponentId[1] - unique identifier of component |

(a)

| Audio Component <> represents a Continuous Component of content type audio |
|---|
| Relationships |
|     Sub-class relationship with Continuous Component class |

(b)

| Video Component <> represents a Continuous Component of content type Video |
|---|
| Relationships |
|     Sub-class relationship with Continuous Component class |

(c)

| CC Component <> represents a Continuous Component of content type closed caption |
|---|
| Relationships |
|     Sub-class relationship with Continuous Component class |

| Elementary Audio Component represents an Elementary Component of content type audio | | | |
|---|---|---|---|
| Attributes | | | |
| | Codec[1] | | |
| | Number of audio channels[1] | | |
| | Encoding bit-rate[1] | | |
| | Language[0..1] | | |
| | Mode[1] Possible values | | |
| | | Complete main | |
| | | Music | |
| | | Dialog | |
| | | Effects | |
| | | Visually impaired | |
| | | Hearing impaired | |
| | | Commentary | |
| | Other encoding parameters (possibly codec dependent) | | |
| Relationships | | | |
| | Sub-class relationship with Audio Component class | | |

(a)

| Elementary Video Component represents an Elementary Component of content type Video | | |
|---|---|---|
| Attributes | | |
| | Codec[1] | |
| | Resolution (width x height, in pixels)[1] | |
| | Aspect ratio[1] | |
| | Interlaced/Progressive[1] | |
| | Frame rate, on "still"picture mode[1] | |
| | Other encoding parameters (possibly codec dependent) | |
| Relationships | | |
| | Sub-class relationship with Video Component class | |

| Elementary CC Component represents an Elementary Component of content type closed caption | | |
|---|---|---|
| Attributes | | |
| | "Codec"(i.e., encoding format)[1] | |
| | Language[1] | |
| | Type[1] Possible values | |
| | | Normal |
| | | Easy-reader |
| Relationships | | |
| | Sub-class relationship with CC Component class | |

| |
|---|
| Composite Audio Component |
| represents a Composite Component of content type audio |
| Relationships |
| "ContainsAudio" relationship with Audio Component class - with the restriction that for each instantiation of the relationship all of the included objects (audio components) represent the same sound scene |
| Sub-class relationship with Audio Component class |

(a)

| | | |
|---|---|---|
| Composite Video Component | | |
| represents a Composite Component of content type video | | |
| Relationships | | |
| "ContainsVideo" relationship with Video Component class - with the restriction that for each instantiation of the relationship all of the contained objects (video components) represent the same video scene | | |
| | Attributes of Contains Video Relationship | |
| | Role - role of the contained component in the Composite Component Possible values | |
| | | Enhancement layer for scalable video encoding, with level |
| | | 3D video left/right view |
| | | 3D video depth information |
| | | Part of video array, <x,y> of <n,m> (from bottom left to top right, by row) |
| | | Follow-Subject metadata (name of subject, location of subject, size of subject), in the case when the "follow-subject" feature is supported by a stream of frame-by-frame metadata indicating an area of the main video component that is focused on the subject |
| | Sub-class relationship with Video Component class | |

| |
|---|
| PickOne Component |
| represents a PickOne Component |
| Relationships |
| "Contains" relationship with Continuous Component class - with the restriction that for each instantiation of the relationship all of the included components are of the same content type and represent the same video scene or audio scene |
| Sub-class relationship with Continuous Component class |

FIG. 81

| Presentable Component <> represents a Presentable Component | | |
|---|---|---|
| Attributes | | |
| | Targeting/personalization properties | |
| | Content advisory rating | |
| | Content/Service protection properties | |
| | Target device(s) [0..n] Possible values | |
| | | Primary Device |
| | | Companion Device |
| | | Inset on Primary Screen ("Picture-in-Picture") |

(a)

| Presentable Video Component represents a Presentable Component of video content type – i.e., contains all objects in the Video Component class that satisfy the definition of a Presentable component | |
|---|---|
| Relationships | |
| | "AssociatedAudio" relationship with Presentable Audio Component class – represents that the associated Presentable Audio Component is suitable for presentation along with the Presentable Video Component |
| | "Associated CC" relationship with Presentable CC Component class – represents that the associated Presentable CC Component is suitable for presentation along with the Presentable Video Component |
| | Sub-class relationship with Video Component |

(b)

| Presentable Audio Component represents a Presentable Component of audio content type – i.e., contains all objects in the Audio Component class that satisfy the definition of a Presentable component | |
|---|---|
| Relationships | |
| | Sub-class relationship with Audio Component |

(c)

| Presentable CC Component represents a Presentable Component of closed caption content type– i.e., contains all objects in the CC Component class that satisfy the definition of a Presentable component | |
|---|---|
| Relationships | |
| | Sub-class relationship with CC Component |

| OnDemand Component |
|---|
| represents a content component that is delivered on demand |
| Attributes |
|     OnDemandComponentId [1] – unique identifier of on demand component |
|     ComponentLocation [1..n] – location where the OnDemand component can be accessed |
|     ComponentName [0..n] – human readable name of component, possibly in multiple languages |
|     PlaybackLength [0..1] – playout time of the component (only meaningful for on demand components such as audio or video clips that have a defined playout time) |
|     AvailabilityStart [0.1] – date and time at which component becomes available |
|     AvailablityDuration [0..1] – length of time component remains available |
|     Targeting/personalization properties |
|     Content/Service protection properties |
|     Content advisory rating [0..n] |

FIG. 83

| NRT Content Item |
|---|
| represents an NRT Content Item |
| Attributes |
|     ContentItemId [1] – unique identifier of NRT Content Item |
|     ContentItemName [0..n] – human readable name of NRT Content Item, possibly in multiple languages |
|     Updatable [1] – indication whether or not NRT Content Item should be monitored for updates |
|     Expiration [0..1] – date and time after which the NRT Content Item should be discarded |
|     ContentItemSize [1] – size of the NRT Content Item, in bytes |
|     PlaybackLength [0..1] – playout time of the NRT Content Item (only meaningful for NRT Content Items such as audio or video clips that have a defined playout time) |
|     Targeting/personalization properties |
|     Content/Service protection properties |
|     Content advisory rating [0..n] |
| Relationships |
|     "Contains" relationship with NRT File class |

(a)

| NRT File represents a Non-real Time file |
|---|
| Attributes |
|     ContentLocation – Content-Location e.g., it can be defined in IETF RFC 2616 |
|     ContentType – Content-Type, e.g., it can be defined in IETF RFC 2616 |

| | |
|---|---|
| OnDemand Component<br>represents a content component that is delivered on demand | |
| Attributes | |
| | OnDemandComponentId [1] – unique identifier of on demand component |
| | ComponentLocation [1..n] – location where the OnDemand component can be accessed |
| | ComponentName [0..n] – human readable name of component, possibly in multiple languages |
| | PlaybackLength [0..1] – playout time of the component (only meaningful for on demand components such as audio or video clips that have a defined playout time) |
| | AvailabilityStart [0.1] – date and time at which component becomes available |
| | AvailablityDuration [0..1] – length of time component remains available |
| | Targeting/personalization properties |
| | Content/Service protection properties |
| | Content advisory rating [0..n] |
| | Essential capabilities [0..1] – receiver capabilities needed for meaningful rendition of the OnDemand Component |
| | Non-essential capabilities [0..1] – receiver capabilities useful for optimal rendition of enhancement, but not absolutely necessary for meaningful rendition of the OnDemand Component |

FIG. 85

| NRT Content Item | |
|---|---|
| represents an NRT Content Item | |
| Attributes | |
| | ContentItemId [1] – unique identifier of NRT Content Item |
| | ContentItemName [0..n] – human readable name of NRT Content Item, possibly in multiple languages |
| | Updatable [1] – indication whether or not NRT Content Item should be monitored for updates |
| | Expiration [0..1] – date and time after which the NRT Content Item should be discarded |
| | ContentItemSize [1] – size of the NRT Content Item, in bytes |
| | PlaybackLength [0..1] – playout time of the NRT Content Item (only meaningful for NRT Content Items such as audio or video clips that have a defined playout time) |
| | Targeting/personalization properties |
| | Content/Service protection properties |
| | Content advisory rating [0..n] |
| | Essential capabilities [0..1] – receiver capabilities needed for meaningful rendition of the NRT Content Item |
| | Non-essential capabilities [0..1] – receiver capabilities useful for optimal rendition of enhancement, but not absolutely necessary for meaningful rendition of the NRT Content Item |
| Relationships | |
| | "Contains" relationship with NRT File class |

(a)

| NRT File represents a Non-real Time file | |
|---|---|
| Attributes | |
| | ContentLocation – Content-Location e.g., it can be defined in IETF RFC 2616 |
| | ContentType – Content-Type, e.g., it can be defined in IETF RFC 2616 |
| | Essential capabilities [0..1] – receiver capabilities needed for meaningful rendition of the NRT File |
| | Non-essential capabilities [0..1] – receiver capabilities useful for optimal rendition of enhancement, but not absolutely necessary for meaningful rendition of the NRT File |

| Linear Service |
|---|
| represents a Linear Service (as described in section 3.2 of this document) |
| Relationships |
|   "Contains" relationship with Presentable Video Component class |
|   Attributes of |
|     Role of video component [1] |
|     Possible values |
|       Primary (default) video |
|       Alternative camera view |
|       Other alternative video component |
|       Sign language (e.g., ASL) inset |
|       Follow subject video, with name of subject being followed, in the case when the follow-subject feature is supported by a separate video component. |
|   "Contains" relationship with Presentable Audio Component class |
|   "Contains" relationship with Presentable CC Component class |
|   "Contains" relationship with Time Base class |
|   "Contains" relationship with App-Based Enhancement class |
|   "Sub-class" relationship with Service class |

FIG. 87

| App |
|---|
| represents a kind of NRT Content Item that can support interactivity |
| Attributes |
|    ... |
| Relationships |
|    Sub-class relationship with NRT Content Item class |

(a)

| App-Based Enhancement |
|---|
| represents an App-Based Enhancement |
| Attributes |
|    Essential capabilities [0..1] – receiver capabilities needed for meaningful rendition of enhancement |
|    Non-essential capabilities [0..1] – receiver capabilities useful for optimal rendition of enhancement, but not absolutely necessary for meaningful rendition of enhancement |
|    Target device [0..n] – for adjunct data services only Possible values |
|       Primary device |
|       Companion device |
| Relationships |
|    "Contains" relationship with App class – for the applications in the App-Based Enhancement |
|    "Contains" relationship with NRT Content Item class – for NRT Content Items used by the applications in the App-Based Enhancement |
|    "Contains" relationship with Notification Stream class – for Notifications Stream that delivers notifications to synchronize the actions of the applications with an underlying Linear Time Base. |
|    "Contains" relationship with OnDemand Component class – for On Demand components to be managed by the application(s). |

| Time Base |
|---|
| represents metadata used to establish a time line for synchronizing the components of a Linear Service |
| Attributes |
|     Time Base ID – identifier of Time Base |
|     Clock Rate – clock rate of the time base |

(a)

| Notification Stream |
|---|
| represents Notification Stream used to deliver synchronized notifications of actions to be taken |
| Attributes |
|     Notification Stream ID – identifier of Notification Stream |

| App-Based Service represents an App-Based Service |
|---|
| Relationships |
|     "Contains" relationship with Time Base class |
|     "Contains" relationship with App-Based Enhancement class. |
|     "Sub-class" relationship with Service class |

FIG. 90

| Program |
|---|
| represents a Program |
| Attributes |
|     ProgramIdentifier [1] – unique identifier of the Program |
|     StartTime [1] – wall clock date and time the Program is scheduled to start |
|     ProgramDuration [1] – scheduled wall clock time from the start of the Program to the end of the Program |
|     TextualTitle [1..n] – human readable title of the Program, possibly in multiple languages – if not present, defaults to TextualTitle of associated Show |
|     TextualDescription [0..n] – human readable description of the Program, possibly in multiple languages – if not present, defaults to TextualDescription of associated Show |
|     Genre [0..n] – genre(s) of the Program – if not present, defaults to Genre of associated Show |
|     GraphicalIcon [0..n] – icon to represent the program (e.g., in ESG), possibly in multiple sizes – if not present, defaults to GraphicalIcon of associated Show |
|     ContentAdvisoryRating [0..n] – content advisory rating for the Program, possibly for multiple regions – if not present, defaults to ContentAdvisoryRating of associated Show |
|     Targeting/personalization properties – properties to be used to determine targeting, etc., of Program – if not present, defaults to Targeting/personalization properties of associated Show |
|     Content/Service protection properties – properties to be used for content protection and/or service protection of Program – if not present, defaults to Content/Service protection properties of associated Show |
|     Other properties defined in the "ESG Model" |
| Relationships |
|     "ProgramOf" relationship with Linear Service class |
|     "ContentItemOf" relationship with App-Based Service class |
|     "OnDemandComponentOf" relationship with App Based Service Class |
|     "Contains" relationship with Presentable Video Component class |
|     Attributes |
|         Role of video component [1] |
|         Possible values |
|         Primary (default) video |
|         Alternative camera view |
|         Other alternative video component |
|         Sign language (e.g., ASL) inset |
|         Follow subject video, with name of subject being followed, in the case when the follow-subject feature is supported by a separate video component. |
|     "Contains" relationship with Presentable Audio Component class |
|     "Contains" relationship with Presentable CC Component class |
|     "Contains" relationship with App-Based Enhancement class |
|     "Contains" relationship with Time Base class |
|     "Based-on" relationship with Show class |
|     "Contains" relationship with Segment class |
|     Attributes of "Contains" relationship with Segment class |
|         RelativeSegmentStartTime – start time of Segment relative to beginning of Program |

FIG. 91

| Show | |
|---|---|
| represents a Show, (i.e., the primary content of a Program from a consumer viewpoint) | |
| Attributes | |
| | ShowIdentifier [1] – unique identifier of the Show [scope of uniqueness TBD] |
| | ShowDuration [1] – duration from the start of the Show to the end of the Show, if played without any interruptions or interstitial material |
| | TextualTitle [1..n] – human readable title of the Show, possibly in multiple languages |
| | TextualDescription [0..n] – human readable description of the Show, possibly in multiple languages |
| | Genre [0..n] – the genre(s) of the Show |
| | GraphicalIcon [0..n] – icon to represent the Show, possibly in multiple sizes |
| | ContentAdvisoryRating [0..n] [details TBD by S34-3 & S33-2] |
| | Targeting/personalization properties – properties to be used to determine targeting, etc., of Program |
| | Content/Service protection properties – properties to be used for content protection and/or service protection of Program |
| | Other properties defined in the "ESG Model" |
| Relationships | |
| | "Includes" relationship with Show Segment class |

FIG. 92

| Segment <> |
|---|
| represents a Segment |
| Attributes |
|     SegmentId [1] – unique identifier of segment |
|     Duration [1] – temporal length of segment |
|     Targeting/personalization properties– targeting properties (to be considered when Segment is to be substituted into a Program) |
|     Content advisory rating [0..1] – content advisory rating for segment (to be considered when Segment is to be substituted into a Program) |

(a)

| Show Segment |
|---|
| represents a Segment of a Show |
| Attributes |
|     ShowSegmentRelativeStartTime – start time of Show Segment relative to beginning of Show |
| Relationships |
|     "Sub-class" relationship with Segment class |

(b)

| Interstitial Segment |
|---|
| Represents a Segment of a Program that is not a Show Segment |
| Relationships |
|     "Sub-class" relationship with Segment class |

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major "channel number" of the service, for service selection |
| @MinorChanNum | 0..1 | integer 0..15 | Minor "channel number" of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
| @ComponentId | 1 | unsignedShort | Unique identifier for component of Service |
| @ComponentType | 1 | string | Component type |
| @ComponentName | 0..N | string | Human readable name of the component of Service |
| @StartTime | 0..1 | unsignedShort | Start time of the component |
| @Duration | 0..1 | unsignedShort | Duration of the component |
| @TargetScreen | 0..N | string | Targeting window of component (e.g. Secondary screen) |
| @URL | 0..N | any URI | URL of component in the Content Server |
| @ContentAdvisory | 0..N | string | Content advisory rating(s) for the component |
| @Genre | 0..N | string | Genre(s) of the component |

FIG. 111

| Link_target_type | Description |
|---|---|
| 0x00 | The URI is a deferred URI. |
| 0x01 | The URI is a generic URI targeting all device classes. |
| 0x02 | The URI is a specific URI targeting devices of the Smartphone class. |
| 0x03 | The URI is a specific URI targeting devices of the Tablet class. |
| 0x04 | The URI is a specific URI targeting devices of the TV class. |
| 0x05 | The URI is a specific URI targeting devices of the PC class. |
| 0x06 to 0xFF | reserved for future use |

FIG. 114

| Service | Service Type | Service ID |
|---|---|---|
| ServiceSignaling | atsc3.0servicesignaling:1 | urn:atsc.org:serviceId:atsc3.0servicesignaling |

(a)

| Variable Name | Req/Opt | Data Type | Evented? |
|---|---|---|---|
| ServiceProperty | Required | String (XML, JSON, ...) | Yes |

(b)

| Name | Required/Optional |
|---|---|
| GetServiceProperty | Required |

(c)

| Argument | Direction | Related State Variable |
|---|---|---|
| ServiceProperty | OUT | ServiceProperty |

```
<?xml Version="1.0"?>
<propertyset>
  <property>
    <ServiceId>a000001</ServiceId>
  </property>
  <property>
    <ServiceName>MBC Music</ServiceId>
  </property>
  <property>
    <ContentId>mbcradio002</ServiceId>
  </property>
  <property>
    <ContentName>Pop Chart</ServiceId>
  </property>
  <property>
    <MajorChanNum>11</ServiceId>
  </property>
  <property>
    <MinorChanNum>5</ServiceId>
  </property>
  ....
</propertyset>
```

(a)

```
<?xml Version="1.0"?>
<ServiceProperty>
  <ServiceId>a000001</ServiceId>
  <ServiceName>MBC Music</ServiceName>
  <ContentId>mbcradio002</ContentId>
  <ContentName>Pop Chart</ContentName>
  <MajorChanNum>11</MajorChanNum>
  <MinorChanNum>5</MinorChanNum>
  ....
  ....
</ServiceProperty>
```

(b)

```
<?xml Version="1.0"?>
<ServiceProperty (or ServiceInfo)
  ServiceId="a000001" ServiceName="MBC Music" MajorChanNum="11" MinorChanNum="5" ...>
  <ComponentItem ContentId="mbcradio002" ComponentType="video" ComponentName=" afaefaef    ", ....>
  </ComponentItem>
</ServiceProperty (or /ServiceInfo)>
```

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

```
<?xml Version="1.0"?>
<propertyset>
  <property>
    <ServicePropertyChangeFlag> true </ServicePropertyChangeFlag>
  </property>
</propertyset>
```

(a)

```
<?xml Version="1.0"?>
<ServicePropertyChangeFlag>
  <value> true </value>
</ServicePropertyChangeFlag>
```

(b)

"true" 혹은 "false"

(c)

```
<?xml Version="1.0"?>
<ServiceProperty>
  <genre>Sports</genre>
  <language>KOR</language>
</ServiceProperty>
```

| Variable Name | Req/Opt | Data Type | Evented? |
|---|---|---|---|
| ServiceProperty | Required | string (XML) | No |
| ServicePropertyName | Required | string (XML) | No |
| ServicePropertyChangeFlag | Required | string (bin.hex) | Yes |
| ServicePropertyURL | Optional | string (XML) or anyURI | No |

(a)

```
<?xml Version="1.0"?>
<ServicePropertyURL>
  <value>http://atsc.serviceinfo.com/servicename</value>
</ServicePropertyURL>
```

```
<?xml Version="1.0"?>
< ServicePropertyChangeFlag      >
   <value>   90080004...    </value>
</ServicePropertyChangeFlag>
```

1001 0000 0000 1000 0000 ...

(a)

```
<?xml Version="1.0"?>
<ServiceProperty>
   <language>a000001</language>
   <genre>MBC Music</genre>
   <AdvisoryRating>mbcradio002</AdvisoryRating>
   <targeting>Pop Chart</targeting>
   ....
   ....
</ServiceProperty>
```

| Variable Name | Req/Opt | Data Type | Evented? |
|---|---|---|---|
| ServiceProperty | Required | string (XML) | No |
| ServicePropertyName | Required | string (XML) | No |
| ServicePropertyChangeFlag | Required | string (XML), List of strings (XML) or CSV of strings | Yes |
| ServicePropertyURL | Optional | string (XML) or anyURI | No |

(a)

```
<?xml Version="1.0"?>
<ServicePropertyChangeFlag>
    <changedfield > genre</changedfield>
    <changedfield >targeting</changedfield>
</ServicePropertyChangeFlag>
```

(b)

```
<?xml Version="1.0"?>
< ServicePropertyChangeFlag>
    genre targeting
</ ServicePropertyChangeFlag>
```

(c)

"genre, targeting"

(d)

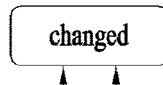

```
<?xml Version="1.0"?>
<ServiceProperty>
    <language>a000001</language>
    <genre>MBC Music</genre>
    <AdvisoryRating>mbcradio002</AdvisoryRating>
    <targeting>Pop Chart</targeting>
    ....
    ....
</ServiceProperty>
```

| Variable Name | Req/Opt | Data Type | Evented? |
|---|---|---|---|
| ServiceProperty | Required | string (XML) | No |
| A_ARG_TYPE_ServicePropertyName | Required | string (CSV) | No |
| A_ARG_TYPE_UpdatedServicePropertyValue | Required | string (XML) | No |
| UpdatedPropertyNames | Required | string (XML) | Yes |

(a)

```
<?xml Version="1.0"?>
<UpdatedPropertyNames>
  <propertyList>
    <propertyName>ContentId</propertyName>
    <propertyName>ContentName</propertyName>
    <propertyName>MajorChanNum</propertyName>
  </propertyList>
</UpdatedPropertyNames>
```

(b)

```
<?xml Version="1.0"?>
< UpdatedPropertyNames>
  <added>
    <propertyName>ContentId</propertyName>
    <propertyName>ContentName</propertyName>
  </added>
  <modified>
    <propertyName>Description</propertyName>
  </modified>
  <deleted>
    <propertyName>Genre</propertyName>
  </deleted>
</UpdatedPropertyNames>
```

| Name | Required/Optional |
|---|---|
| GetServiceProperty | Required |
| GetServicePropertyValue | Required |

(a)

| Argument | Direction | Related State Variable |
|---|---|---|
| ServiceProperty | OUT | ServiceProperty |

(b)

| Argument | Direction | Related State Variable |
|---|---|---|
| ServicePropertyName | IN | A_ARG_TYPE_ServicePropertyName |
| UpdatedServicePropertyValue | OUT | A_ARG_TYPE_UpdatedServicePropertyValue |

(c)

```
<?xml Version="1.0"?>
<UpdatedServicePropertyValue>
  <propertyList>
    <ContentId>sport0020</ContentId>
    <ContentName>Sports Highlight</ContentName>
    <MajorChanNum>20</MajorChanNum>
  </propertyList>
</UpdatedServicePropertyValue>
```

| Variable Name | Req/Opt | Data Type | Evented? |
|---|---|---|---|
| Service Property | Required | string | No |
| ServicePropertyName | Required | string | No |

(a)

| Name | Required/Optional |
|---|---|
| GetServiceProperty | Required |
| SetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

| Argument | Direction | Related State Variable |
|---|---|---|
| ServicePropertyName | IN | ServicePropertyName |

```xml
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR INDICATED A SEVERE THUNDERSTORM OVER SOUTH CENTRAL ALPINE COUNTRY...OR ABOUT 18 MILES SOUTHEAST OF KIRKWOOD...MOVING SOUTHWEST AT 5 MPH. HAIL...INTENSE RAIN AND STRONG DAMAGING WINDS ARE LIKELY WITH THIS STORM.</description>
    <instruction>TAKE COVER IN A SUBSTANTIAL SHELTER UNTIL THE STORM PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME NORTHEASTERN CALAVERAS COUNTY IN CALIFONIA, SOUTHWESTERN ALPINE COUNTY IN CALIFORNIA</areaDesc>
      <polygon>38.47,-120.14 38.34,-119.95 38.52,-119.74 38.62,-119.89 38.47,-120.14</polygon>
      <geocode>fips6=006109</geocode>
      <geocode>fips6=006009</geocode>
      <geocode>fips6=006003</geocode>
    </area>
  </info>
</alert>
```

FIG. 132

| Service | Service Type | Service ID |
|---|---|---|
| EmergencyAlert | atsc3.0:atsc3.0eas:1 | urn:atsc.org:service:atsc3.0eas |

(a)

| Variable Name | Req/Opt | Data Type | Evented? |
|---|---|---|---|
| EmergencyAlert | Required | string (XML, JSON, ...) | Yes |
| EmergencyAlertProperty | Required | string (XML, JSON, ...) | No or Yes |

(b)

```
<EmergencyAlert>
<dateTime>20140122T052000 </dateTime>
    <messageType>CAP</messageType>
    <version>1.1</version>
</EmergencyAlert>
```

(c)

| Name | Required/Optional |
|---|---|
| GetAllEmergencyAlertMessage | Required |

(d)

| Argument | Direction | Related State Variable |
|---|---|---|
| EmergencyAlertProperty | OUT | EmergencyAlertProperty |

```
<?xml version = "1.0" encoding = "UTF-8"?>
<alert xmlns = "http://www.incident.com/cap/1.0")
<identifier>KSTo1055887203<1identifier>
<sender>KSTo8NWS.NOAA.GOV</sender>
<3ent>2003-06-17T14:57:00-07:00</sent>
<status>Actual</status>
<mngype>Alert</mngype>
<scope>Publ1c</scope>
<info>
<category>MEt<1category>
<event>SEVERE THUNDERSTORM</event>
<urgency>Immediate</urgency>
<severity>5evere</severity>
<certainty>Likely</certainty>
<eventCode>same=SVR<1eventCode>
<expires>2003-06-17Tl é=00:00-07:00</expire3>
<senderName>NATIONAL WEATHER SERVICE SACRAMENTO CA</3enderName>
<headline>SEVERE THUNDERSTORM WARNING</headline>
<description> AT 254 PM PDT...NATIONAL WEATHER SERVICE DOPPLER RADAR
INDICATED A SEVERE THUNDERSTORM OVER SOUTH CENTRAL ALPINE COUNTY...OR ABOUT 18
MILES SOUTHEAST OF KIRKWOOD...MOVTNG SOUTHWEST AT 5 MPH. HAIL...INTENSE RAIN AND
STRONG DAMAGING WINDS ARE LIKELY WITH THIS STORM.</description>
<instruction>TAKE COVER IN A SUBSTANTIAL SHELTER UNTIL THE STORM
PASSES.</instruction>
<contact>BARUFFALDI/JUSKIE</contact>
<area>
<areaDcsc>EXTREME NORTH CENTRAL TUOLUMNE COUNTY IN CALIFORNIA, EXTREME
NORTHEASTERN CALAVERAS COUNTY IN CALIFORNIA, SOUTHWESTERN ALPINE COUNTY IN
CALIFORNIA</areaDesc>
<polygon>33.47,-120.14 38.34,-119.95 38.52,-119.74 38.62,-119.89 38.47,-
120.14</polygon>
<geocode>fipsé=006109</geocode>
<geocode>fipsє=006009</geocode>
<geocode>fipsé:006003<1geocode>
</area>
</info>
</alert>
```

FIG. 135

| Urgency | Severity | Certainty | |
|---|---|---|---|
| Immediate | Extreme | Very likely (>85%) | ⎤ High |
| Expected | Severe | Likely (>50%) | ⎦ |
| Future | Moderate | Possible (<50%) | — Medium |
| Past | Minor | Unlikely (0%) | — Low |
| Unknown | Unknown | Unknown | — Default (Medium) |

FIG. 136

| Urgency | Severity | Certainty |
|---|---|---|
| Immediate - 5 | Extreme - 5 | Very likely (>85%) - 5 |
| Expected - 4 | Severe - 4 | Likely (>50%) - 4 |
| Future - 3 | Moderate - 3 | Possible (<50%) - 3 |
| Past - 2 | Minor - 2 | Unlikely (0%) - 2 |
| Unknown - 1 | Unknown - 1 | Unknown - 1 |

FIG. 137

| Urgency |
|---|
| Immediate - 9 |
| Expected - 8 |
| Future - 7 |
| Past - 5 |
| Unknown - 0 |

| Severity |
|---|
| Extreme - 5 |
| Severe - 4 |
| Moderate - 3 |
| Minor - 2 |
| Unknown - 0 |

| Certainty |
|---|
| Very likely (>85%) - 6 |
| Likely (>50%) - 5 |
| Possible (<50%) - 4 |
| Unlikely (0%) - 3 |
| Unknown - 0 |

FIG. 138

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

```
<?xml Version="1.0"?>
< EmergencyAlertMessage >
  <identifier>KSTO1055887203</identifier>
  <category>Met</category>
  <urgency>Immediate</urgency>
  <severity>Severe</severity>
  <certainty>Likely</certainty>
  <description>AT 242 PM....</description>
</EmergencyAlertMessage >
```

FIG. 141

| Variable Name | Req/Opt | Data Type | Evented? |
|---|---|---|---|
| EmergencyAlert | Required | string (XML JSON, ...) | Yes |

(a)

```
<?xml Version="1.0"?>
< EmergencyAlert >
  < ServiceId >000011</ServiceId>
  < MessageId >KSTO1055887203</MessageId>
  < MessageURI > http://atsc.easinfo.com/</MessageURI>
</EmergencyAlert>
```

(b)

| Name | Required/Optional |
|---|---|
| GetEmergencyAlertInfo | Required |

(c)

| Argument | Direction | Related State Variable |
|---|---|---|
| EmergencyAlert | OUT | EmergencyAlert |

| Variable Name | Req/Opt | Data Type | Evented? |
|---|---|---|---|
| EmergencyAlert | Required | string (XML) | Yes or No |
| A_ARG_TYPE_EmergencyAlertURI | Required | string (XML) | Yes or No |

(a)

```
<?xml Version="1.0"?>
< EmergencyAlert >
  < dateTime>20140122T052000</dateTime >
  < ServiceId>000011</ServiceId >
  < MessageId >KSTO1055887203</MessageId>
  < URIList >
    <URI> file://EASmessageInfo/ui/full/index.html</URI>
    <URI> file://EASmessageInfo/ui/alternative/index.html</URI>
  </URIList >
</EmergencyAlert>
```

(b)

```
<?xml Version="1.0"?>
< EmergencyAlerURI >
  <URI>  file://EASmessageInfo/ui/index.html</URI>
</ EmergencyAlertURI >
```

| Name | Required/Optional |
|---|---|
| GetEmergencyAlert | Required |
| GetEmergencyAlertURI | Required |

(a)

| Argument | Direction | Related State Variable |
|---|---|---|
| EmergencyAlert | OUT | EmergencyAlert |

(b)

| Argument | Direction | Related State Variable |
|---|---|---|
| EmergencyAlertURI | OUT | A_ARG_TYPE_EmergencyAlertURI |

| Service | Service Type | Service ID |
|---|---|---|
| NRTDataSignaling | atsc3.0:nrtdatasignaling:1 | urn:atsc.org:serviceId:atsc3.0:nrtdatasignaling |

(a)

| XML Element/Attribute | | | Cardinality | Data Type | Description |
|---|---|---|---|---|---|
| NRTDataInfo | | | | | |
| | @DataId | | 1 | unsignedShort | Unique identifier for NRT Data |
| | @ConsumptionModel | | 1 | string | Consumption model for NRT Data |
| | @DownloadingStatus | | 0..1 | string | Downloading status of NRT Data: "Downloading", "Completed", or "Error" |
| | ContenItem | | 1..N | | Content Item Information of NRT Data |
| | | @ContentItemId | 1 | unsignedShort | Unique identifier of NRT Content Item |
| | | @ContentItemName | 0..N | string | Human reqdable name of NRT Content Item |
| | | @ContentItemSize | 1 | unsignedShort | Size of the NRT Content Item, in bytes |
| | | @PlaybackLength | 0..1 | unsignedShort | Playout time of the NRT Content Item |
| | | @URL | 0..N | any URI | URL of NRT Content Item in Content Server |

| Variable Name | Req/Opt | Data Type | Evented? |
|---|---|---|---|
| NRTDataProperty | Required | string (XML) | Yes |
| NRTDataID | Required | string | No |

(a)

```
<?xml Version="1.0"?>
<NRTDataProperty (or NRTDataInfo)
  DataId="000001" ConsumptionModel="0x0C50" DownloadingStatus="Downloading">
    <ContentItem ContentItemId="32" ContentItemName="Movie clip"
    ContentItemSize="500" PlaybackLength="48" URL="http://atsc.nrtdatainfo.com/32">
</NRTDataProperty (or NRTDataInfo)>
```

(b)

| Name | Required/Optional |
|---|---|
| GetNRTDataProperty | Required |

(c)

| Argument | Direction | Related State Variable |
|---|---|---|
| NRTDataProperty | OUT | NRTDataProperty |
| NRTDataID | IN | NRTDataID |

| Service | Service Type | Service ID |
|---|---|---|
| DeviceCapabilitySignaling | atsc3.0:devservicesignaling:1 | urn:atsc.org:serviceId:atsc3.0:devservicesignaling |

(a)

| XML Element/Attribute | Cardinality | Data Type | Description |
|---|---|---|---|
| DeviceCapabilityProperty | | | |
|   ComponentItem | 1..N | | |
|     @ComponentID | 1 | unsignedShort | Unique identifier for component of service |
|     @ComponentType | 1 | string | Type of component (e.g. video, audio, etc.) |
|     Video | 0..1 | | |
|       @VideoCodec | 1 | string | Video Codec in case of video component |
|       @Resolution | 0..1 | string | width x height, in pixels |
|       @AspectRatio | 0..1 | string | Aspect Ratio of component |
|     @AudioCodec | 0..1 | string | Audio Codec in case of audio component |
|     @CCCodec | 0..1 | string - 15 | encoding format for Closed Caption |
|     @AppVersion | 0..1 | integer 0 | application version in case of application |
|     @CapabilityCode | 0..1 | string | Capability Code for OnDemand component, NRT Content Item, or NRT File |
|     @AvailComponentURL | 1 | boolean | Default = "false" |

(b)

| XML Element/Attribute | Cardinality | Data Type | Description |
|---|---|---|---|
| DeviceCapabilityProperty | | | |
|   ComponentItem | 1..N | | |
|     @ComponentID | 1 | unsignedShort | Unique identifier for component of service |
|     @ComponentType | 1 | string | Type of component (e.g. video, audio, etc.) |
|     Video | 0..1 | | |
|       @VideoCodec | 1 | string | Video Codec in case of video component |
|       @Resolution | 0..1 | string | width x height, in pixels |
|       @AspectRatio | 0..1 | string | Aspect Ratio of component |
|     Audio | 0..1 | | |
|       @AudioCodec | 1 | string | Audio Codec in case of audio component |
|     CC | 0..1 | | |
|       @CCCodec | 1 | string | encoding format for Closed Caption |
|     App | 0..1 | | |
|       @AppVersion | 0..1 | integer 0 - 15 | application version in case of application |
|     CapabilityCode | 0..1 | string | Capability Code for the component, |
|     AvailComponentURL | 1 | boolean | Default = "false" |

| Variable Name | Req/Opt | Data Type | Evented? |
|---|---|---|---|
| DeviceCapabilityProperty | Required | string (XML, JSON, ...) | Yes |
| ComponentURL | Optional | string (XML, JSON, ...), or anyURI | No |

(a)

```
<?xml Version="1.0"?>
<DeviceCapabilityProperty>
  <ComponentItem ComponentId="00011" ComponentType="video">
    <Video Resolution="1280x720"></Video>
    <Audio AudioCodec="ABCAAC"></Aideo>
    ...
  <AvailComponentURL>false</AvailComponentURL>
  </ComponentItem>
<DeviceCapabilityProperty>
```

(b)

```
<?xml Version="1.0"?>
<ComponentURL >
  <value>http://atsc.componentinfo.com/secondscreen/video1</value>
</ ComponentURL >
```

(c)

| Variable Name | Req /Opt | Data Type | Evented? |
|---|---|---|---|
| A_ARG_TYPE_ComponentId | Required | string (XML, JSON,...) | No |
| A_ARG_TYPE_ComponentItem | Required | string (XML, JSON,...) | No |

| Name | Required/Optional |
|---|---|
| GetComponentItem | Required |
| GetComponentURL | Optional |
| GetDeviceCapability | Required |

(a)

| Action | Argument | Direction | Related State Variable |
|---|---|---|---|
| GetDeviceCapability | ComponentId | IN | A_ARG_TYPE_ComponentId |
| | DeviceCapabilityProperty | OUT | DeviceCapabilityProperty |
| GetComponentURL | ComponentId | IN | A_ARG_TYPE_ComponentId |
| | ComponentURL | OUT | ComponentURL |
| GetComponentItem | ComponentId | IN | A_ARG_TYPE_ComponentId |
| | ComponentItem | OUT | A_ARG_TYPE_ComponentItem |

| XML Element/Attribute | Cardinality | Data Type | Description |
|---|---|---|---|
| DeviceCapabilityProperty | | | |
|   ComponentItem | 1..N | | |
|     @ComponentID | 1 | unsignedShort | Unique identifier for component of service |
|     @ComponentType | 1 | string | Type of component (e.g. video, audio, etc.) |
|     Video | 0..1 | | |
|       @VideoCodec | 1 | string | Video Codec in case of video component |
|       @Resolution | 0..1 | string | width x height, in pixels |
|       @AspectRatio | 0..1 | string | Aspect Ratio of component |
|     Audio | 0..1 | | |
|       @AudioCodec | 1 | string | Audio Codec in case of audio component |
|     CC | 0..1 | | |
|       @CCCodec | 1 | string | encoding format for Closed Caption |
|     App | 0..1 | | |
|       @AppVersion | 0..1 | integer 0 - 15 | application version in case of application |
|     CapabilityCode | 0..1 | string | Capability Code for the component, |
|     AvailComponentURL | 0..1 | anyURI | Accessible URI for the coompontent |

(a)

```
<?xml Version="1.0"?>
<DeviceCapabilityProperty >
  <ComponentItem ComponentId ="00011" ComponentType ="video">
    <Video Resolution="1280x720"></Video>
    <Audio  AudioCodec ="ABCAAC"></Aideo>
    ...
  <AvailComponentURL >www.abc.def/content00011</AvailComponentURL>
</ ComponentItem >
<DeviceCapabilityProperty >
```

(b)

BROADCAST RECEIVING DEVICE, METHOD OF OPERATING BROADCAST RECEIVING DEVICE, LINKING DEVICE FOR LINKING TO BROADCAST RECEIVING DEVICE, AND METHOD OF OPERATING LINKING DEVICE

CROSS-REFERENCE TO RELATED APPLICATIONS

This application is a Continuation of U.S. application Ser. No. 15/317,359, filed on Dec. 8, 2016, which is the National Phase of PCT International Application No. PCT/KR2015/006640, filed on Jun. 29, 2015, which claims priority under 35 U.S.C. 119(e) to U.S. Provisional Application No. 62/019,395, filed on Jun. 30, 2014, all of these applications are hereby expressly incorporated by reference into the present application.

BACKGROUND OF THE INVENTION

Field of the Invention

The present invention relates to a broadcast reception device, a method of operating a broadcast reception device, a companion device for interoperating with a broadcast reception device and a method of operating a companion device.

Discussion of the Related Art

With development of digital broadcast and communication environments, hybrid broadcasts using communication networks (for example, broadband) in addition to existing broadcast networks receive attentions. Additionally, such hybrid broadcasts provide applications or broadcast services interoperating with terminal devices such as smartphones or tablets. As the uses of terminal devices such as smartphones or tablets increase, it is necessary to provide broadcast services efficiently interoperating with the terminal devices.

Especially, broadcast services efficiently providing the properties of broadcast services or information such as an emergency alarm transmitted through broadcasts to terminal devices such as smartphones or tablets are required.

SUMMARY OF THE INVENTION

Embodiments provide a broadcast reception device providing broadcast services efficiently interoperating with terminal devices and an operating method thereof.

Embodiments also provide a broadcast reception device providing broadcast services efficiently transmitting information to terminal devices and an operating method thereof.

Embodiments also provide a terminal device efficiently interoperating with a broadcast reception device and efficiently receiving information from the broadcast reception device.

The object of the present invention can be achieved by providing a companion device interoperating with a broadcast reception device for receiving a broadcast service including a communication unit configured to establish a pairing session with the broadcast reception device, and a controller configured to transmit a request for notification of signaling information from the broadcast reception device, to receive the signaling information and to perform a function related to the received signaling information.

The signaling information may include broadcast service property information, and the controller may receive updated property information from the broadcast reception device, selectively request some properties included in the updated property information from the broadcast reception device and receive information on the requested properties.

The reception of the updated property information and the request for some properties may be performed and made based on names of properties included in the broadcast service property information.

The signaling information may include emergency alert information, the controller may receive at least one of a message identifier, a service identifier and URI information from the broadcast reception device, and request the emergency alert information from the broadcast reception device based on the received message identifier and service identifier or requests the emergency alert information from a content server based on the received URI information, and the emergency alert information may be received based on the request.

The signaling information may include emergency alert information, the controller may receive URI information from the broadcast reception device, and receive the emergency alert information from the broadcast reception device based on the received URI information, and the emergency alert information may include a user interface page generated by the broadcast reception device.

The signaling information may include non-real-time information, and the controller may request property information of the non-real-time data using an identifier of the non-real-time data, and receive the property information of the non-real-time data in an XML from the broadcast reception device.

The signaling information may include device capability information, and the controller may receive the device capability information, request a media component based on the device capability information, and receive and present the media component.

The device capability information may further include location information of a replaceable media component.

The location information may include uniform resource locator (URL) information of the replaceable media component, and the controller may receive the replaceable media component from the broadcast reception device or a content server based on the URL information.

Provided is a broadcast reception device providing broadcast services efficiently interoperating with terminal devices and an operating method thereof.

Provided is a broadcast reception device providing broadcast services efficiently transmitting information to terminal devices and an operating method thereof.

Provide is a terminal device efficiently interoperating with a broadcast reception device and efficiently receiving information from the broadcast reception device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a view of a broadcast transmission frame according to another embodiment of the present invention.

FIG. 4 is a view illustrating a structure of a transport packet transmitting a broadcast service according to an embodiment of the present invention.

FIG. 5 is a view illustrating a value that a network protocol field has in a transport packet transmitting a broadcast service according to an embodiment of the present invention.

FIG. 9 is a view illustrating a broadcast service signaling table according to an embodiment of the present invention.

FIG. 10 is a view illustrating a value that a service_category field has in a broadcast service signaling table according to an embodiment of the present invention.

FIG. 11 is a view of a broadcast service signaling table according to another embodiment of the present invention.

FIG. 12 is a view of a stream identifier descriptor according to another embodiment of the present invention.

FIG. 13 is a view illustrating an operation when a broadcast transmission device transmits a broadcast service signaling table according to an embodiment of the present invention.

FIG. 14 is a view illustrating an operation when a broadcast reception device receives a broadcast service signaling table according to an embodiment of the present invention.

FIG. 15 is a view illustrating broadcast service transmission path signaling information according to an embodiment of the present invention.

FIG. 16 is a view illustrating a value that a delivery_network_type field has in broadcast service transmission path signaling information according to an embodiment of the present invention.

FIG. 17 is a view that broadcast service transmission path signaling information signals the transmission of a broadcast service through IP stream according to an embodiment of the present invention.

FIG. 18 is a view that broadcast service transmission path signaling information signals the transmission of a broadcast service through an IP stream of another broadcaster according to an embodiment of the present invention.

FIG. 19 is a view that broadcast service transmission path signaling information signals the transmission of a broadcast service through a FLUTE session according to an embodiment of the present invention.

FIG. 20 is a view that broadcast service transmission path signaling information signals the transmission of a broadcast service through a FLUTE protocol of another broadcaster according to an embodiment of the present invention.

FIG. 21 is a view that broadcast service transmission path signaling information signals the transmission of a broadcast service through MPEG-2 TS stream of another broadcaster according to an embodiment of the present invention.

FIG. 22 is a view that broadcast service transmission path signaling information signals the transmission of a broadcast service through a packet based stream of another broadcaster according to an embodiment of the present invention.

FIG. 23 is a view that broadcast service transmission path signaling information signals the transmission of a broadcast service through a packet based stream of an IP based broadcast network according to an embodiment of the present invention.

FIG. 24 is a view that broadcast service transmission path signaling information signals a broadcast service through URL according to an embodiment of the present invention.

FIG. 27 is a view illustrating media component signaling information signaling a media component according to an embodiment of the present invention.

FIG. 28 is a view illustrating a value that a component_type field in media component signaling information according to an embodiment of the present invention.

FIG. 29 is a view illustrating a component_data field in media component signaling information according to an embodiment of the present invention.

FIG. 30 is a view illustrating the type and role of a media component according to an embodiment of the present invention.

FIG. 34 is a view illustrating a configuration of a broadcast reception device according to another embodiment of the present invention.

FIG. 35 is a view illustrating a configuration of a complex video component according to an embodiment of the present invention.

FIG. 42 is a view illustrating media component information according to an embodiment of the present invention.

FIG. 43 is a view illustrating a value of a component_data field in media component signaling information according to another embodiment of the present invention.

FIG. 44 is a view illustrating complex component information according to an embodiment of the present invention.

FIG. 45 is a view illustrating a descriptor including complex component information according to an embodiment of the present invention.

FIG. 46 is a view illustrating related component list information according to an embodiment of the present invention.

FIG. 47 is a view of an NRT information table according to an embodiment of the present invention.

FIG. 48 is a view illustrating an NRT information block according to an embodiment of the present invention.

FIG. 49 is a view of an NRT service descriptor according to an embodiment of the present invention.

FIG. 50 is a view illustrating graphic icon information according to an embodiment of the present invention.

FIG. 51 is a view illustrating a value that an icon transport mode field of graphic icon information has according to an embodiment of the present invention.

FIG. 52 is a view illustrating a value that a coordinate system field of graphic icon information has according to an embodiment of the present invention.

FIG. 53 is a view illustrating media component list information according to an embodiment of the present invention.

FIG. 54 is a view when a media component or a broadcast service is mapped through URI in a broadcast service signaling table according to an embodiment of the present invention.

FIG. 55 is a view illustrating targeting criterion information signaling the targeting criterion of a broadcast service or a media component.

FIG. 56 is a view illustrating text information for describing a broadcast service or a media component.

FIG. 57 is a view illustrating title information of a broadcast service, a program, or a show segment.

FIG. 58 is a view illustrating genre information of a broadcast service, a program, or a show segment.

FIG. 61 is a view illustrating show information according to an embodiment of the present invention.

FIG. 62 is a view illustrating a show information block according to an embodiment of the present invention.

FIG. 63 is a view illustrating a segment information block according to an embodiment of the present invention.

FIG. 66 is a view illustrating program information according to an embodiment of the present invention.

FIG. 67 is a view illustrating a program information block according to an embodiment of the present invention.

FIG. 68 is a view illustrating a program information block according to another embodiment of the present invention.

FIG. 69 is a view illustrating a program information block according to another embodiment of the present invention.

FIG. 70 is a view illustrating a program information block according to another embodiment of the present invention.

FIG. 71 is a view illustrating a program information block according to another embodiment of the present invention.

FIG. 72 is a view illustrating segment information according to an embodiment of the present invention.

FIG. 73 is a view illustrating a segment information block according to an embodiment of the present invention.

FIG. 74 is a view illustrating a targeting segment set information according to an embodiment of the present invention.

FIG. 77 is a view illustrating a continuous component class, an audio component class, a video component class, and a closed caption component class.

FIG. 78 is a view illustrating an elementary audio component class, an elementary video component class, and an elementary closed caption component class.

FIG. 79 is a view illustrating a composite audio component class and a composite video component class.

FIG. 80 is a view illustrating a PickOne component class.

FIG. 81 is a view illustrating a presentable component class, a presentable video component class, a presentable audio component class, and a presentable subtitle component class.

FIG. 82 is a view illustrating an OnDemand component class.

FIG. 83 is a view illustrating an NRT content item class and an NRT file class.

FIG. 84 is a view illustrating an OnDemand component class according to another embodiment of the present invention.

FIG. 85 is a view illustrating an NRT content item class and an NRT file class according to another embodiment of the present invention.

FIG. 86 is a view illustrating a linear service class.

FIG. 87 is a view illustrating an App class and an App-based enhancement service.

FIG. 88 is a view illustrating a time base class and a notification stream class.

FIG. 89 is a view illustrating an App-based service class.

FIG. 90 is a view illustrating a program class.

FIG. 91 is a view illustrating a show class.

FIG. 92 is a view illustrating a segment class, a show segment class, and an interstitial segment class.

FIG. 110 is a view showing properties of a broadcast service signaled according to an embodiment of the present invention.

FIG. 111 is a view showing values of target device information among properties of a broadcast service signaled according to an embodiment of the present invention.

FIG. 114 is a view showing service signaling messages of a broadcast reception device and a companion device using an eventing method according to an embodiment of the present invention.

FIG. 116 is a view showing the data format of a broadcast service property signaled from a broadcast receiving device to a companion device according to an embodiment of the present invention.

FIG. 117 is a view showing a variables indicating that the state of a broadcast service property signaled from a broadcast receiving device to a companion device, an action for the broadcast service property and an action argument according to an embodiment of the present invention.

FIG. 119 is a view showing data format indicating whether a broadcast service property signaled from a broadcast receiving device to a companion device is changed according to another embodiment of the present invention.

FIG. 120 is a view showing a variable indicating the state of a broadcast service property signaled from a broadcast receiving device to a companion device according to another embodiment of the present invention.

FIG. 121 is a view showing data format indicating whether a broadcast service property signaled from a broadcast receiving device to a companion device is changed according to another embodiment of the present invention.

FIG. 122 is a view showing the variable indicating the state of a broadcast service property signaled from a broadcast receiving device to a companion device according to another embodiment of the present invention.

FIG. 123 is a ladder diagram showing operation for signaling a broadcast service property from a broadcast receiving device to a companion device according to another embodiment of the present invention.

FIG. 124 is a view showing a variable indicating the state of a broadcast service property signaled from a broadcast receiving device to a companion device according to another embodiment of the present invention.

FIG. 125 is a view showing an action for acquiring a broadcast service property according to an embodiment of the present invention.

FIG. 126 is a ladder diagram showing operation for signaling a broadcast service property from a broadcast receiving device to a companion device according to another embodiment of the present invention.

FIG. 127 is a view showing a variable indicating the state of a broadcast service property signaled from a broadcast receiving device to a companion device, an action for the broadcast service property and an action argument according to another embodiment of the present invention.

FIG. 128 is a ladder diagram showing operation for signaling a broadcast service property from a broadcast receiving device to a companion device according to another embodiment of the present invention.

FIG. 129 is a view showing a process of generating and transmitting an emergency alert over a broadcast network according to an embodiment of the present invention.

FIG. 130 is a view showing extraction and display of an emergency alert signaled by a broadcast receiving device over a broadcast network according to an embodiment of the present invention.

FIG. 131 is a view showing the format of a CAP message according to an embodiment of the present invention.

FIG. 132 is a view showing a service type, a service ID, a variable indicating an emergency alert state, an emergency alert action and an action argument of an emergency alert service signaled by a broadcast receiving device according to an embodiment of the present invention.

Figure 133:
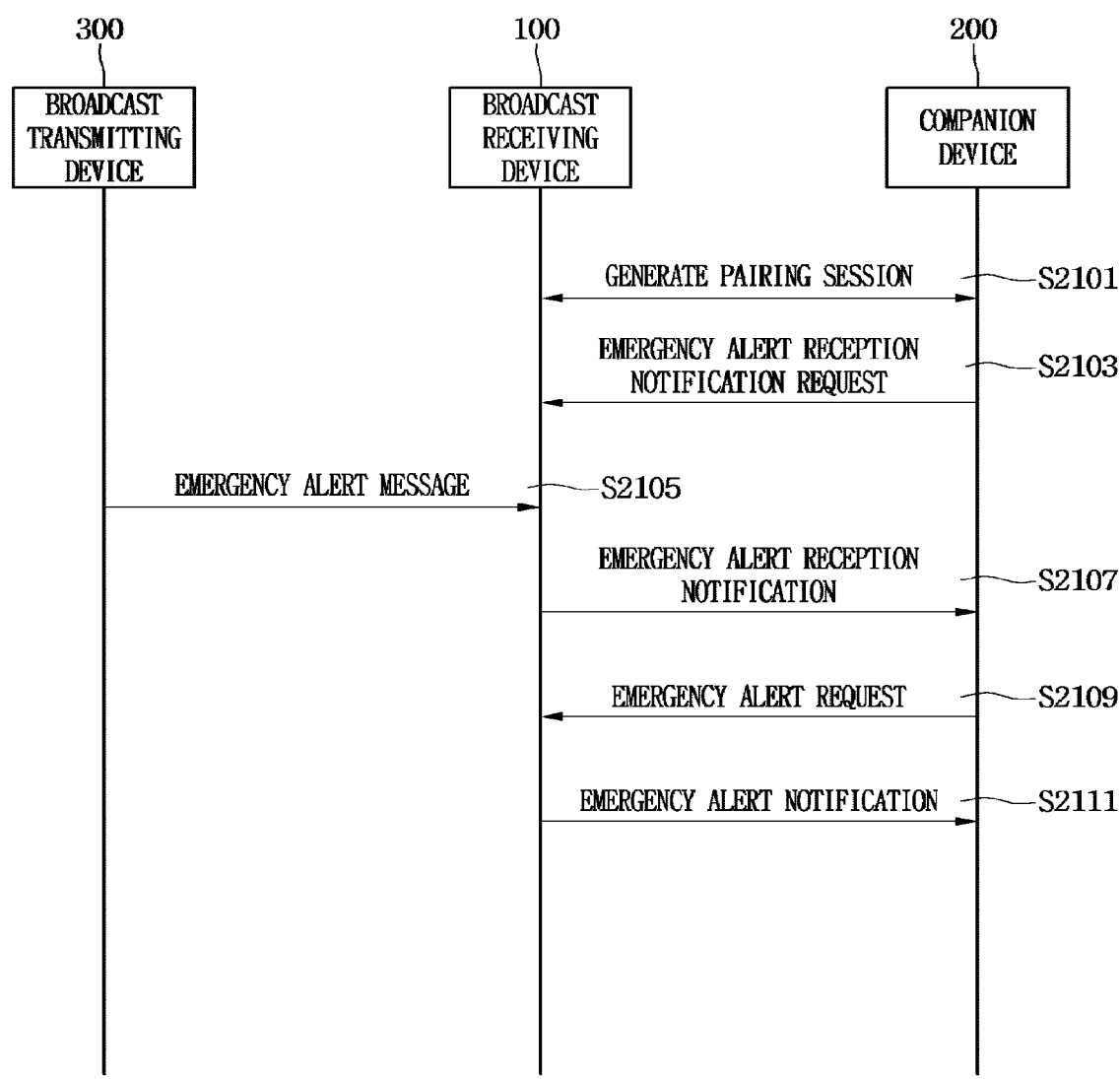

FIG. 133 is a ladder diagram showing operation for signaling an emergency alert from a broadcast receiving device to a companion device according to an embodiment of the present invention.

FIG. 134 is a view showing information included in an emergency alert notification message of a broadcast receiving device according to an embodiment of the present invention.

FIGS. 135 to 137 are views showing criteria for determining priority of an emergency alert at a broadcast reception device according to another embodiment of the present invention.

FIG. 138 is a view showing a variable indicating the state of an emergency alert signaled by a broadcast reception device, an emergency alert action and an action argument according to another embodiment of the present invention.

Figure 139:
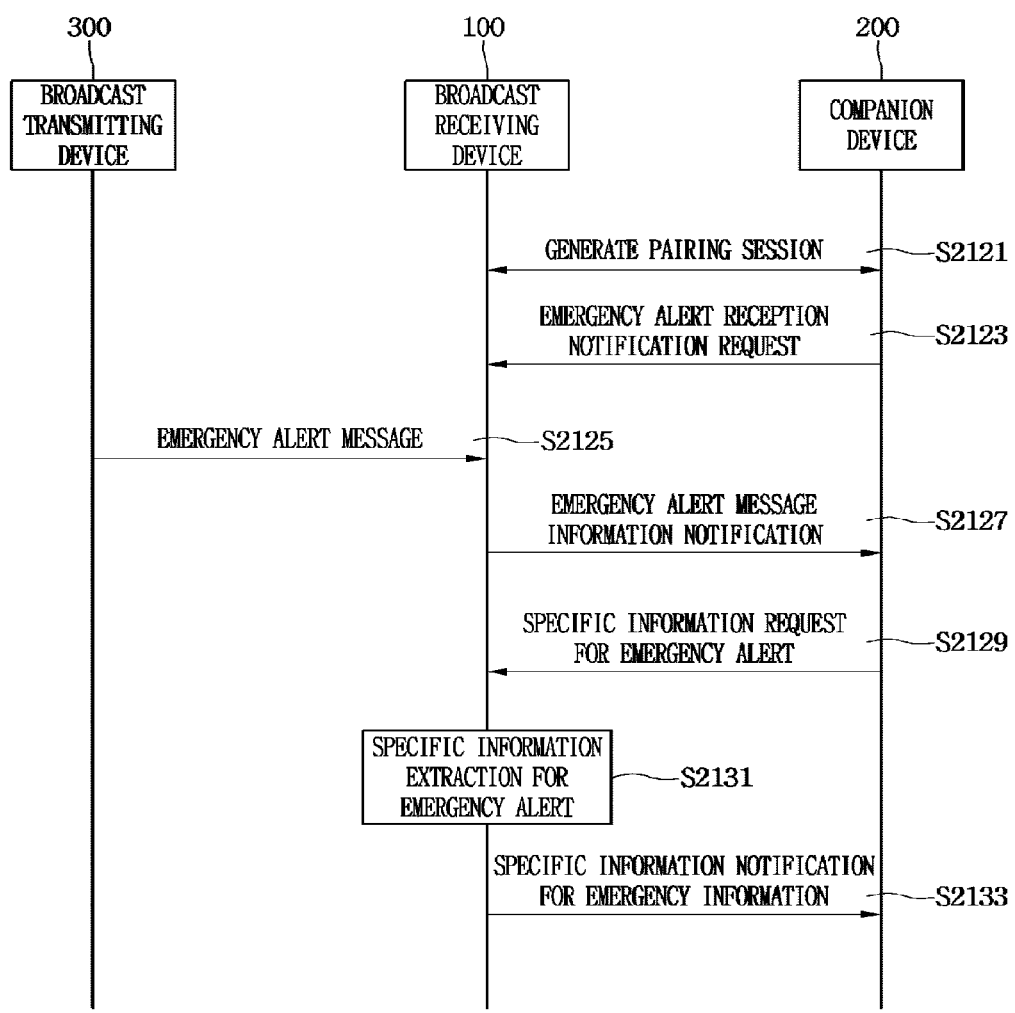

FIG. 139 is a ladder diagram showing operation for signaling an emergency alert from a broadcast receiving device to a companion device according to another embodiment of the present invention.

FIG. 140 is a view showing an emergency alert message in XML returned from a broadcast receiving device according to an embodiment of the present invention.

FIG. 141 is a view showing a variable indicating the state of an emergency alert signaled by a broadcast receiving device, an emergency alert action and an action argument according to another embodiment of the present invention.

Figure 142:
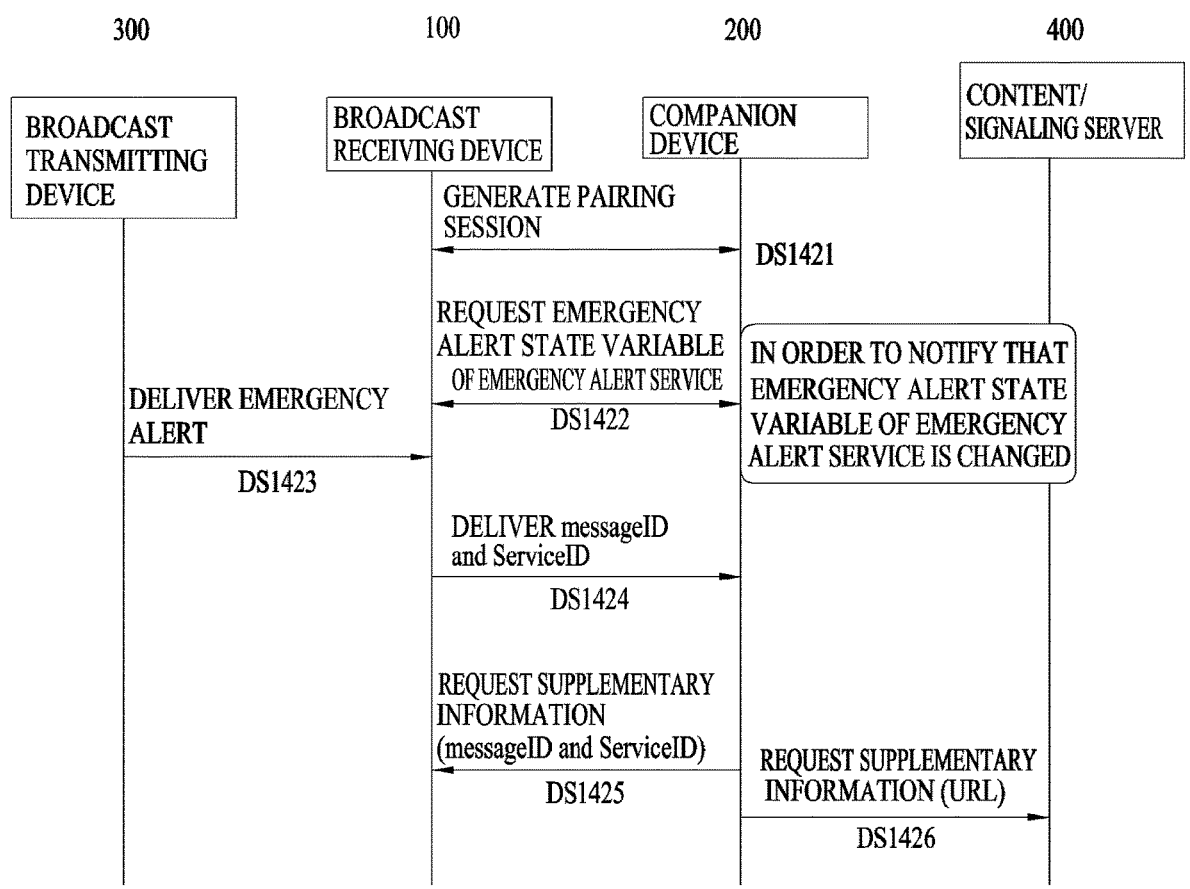

FIG. 142 is a ladder diagram showing operation for signaling an emergency alert from a broadcast receiving device to a companion device according to another embodiment of the present invention.

FIG. 143 is a view showing a variable indicating the state of an emergency alert signaled by a broadcast receiving device according to another embodiment of the present invention.

FIG. 144 is a view showing an action and action argument of an emergency alert signaled by a broadcast receiving device according to another embodiment of the present invention.

Figure 145:
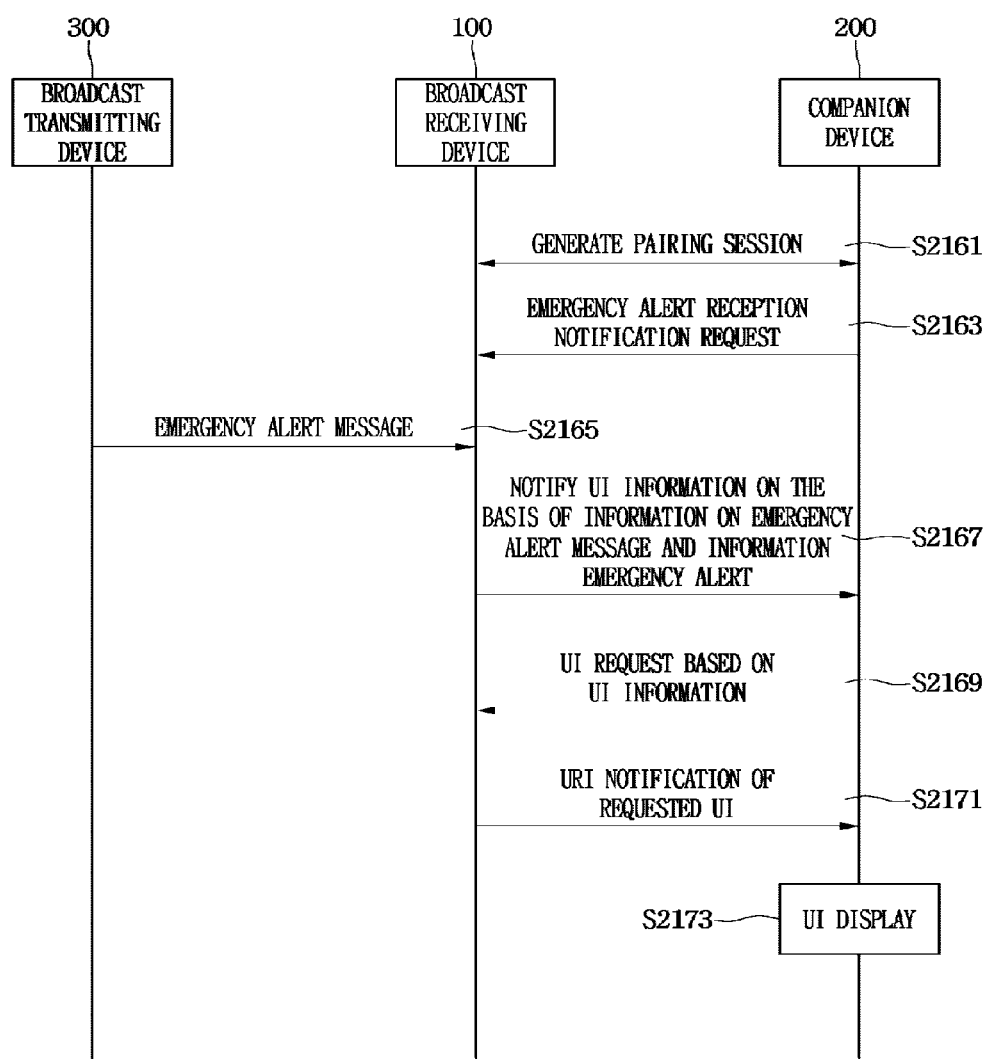

FIG. 145 is a ladder diagram showing operation for signaling an emergency alert from a broadcast receiving device to a companion device according to another embodiment of the present invention.

Figure 146:
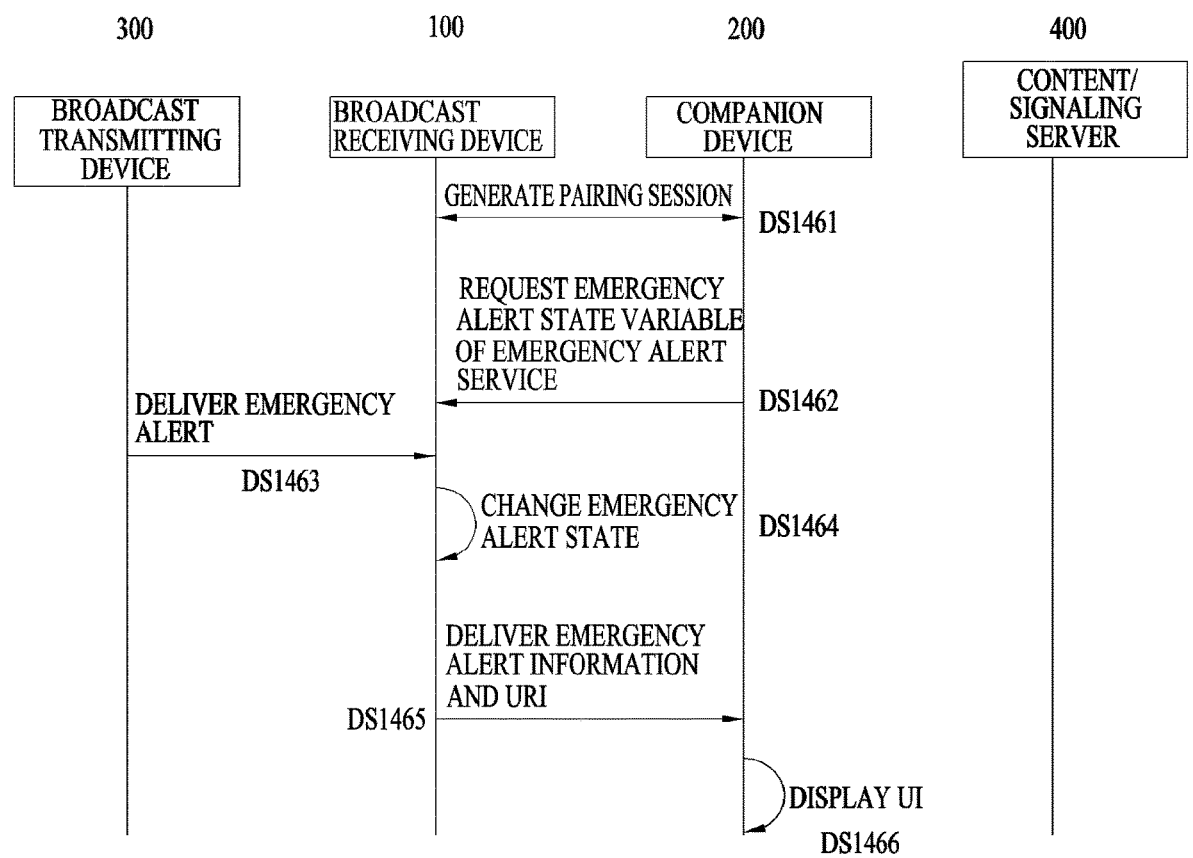

FIG. 146 is a ladder diagram showing operation for signaling an emergency alert from a broadcast receiving device to a companion device according to another embodiment of the present invention.

FIG. 147 is a view showing NRT data signaling information for a companion device according to an embodiment of the present invention.

Figure 148:
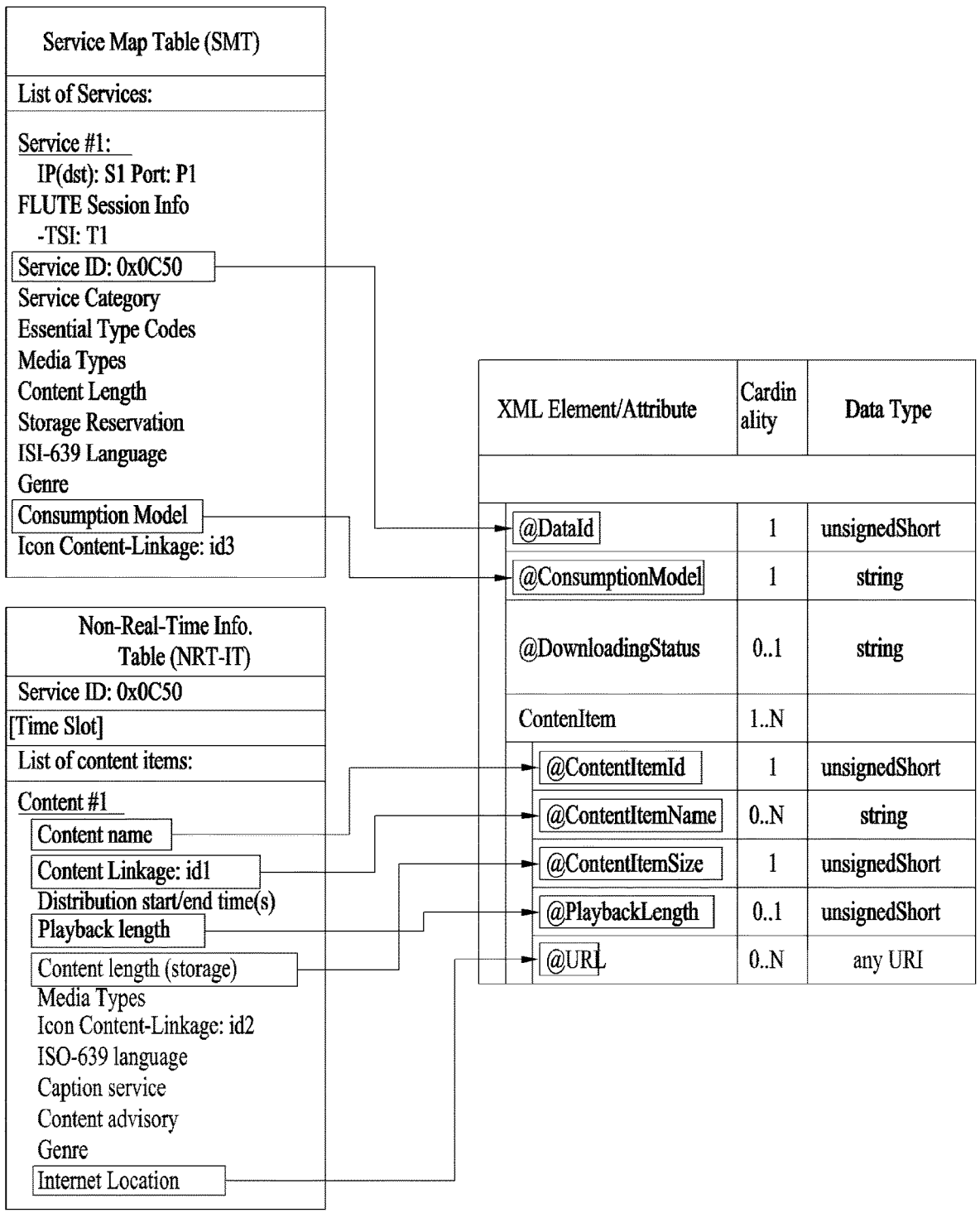

FIG. 148 is a view showing a broadcast receiving apparatus generating NRT data signaling information for a companion device based on NRT data signaling information for the broadcast receiving device according to an embodiment of the present invention.

FIG. 149 is a view showing a variable for NRT data, an action for acquiring NRT data and an action argument according to an embodiment of the present invention.

Figure 150:
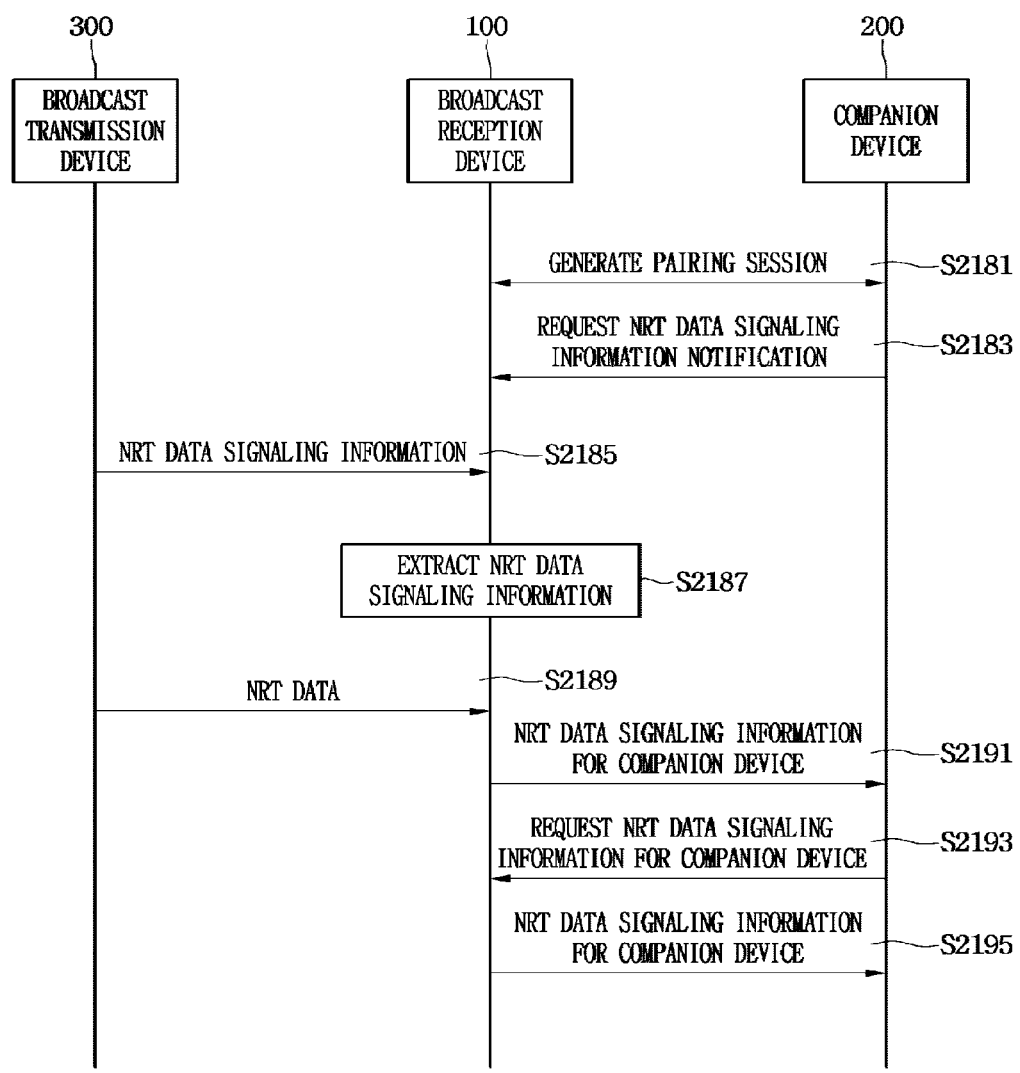

FIG. 150 is a view showing signaling of NRT data from a broadcast receiving device to a companion device according to an embodiment of the present invention.

Figure 151:
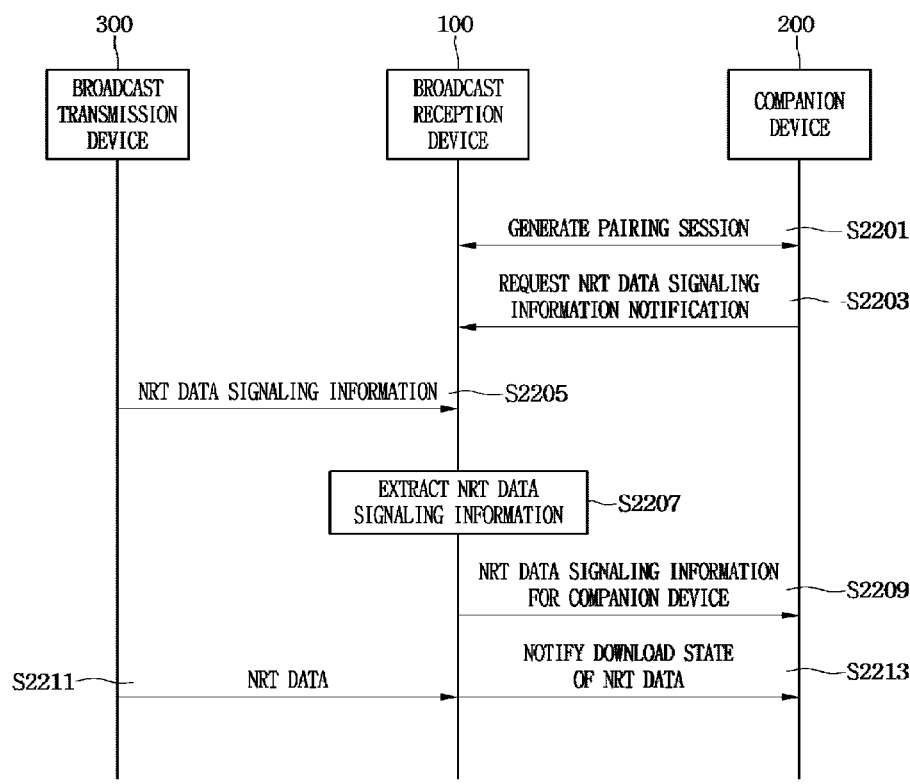

FIG. 151 is a view showing signaling of NRT data from a broadcast receiving device to a companion device according to another embodiment of the present invention.

FIG. 152 is a view showing device capability information signaled from a broadcast receiving device to a companion device according to an embodiment of the present invention.

FIG. 153 is a view showing a state variable indicating device capability information according to an embodiment of the present invention.

FIG. 154 is a view showing an action for acquiring device capability information and an action argument according to an embodiment of the present invention.

Figure 155:
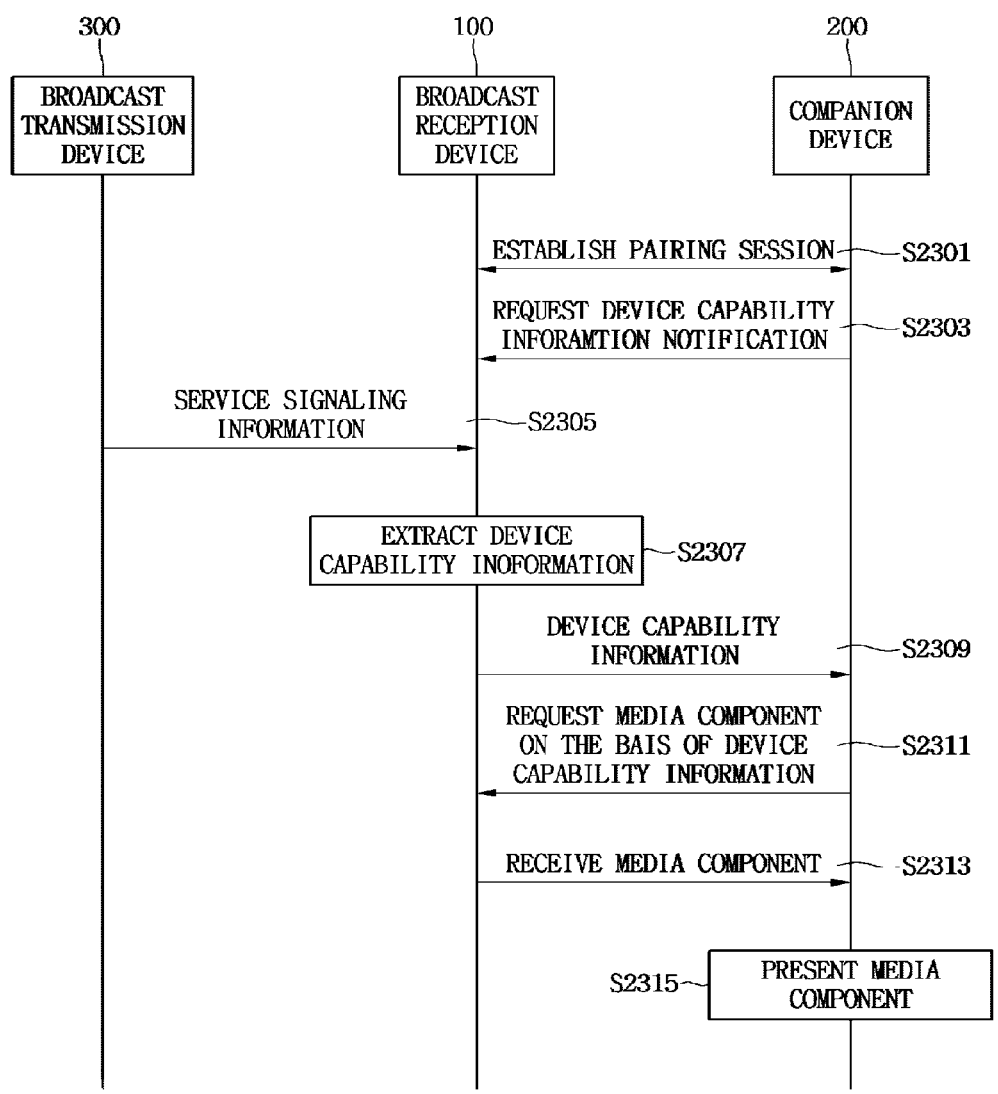

FIG. 155 is a view showing signaling of device information from a broadcast receiving device to a companion device according to an embodiment of the present invention.

Figure 156:
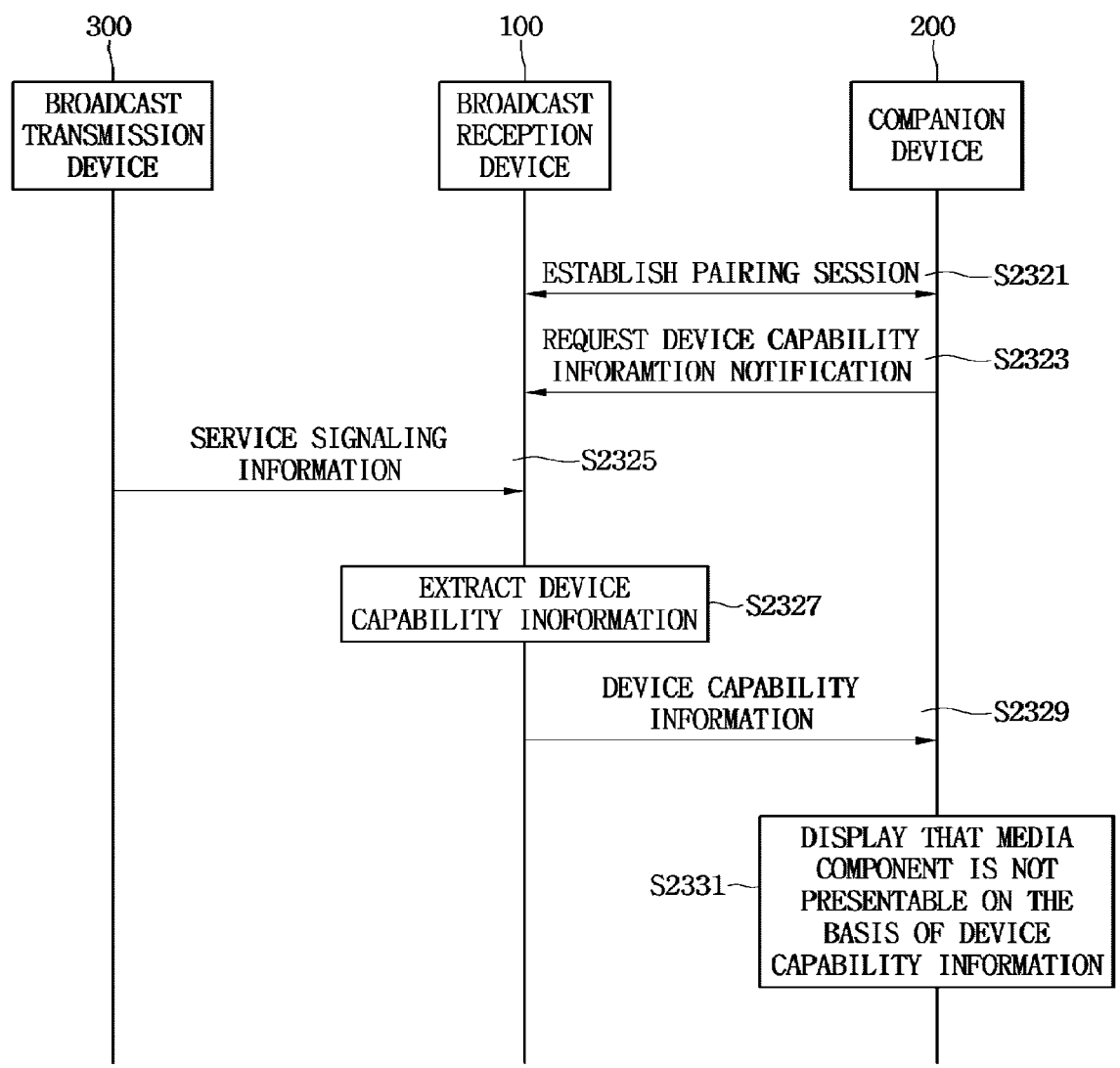

FIG. 156 is a view showing signaling of device information from a broadcast reception device to a companion device according to an embodiment of the present invention.

Figure 157:
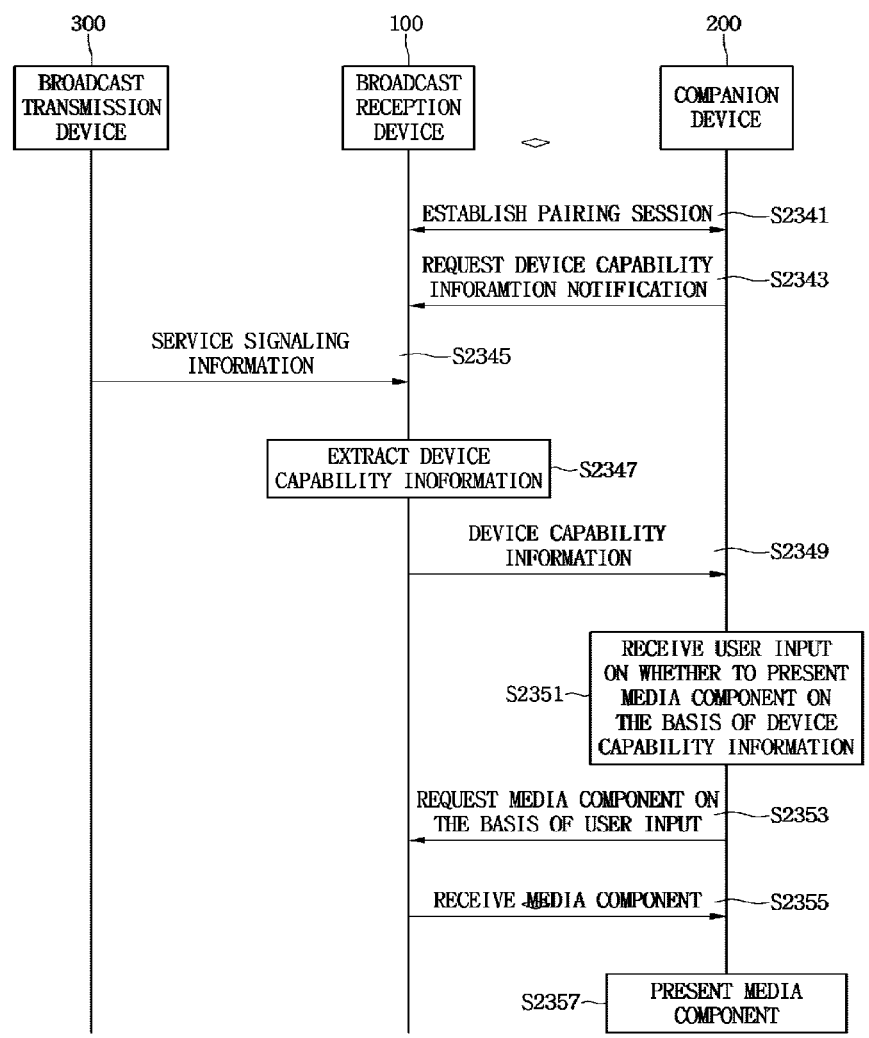

FIG. 157 is a view showing signaling of device information from a broadcast reception device to a companion device according to another embodiment of the present invention.

Figure 158:
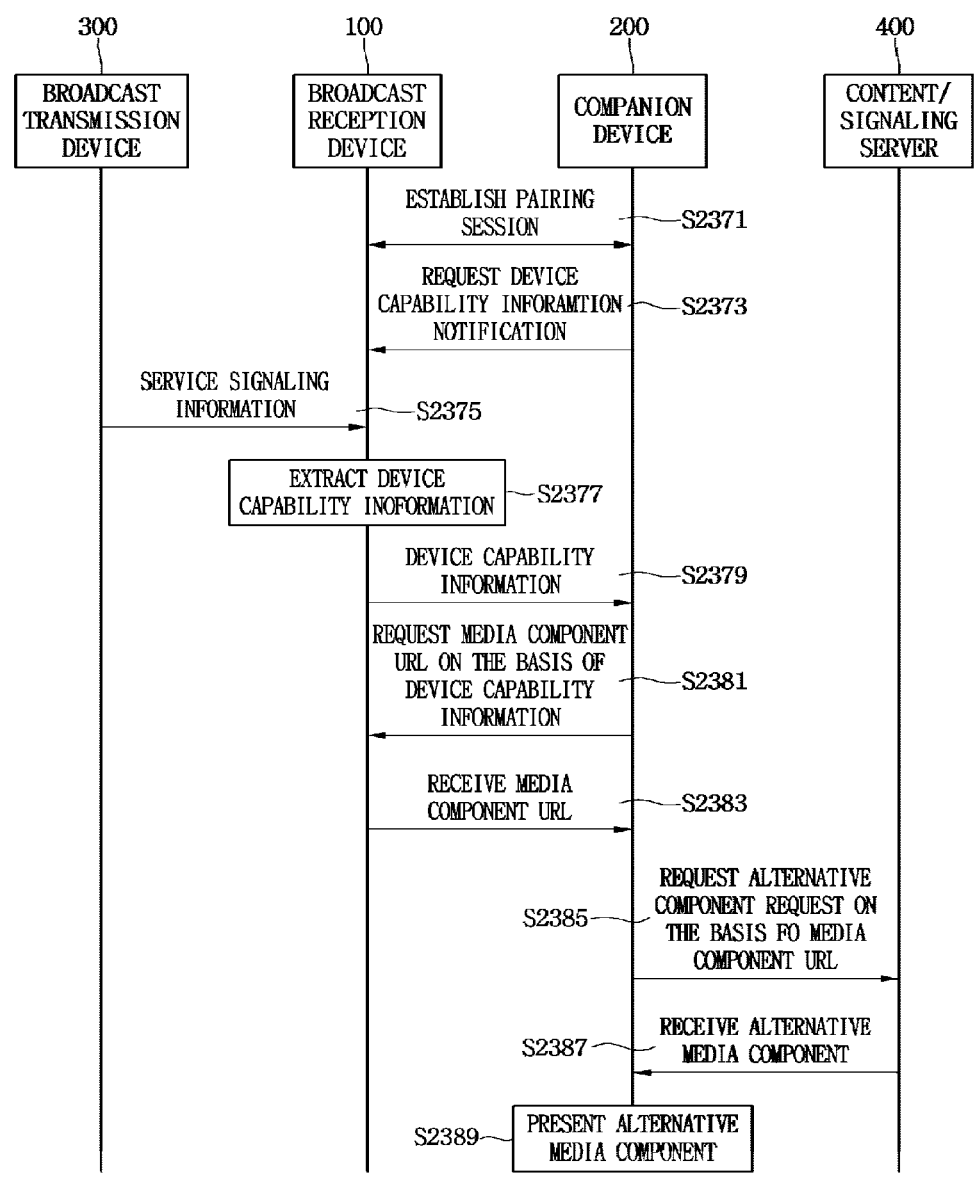

FIG. 158 is a view showing signaling of device information from a broadcast reception device to a companion device according to another embodiment of the present invention.

FIG. 159 is a view showing device capability information signaled from a broadcast reception device to a companion device according to an embodiment of the present invention.

Figure 160:
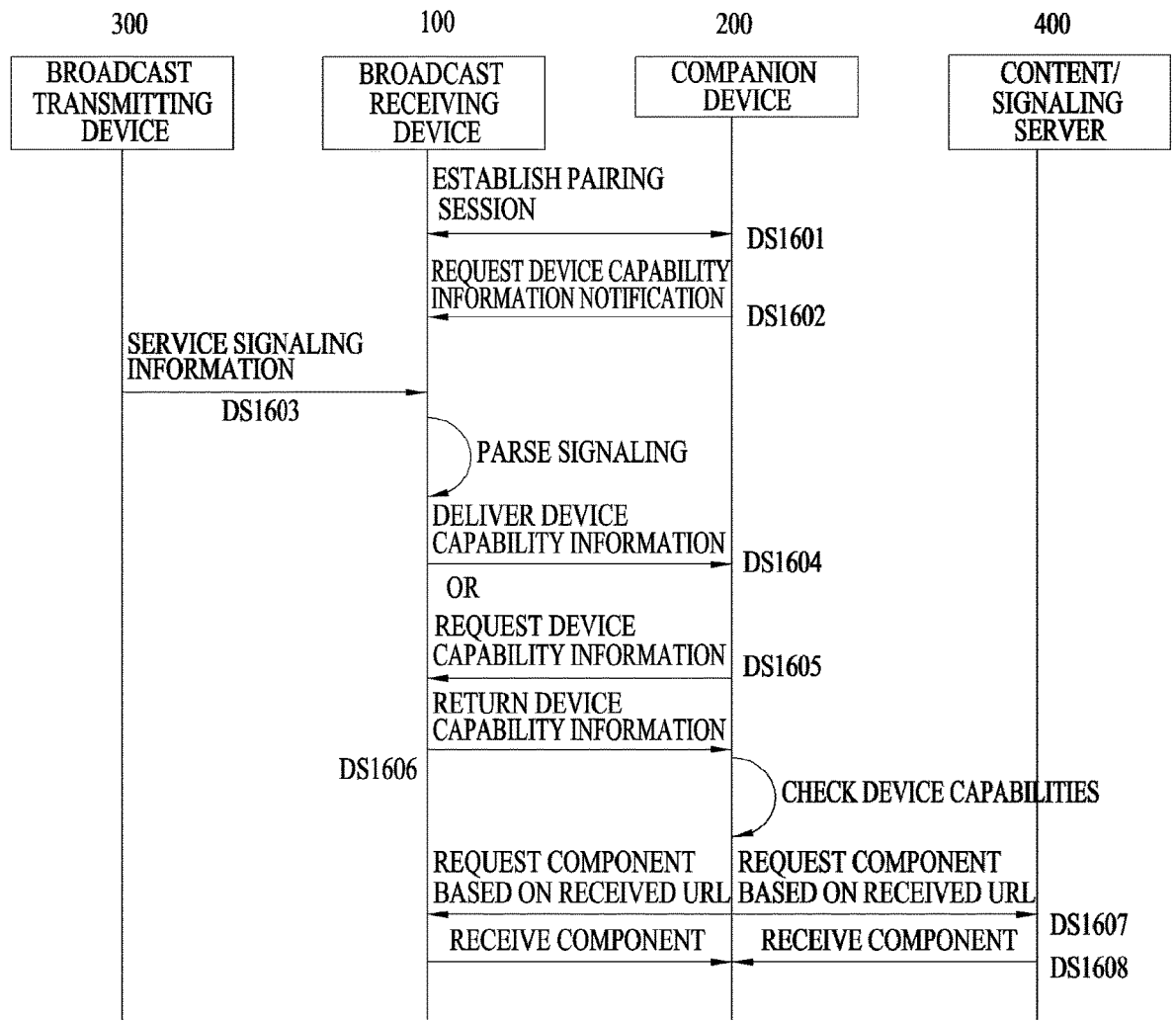

FIG. 160 is a view showing signaling of device information from a broadcast reception device to a companion device according to an embodiment of the present invention.

Figure 161:
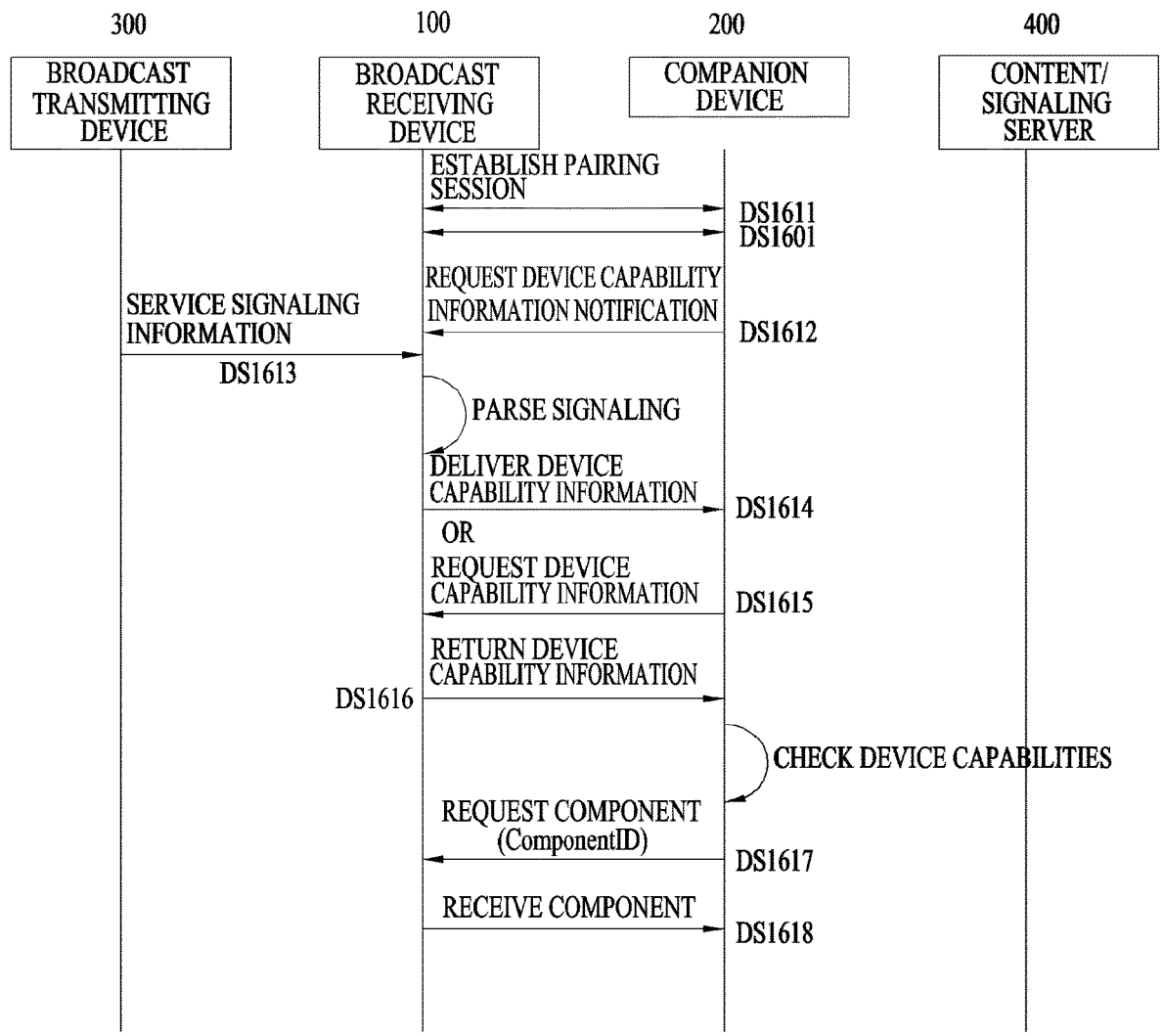

FIG. 161 is a view showing signaling of device information from a broadcast reception device to a companion device according to an embodiment of the present invention.

Figure 162:
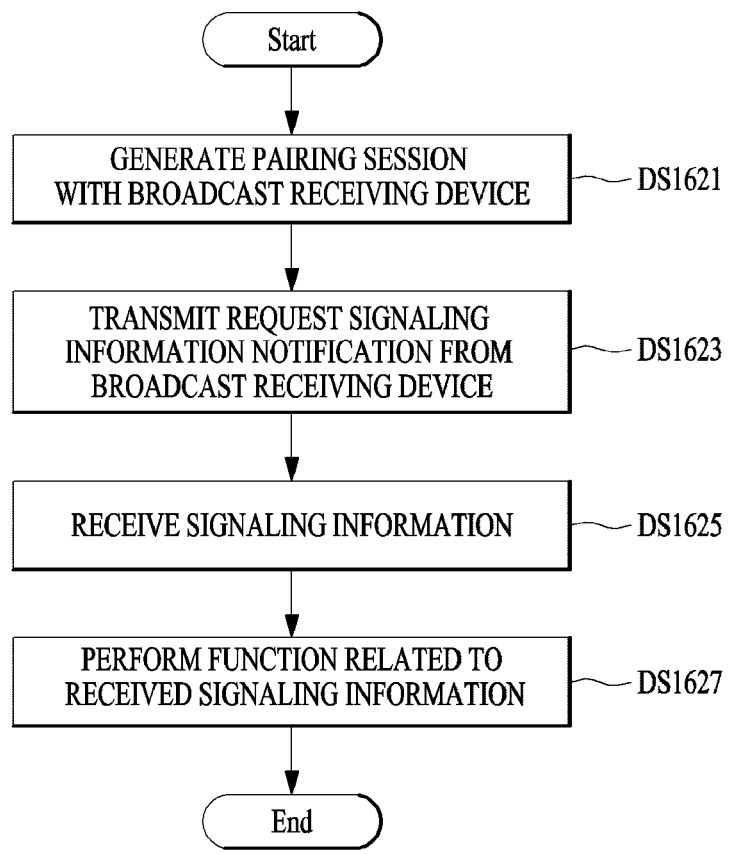

FIG. 162 is a flowchart illustrating operation of a companion device according to an embodiment of the present invention.

Figure 163:
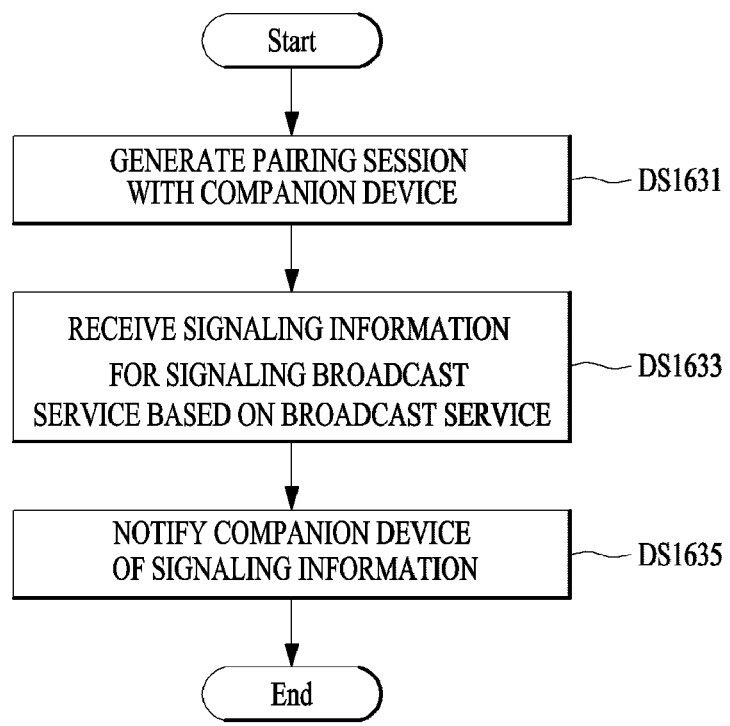

FIG. 163 is a flowchart illustrating operation of a broadcast reception device according to an embodiment of the present invention.

DETAILED DESCRIPTION OF THE EMBODIMENTS

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

Figure 1:
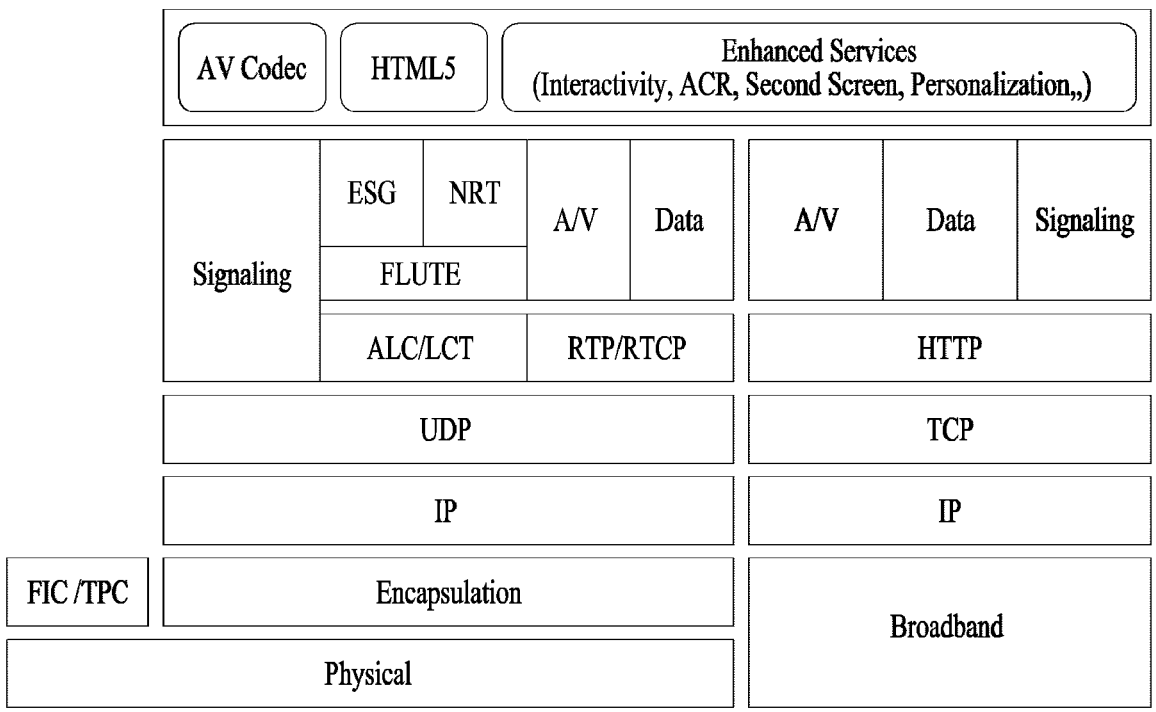
FIG. 1 is a view of a protocol stack for supporting a broadcast service according to an embodiment of the present invention.

FIG. 1 is a view of a protocol stack for supporting a broadcast service according to an embodiment of the present invention.

The broadcast service may provide adjunct services, for example, audio/video (AN) data and HTML5 application, interactive service, ACR service, second screen service, and personalization service.

Such a broadcast service may be transmitted through a physical layer (i.e., broadcast signal) such as terrestrial wave and a cable satellite. Additionally, a broadcast service according to an embodiment of the present invention may be transmitted through an internet communication network (e.g., broadband).

When the broadcast service is transmitted through a physical layer, i.e., a broadcast signal such as terrestrial wave and a cable satellite, a broadcast reception device may extract an encapsulated MPEG-2 Transport Stream (TS) and an encapsulated IP datagram by demodulating the broadcast signal. The broadcast reception device may extract a user datagram protocol (UDP) datagram from the IP datagram. At this point, the signaling information may be in XML format. The broadcast reception device may extract signaling information from the UDP datagram. Additionally, the broadcast reception device may extract an Asynchronous Layered Coding/Layered Coding Transport (ALC/LCT) packet from the UDP datagram. The broadcast reception device may extract a File Delivery over Unidirectional Transport (FLUTE) packet from the ALC/LCT packet. At this point, the FLUTE packet may include Non-Real Time (NRT) data and Electronic Service Guide (ESG) data. Additionally, the broadcast reception device may extract a Real-time Transport Protocol (RTCP) packet and an RTP Control Protocol (RTCP) packet from the UDP datagram. The broadcast reception device may extract A/V data and enhanced data from the RTP/RTCP packet. At this point, at least one of NRT data, A/V data, and enhanced data may be in ISO Base Media File Format (ISO BMFF). Additionally, the broadcast reception device may extract signaling information such as NRT data, A/V data, and PSI/PSIP from an MPEG-2 TS packet or IP datagram.

When the broadcast service is transmitted through an internet communication network (e.g., broadband), the broadcast reception device may receive an IP packet from the internet communication network. The broadcast reception device may extract a TCP packet from the IP packet. The broadcast reception device may extract an HTTP packet from the TCP packet. The broadcast reception device may extract A/V data, enhanced data, and signaling information from the HTTP packet. At this point, at least one of A/V and enhanced data may be in ISO BMFF format. Additionally, the signaling information may in XML format.

A detailed transmission frame and transport packet transmitting broadcast service will be described with reference to FIGS. 2 to 5.

Figure 2:
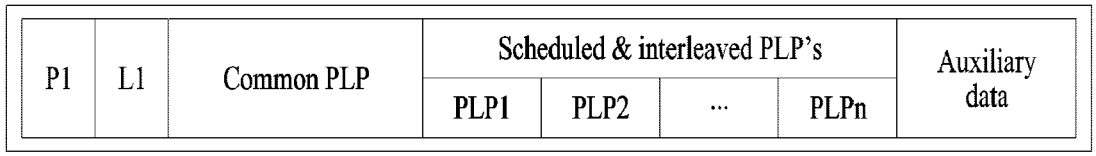
FIG. 2 is a view illustrating a broadcast transmission frame according to an embodiment of the present invention.

FIG. 2 is a view illustrating a broadcast transmission frame according to an embodiment of the present invention.

According to the embodiment of FIG. 2, the broadcast transmission frame includes a P1 part, an L1 part, a common PLP part, an interleaved PLP part (e.g., a scheduled & interleaved PLP's part), and an auxiliary data part.

According to the embodiment of FIG. 2, the broadcast transmission device transmits information on transport signal detection through the P1 part of the transmission frame. Additionally, the broadcast transmission device may transmit turning information on broadcast signal tuning through the P1 part.

According to the embodiment of FIG. 2, the broadcast transmission device transmits a configuration of the broadcast transmission frame and characteristics of each PLP through the L1 part. At this point, the broadcast reception device 100 decodes the L1 part on the basis of the P1 part to obtain the configuration of the broadcast transmission frame and the characteristics of each PLP.

According to the embodiment of FIG. 2, the broadcast transmission device may transmit information commonly applied to PLPs through the common PLP part. According to a specific embodiment of the present invention, the broadcast transmission frame may not include the common PLP part.

According to the embodiment of FIG. 2, the broadcast transmission device transmits a plurality of components included in broadcast service through an interleaved PLP part. At this point, the interleaved PLP part includes a plurality of PLPs.

Moreover, according to the embodiment of FIG. 2, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 2, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part. This will be described with reference to FIG. 3.

FIG. 3 is a view of a broadcast transmission frame according to another embodiment of the present invention.

According to the embodiment of FIG. 3, the broadcast transmission frame includes a P1 part, an L1 part, a fast information channel (FIC) part, an interleaved PLP part (e.g., a scheduled & interleaved PLP's part), and an auxiliary data part.

Except the FIC part, other parts are identical to those of FIG. 2.

The broadcast transmission device transmits fast information through the FIC part. The fast information may include configuration information of a broadcast stream transmitted through a transmission frame, simple broadcast service information, and component information. The broadcast reception device 100 may scan broadcast service on the basis of the FIC part. In more detail, the broadcast reception device 100 may extract information on broadcast service from the FIC part.

FIG. 4 is a view illustrating a structure of a transport packet transmitting a broadcast service according to an embodiment of the present invention.

In the embodiment of FIG. 4, a transport packet transmitting a broadcast service includes a Network Protocol field, an Error Indicator field, a Stuffing Indicator field, a Pointer field, a Stuffing bytes field, and payload data.

The Network Protocol field represents the type of a network protocol. According to a specific embodiment of the present invention, a value of the Network Protocol field may represent the IPv4 protocol or a frame packet type. In more detail, as shown in the embodiment of FIG. 5, when a value of the Network Protocol field is 000, it may represent the IPv4 protocol. In more detail, as shown in the embodiment of FIG. 5, when a value of the Network Protocol field is 111, it may represent a frame_packet_type protocol. At this point, framed_packet_type may be a protocol defined by ATSC A/153. In more detail, framed_packet_type may represent a network packet protocol not including a field representing information on the length. According to a specific embodiment of the present invention, the Network Protocol may be a 3-bit field.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described with reference to FIG. 5.

Figure 6:
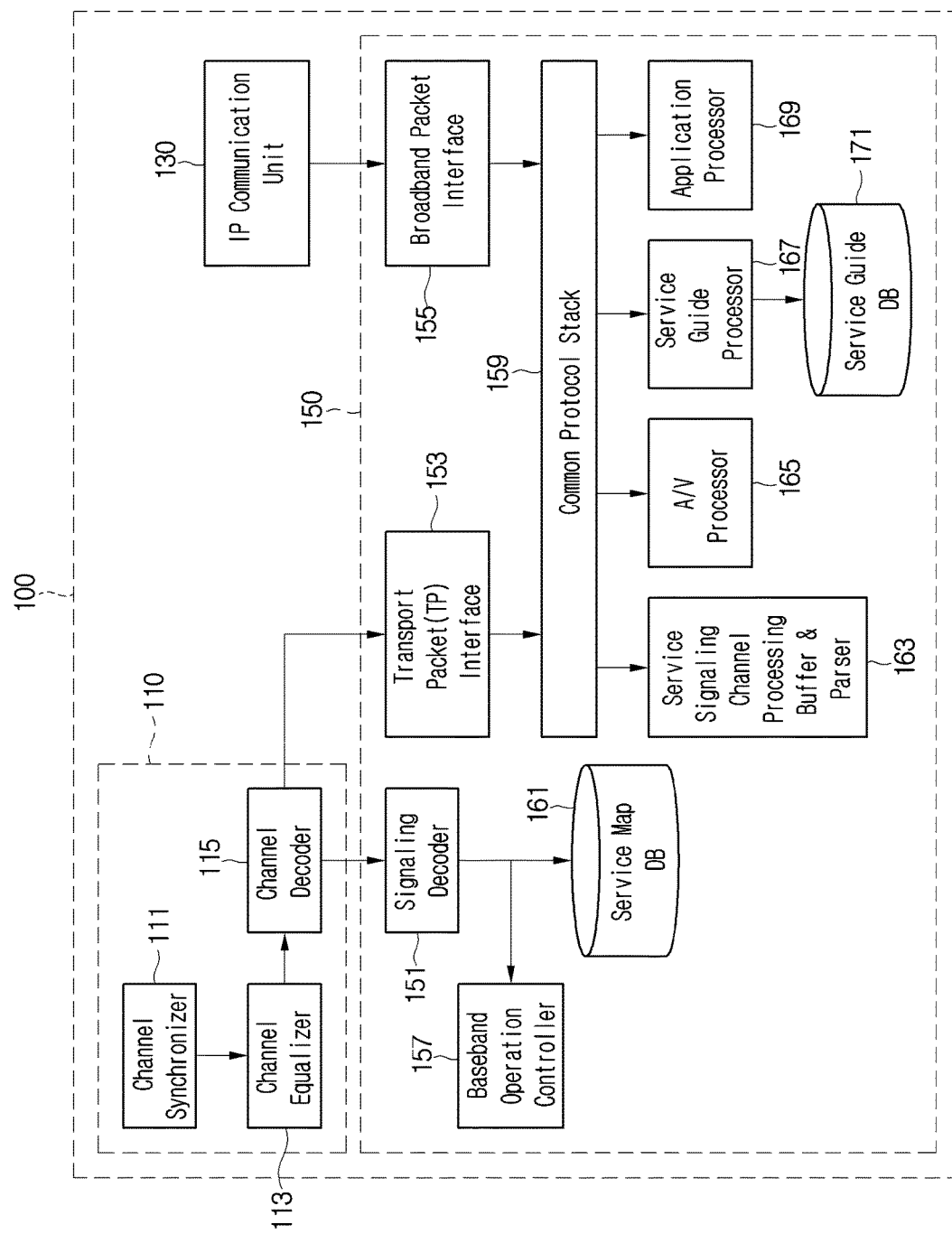
FIG. 6 is a view illustrating a configuration of a broadcast reception device according to an embodiment of the present invention.

FIG. 6 is a view illustrating a configuration of a broadcast reception device 100 according to an embodiment of the present invention.

The broadcast reception device 100 of FIG. 6 includes a broadcast receiving unit 110, an internet protocol (IP) communication unit 130, and a control unit 150.

The broadcast receiving unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a service guide processor 167, an application processor 169, and a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from an internet network. At this point, the broadcast packet interface 155 may extract signaling data or IP datagram from the IP packet.

The baseband operation control unit 157 controls an operation relating to receiving broadcast information from a baseband.

The common protocol stack 159 extracts audio or video from a transport packet.

The A/V processor 165 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 161 stores a broadcast service list including information on broadcast services.

The service guide processor 167 processes terrestrial broadcast service guide data guiding programs of terrestrial broadcast service.

The application processor 169 extracts and processes application related information from a broadcast signal.

The service guide database 171 stores program information of a broadcast service.

Figure 7:
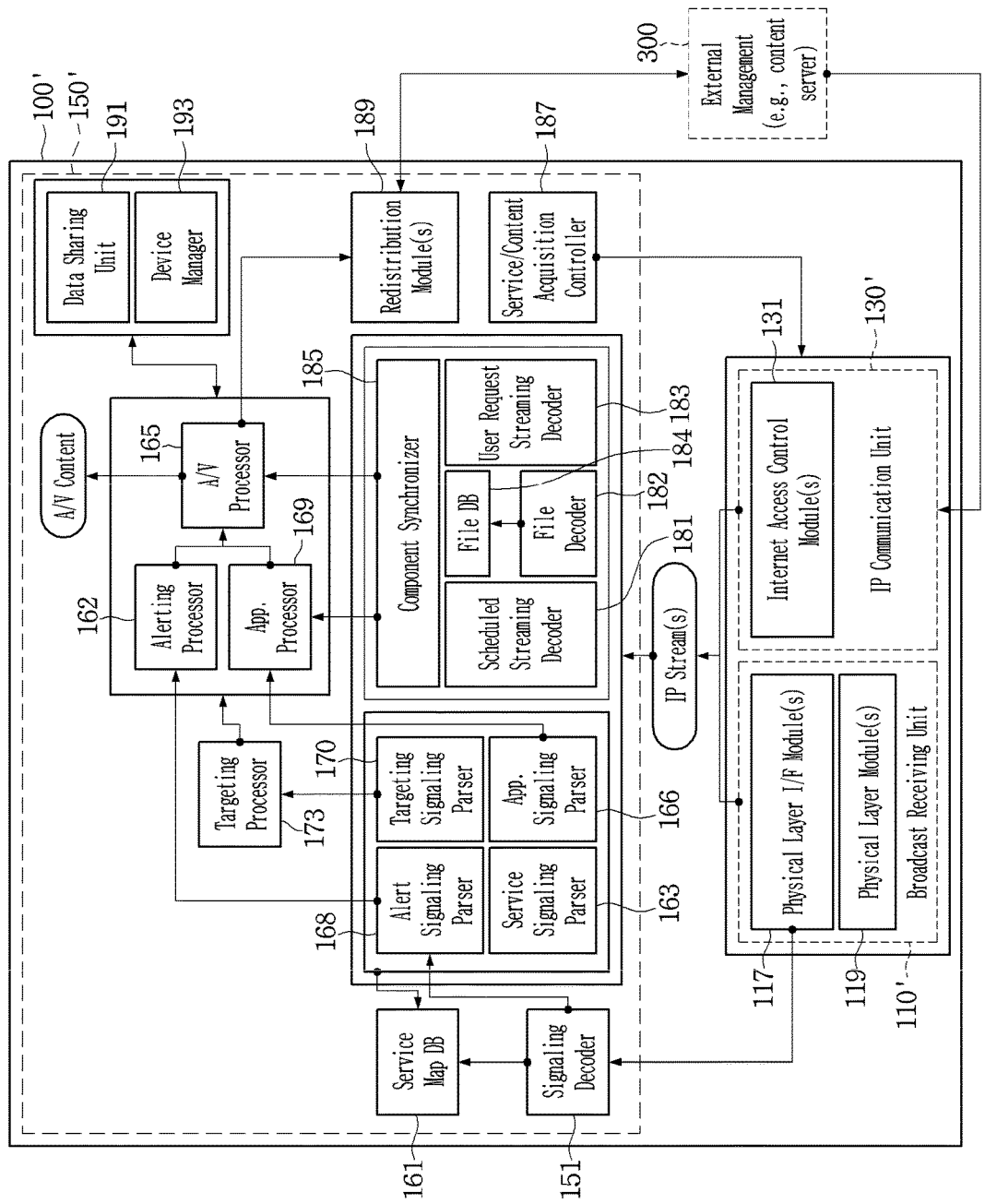
FIG. 7 is a view illustrating a configuration of a broadcast reception device according to another embodiment of the present invention.

FIG. 7 is a view illustrating a configuration of a broadcast reception device 100' according to another embodiment of the present invention.

In an embodiment of FIG. 7, the broadcast reception device 100' of FIG. 7 includes a broadcast receiving unit 110', an internet protocol (IP) communication unit 130', and a control unit 150'.

The broadcast receiving unit 110' may include one or more processors, one or more circuits, and one or more hardware modules, which perform each of a plurality of functions that the broadcast receiving unit 110' performs. In more detail, the broadcast receiving unit 110' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast receiving unit 110' may include a physical layer module 119 and a physical layer IP frame (I/F) module 117. The physical layer module 119 receives and processes a broadcast related signal through a broadcast channel of a broadcast network. The physical layer I/F module 117 converts a data packet such as an IP datagram obtained from the physical layer module 119 into a specific frame. For example, the physical layer module 119 may convert an IP datagram into an RS Frame or GSE.

The IP communication unit 130' may include one or more processors, one or more circuits, and one or more hardware modules, which perform each of a plurality of functions that the IP communication unit 130' performs. In more detail, the IP communication unit 130' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130' may include an internet access control module 131. The internet access control module 131 may control an operation of the broadcast reception device 100' to obtain at least one of service, content, and signaling data through an internet communication network (for example, broadband).

The control unit 150' may include one or more processors, one or more circuits, and one or more hardware modules, which perform each of a plurality of functions that the control unit 150' performs. In more detail, the control unit 150' may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150' may include at least one of a signaling decoder 151, a service map database 161, a service signaling channel parser 163, an application signaling parser 166, an alert signaling parser 168, a targeting signaling parser 170, a targeting processor 173, an A/V processor 165, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The targeting signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 165 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100' and an external device and processes exchange related information. In more detail, the data sharing unit 191 may transmit AV data or signaling information to an external device. Additionally, the data sharing unit 191 may receive AV data or signaling information from an external device.

Figure 8:
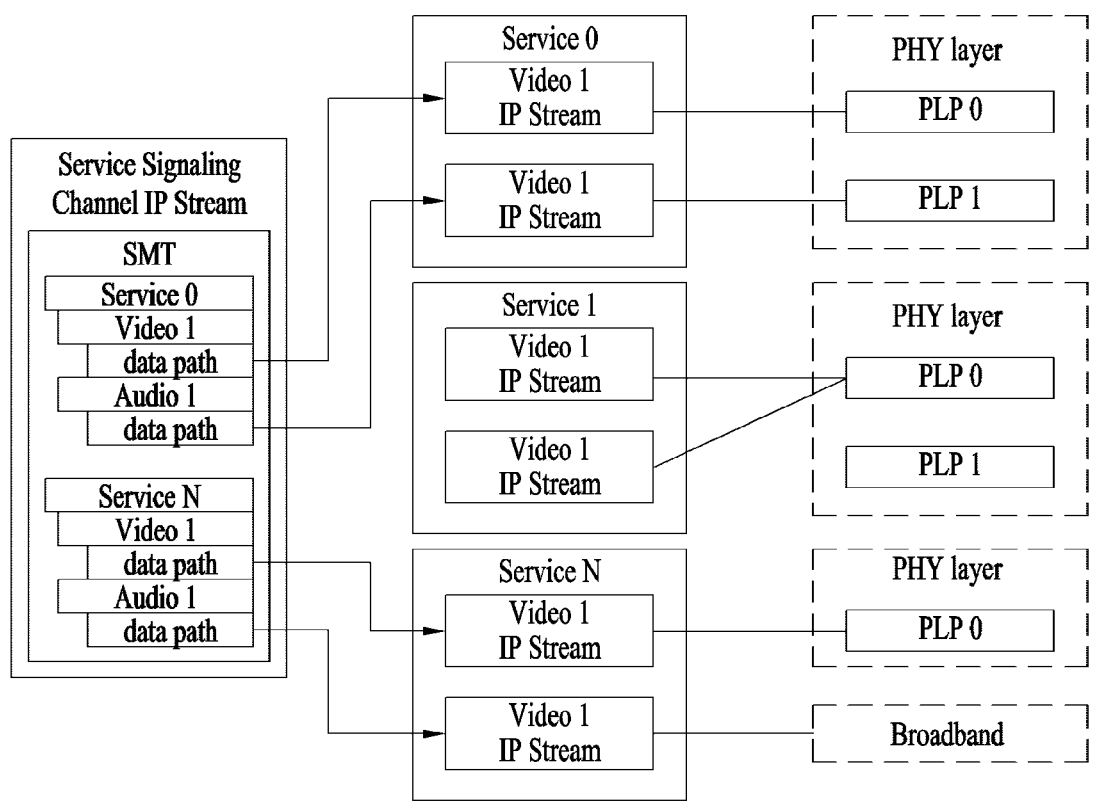
FIG. 8 is a view that a broadcast service signaling table and broadcast service transmission path signaling information signal broadcast service and a broadcast service transmission path.

FIG. 8 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 8, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio 1 in Service N through internet network according to the signaling table. At this point, the PLP is a series of logical data delivery paths identifiable on a physical layer. The PLP may be also referred to as a data pipe.

A broadcast service signaling table will be described with reference to FIGS. 9 to 14.

FIG. 9 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 9, the broadcast service signaling table may include at least one of a table_id field, section_syntax_indicator field, a private_indicator field, a section_length field, a table_id_extension field, a version_number field, a current_next_indicator field, a section_number field, a last_section_numberr field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include an SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the version_number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last section number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel_number of a corresponding broadcast service.

The service_category field represents a category of a broadcast service. In more detail, the service_category field may represent at least one of TV service, radio service, broadcast service guide, RI service, and emergency alerting. For example, as shown in the embodiment of FIG. 9, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descrptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service. This will be described in more detail with reference to FIG. 11.

FIG. 11 is a view of a broadcast service signaling table according to another embodiment of the present invention.

In more detail, as shown in the embodiment of FIG. 11, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. This will be described in more detail with reference to FIG. 41.

FIG. 12 is a view of a stream identifier descriptor according to another embodiment of the present invention.

The stream identifier information includes at least one of a descriptor_tag field, a descriptor_length field, and a component_tag field.

The descriptor_tag field represents a descriptor including stream identifier information. According to a specific embodiment of the present invention, the descriptor_tag field may be an 8-bit field.

The descriptor_length field represents the length of stream identifier information after a corresponding field. According to a specific embodiment of the present invention, the descriptor_length field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described with reference to FIGS. 13 and 17.

The above broadcast service table is described as in a bitstream format but according to a specific embodiment of the present invention, a broadcast service table may be in an XML format.

FIG. 13 is a view illustrating an operation when a broadcast transmission device transmits a broadcast service signaling table according to an embodiment of the present invention.

The broadcast transmission device may include a transmitting unit for transmitting a broadcast signals and a control unit for controlling operations of the broadcast transmitting unit. A transmitting unit may include one or more processors, one or more circuits, and one or more hardware modules, which perform each of a plurality of functions that the transmitting unit performs. In more detail, the transmitting unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. A control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains broadcast service information through the control unit in operation S101. At this point, the broadcast service information is information for describing broadcast service. In more detail, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast transmission device generates a broadcast service signaling table on the basis of broadcast service information through a control unit in operation S103. At this point, the broadcast service signaling table may include the above-mentioned broadcast service information.

The broadcast transmission device transmits a broadcast signal including a service signaling table through a transmitting unit in operation S105.

FIG. 14 is a view illustrating an operation when a broadcast reception device receives a broadcast service signaling table according to an embodiment of the present invention.

The broadcast reception device 100 receives a broadcast signal through the broadcast receiving unit 110 in operation S301.

The broadcast reception device 100 obtains a broadcast service signaling table through the control unit 150 on the basis of the broadcast signal in operation S303. In more detail, the broadcast reception device 100 may obtain a broadcast service signaling table from the broadcast signal. At this point, as mentioned above, the broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component. The media component signaling information signaling a media component that the broadcast service includes may include information representing whether each media component is essential to a corresponding broadcast service. Additionally, the media component signaling information signaling a media component that the broadcast service includes may include information relating to each component. However, according to a specific embodiment of the present invention, the broadcast reception device 100 may obtain a broadcast service signaling table via an IP network.

The broadcast reception device 100 obtains broadcast service information on the basis of the broadcast service signaling table through the control unit 150 in operation S305. At this point, as mentioned above, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast reception device 100 generates a broadcast service list for storing information on a broadcast service on the basis of the broadcast service information through the control unit 150 in operation S307. At this point, the broadcast service list may include broadcast service information that the broadcast reception device 100 obtains. According to a specific embodiment of the present invention, the broadcast reception device 100 may receive a broadcast service on the basis of broadcast service information or a broadcast service list.

FIG. 15 is a view illustrating broadcast service transmission path signaling information according to an embodiment of the present invention.

The broadcast service transmission path signaling information may include information representing the type of a network transmitting a broadcast service and specific transmission information according to a broadcast transmission type. The type of a network transmitting a broadcast service may be one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of different broadcasters, a network transmitting a broadcast service through a packet based stream of a different broadcaster, a network transmitting a broadcast service through a packet based stream transmitted from an IP based broadcast network, and a network for obtaining a broadcast service through URL.

According to a specific embodiment of the present invention, as shown in FIG. 15, the broadcast service transmission path signaling information may include a descriptor_tag field, a description_length field, a delivery_network_type field, and a data_path field.

The descriptor_tag field represents that a corresponding descriptor includes transmission path signaling information. According to a specific embodiment of the present invention, the descriptor_tag field may be an 8-bit field.

The descriptor_length field represents the length of broadcast service transmission path signaling information after a corresponding field. According to a specific embodiment of the present invention, the descriptor_length field may be an 8-bit field.

The delivery_network_type field represents the type of a transmission network transmitting a broadcast service. According to a specific embodiment of the present invention, a value of the delivery_network_type field may represent one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. For example, as shown in the embodiment of FIG. 16, when a value of the delivery_network_type field is 0x00, it may represent a network transmitting a broadcast service through an IP stream transmitted from the same broadcaster. Moreover, when a value of the delivery_network_type field is 0x01, it may represent a network transmitting a broadcast service through an IP stream transmitted from a different broadcaster. Moreover, when a value of the delivery_network_type field is 0x02, it may represent a network transmitting a broadcast service through a FLUTE session of the same broadcaster. Additionally, when a value of the delivery_network_type field is 0x03, it may represent a network transmitting a broadcast service through a FLUTE session of a different broadcaster. Furthermore, when a value of the delivery_network_type field is 0x04, it may represent a network transmitting a broadcast service through an MPEG-2 TS of a different broadcaster. In addition, when a value of the delivery_network_type field is 0x05, it may represent a network transmitting a broadcast service through a packet based stream of a different broadcaster. Moreover, when a value of the delivery_network_type field is 0x06, it may represent a network transmitting a broadcast service through a packet based stream transmitted from an IP based broadcast network. Furthermore, when a value of the delivery_network_type field is 0x07, it may represent a network obtaining a broadcast service through URL.

The data_path field includes specific transmission information according to the type of a transmission network transmitting a broadcast service. This data_path will be described in more detail with reference to FIGS. 17 to 25.

FIG. 17 is a view when broadcast service transmission path signaling information signals the transmission of a broadcast service through IP stream according to an embodiment of the present invention.

When a network transmitting a broadcast service is a network transmitting a broadcast service through an IP stream that the same broadcaster transmits, broadcast service transmission path signaling information may include at least one of information representing an IP version, information on whether it contains a source IP address, an source IP address, information on whether it contains a destination IP address, a destination IP address, information representing the number of UDP ports of an IP datagram flow transmitting a broadcast service, and information an UDP port number information.

According to a specific embodiment of the present invention, as shown in the embodiment of FIG. 17, the broadcast service transmission path signaling information may include at least one among an IP_versioni_flag field, a source_IP_address_flag field, a destination_IP_address_flag field, a source_IP_address field, a port_num_count field, and a destination_UDP_port_number field.

The IP_versioni_flag field represents an IP address format of an IP datagram including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram including a broadcast service includes a source IP address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source IP address. According to a specific embodiment of the present invention, the source_IP_address_flag field may be a 1-bit field.

The destination_IP_address_flag field represents that an IP datagram including a broadcast service includes a destination IP address. In more detail, when a value of the destination_IP_address_flag field is 1, it represents that an IP datagram including a broadcast service includes a destination IP address and when a value of the destination_IP_address_flag field is 0, it represents that an IP datagram including a broadcast service does not include a destination IP address. According to a specific embodiment of the present invention, the destination_IP_address_flag field may be a 1-bit field.

The source_IP_address field represents the source_IP_address of an IP datagram including a broadcast service. According to a specific embodiment of the present invention, the source_IP_address field may be a 32 or 128-bit field according to the IP version.

The destination_IP_address field represents the destination IP address of an IP datagram including a broadcast service. According to a specific embodiment of the present invention, the destination IP_address field may be a 32 or 128-bit field according to the IP version.

The port_num_count field represents the number of ports of an IP datagram flow including a broadcast. According to a specific embodiment of the present invention, the port_num_count field may be an 8-bit field.

The destination_UDP_port number field represents the UDP port number of an IP datagram including a broadcast service. According to a specific embodiment of the present invention, the destination_UDP_port_number field may be a 16-bit field.

FIG. 18 is a view when broadcast service transmission path signaling information signals the transmission of a broadcast service through an IP stream of a different broadcaster according to an embodiment of the present invention.

When a network transmitting a broadcast service is a network transmitting a broadcast service through an IP stream that a different broadcaster transmits, unlike a network transmitting a broadcast service through an IP stream that the same broadcaster transmits, the broadcast service transmission path signaling information may further include an identifier for identifying a transport stream transmitting an IP datagram.

According to an embodiment of the present invention, as shown in the embodiment of FIG. 18, the broadcast service transmission path signaling information may include a transport_stream_id field.

The transport_stream_id field identifies a transport stream transmitting an IP datagram including a broadcast service. According to a specific embodiment of the present invention, the transport_stream_id field may be a 16-bit field.

FIG. 19 is a view when broadcast service transmission path signaling information signals the transmission of a broadcast service through a FLUTE session according to an embodiment of the present invention.

When a network transmitting a broadcast service is a network transmitting a broadcast service through a FLUTE session that the same broadcaster transmits, broadcast service transmission path signaling information may include at least one of information representing an IP version, information on whether it contains an IP address, a source IP address, a destination IP address, UDP port number information, and a Transport Session Identifier for identifying a FLUTE session transmitting a FLUTE packet including a broadcast service.

According to a specific embodiment of the present invention, as shown in the embodiment of FIG. 19, the broadcast service transmission path signaling information may include at least one among an IP_versioni_flag field, a source_IP_address_flag field, a source_IP_address field, a destination_UDP_port_number field, and a flute_tsi field.

The IP_versioni_flag field represents an IP address format of an IP datagram transmitting a FLUTE packet including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP version flag field may be a 1-bit field.

The source_IP_address_flag field represents whether an IP datagram transmitting a FLUTE packet including a broadcast service includes a source IP address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source IP address. According to a specific embodiment of the present invention, the source_IP_address_flag field may be a 1-bit field.

The source_IP_address field represents the source_IP_address of an IP datagram transmitting a FLUTE packet including a broadcast service. According to a specific embodiment of the present invention, the source_IP_address field may be a 32 or 128-bit field according to the IP version.

The destination_IP_address field represents the destination_IP_address of an IP datagram transmitting a FLUTE packet including a broadcast service. According to a specific embodiment of the present invention, the destination_IP_address field may be a 32 or 128-bit field according to the IP version.

The destination_UDP_port_number field represents the UDP port number of an IP datagram transmitting a FLUTE packet including a broadcast service. According to a specific embodiment of the present invention, the destination_UDP_port_number field may be a 16-bit field.

The flute_tsi field represents a Transport Session Identifier for identifying a FLUTE session transmitting a FLUTE packet including a broadcast service.

FIG. 20 is a view when broadcast service transmission path signaling information signals the transmission of a broadcast service through a FLUTE protocol of a different broadcaster according to an embodiment of the present invention.

When a network transmitting a broadcast service is a network transmitting a broadcast service through a FLUTE session of a different broadcaster, unlike a network transmitting a broadcast service through a FLUTE session of the same broadcaster, the broadcast service transmission path signaling information may further include an identifier for identifying a transport stream transmitting a FLUTE packet.

According to an embodiment of the present invention, as shown in the embodiment of FIG. 20, the broadcast service transmission path signaling information may include a transport_stream_id field.

The transport_stream_id field identifies a transport stream transmitting a FLUTE packet including a broadcast service. According to a specific embodiment of the present invention, the transport_stream_id field may be a 16-bit field.

FIG. 21 is a view when broadcast service transmission path signaling information signals the transmission of a broadcast service through MPEG-2 TS stream of a different broadcaster according to an embodiment of the present invention.

When a network transmitting a broadcast service is a network transmitting a broadcast service through MPEG-2 TS of a different broadcaster, it may include an identifier for identifying a transport stream transmitting MPEG-2 TS including a broadcast and an identifier of an MPEG-2 TS packet including a broadcast service.

According to a specific embodiment of the present invention, as shown in FIG. 21, the broadcast service transmission path signaling information may include at least one of a transptort_stream_id field and a pid field.

The transptort_stream_id field represents an identifier for identifying a transport stream transmitting MPEG-2 TS. According to a specific embodiment of the present invention, the transport_stream_id field may be a 16-bit field.

The pid field represents an identifier of an MPEG2-TS packet including a broadcast service. According to a specific embodiment of the present invention, the pid field may be a 13-bit field.

FIG. 22 is a view when broadcast service transmission path signaling information signals the transmission of a broadcast service through a packet based stream of a different broadcaster according to an embodiment of the present invention.

When a network transmitting a broadcast service is a network transmitting a broadcast service through a packet based stream of a different broadcaster, broadcast service transmission path signaling information may include an identifier for identifying a packet based stream including a broadcast service and an identifier of a packet including a broadcast service.

According to a specific embodiment of the present invention, as shown in FIG. 22, the broadcast service transmission path signaling information may include at least one of a transptort_stream_id field and a packet_id field.

The transport_stream_id field represents an identifier of a packet based stream including a broadcast service. According to a specific embodiment of the present invention, the transport_stream_id field may be a 16-bit field.

The packet_id field represents an identifier of a packet including a broadcast service. According to a specific embodiment of the present invention, the packet_id field may be a 16-bit field.

FIG. 23 is a view when broadcast service transmission path signaling information signals the transmission of a broadcast service through a packet based stream of an IP based broadcast network according to an embodiment of the present invention.

When a network transmitting a broadcast service is a network transmitting a broadcast service through a packet based stream transmitted from an IP based broadcast network, broadcast service transmission path signaling information may include at least one of information representing an IP version, information representing whether it contains a source IP address, a source IP address, a destination IP address, UDP port number information, and an identifier for identifying a packet including a broadcast service.

According to a specific embodiment of the present invention, as shown in the embodiment of FIG. 23, the broadcast service transmission path signaling information may include at least one among an IP_versioni_flag field, a source_IP_address_flag field, a source_IP_address field, a destination_UDP_port_number field, and a packet_id field.

The IP_versioni_flag field represents an IP address format of an IP datagram transmitting a packet including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram transmitting a packet including a broadcast service includes a source IP address. In more detail, when a value of the source_IP_address_flag field is 1, it represents that an IP datagram including a broadcast service includes a source_IP_address and when a value of the source_IP_address_flag field is 0, it represents that an IP datagram including a broadcast service does not include a source IP address. According to a specific embodiment of the present invention, the source_IP_address_flag field may be a 1-bit field.

The source_IP_address field represents the source IP address of an IP datagram transmitting a packet including a broadcast service. According to a specific embodiment of the present invention, the source_IP_address field may be a 32 or 128-bit field according to the IP version.

The destination_IP_address field represents the destination IP address of an IP datagram transmitting a packet including a broadcast service. According to a specific embodiment of the present invention, the destination_IP_address field may be a 32 or 128-bit field according to the IP version.

The destination_UDP_port_number field represents the UDP port number of an IP datagram transmitting a packet including a broadcast service. According to a specific embodiment of the present invention, the destination_UDP_port_number field may be a 16-bit field.

The packet_id field represents an identifier for identifying a packet including a broadcast service. According to a specific embodiment of the present invention, the packet_id field may be a 16-bit field.

FIG. 24 is a view when broadcast service transmission path signaling information signals a broadcast service through URL according to an embodiment of the present invention.

When a network transmitting a broadcast service is a network obtaining a broadcast service through URL, broadcast service transmission path signaling information may include information representing the length of URL for receiving a broadcast service and a URL for receiving a broadcast service.

According to a specific embodiment of the present invention, as shown in FIG. 24, the broadcast service transmission path signaling information may include at least one of an URL_lenth field and a URI char field.

The URL_lengh field represents the length of a URL for receiving a broadcast service. According to a specific embodiment of the present invention, the URL length field may be an 8-bit field.

The URL_char field represents a URL for receiving a broadcast service. According to a specific embodiment of the present invention, the URL_char field may be an 8-bit field.

Figure 25:
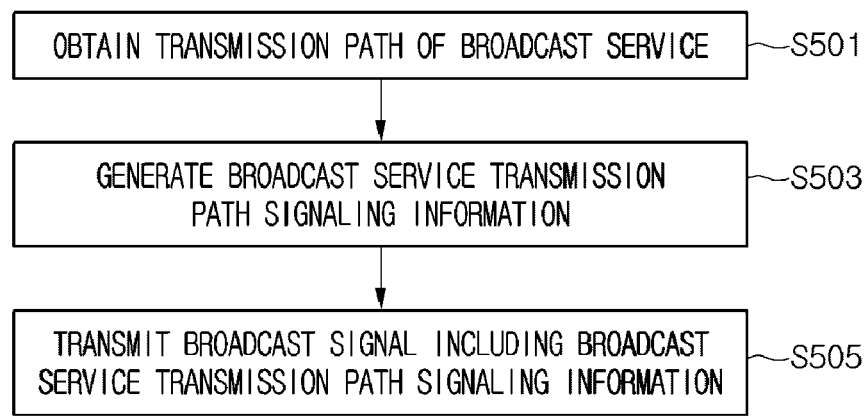
FIG. 25 is a view when a broadcast transmission device transmits broadcast service transmission path signaling information according to an embodiment of the present invention.

FIG. 25 is a view when a broadcast transmission device transmits broadcast service transmission path signaling information according to an embodiment of the present invention.

The broadcast transmission device obtains a transmission path of a broadcast service through a control unit in operation S501.

The broadcast transmission device generates broadcast service transmission path signaling information through a control unit in operation S503. The broadcast transmission device may generate the broadcast service transmission path signaling information described with reference to FIGS. 14 to 23.

The broadcast transmission device transmits a broadcast signal including broadcast service transmission path signaling information through a transmitting unit in operation S505.

Figure 26:
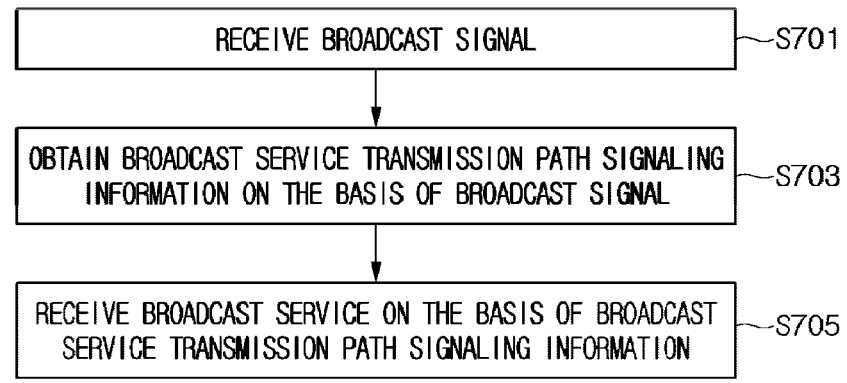
FIG. 26 is a view when a broadcast reception device receives a broadcast service on the basis of a broadcast service transmission path according to an embodiment of the present invention.

FIG. 26 is a view when a broadcast transmission device transmits broadcast service transmission path signaling information according to an embodiment of the present invention.

The broadcast reception device 100 receives a broadcast signal through the broadcast receiving unit 110 in operation S701.

The broadcast reception device 100 obtains broadcast service transmission path signaling information through the control unit 150 on the basis of the broadcast signal in operation S703.

The broadcast reception device 100 receives a broadcast service on the basis of the broadcast service transmission path signaling information through the control unit 150 in operation S705. In more detail, the broadcast reception device 100 may receive a media component of a broadcast service on the basis of the broadcast service transmission path signaling information through the control unit 150. As described with reference to FIGS. 16 to 25, the broadcast reception device 100 may receive a broadcast service through at least one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of different broadcasters, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. Especially, according to a specific embodiment of the present invention, the broadcast reception device 100 may receive a plurality of media components of a broadcast service through a plurality of networks. For example, the broadcast reception device 1100 may receive a video component of a broadcast service via a packet based stream through the broadcast receiving unit 1110 and may receive an audio component of a broadcast service via an IP based broadcast network through the IP communication unit 130.

As described above, the broadcast service signaling table may include media component signaling information signaling a media component. Especially, when a broadcast service is transmitted in the ISO Base Media File Format (ISO BMFF), the broadcast service signaling table may include media component signaling information. This will be described in more detail with reference to FIGS. 27 to 30.

FIG. 27 is a view illustrating media component signaling information signaling a media component according to an embodiment of the present invention.

The media component signaling information may include information representing an encoding type of a media component, information on whether a media component is encrypted, information representing the number of STKM streams including a key decrypting an encrypted media component, an identifier for identifying an STKM stream including a key for decrypting an encrypted media component, the length of a transmission parameter of a media component, a transmission parameter of a media component, and an encoding parameter according to an encoding type of a component. At this point, the transmission parameter may include at least one of a buffer model and the size of a maximum transmitting unit (MTU).

According to a specific embodiment of the present invention, as shown in the embodiment of FIG. 27, media component signaling information may include at least one of a descriptor_tag field, a descriptor_length field, a component_type field, a component_encryption_flag field, a num_STKM_streams field, an STKM stream id field, a transport_parameter_text_length field, a transport_parameter_text field, and a component_data field.

The descriptor_tag field represents that a corresponding descriptor includes media component signaling information. According to a specific embodiment of the present invention, the descriptor_tag field may be an 8-bit field.

The descriptor_length field represents the length of broadcast service transmission path signaling information after a corresponding field. According to a specific embodiment of the present invention, the descriptor_length field may be an 8-bit field.

The component_type field represents an encoding type of a corresponding component. According to an embodiment of the present invention, as shown in the embodiment of FIG. 28, a value that the component_type field has may represent at least one of an H.264/AVC, SVC enhancement layer stream component, an HE AAC v2 audio stream component, a FLUTE file delivery session, an STKM stream component, an LTKM stream component, an OMA-RME DIMS stream component, and an NTP time base stream component. When a media component is transmitted through ISO BMFF, the broadcast reception device 100 needs to prepare an appropriate operation for receiving a media component. Accordingly, it is necessary to signal the fact that a media component is transmitted through ISO BMFF. In more detail, as shown in the embodiment of FIG. 28, the component_type field may represent that a media component is transmitted through ISO BMFF. In more detail, when a value of the component_type field is 35, it may represent that a media component is an H.264/AVC component. In more detail, when a value of the component_type field is 36, it may represent that a media component is an SVC enhancement layer stream component. In more detail, when a value of the component_type field is 37, it may represent that a media component is an HE AAC v2 audio stream component. In more detail, when a value of the component_type field is 38, it may represent that a media component is transmitted through a FLUTE file transmission session. In more detail, when a value of the component_type field is 39, it may represent that a media component is an STKM stream component. In more detail, when a value of the component_type field is 40, it may represent that a media component is an LTKM stream component. In more detail, when a value of the component_type field is 41, it may represent that a media component is an OMA-RME DIMS stream component. In more detail, when a value of the component_type field is 42, it may represent that a media component is an NTP time base stream component. In more detail, when a value of the component_type field is 43, it may represent that a media component is transmitted through an ISO BMFF. According to a specific embodiment of the present invention, the component_type field may be a 7-bit field.

The component_encryption_flag field is a field representing whether a media component is encrypted. According to a specific embodiment of the present invention, the component_encryption_flag field may be a 1-bit field.

The num_STKM_streams field represents the number of STKM streams including a key for decrypting an encrypted media component. According to a specific embodiment of the present invention, the num_STKM_streams field may be an 8-bit field.

The STKM stream id field represents an identifier for identifying an STKM stream including a key for decrypting an encrypted media component. According to a specific embodiment of the present invention, the STKM stream id field may be an 8-bit field.

The transport_parameter_text_length field represents the length of the transport_parameter_text field. According to a specific embodiment of the present invention, the transport_parameter_text_length field may be an 8-bit field.

The transport_parameter_text field represents a transmission parameter of a media component. At this point, the transmission parameter may include at least one of a buffer model and the size of a maximum transmitting unit (MTU).

The component_data field represents an encoding parameter of a component. A parameter that an encoding parameter includes may vary according to an encoding type of a component. In more detail, a parameter that an encoding parameter includes may vary according to a value of the component_type field.

When a media component is transmitted through ISO BMFF, the component_data field may include at least one of version information of ISO BMFF and profile information.

In more detail, as shown in the embodiment of FIG. 30, the component_data field may include at least one of a version field and a profile field.

The version field represents version information of ISO BMFF. According to a specific embodiment of the present invention, the version field may be an 8-bit field.

The profile field represents profile information of ISO BMFF. According to a specific embodiment of the present invention, the profile field may be an 8-bit field.

The above-described media components are all handled and signaled identically regardless of their contents. However, recently, an adaptive streaming service transmitting different qualities of a media component according to a communication environment receives great attentions. Accordingly, a user may select one of various qualities of media components including the same content according to a communication environment and may then view the selected one. Furthermore, a multi view service displaying a plurality of media components on one screen simultaneously is provided. Accordingly, a user may view a plurality of images or data broadcasts through one screen. For example, a user may view a game of another stadium while viewing a baseball game through an additional Picture In Picture (PIP) screen. In such a way, as a broadcast service including a plurality of media components is diversified and increased, a broadcast transmission device and a broadcast reception device may need to divide the types of a component and process them and also need to systematically define the relationship between each media component. This will be described with reference to FIGS. 30 to 108.

FIG. 30 is a view illustrating the type and role of a media component according to an embodiment of the present invention.

The media component may be divided into a content component, a simple audio component, a simple video component, a continuous component, an elementary component, a composite component, a composite audio component, a composite video component, an adaptive component, an adaptive audio component, an adaptive video component, and a complex component. An adaptive component may be represented as a PickOne component.

The content component is a component including metadata relating to one kind of media. In more detail, the content component may be one of a video track, an audio track, a closed caption, a video enhanced layer, a webpage, and a bi-directional application.

The simple audio component is a component including audio. In more detail, the simple audio component is the encoding of one voice sequence encoded according to specific encoding parameters.

The simple audio component is a component including video. In more detail, the simple video component is the encoding of one video sequence encoded according to specific encoding parameters.

The continuous component is a component played on a continuous stream.

The elementary component is a continuous component including one encoding. The elementary component may be an audio component. In more detail, the elementary component may be one encoding for voice sequence. Additionally, the elementary component may be a video component.

In more detail, the elementary component may be one encoding for video sequence. The elementary component may be one closed caption track.

The composite component is a collection of continuous components necessary for playing one scene. In more detail, the composite component is a collection of continuous components that have the same media type, represent the same scene, and need to be played together in a predetermined combination. Accordingly, the composite component is a collection of media components combined to represent one scene. In more detail, the composite component may be music, dialogs, and special effect necessary for one complete audio. Additionally, the composite component may be the right image and the left image of a 3D image necessary for playing the 3D image.

The composite audio component is a collection of audio components necessary for playing voice sequence. In more detail, the composite audio component may be a collection of audio components to be mixed.

The composite video component is a collection of video components necessary for playing image sequence. In more detail, the composite video component may be a collection of 3D components combined for 3D video playback. Additionally, the composite video component may be base video encoding accompanying at least one enhanced encoding.

The adaptive component is a collection of continuous components representing one scene, which are replaced with each other. As described above, the adaptive component may be referred to as PickOne and this represents that one of a plurality of several replaceable continuous components is selected and played. In more detail, the adaptive component is a collection of continuous components that have the same media type and represent the same scene and one of the continuous components is selected for playback. In more detail, the adaptive component is a collection of media components obtained by encoding the same content with different qualities. For example, the adaptive component may be a collection of audio components obtained by encoding the same voice sequence with different bitrates. Additionally, the adaptive component is a collection of video components obtained by encoding the same image sequence with different bitrates. Additionally, the adaptive component may be a general closed caption track and an easy reader closed caption for the same dialog.

The adaptive audio component is a collection of audio components, one of which is selected for playing voice sequence. In more detail, the adaptive audio component may be a collection of audio components obtained by encoding the same sound sequence with different bitrates.

The adaptive video component is a collection of video components, one of which is selected for playing image sequence. In more detail, the adaptive video component may be a collection of video components obtained by encoding the same video sequence with different encoding parameters.

The complex component represents one of the composite component or the adaptive component. The complex component will be described in more detail with reference to FIGS. 31 to 33.

Figure 31:
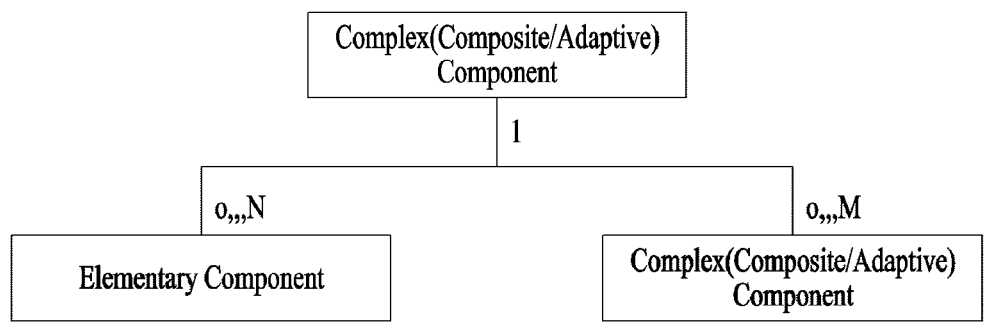
FIG. 31 is a view illustrating a configuration of a complex component according to an embodiment of the present invention.
Figure 32:
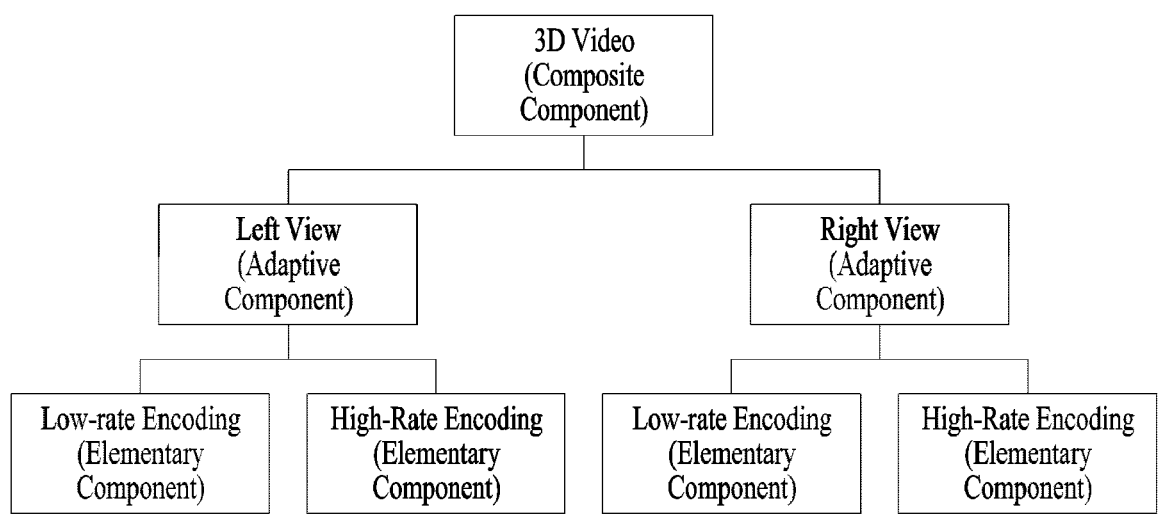
FIG. 32 is a view illustrating a complex video component according to an embodiment of the present invention.

FIG. 31 is a view illustrating a configuration of a complex component according to an embodiment of the present invention.

The complex component is not required to include only an elementary component. According to a specific embodiment of the present invention, the complex component may include a complex component. Accordingly, a broadcast service may not be played only with one elementary component in a complex component. Additionally, the complex component may be a composite component or an adaptive component. In more detail, as shown in the embodiment of FIG. 31, the composite component may include at least one elementary component. Additionally, the composite component may include at least one complex component. Additionally, the composite component may include both an elementary component and a complex component. One adaptive component may include at least one elementary component.

A component of a broadcast service may be described using the term "top-level component". A top-level audio component represents a unique voice sequence. A top-level video component represents a unique image sequence. According to a specific embodiment of the present invention, such a top-level component may be an elementary component. According to another specific embodiment of the present invention, such a top-level component may be a composite component.

Figure 33:
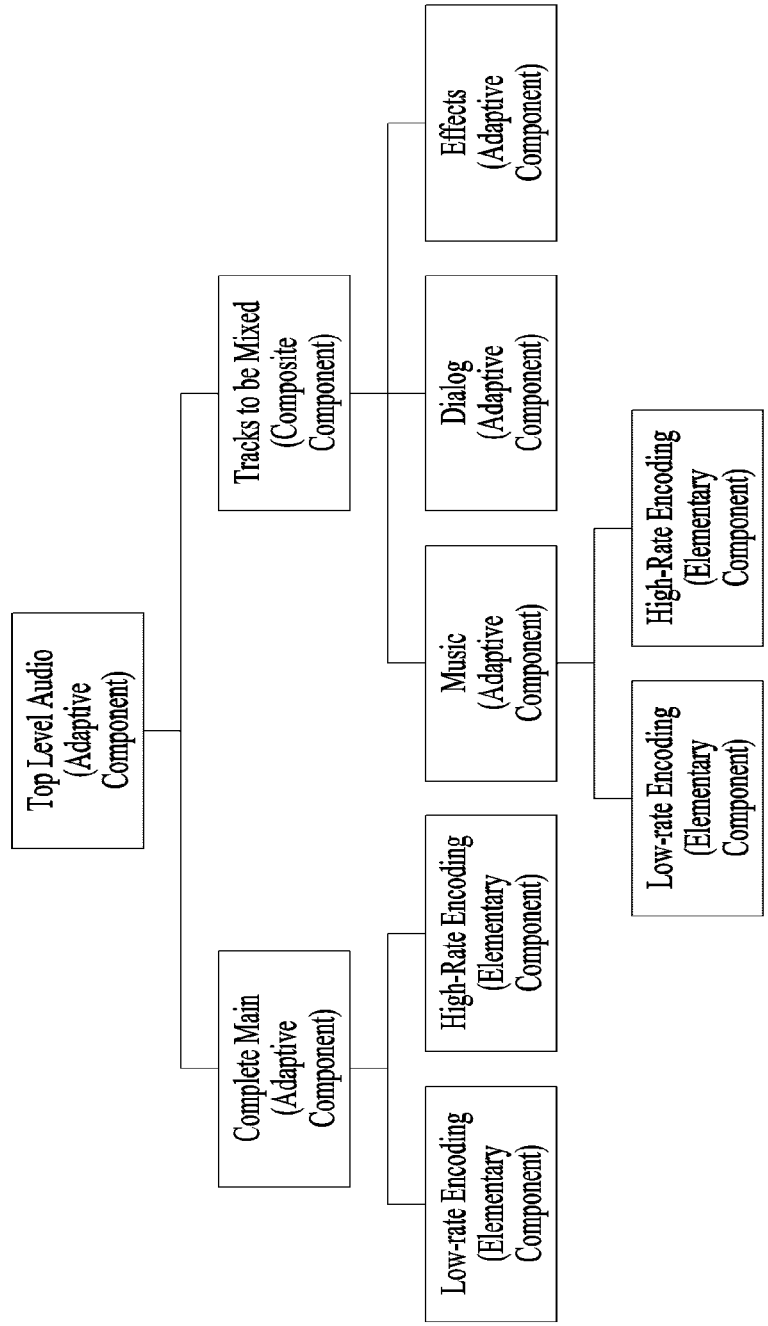
FIG. 33 is a view illustrating a complex audio component according to an embodiment of the present invention.

For example, as shown in the embodiment of FIG. 33, the top-level video component may be a composite component including the left image and right image components of a 3D image. At this point, the left image component of the 3D image may be an adaptive component including a plurality of elementary components encoded with different bitrates. Additionally, the right image component of the 3D image may be an adaptive component including a plurality of elementary components encoded with different bitrates.

According to another specific embodiment of the present invention, as shown in the embodiment of FIG. 62, the top-level audio component may be an adaptive component including an adaptive component including a complete main audio and a composite component having mixed music, dialogs, and special effects. At this point, the adaptive component including a complete main audio may include a plurality of elementary components encoded with different bitrates. Additionally, the composite component including mixed music, dialogs, and special effects may include an adaptive component including music, an adaptive component including dialogs, and an adaptive component including special effects. That is, the adaptive component including music may include a plurality of elementary components encoded with different bitrates.

Distinguishing a media component in such a way may simplify the relationship between a plurality of media components. For example, when it is specified that each video program includes one complex video component, the relationship with each audio elementary component or a video elementary component does not need to be specified.

There may be a plurality of complex component models for one media. For example, a 3D component encoded with a plurality of bitrates may be modeled with a sub media component for a left image and a sub media component for a right image. Each sub media component may be modeled as an adaptive component including a plurality of components encoded with different bitrates. Additionally, the same 3D component may be modeled as an adaptive component including a plurality of sub media components encoded with different bitrates and each of the sub media components may be modeled as a composite component including left and right images. The number of sub media components with different bitrates in the left and right images may vary.

FIG. 34 is a view illustrating a configuration of a complex video component according to an embodiment of the present invention.

The embodiment of FIG. 34 is obtained by editing the specific expression in the embodiment of FIG. 30 and is applicable like the embodiment of FIG. 31. Especially, the definitions and roles of continuous components, elementary components, composite components and complex components are the same. The adaptive component of FIG. 30 is expressed as a PickOne component as described above. The definition and role of the PickOne component in the embodiment of FIG. 34 are identical to those of the adaptive component in the embodiment of FIG. 30. Accordingly, a composite component represents that a plurality of continuous components are combined and one content is played. Additionally, a PickOne component represents a component that is one selected from a plurality of selectable media components and played. However, in the embodiment of FIG. 34, a presentable component is defined unlike the embodiment of FIG. 30. The presentable component represents a continuous component that is substantially played in the broadcast reception device 100. Additionally, the presentable component may be an elementary component. Additionally, the presentable component may be a complex component. In a specific embodiment, a media component itself may be a presentable component and may be included in a complex component as a sub-media component of a complex component. For example, a service may include a basic 2D video component and a complex 3D component. At this point, a 2D video component is a presentable component that is playable as a 2D image without a 3D video component. Additionally, as one view of a 3D image, the 2D video component may be played as a 3D image together with another 3D video component.

Additionally, in another specific embodiment, a presentable audio component may be a PickOne component including a main component, music, dialog, and sound effect. At this point, a main component and a music component may be a PickOne component including a plurality of elementary components encoded with different bitrates. Additionally, a media component representing dialog and sound effect may be an elementary component.

FIG. 35 is a view illustrating a configuration of a complex video component according to an embodiment of the present invention.

A presentable component may be a composite component. Like the embodiment of FIG. 35, scalable video encoding may include a plurality of media components as a composite component. The scalable video encoding may include a base layer component that is an elementary component, a first enhancement layer component, and a second enhancement layer component. At this point, the base layer component is a presentable component that is playable without the first enhancement layer component and the second enhancement layer component. Additionally, the base layer component may be played as a high quality image together with at least one of the first enhancement layer component and the second enhancement layer component. At this point, the first enhancement layer component and the second enhancement layer component are components unplayable without the base layer component and are supposed to be played together with the base layer component. Therefore, the first enhancement layer component and the second enhancement layer component cannot be called a presentable component. At this point, the broadcast reception device 100 may combine the base layer component with the first enhancement layer component and the second enhancement layer component to play an image on the basis of the capabilities of the broadcast reception device 100. In more detail, when the capabilities of the broadcast reception device 100 are low, the broadcast reception device 100 may play a relatively low quality image by using the base layer component. Or, when the capabilities of the broadcast reception device 100 are relatively high, the broadcast reception device 100 may combine the base layer component with the first enhancement layer component and the second enhancement layer component to play a relatively high quality image. Or, when the capabilities of the broadcast reception device 100 are very high, the broadcast reception device 100 may combine the base layer component with the first enhancement layer component and the second enhancement layer component to play a very high quality image.

Figure 36:
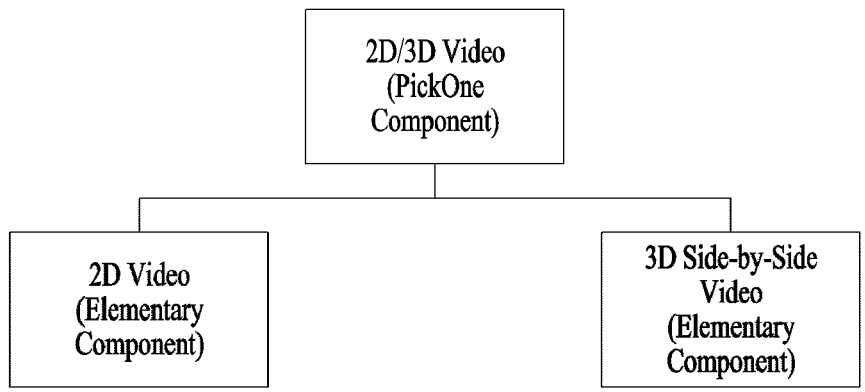
FIG. 36 is a view illustrating a complex video component according to another embodiment of the present invention.

FIG. 36 is a view illustrating a complex video component according to another embodiment of the present invention.

A presentable component may be a PickOne component. According to the embodiment of FIG. 36, a PickOne component may include 2D encoding and 3D encoding in side-by-side format. At this point, the 3D encoding is divided into a left view and a right view. The left view and the right view are encoded each to be half the view width and disposed side-by-side to generate a picture. The broadcast reception device 100 may select one of the 2D encoding and the 3D encoding according to the capabilities of the broadcast reception device 100 and may then play the selected one. In more detail, when the broadcast reception device 100 does not support a 3D image, it may select and play the 2D encoding. Additionally, when the broadcast reception device 100 supports a 3D image, it may select and play the 3D encoding.

In such a way, each service may be described through a presentable component therein. Additionally, when the presentable component is a complex component, it may be described through components including the complex component. In a specific embodiment, each presentable audio component may represent the voice of a specific scene and each presentable video component may represent the picture of a specific scene captured at a specific angle. In the case of a simple combination, the presentable component may be an elementary component. As described above, each presentable component may be a complex component. This will be described with reference to FIG. 37.

Figure 37:
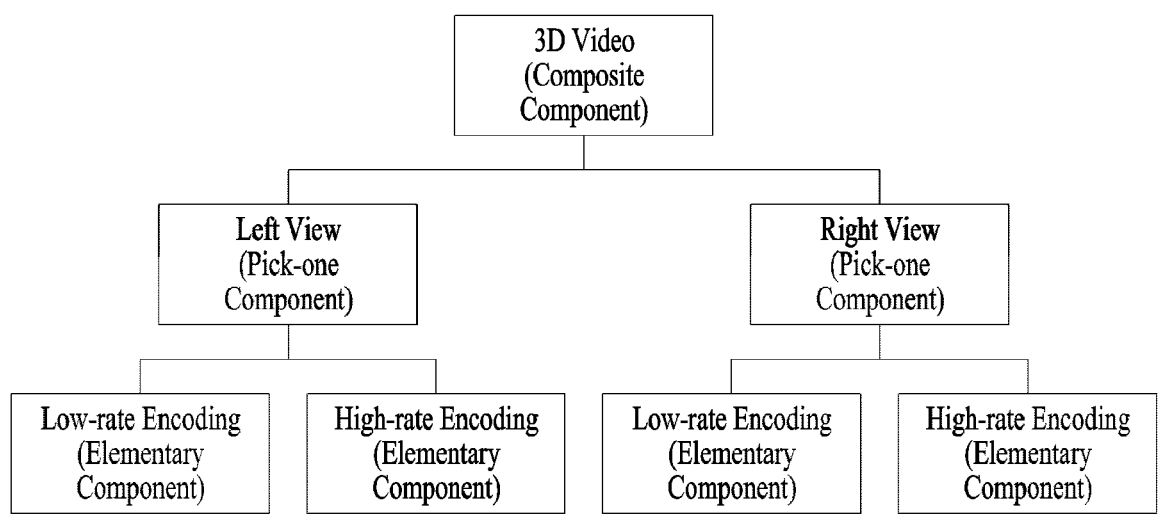
FIG. 37 is a view illustrating a complex video component according to another embodiment of the present invention.

FIG. 37 is a view illustrating a complex video component according to another embodiment of the present invention.

A presentable component may be a composite component and a component that a composite component includes may be a PickOne component. In the embodiment of FIG. 37, a presentable video component includes a 3D image left view video component and a 3D image right view video component. The left view video component and the right view video component are PickOne components. Accordingly, the left view video component and the right view video component include a plurality of elementary components encoded with different bitrates.

When the type and role of a media component are defined as in the embodiment of FIG. 63, the relationship and structure of a media component that a service includes may be described efficiently and simply. Accordingly, by using this, a broadcast transmission device may signal services efficiently and simply and also by using this, the broadcast reception device 100 may obtain service signaling information efficiently and simply.

Various broadcast service models are described with reference to FIGS. 38 to 41.

Figure 38:
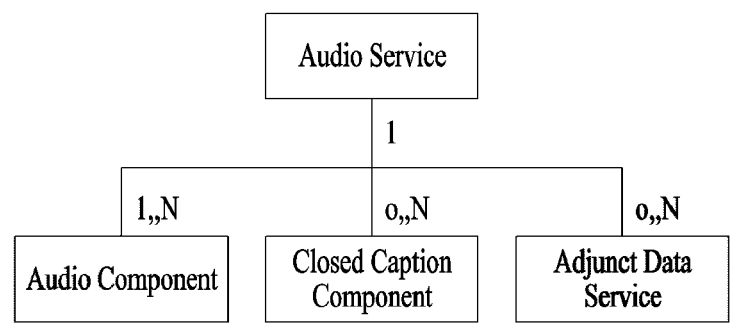
FIG. 38 is a view illustrating a media component configuration of audio service according to an embodiment of the present invention.

FIG. 38 is a view illustrating a media component configuration of an audio service according to an embodiment of the present invention.

The audio service may include one or more audio components. Additionally, the audio service may include a closed caption component. Additionally, the audio component may include adjunct data service. At this point, an adjunct service may be a Non-Real-Time (NRT) service. Additionally, according to a specific embodiment of the present invention, an audio service may be transmitted through continuous stream according to a predetermined schedule. According to a specific embodiment of the present invention, audio service may be referred to as radio service.

Figure 39:
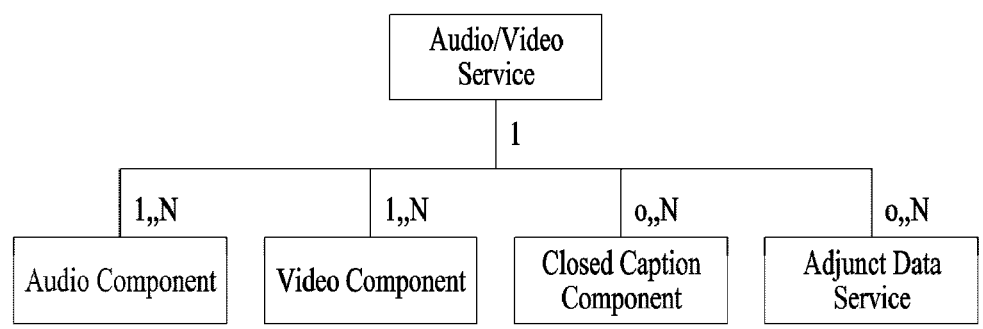
FIG. 39 is a view illustrating a configuration of a broadcast service including both audio and video according to an embodiment of the present invention.

FIG. 39 is a view illustrating a configuration of a broadcast service including both audio and video according to an embodiment of the present invention.

The broadcast service including both audio and video may include one or more main video components. At this point, the broadcast service including both audio and video may include an adjunct video component. At this point, the broadcast service including both audio and video may include an audio component. Moreover, the broadcast service including both audio and video may include a closed caption component. Furthermore, the broadcast service including both audio and video may include an adjunct service data component. According to a specific embodiment of the present invention, a service including both audio and video may be referred to as TV service.

Figure 40:
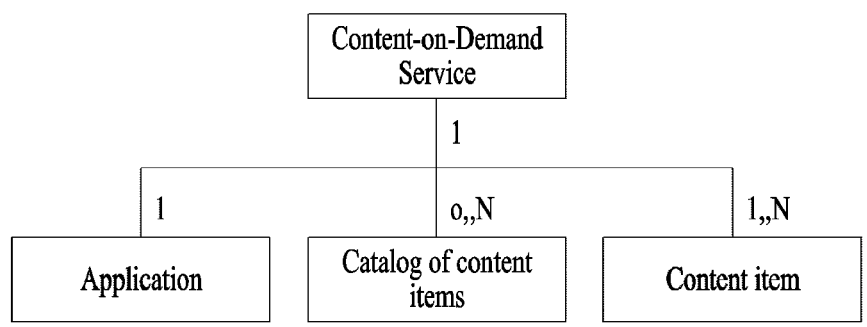
FIG. 40 is a view illustrating a configuration of a user request content service according to an embodiment of the present invention.

FIG. 40 is a view illustrating a configuration of a user request content service according to an embodiment of the present invention.

A Contents On Demand (CoD) service may include an application providing a user interface. Additionally, the CoD service may include a content item provided in response to a user request. Additionally, the CoD service may include a catalog of a content item. At this point, the catalog may be embedded in an application.

Figure 41:
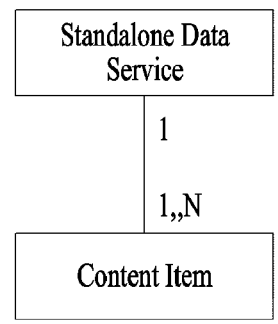
FIG. 41 is a view illustrating a configuration of a stand-alone NRT data service according to an embodiment of the present invention.

FIG. 41 is a view illustrating a configuration of a stand-alone data service according to an embodiment of the present invention.

A stand-alone data service may include one or more content items configuring a service. In a specific embodiment, a stand-alone NRT data service may be referred to as an App service.

A plurality of broadcast services may share a media component. In more detail, each of media components that the above-described audio service, broadcast service including both audio and video, and stand-alone data service include may relate to one or more other components. At this point, one or more other components may include a service encoded by another method representing the same base content.

Additionally, a broadcast service may include as a property at least one of a service identifier, a service form, a description of a service, a service name, a channel number, a graphic icon, a list of components in a service, a property for broadcast service protection, a property on targeting/personalization, a contents advisory rating, a language of a service, a list of adjunct NRT data services relating to service, and a property on broadcast service user report. At this point, a service name may be displayed in a plurality of languages. Additionally, a graphic icon may be used to represent a service. Additionally, a service language may represent a primary language used in service. Additionally, the service form may include at least one of a scheduled audio service transmitted according to a planned schedule, a service including scheduled audio and video transmitted according to a planned schedule, a user request service transmitted in response to a user request, and a scripted NRT data service. Additionally, the channel number may include a major channel number and a minor channel number in detail. Additionally, the channel number may be displayed as a virtual channel number. Moreover, a plurality of broadcast services may use the same graphic icon. Additionally, the service identifier may have a unique value in a broadcast area where a broadcast service is broadcasted. Additionally, the service identifier may include identifiers of two categories, for example, a local identifier and a regional identifier. The local identifier may be used for services broadcasted only in one broadcast area. Accordingly, a plurality of broadcast services broadcasted in a plurality of different broadcast areas may have the same regional identifier. The local identifier may be used for broadcast service identification when the same broadcast is available in a plurality of broadcast areas.

In order to signal the properties of such a broadcast service, the above-described broadcast signaling table may be used.

Each continuous component may have a plurality of properties. At this point, the plurality of languages may be divided into a plurality of types. In a specific embodiment, a plurality of properties that a continuous component has may include a basic continuous component property, an elementary component property, a complex component property, and a presentable component property.

The basic continuous component property is applied to all continuous components. The basic continuous component property may include at least one of a unique content identifier, a content structure, and a content type. At this point, the content structure may represent one of a basic component and a PickOne component. Additionally, the content type may represent one of audio, video, and a closed caption.

The elementary component property is applied to an elementary component. The elementary component property may include the basic feature of component encoding. For example, the elementary component property may include a video resolution. Additionally, the elementary component property may include the number of audio channels.

The complex component property is applied to a complex component. The complex component property may include at least one of media components that a complex component includes and the role of the media components. In more detail, the role of the media components may represent that an audio component is a dialog track. Additionally, the role of media components may represent that a video component is the left view of a 3D image.

Each service may include one or more media components. Additionally, each media component may include at least one as a property among a component identifier for identifying a media component, the type of a component, description for a component, a targeting/personalization property, a service protection property, a target device, contents advisory rating, and related component information. At this point, a value of a component identifier may be unique between components of a broadcast service. The target device may represent one among a primary device and a companion device. Additionally, the service signaling table may include media component information signaling a property of such a media component. In more detail, the service signaling table may include media component information as component level information. This will be described with reference to FIG. 42.

FIG. 42 is a view illustrating media component information according to an embodiment of the present invention.

The media component information may include information representing the type of a media component, information on whether information on a target device is included, target device information representing a target device, text information describing a media component, a component encoding parameter according to the type of a media component, and information on a complex component in the case of a complex component that a media content includes.

The media component information may include a descriptor_tag field, a descriptor_length field, a component_type field, a target_device_flag field, a target_device field, a text_length field, a text_char field, a component_data_type field, a component_data field, and a complex_component_data field.

The descriptor_tag field represents that media component information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The target_device_flag field represents whether the targte_device field is included. According to a specific embodiment of the present invention, the target_device_flag may be a 1-bit field.

The target_device field represents a target_device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The text_length field represents the length of the text_char field. According to a specific embodiment of the present invention, the text_length field may be an 8-bit field.

The text_char field is a text for describing a media component.

The component_data_type field represents an encoding type of a corresponding component. In more detail, the component_data_type field may have the same value as that in the embodiment of FIG. 43. In more detail, when a value of the component_type field is 35, it may represent that a media component is an H.264/AVC component. In more detail, when a value of the component_data_type field is 36, it may represent that a media component is an SVC enhancement layer stream component. In more detail, when a value of the component_data_type field is 37, it may represent that a media component is an HE AAC v2 audio stream component. In more detail, when a value of the component_data_type field is 38, it may represent that a media component is transmitted through a FLUTE file transmission session. In more detail, when a value of the component_data_type field is 39, it may represent that a media component is an STKM stream component. In more detail, when a value of the component_data_type field is 40, it may represent that a media component is an LTKM stream component. In more detail, when a value of the component_data_type field is 41, it may represent that a media component is an OMA-RME DIMS stream component. In more detail, when a value of the component_data_type field is 42, it may represent that a media component is an NTP time base stream component. In more detail, when a value of the component_data_type field is 70, it may represent that a media component is an HEVC video stream component. In more detail, when a value of the component_data_type field is 71, it may represent that a media component is transmitted through an ISO BMFF. According to a specific embodiment of the present invention, the component_type field may be an 8-bit field.

The component_data field represents an encoding parameter of a component. A parameter that an encoding parameter includes may vary according to an encoding type of a component. In more detail, a parameter that an encoding parameter includes may vary according to a value of the component_type field.

When the type of a media component is a complex type, for example, a composite component or an adaptive component, the complex_component_data field represents information on a complex component. This will be described in more detail with reference to FIGS. 44 and 45. Additionally, component information is described through a bit stream format, but component information may be in another format such as an XML file format.

FIG. 44 is a view illustrating complex component information according to an embodiment of the present invention.

The complex component information may include at least one of information representing a set form of component, information on whether information on a target_device is included, target_device information representing a target_device, the number of sub media components that a corresponding complex component includes, information on the type of a media that a sub media component includes and a role of a sub media component when a corresponding complex component is a composite component.

In more detail, as shown in FIG. 44, the complex component information may include at least one of an aggretation_type field, a num_sub_component field, a sub_component_id field, a general_mdeida_type field, and a sub_component_role field.

The aggretation_type field represents the type of a set that a corresponding component belongs. In more detail, a value of the aggretation_type field represents either a composite component or an adaptive component. According to a specific embodiment of the present invention, the aggretation_type field may be a 3-bit field.

The target_device_flag field represents whether the targte_device field is included. According to a specific embodiment of the present invention, the target_device_flag may be a 1-bit field.

The target_device field represents a target_device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The num_sub_component field represents the number of sub media components that a corresponding complex component includes. According to a specific embodiment of the present invention, the num_sub_component field may be an 8-bit field.

The sub_component_id field represents a sub media component identifier for identifying a sub media component. According to a specific embodiment of the present invention, the sub_component_id field may be an 8-bit field.

When a corresponding complex component is a composite component, the general_media_type field represents the type of a media that a sub media component includes. In more detail, a value of the general_media_type field may represent one among video, audio, text, application, and message. In more detail, when a value of the general_media_type field is 0x00, it represents that a media that a sub media component includes video. When a value of the general_media_type field is 0x01, it represents that a media that a sub media component includes audio. When a value of the general_media_type field is 0x02, it represents that a media that a sub media component includes text. When a value of the general_media_type field is 0x03, it represents that a media that a sub media component includes application. When a value of the general_media_type field is 0x04, it represents that a media that a sub media component includes message. According to a specific embodiment of the present invention, the general_media_type field may be a 4-bit field.

The sub_component_role field represents the role of each sub media component. In more detail, a value of the sub_component_role field may represent that a sub media component is an enhancement layer for scalable video encoding. According to another specific embodiment of the present invention, a value of the sub_component_role field may represent that a sub media component is one among the right image, left image, and depth information of a 3D image. According to another specific embodiment of the present invention, a value of the sub_component_role field may represent that a sub media component is a video at a specific position of a screen divided into a plurality of areas. According to the type of a media that a sub media component includes, information that the sub_compoent_role field represents may vary. According to a specific embodiment of the present invention, the sub_component_role field may be an 8-bit field.

Such complex component information may be included in a complex component descriptor as shown in the embodiment of FIG. 45. Additionally, complex component information is described through a bit stream format, but the complex component information may be in another format such as an XML file format.

As described above, media components may have a predetermined relationship to each other. For example, one closed caption component may relate to one or more audio components. Additionally, in order to signal a relationship between such media components, the service signaling table may include related component list information. In more detail, the service signaling table may include related component list information as component level information. The related component list information will be described in more detail with reference to FIG. 46.

FIG. 46 is a view illustrating related component list information according to an embodiment of the present invention.

The related component list information may include at least one of a component identifier for identifying a component, information representing the type of a media component, information representing the encoding format of a media component, and information representing the type of media that a media component includes.

In more detail, as shown in the embodiment of FIG. 47, the related component list information may include at least one of a descriptor_tag field, a descriptor_length field, a num_associated_component field, a component_id field, a component_type field, a component_data_type field, and a general_media_typee field.

The descriptor_tag field represents that related component list information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The num_associated_component field represents the number of media components relating to a corresponding media component. According to a specific embodiment of the present invention, the num_associated_component field may be an 8-bit field.

The component_id field represents an identifier for identifying a related media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a related media component represents an elementary component. When a value of the component_type field is 0x01, a related media component represents a composite component. When a value of the component_type field is 0x02, a related media component represents an adaptive component. According to a specific embodiment of the present invention, the component_type field may be a 4-bit field.

The component_data_type field represents an encoding type of a corresponding component. In more detail, the component_data_type field may have the same values as those in FIG. 43. According to a specific embodiment of the present invention, the component_type field may be an 8-bit field.

The general_media_type field represents the type of a media that a related media component includes. In more detail, a value of the general_media_type field may represent one among video, audio, text, application, and message. In more detail, when a value of the general_media_type field is 0x00, it represents that a media that a related media component includes video. When a value of the general_media_type field is 0x01, it represents that a media that a related media component includes audio. When a value of the general_media_type field is 0x02, it represents that a media that a related media component includes text. When a value of the general_media_type field is 0x03, it represents that a media that a related media component includes application. When a value of the general_media_type field is 0x04, it represents that a media that a related media component includes message. According to a specific embodiment of the present invention, the general_media_type field may be an 8-bit field.

An audio component may include at least one as a property among a component identifier for identifying a media component, the type of a component, description for a component, a targeting/personalization property, a service protection property, a target device, and related component information. At this point, a value of a component identifier may be unique between components of a broadcast service. The target device may represent one among a primary device, a companion device, and both a primary device and a companion device.

When the audio component is an elementary component, it may include a property for encoding format including codec, the number of channels, a bitrate, and a compression parameter. Additionally, when the audio component is an elementary component, it may include language information of audio as a property. The mode of the audio component may be included as a property. At this point, the mode of the audio component may be one among complete main audio, dialog, effect sound, and audio for the visually impaired, audio for the hearing-impaired, commentary, and voice over.

When the audio component is a complex component, it may include at least one as a property among information representing the type of aggregation, a list of included media components, and the role of an included component in the case of a composite component. The form of a set may be one of a composite component and an adaptive component, that is, a PickOne component.

When the audio component is a top level component, it may include at least one as a property among contents advisory rating and information on a related closed caption component.

When an audio component is a presentable component, it may have as a property at least one of targeting/personalization, Content advisory rating, content/service protection, a target screen, and a related closed caption component. At this point, the target screen property may represent at least one of a primary screen, a companion screen, and a screen partially inserted into the primary screen, for example, Picture In Picture (PIP).

The closed caption component may include at least one as a property among a component identifier, the type of a component, a targeting/personalization property, a service protection property, a target device, and an audio component identifier relating to a closed caption component. At this point, a value of a component identifier may be unique between components of a broadcast service. The target device may represent one among a primary device, a companion device, and both a primary device and a companion device.

When the closed caption component is an elementary component, the closed caption component may include its language kind and form, as a property. In more detail, the form of a closed caption component may be one among a general closed caption or an Easy-reader closed caption.

When the closed caption component is an adaptive component, it may include a media component therein, as a property.

When the closed caption component is a top level component, it may include contents advisory rating as a property.

When a closed caption component is a presentable component, it may have as a property at least one of targeting/personalization, Content advisory rating, content/service protection, and a target screen. At this point, the target screen property may represent at least one of a primary screen, a companion screen, and a screen partially inserted into the primary screen, for example, Picture In Picture (PIP).

The video component may include at least one as a property among a component identifier for identifying a media component, the type of a component, a targeting/personalization property, a service protection property, the role of a video component, a target screen, and an NRT data service relating to a video component. At this point, a value of a component identifier may be unique between components of a broadcast service. The role of a video component may be one among an alternative camera view, an alternative video component, a sign language screen, and a follow subject video. The target device may represent one among a primary device, a companion device, both a primary device and a companion device, and a Picture In Picture (PIP) screen. When the NRT data service relating to a video component is not included, all additional NRT data services are connected to a video component.

When the video component is an elementary component, it may include at least one as a property among codec, an encoding format including a compression parameter or the like, a resolution including horizontal and vertical pixel values, an aspect ratio, a scanning method representing whether it is interlace or progressive, a frame rate, and a still picture mode. Additionally, the video component may include an encoding parameter as a property. At this point, the type of a specific encoding parameter may vary depending on codec of a video component.

When the video component is a complex component, it may include an aggregation form and a media component list that the complex component includes, as a property.

When the video component is a composite component among complex components, it may include the role of each media component that the composite component includes, as a property. At this point, the role of a media component may represent an enhancement layer for scalable video encoding. According to another specific embodiment of the present invention, the role of a media component may represent one among the right image, left image, and depth information of a 3D image. According to another specific embodiment of the present invention, the role of a media component may represent a video at a specific position of a screen divided into a plurality of areas. According to another specific embodiment of the present invention, the role of a media component may be Follow-Subject metadata that is a screen displayed according to a specific subject. Such Follow-Subject metadata may include at least one of a subjects' name, a subject's position, and a subject's size. When a Follow-Subject function is supported by metadata in frame unit of stream, the Follow-Subject metadata may represent an area of a main video component where a subject is focused.

When the video component is a top level component among complex components, it may include at least one as a property among contents advisory rating and a related audio component.

When a video component is a presentable component, it may have as a property at least one of targeting/personalization, Content advisory rating, content/service protection, a target screen, and a related audio presentable component, and related closed caption presentable component. At this point, the target screen property may represent at least one of a primary screen, a companion screen, and a screen partially inserted into the primary screen, for example, Picture In Picture (PIP).

The NRT data service may be a stand-alone service not depending on another service. Additionally, the NRT data service may be an adjunct NRT data service depending on another service. At this point, the adjunct NRT data service may be part of radio service. Moreover, the adjunct NRT data service may be part of TV service. The NRT data service may have a common property for all services, for example, a service identifier. Furthermore, the NRT data service and the NRT service may have a common property.

The data service may include at least one of a service language, a consumption model, an essential capability list, a non-essential capability list, a target device, and a content item available in a data service as properties.

A consumption model may represent at least one of Push, Portal, Push Scripted, Portal Scripted, Triggered, and Segment Delivery.

In Push, NRT data service provides service on the basis of a request. The broadcast reception device 100 provides to a user an option for automatically updating an NRT data service relating to service. In more detail, the broadcast reception device 100 receives from a user an input for auto update of an NRT data service relating to service. When an input for auto update of an NRT data service relating to service is received from a user, the broadcast reception device 100 caches a content relating to service and the latest version of an auto update file in order for user. When an input for push service is received from a user, the broadcast reception device 100 displays a pre-loaded content.

Portal provides an experience as if a user accessed NRT data service through a web browser. At this point, files used for NRT data service need to support text/graphic rendering.

Push Scripted is similar to Push. However, there is a difference in that Push Scripted provides a Declarative Object providing a user interface of a specific broadcaster for service.

Portal Scripted is similar to Portal. However, there is a difference in that Portal Scripted provides a Declarative Object providing a user interface of a specific broadcaster for service.

Triggered is a consumption model used in bi-directional adjunct NRT data service. In an example of typical Triggered, in order to improve user experience, a Declarative Object in which adjunct NRT data service for A/V virtual channel is synchronized is delivered.

Segment delivery provides the delivery of a segment and an application for supporting the insertion of a targeted content of a program. A segment divides a program into a plurality of time spans. A targeting segment provides a content based on the characteristics of a user and the characteristics of the broadcast reception device 100 as a specific segment. In more detail, the broadcast reception device 100 may play a content based on the characteristics of a user and the characteristics of the broadcast reception device 100 as a specific segment. In more detail, a segment delivery consumption model is not displayed to a user (for example, behind scene) and is used to insert a targeting content into the middle of a radio program or a TV program. For example, the broadcast reception device 100 displays a targeting advertisement based on the characteristics of a user during the middle of a radio program or a TV program. Such NRT data service is not provided by a user's selection. Such NRT data service may be opened by an inserted targeting application, a collection of segments targeted for insertion, and an application and may deliver at least one of consumed other files as a content item. At this point, it is selected that which segment and what time the inserted targeting application is inserted. Additionally, the targeting application may notify such insertion to the broadcast reception device 100. Additionally, the targeting application may perform a report function. Additionally, other files opened and consumed by an application may be encrypted to be interpreted by only a corresponding application.

The broadcast reception device 100 may perform the following operations in order for segment delivery. The broadcast reception device 100 may download and cache an application in advance in order not to download the application repeatedly each time a user selects radio service or TV service including adjunct NRT data service. Additionally, the broadcast reception device 100 may pre-download a targeted segment and may cache an expiration date. Through this, the broadcast reception device 100 may provide a targeted segment to a user immediately. Additionally, the broadcast reception device 100 may execute an application. Additionally, when an application notifies that a specific segment is inserted, the broadcast reception device 100 may insert the specific segment.

A target device may represent one of a primary device and a companion device, or both a primary device and a companion device.

A content item of data service may have as a property at least one of a content item identifier, the name of a content item, a file set including content items, a display for representing whether the update of a content item is to be monitored, an available window representing a download available time, an expiration data representing a time at which a content item is discarded, a content item size, the playback length of a content item, a targeting/personalizing property, service/content protection, and content advisory rating.

Additionally, each additional NRT service may include a target screen as a property. At this point, the target screen may represent one among a primary device, a companion device, and both a primary device and a companion device.

Such an NRT data property may be signaled through an NRT information table. This will be described with reference to FIG. 47.

FIG. 47 is a view of an NRT information table according to an embodiment of the present invention.

The NRT information table may include an NRT service identifier and an NRT information block.

According to a specific embodiment of the present invention, as shown in the embodiment of FIG. 47, the NRT information table may include at least one of a table_id field, section_syntax_indicator field, private_indicator field, section_length field, table_id_extension field, version_number field, current_next_indicator field, section_number field, last_section_numberr field, service_id field, and NRT information block field.

The table_id field represents the identifier of an NRT information table. At this point, a value of the table_id field may be one of reserved id values defined in ATSC A/65. According to a specific embodiment of the present invention, the table_id field may be an 8-bit field.

The section_syntax_indicator field represents whether an NRT information table is a private section table in the long formant of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying an NRT information table in combination with the table_id field. Especially, the table_id field may include a protocol_version field representing a protocol version of an NRT information table. According to a specific embodiment of the present invention, the protocol_version field may be an 8-bit field. Especially, the table_id_extension field may include a subnet_id field identifying a subnet that an NRT information table transmits. According to a specific embodiment of the present invention, the subnet_id field may be an 8-bit field.

The version_number field represents a version of an NRT information table. The broadcast reception device 100 may determine the availability of an NRT information table on the basis of a value of the vserion_number field. In more detail, when a value of the version_number field is identical to a version of a previously received service signaling table, the information of the NRT information table may not be used. According to a specific embodiment of the present invention, the version_number field may be a 5-bit field.

The current_next_indicator field represents whether information of an NRT information table is currently available. In more detail, when a value of the current_next_indicator field is 1, it may represent that an NRT information table is available. Moreover, when a value of the current_next_indicator field is 1, it may represent that information of an NRT information table is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of an NRT information table is large, the NRT information table may be divided into a plurality of sections and then transmitted. At this point, the broadcast reception device 100 determines whether all sections necessary for an NRT information table are received on the basis of the section_number field and the last_section_number field. According to a specific embodiment of the present invention, the last_section_number field may be an 8-bit field.

The service_id field represents a service identifier for identifying an NRT service. According to a specific embodiment of the present invention, the service_id field may be a 16-bit field.

The NRT information block field represents an NRT information block. This will be described in more detail with reference to FIG. 48.

FIG. 48 is a view illustrating an NRT information block according to an embodiment of the present invention.

The NRT information block may include at least one of descriptors including information representing the start time of a time span that the NRT information block signals, information representing the length of a time span that the NRT information block signals, the number of content items that the NRT information block signals, content identification information identifying a corresponding content item, information on whether a corresponding content item is updated periodically, information on whether content protection is applied to files that a corresponding content item includes, information representing whether a corresponding content item is a master content item executed when service is selected, information on whether the NRT information block includes the length of a playback time of a corresponding content, the length of a playback time of a corresponding content, information on whether the NRT information block includes the playback delay time of a corresponding content, the playback delay time of a corresponding content, information on whether the NRT information block includes the expiration time of a corresponding content item, the expiration time of a content item, information on whether the NRT information block includes the size of a corresponding content item, the size of a corresponding content, information on whether the NRT information block includes information on a target device of NRT service, information on a target device of NRT service, information on whether a corresponding content item is received through a broadcast network, information on whether a corresponding content item is received through an internet network, the name of a corresponding content item, and specific information on a corresponding content.

In more detail, as shown in the embodiment of FIG. 49, the NRT information block may include at least one of a time_span_start field, time_span_length field, a num_content_items_in_section field, a content_id, an updates_available field, a content security conditions indicator field, a master item field, a playback_length_included field, a palybace_Delay_included field, an expiration_included field, a content_size_included field, an available_in_broadcast field, a target_included field, a playback_length_in_seconds field, a playback_delay field, an expiration field, a content_size field, a target field, a content_name_text field, and a content_descriptor field.

In more detail, as shown in the embodiment of FIG. 49, the NRT information block may include at least one of a time_span_start field, time_span_length field, a num_content_items_in_section field, a content_id, an updates_available field, a content_security_conditions_indicator field, a master item field, a playback_length_included field, a palybace_Delay_included field, an expiration_included field, a content_size_included field, an available_in_broadcast field, a target_included field, a playback_length_in_seconds field, a playback_delay field, an expiration field, a content_size field, a target field, a content_name_text field, and a content_descriptor field.

The time_span_start field represents the start time of a time span that the NRT information block signals. According to a specific embodiment of the present invention, the time_span_start field may be a 32-bit field.

The time_span_length field represents the length of a time span that the NRT information block signals. According to a specific embodiment of the present invention, the time_span_length field may be a 16-bit field.

The NRT_content_items_in_section field represents the number of content items that the NRT information block signals. According to a specific embodiment of the present invention, the NRT_content_items_in_section field may be an 8-bit field.

The content_id field represents information for identifying a corresponding content item. According to a specific embodiment of the present invention, the content id field may be a 32-bit field.

The updates_available field represents whether a corresponding content item is updated. According to a specific embodiment of the present invention, the updates_available field may be a 1-bit field.

The content_security_conditions_indicator field represents whether a content protection is applied to at least one of files that a corresponding content item includes. According to a specific embodiment of the present invention, the content_security_conditions_indicator field may be a 1-bit field.

The master item field represents whether a corresponding content item is a master content item. In more detail, the master item field represents whether a corresponding content item is a content item that needs to be executed when a corresponding NRT service is selected. According to a specific embodiment of the present invention, the master item field may be a 1-bit field.

The playback_length_included field represents whether the NRT information block includes the length of a playback time of a corresponding content item. According to a specific embodiment of the present invention, the playback_length_included field may be a 1-bit field.

The palyback_Delay_included field represents whether the NRT information block includes delay playback time information of a corresponding content item. According to a specific embodiment of the present invention, the palyback_Delay_included field may be a 1-bit field.

The expiration_included field represents whether the NRT information block includes the expiration time of a corresponding content item. According to a specific embodiment of the present invention, the expiration_included field may be a 1-bit field.

The content_size_included field represents whether the NRT information block includes the size of a corresponding content item. According to a specific embodiment of the present invention, the content_size_included field may be a 1-bit field.

The available_in_broadcast field represents whether a corresponding content item is obtained through a broadcast network. According to a specific embodiment of the present invention, the available_in_broadcast field may be a 1-bit field.

The available_in_internet field represents whether a corresponding content item is obtained through an internet network. According to a specific embodiment of the present invention, the available_in_internet field may be a 1-bit field.

The target_included field represents whether the NRT information block includes information on a target device. According to a specific embodiment of the present invention, the target_included may be a 1-bit field.

The playback_length_in_seconds field represents the length of a playback time of a corresponding content item. According to a specific embodiment of the present invention, the playback_length_in_seconds field may represent a length in seconds. Additionally, according to a specific embodiment of the present invention, the playback_length_in_seconds field may be a 24-bit field.

The playback_delay field represents the playback delay time of a corresponding content item. According to a specific embodiment of the present invention, the playback_delay field may be a 24-bit field.

The expiration field represents the expiration time of a corresponding content item. According to a specific embodiment of the present invention, the expiration field may be a 32-bit field.

The content_size field represents the size of a corresponding content item. According to a specific embodiment of the present invention, the content_size field may be a 40-bit field.

The target field represents target device information of a corresponding content item. According to a specific embodiment of the present invention, when a value of the target field is 0x01, it represents that a target device is only a primary device. According to a specific embodiment of the present invention, when a value of the target field is 0x02, it represents that a target device is one or more companion devices. Additionally, according to a specific embodiment of the present invention, when a value of the target field is 0x03, it represents that a target device is both a primary device and one or more companion devices.

The content_name_length field represents the length of the content_name_text field. According to a specific embodiment of the present invention, the content_name_length field may be an 8-bit field.

The content_name_text field represents the name of a corresponding content item.

The content_descriptor field represents one or more NRT service descriptors including specific information on a content item. This will be described in more detail with reference to FIG. 49. FIG. 49 is a view of an NRT service descriptor according to an embodiment of the present invention.

The NRT service descriptor may include at least one of information representing a consumption model of NRT service, information on whether to update NRT service automatically, information on whether information representing a minimum storage space necessary for NRT service is included, information on whether information representing the default size of a content item is included, information on a target device, information representing a minimum storage space for NRT service, and information on the default size of a content item.

According to a specific embodiment of the present invention, the NRT service descriptor may include at least one of a consumption_model field, auto-update field, a stoargage_reservation_present field, a decault_content_size_present field, a target_include field, a storage_reservation field, and a default_content_size field.

The counsumption_model field represents a consumption model of NRT service. According to an embodiment of the present invention, when a value of the counsumption_model field is 0x00, it represents that a consumption model of NRT service is Push. According to an embodiment of the present invention, when a value of the counsumption_model field is 0x01, it represents that a consumption model of NRT service is Portal. According to an embodiment of the present invention, when a value of the counsumption_model field is 0x02, it represents that a consumption model of NRT service is Scripted Push. According to an embodiment of the present invention, when a value of the counsumption_model field is 0x03, it represents that a consumption model of NRT service is Scripted Portal. According to an embodiment of the present invention, when a value of the counsumption_model field is 0x04, it represents that a consumption model of NRT service is Triggered. According to an embodiment of the present invention, when a value of the counsumption_model field is 0x05, it represents that a consumption model of NRT service is Segment Delivery. According to a specific embodiment of the present invention, the counsumption_model field may be a 6-bit field.

The auto-update field represents that auto-update service is provided. According to a specific embodiment of the present invention, the auto-update field may be a 1-bit field.

The stoargage_reservation_present field represents whether information on the size of a minimum storage space necessary for executing NRT service is included. According to a specific embodiment of the present invention, the stoargage_reservation_present field may be a 1-bit field.

The decault_content_size_present field represents whether information representing the default size of a content item is included. According to a specific embodiment of the present invention, the decault_content_size_present field may be a 1-bit field.

The target_include field represents whether information on a target device is included. According to a specific embodiment of the present invention, the target_include may be a 1-bit field.

The storage_reservation field represents the size of a minimum storage space necessary for executing NRT service. According to a specific embodiment of the present invention, the storage_reservation field may be a 24-bit field.

The default_content_size field represents the default size of a content item. According to a specific embodiment of the present invention, the default_content_size field may be a 40-bit field.

The above described NRT information block and NRT service descriptor are described in a bit stream format. However, the NRT information block and the NRT service descriptor are not limited to a bit stream format and thus may be in another format. For example, the NRT information block and the NRT service descriptor may be in an XML file format.

Additionally, in order to signal the graphic icon of a broadcast service, a program or a show segment including the primary content of a program among a plurality of time spans, a broadcast service signaling table, program information, or segment information may include the graphic icon information. Especially, the broadcast service signaling table may include graphic icon service as service level information. Additionally, the program information may include graphic icon information as program level information. Additionally, the segment information may include graphic icon information as segment level information.

FIG. 50 is a view illustrating graphic icon information according to an embodiment of the present invention.

The graphic icon information may include at least one of an icon identifier, an icon transmission mode representing an icon transmission method, information representing whether the position of an icon is specified, coordinate system information representing coordinates that are the base of an icon position, horizontal coordinates information representing the horizontal coordinates of an icon, vertical coordinates information representing the vertical coordinates of an icon, information representing the image form of an icon, URL information representing the position where an icon image is stored, and icon data itself.

In more detail, as shown in the embodiment of FIG. 50, the graphic icon information may include at least one of a descriptor_tag field, a descriptor_length field, a descriptor_number field, a last_decirptor_number field, an icon_id field, an icon_transport_mode field, a position_flag field, a coordinate_system field, an icon_horizontal_origin field, an icon_vertical_origin field, an icon_type_length field, an icon_type_chars field, an icon_data_length field, an icon_data_byte field, a url_length field, a url field, and an icon_content_linkage field.

The descriptor_tag field represents that icon information is included. According to a specific embodiment of the present invention, the descriptor_tag field may be an 8-bit field.

The descriptor_length field represents the length of icon information after this field. According to a specific embodiment of the present invention, the descriptor_length field may be an 8-bit field.

The descriptor_number field represents the order of the current descriptor when icon information is divided into a plurality of descriptors and transmitted. According to a specific embodiment of the present invention, in the case of a descriptor transmitted first, a value of the descriptor_number field may be 0x00. According to a specific embodiment of the present invention, a value of the descriptor_number field may be increased by one. According to a specific embodiment of the present invention, the descriptor_number field may be a 4-bit field.

The last_decirptor_number field represents the number of the last descriptor. According to a specific embodiment of the present invention, the last_decirptor_number field may be a 4-bit field.

The icon_id field represents an icon identifier for identifying an icon. According to a specific embodiment of the present invention, the icon_id field may be an 8-bit field.

The icon_transport_mode field represents an icon transmission method. In more detail, a value of the icon_transport_mode field may represent one among when an icon image is transmitted through graphic icon information itself, when an icon image is linked through URL, and an icon image is transmitted through a FLUTE session. According to a specific embodiment of the present invention, as shown in the embodiment of FIG. 51, when a value of the icon_transport_mode field is 0x00, it represents that an icon image is transmitted through graphic icon information itself. When a value of the icon_transport_mode field is 0x01, it represents that an icon image is linked through URL. When a value of the icon_transport_mode field is 0x02, it represents that an icon image is transmitted through a FLUTE session. According to a specific embodiment of the present invention, the icon_transport_mode field may be a 2-bit field.

The position_flag field represents whether the position of an icon is specified. According to a specific embodiment of the present invention, the position_flag field may be a 1-bit field.

The coordinate_system field represents coordinates that is the base of an icon position. In more detail, when a value of the coordinate_system field may represent at least one of when a coordinate_system is configured with 720x576 coordinates, when a coordinate_system is configured with 1280x720 coordinates, when a coordinate_system is configured with 1920x1080 coordinates, when a coordinate_system is configured with 3840x2160 coordinates, and when a coordinate system is configured with 7680x4320 coordinates. According to a specific embodiment of the present invention, as shown in the embodiment of FIG. 52, when a value of the coordinate_system field is 0x00, it represents that a coordinate system is configured with 720x576 coordinates. When a value of the coordinate_system field is 0x01, it represents that a coordinate system is configured with 1280x720 coordinates. When a value of the coordinate_system field is 0x02, it represents that a coordinate system is configured with 1920x1080 coordinates. When a value of the coordinate_system field is 0x03, it represents that a coordinate system is configured with 3840x2160 coordinates. When a value of the coordinate_system field is 0x04, it represents that a coordinate system is configured with 7680x4320 coordinates. According to a specific embodiment of the present invention, the coordinate_system field may be a 3-bit field.

The icon_horizontal_origin field represents the horizontal coordinates of an icon. In more detail, a value of coordinates may be increased in a direction from a left column to a right column. According to a specific embodiment of the present invention, the icon_horizontal_origin may be a 13-bit field.

The icon_vertical origin field represents the vertical coordinates of an icon. In more detail, a value of coordinates may be increased in a direction from an upper row to a lower row. According to a specific embodiment of the present invention, the icon_vertical_origin may be a 13-bit field.

The icon_type_length field represents the length of the icon_type field. According to a specific embodiment of the present invention, the icon_type_length field may be an 8-bit field.

The icon_type_chars field represents the image form of an icon. In more detail, a value of the icon_type_chars field may be in a Multipurpose Internet Mail Extensions (MIME) image form defined in RFC 2045.

The icon_data_length field represents the length of the icon_data_byte field when an icon image is transmitted through graphic icon information. According to a specific embodiment of the present invention, the icon_data_length field may be an 8-bit field.

The icon_data_byte field represents data of an icon image that graphic icon information transmits.

The url_length field represents the length of the url field when an icon image is linked through URL. The url_length field may be an 8-bit field.

The url field represents a URL that an icon links.

The icon_content_linkage field represents a FLUTE FDT contents linkage transmitting an icon image when the icon image is transmitted through a FLUTE session.

Graphic icon information is described through the embodiment in which the graphic icon information is in a bit stream format, but the graphic icon information may be in another format such as an XML file format.

Additionally, as described above, broadcast services may include one or more media components. The service signaling table may include media component list information signaling media components that a broadcast service includes. Especially, the broadcast service signaling table may include media component list information as service level information.

This will be described in more detail with reference to FIG. 53.

FIG. 53 is a view illustrating media component list information according to an embodiment of the present invention.

The media component list information may include at least one of a component identifier for identifying a component, component type information representing the type of a media component, and media type information representing the type of media that a media component includes.

According to a specific embodiment of the present invention, as shown in FIG. 53, the media component list information may include a descriptor_tag field, a descriptor_length field, a num_component field, a component_id field, a component_type field, and a general_media_type field.

The descriptor_tag field represents that component list information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The num_component field represents the number of media components that a corresponding broadcast service includes. According to a specific embodiment of the present invention, the num_component field may be an 8-bit field.

The component_id field represents an identifier for identifying a corresponding media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The general_media_type field represents the type of a media that a media component includes. A value of the general_media_type field may represent one among video, audio, text, application, and message. In more detail, when a value of the general_media_type field is 0x00, it represents that a media that a media component includes video. When a value of the general_media_type field is 0x01, it represents that a media that a media component includes audio. When a value of the general_media_type field is 0x02, it represents that a media that a media component includes text. When a value of the general_media_type field is 0x03, it represents that a media that a media component includes application. When a value of the general_media_type field is 0x04, it represents that a media that a media component includes message. According to a specific embodiment of the present invention, the general_media_type field may be a 4-bit field.

Additionally, component list information is described through a bit stream format, but may be in another format such as an XML file format.

According to a specific embodiment of the present invention, one media component may be shared by a plurality of broadcast services of the same broadcast stream. Additionally, a plurality of broadcast services in a different broadcast stream may share one media component. Accordingly, a method of a plurality of broadcast services to efficiently share one media component is required. For this, a broadcast transmission device may allow each media component or broadcast service to be associated with a unique resource identifier (URI).

This will be described in more detail with reference to FIG. 54.

FIG. 54 is a view when a media component or a broadcast service is mapped through URI in a broadcast service signaling table according to an embodiment of the present invention.

A broadcast service or a media component may be signaled through URI in the broadcast service signaling. At this point, information signaling broadcast service or media component through URI may be referred to as URI linkage information. The URI linkage information may include at least one of URI or private data independently defined by each broadcaster or region.

According to a specific embodiment of the present invention, as shown in FIG. 54, the URI linkage information may include a descriptor_tag field, a descriptor_length field, an uri_length field, an uri_char field, and a private_data_byte field.

The descriptor_tag field represents that URI linkage information is included. According to a specific embodiment of the present invention, the URI linkage information may be an 8-bit field.

The descriptor_length field represents the length of the URI linkage information after the descriptor_length field. According to a specific embodiment of the present invention, the descriptor_length field may be an 8-bit field.

The uri_length field represents the length of the uri_char field. According to a specific embodiment of the present invention, the uri_length field may be an 8-bit field.

The uri_char field represents each character in URI character string. According to a specific embodiment of the present invention, the uri_char field may be an 8-bit field.

The private_data_byte field represents private data independently defined by each broadcaster or region. According to a specific embodiment of the present invention, the private_data_byte field may be an 8-bit field.

The broadcast reception device 100 may identify a media component or a broadcast service through URI of URI linkage information. When the URI of the URI linkage information identifies a media component, a broadcast service signaling table may include URI linkage information as component level information. When the URI of the URI linkage information identifies a broadcast service, a broadcast service signaling table may include URI linkage information as service level information.

The format of URI link information is described through bit stream in the embodiment of FIG. 54 but is not limited thereto. Especially, URI link information may be in an XML file format.

A broadcast transmission device may transmit a broadcast service or a media component, which targets on users having a specific condition. Additionally, the broadcast reception device 100 may transmit information on a user of the broadcast reception device 100 and may receive a broadcast service or a media component proper for a user of the broadcast reception device 100. For example, the broadcast reception device 100 may transmit information of a region where the broadcast reception device 100 is placed and may receive a broadcast service for a corresponding region. For this, required is a method of signaling information on a targeting criterion and a personalization property that a broadcast service or a media component targets. This will be described with reference to FIG. 55.

FIG. 55 is a view illustrating targeting criterion information signaling the targeting criterion of a broadcast service or a media component.

The broadcast service signaling table may include targeting criterion information signaling the target criterion of a broadcast service or a media component.

The targeting criterion information may include at least one of targeting identifier information for identifying a target criterion, targeting form information representing the form of targeting, and targeting criterion value information representing a specific targeting criterion.

According to a specific embodiment of the present invention, as shown in the embodiment of FIG. 55, the targeting criterion information may include at least one of a descriptor_tag field, a descriptor_length field, a num_targeting_criteria field, a criterion_id_length field, a criterion_id field, a criterion_type_code field, a num_criterion_values field, a criterion value length field, and criterion_value field.

The descriptor_tag field represents targeting criterion information. According to a specific embodiment of the present invention, the descriptor_tag field may be an 8-bit field.

The descriptor_length field represents the length of targeting criterion information after the descriptor_tag field. The descriptor_length field may be an 8-bit field.

The num_targeting_criteria field represents the number of targeting criterion information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion_id field. According to a specific embodiment of the present invention, the criterion_id_length field may be an 8-bit field.

The criterion_id field represents a targeting criterion identifier for identifying a targeting criterion. According to a specific embodiment of the present invention, the criterion id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a broadcast service or a media component may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion_value.

According to a specific embodiment of the present invention, when targeting criterion information signals targeting criterion of a media component, the broadcast service signaling table may include targeting criterion information as component level information. According to a specific embodiment of the present invention, when targeting criterion information signals the targeting criterion of a broadcast service, the broadcast service signaling table may include targeting criterion information as service level information.

Targeting criterion information is described through a bit stream format in the embodiment of FIG. 55 but is not limited thereto. Especially, the targeting criterion information may be in an XML file format.

The broadcast service signaling table may include text information for describing a broadcast service or a media component. This will be described in more detail with reference to FIG. 56.

FIG. 56 is a view illustrating text information for describing a broadcast service or a media component.

In more detail, the text information may include at least one of information representing the kind of text language, an identifier for identifying text information, and text information for describing a text including a broadcast service or a media component.

According to a specific embodiment of the present invention, as shown in the embodiment of FIG. 56, the text information may include a descriptor_number field, a last_descriptor_number field, a description_id field, a language_code field, a text_length field and a text_char field.

The descriptor_number field represents the order of a descriptor. When one descriptor does not include all text information, text information is divided and included in a plurality of descriptors. At this point, the descriptor_number field represents a number of a corresponding descriptor among a plurality of descriptors. According to a specific embodiment of the present invention, the descriptor_number field may be a 4-bit field.

The last_descriptor_number field represents a number of the last descriptor including text information. According to a specific embodiment of the present invention, the last_descriptor_number field may be a 4-bit field.

The description_id field represents an identifier for identifying text information. In more detail, the broadcast reception device 100 may identify text information for a specific broadcast service or media component from text information for another media component or broadcast service, on the basis of a value of the description_id field. According to a specific embodiment of the present invention, the description_id field may be an 8-bit field.

The language_code field represents a language used in text information. According to a specific embodiment of the present invention, the language_code field may be a 24-bit field.

The text_length field represents the length of the text_char field. According to a specific embodiment of the present invention, the text_length field may be an 8-bit field.

The text_char field represents a character of text information. According to a specific embodiment of the present invention, the text_char field may be an 8-bit field.

According to a specific embodiment of the present invention, when text information signals a text for describing a media component, the broadcast service signaling table may include text information as component level information. According to a specific embodiment of the present invention, when text information signals text information for describing a broadcast service, the broadcast service signaling table may include text information as service level information.

The text information format is described through a bit stream format in the embodiment of FIG. 56 but is not limited thereto. Especially, the text information may be in an XML file format.

Additionally, in order to signal the title of a broadcast service, a program or a show segment including the primary content of a program among a plurality of time spans, a broadcast service signaling table, program information, or segment information may include title information. Especially, the broadcast service signaling table may include title information as service level information. Additionally, the program information may include title information as program level information. Additionally, the segment information may include title information as segment level information. Especially, the title information may include titles in a plurality of languages to support multiple languages.

FIG. 57 is a view illustrating title information of a broadcast service, a program, or a show segment.

The title information may include at least one of information representing the number of languages, information representing the language of a title, information representing the length of a title, and characters in a title.

According to a specific embodiment of the present invention, as shown in the embodiment of FIG. 57, the title information may include at least one of a num_title field, a language_code field, a title_length field, and a text_char field.

The num_title field represents the number of titles. In more detail, the title information may include the title of a broadcast service, a program, or a show segment, which are displayed according to a plurality of languages. Accordingly, the num_title field may represent the number of languages displaying a title. According to a specific embodiment of the present invention, the num_tilte field may be an 8-bit field.

The language_code field represents the type of language displaying a title. According to a specific embodiment of the present invention, the language_code field may be a 24-bit field.

The title_length field represents the number of characters in a title. According to a specific embodiment of the present invention, the title length field may be an 8-bit field.

The text_char field represents characters in a title. According to a specific embodiment of the present invention, the text_char field may be an 8-bit or 16-bit field.

Although title information in a bit stream format is described, it is not limited to the bit stream format and may be in another format. In a specific embodiment, the title information may be in an XML file format.

Additionally, in order to signal the genre of a broadcast service, a program or a show segment including the primary content of a program among a plurality of time spans, a broadcast service signaling table, program information, or segment information may include genre information. Especially, the broadcast service signaling table may include genre information as service level information. Additionally, the program information may include genre information as program level information. Additionally, the segment information may include genre information as segment level information. This will be described in more detail with reference to FIG. 58.

FIG. 58 is a view illustrating genre information of a broadcast service, a program, or a show segment.

In more detail, the genre information may include information representing the number of genres and information representing the genre of a broadcast service, a program, or a show segment.

In more detail, as shown in the embodiment of FIG. 58, the genre information may include at least one of a num_genre field and a genre_value field.

The num_genre field represents the number of genres. According to a specific embodiment of the present invention, the num_genre field may be an 8-bit field. One broadcast service, program, and show segment may correspond to a plurality of genres. Accordingly, the genre information may include a plurality of genre information on one broadcast service, program, and show segment. Accordingly, the genre information may include the num_genre field.

The genre_value field represents the genre of a broadcast service, a program, or a show segment. According to a specific embodiment of the present invention, the genre_value field may be an 8-bit field.

Although genre information in a bit stream format is described, it is not limited to the bit stream format and may be in another format. In a specific embodiment, the genre information may be in an XML file format.

Additionally, a broadcast service, a media component, or a content item may be for a specific device. In detail, a broadcast service, a media component, or a content item may be for a primary device. Additionally, a broadcast service, a media component, or a content item may be for a plurality of companion devices. Accordingly, in order to signal a target device relating to a broadcast service, a media component, or a content item, a broadcast service program table, a program table, or an NRT information table may include target device information. This will be described with reference to FIG. 59.

Figures 59, 60:
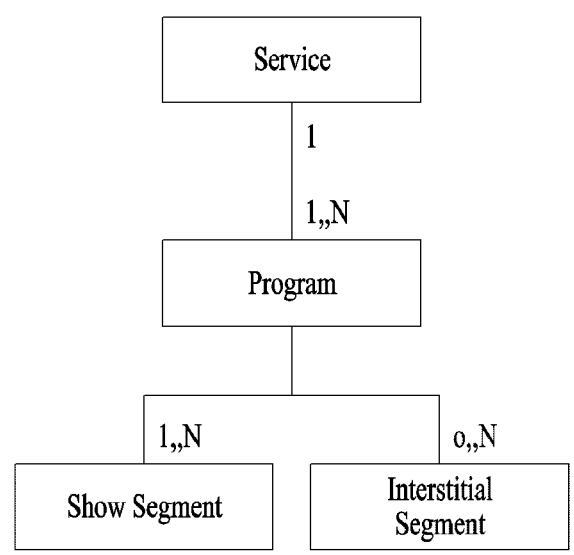
FIG. 59 is a view illustrating target device information signaling a target device relating to a media component or a content item.
FIG. 60 is a view when a broadcast service is divided into a plurality of segments.

FIG. 59 is a view illustrating target device information signaling a target device relating to a media component or a content item.

The target device information may include information representing a target device of a broadcast service, a media component, or a content item.

In a specific embodiment, the target device information may include a target_device field as shown in FIG. 59. The target_device field represents a target device of a broadcast service, a media component, or a content item. According to a specific embodiment of the present invention, the target device may be an 8-bit field.

Although target device information in a bit stream format is described, it is not limited to the bit stream format and may be in another format. In a specific embodiment, the target device information may be in an XML file format.

A broadcast service and a media component that a broadcast service includes are described above. A program and a segment will be described in more detail with reference to FIGS. 60 to 64.

FIG. 60 is a view when a broadcast service is divided into a plurality of segments.

A broadcast service may include a program which is a temporal segment having a scheduled start time and playback length. More specifically, a radio service includes a radio program or an audio program. In addition, a TV service may include a TV program. In addition, a user request content service may include a user request program. In addition, a stand-alone NRT data service may include a data program.

Such a program may be divided according to broadcast service time. In addition, a broadcast time of a radio service is equal to a sum of durations of radio programs. A broadcast time of a TV service is equal to a sum of durations of TV programs. The duration of a user request content service does not indicate a playback time of specific content but indicates a time when a user request content service is possible. Accordingly, the playback time of individual content depends on the user. While a content item is provided, a start time and a length are restricted according to program. Accordingly, a content item provided through the user request content service may be included in a catalog. At this time, the catalog may be an application for providing a user interface to provide a service.

A program may include a show representing a primary content of a related program. Many parts which are considered as a property of a program may be substantially referred to a property of a show. For example, texts, actors, or genre describing a program included in a program property relate to the properties of a show. Properties other than the properties of a show in a program property are the properties of a program itself. For example, the identifier of a service including a program or the start time of a program is the property of the program itself. Even when a program includes the same show, the property of a program itself may vary.

A show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show. This will be described with reference to FIG. 61.

FIG. 61 is a view illustrating show information according to an embodiment of the present invention.

The show information may include a show information block including identifier information for identifying a show and specific information on a show.

In more detail, as shown in the embodiment of FIG. 61, the show information may include a table_id field, a section_syntax_indicator field, a private_indicator field, a section_length field, a table_id_extentsion field, a version_number field, a current_next_indicator field, a section_number field, a last_section_number field, a show id field, and a show_infoamtion_block field.

The table_id field represents that show information is included. According to a specific embodiment of the present invention, the table_id field may be an 8-bit field.

The section_syntax_indicator field represents whether show information is a private section table in the long formant of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying show information in combination with the table_id field. In more detail, the table_id_extension field may include at least one of the protocol_version field and the subnet_id field. The protocol_version field represents a protocol version of program information. In more detail, the protocol_version field may be an 8-bit field in which the upper four bits represent a major version_number and the lower four bits represent a minor version number. When show information is transmitted through broadcast stream, the subnet_id field may represent a subnet identifier for identifying an IP subnet for transmitting program information. According to another specific embodiment of the present invention, a value of the subnet_id field may be 0. When program information is transmitted through internet network, the subnet_id field has the same value as the subnet_id field of program information transmitted through broadcast stream. According to a specific embodiment of the present invention, the subnet_id field may be an 8-bit field.

The version_number field represents a version of show information. The broadcast reception device 100 may determine the availability of show information on the basis of a value of the vserion_number field. In more detail, when a value of the version_number field is identical to a version of previously received service show information, the show information may not be used. According to a specific embodiment of the present invention, the version_number field may be a 5-bit field.

The current_next_indicator field represents whether show information is currently available. In more detail, when a value of the current_next_indicator field is 1, it may represent that show information is available. Moreover, when a value of the current_next_indicator field is 1, it may represent that show information is available next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a show information table is large, the show information table may be divided into a plurality of sections and then transmitted. At this point, the broadcast reception device 100 determines whether all sections necessary for show information are received on the basis of the section_number field and the last_section_number field. According to a specific embodiment of the present invention, the last_section_number field may be an 8-bit field.

The show_id field represents a show identifier for identifying a show that show information signals. According to a specific embodiment of the present invention, the show_id field may be a 16-bit field.

The show_information_block field represents a show information block including information on the property of a segment. This will be described in more detail with reference to FIG. 62.

FIG. 62 is a view illustrating a show information block according to an embodiment of the present invention.

The show information block may include at least one of descriptors including the length of a show, a text for describing a show, the number of segments relating to a show, a segment information block signaling a segment relating to a show, and specific information on the property of a show. At this point, a show related segment may be a segment including a show.

In more detail, as shown in the embodiment of FIG. 62, the show information block may include at least one of a time_span_length field, a title text_length field, a title text( ) field, a num_segment field, a segment_information_block( ) field, a num_show_descriptors field, and a descriptors field.

The time_span_length field represents the length of a show. The show may be included in a plurality of segments. At this point, the start times of a plurality segments may vary but the length of a show may be identical. The reason is that even when contents of a show segment are included in different programs, they are the same. According to a specific embodiment of the present invention, the time_span_length field may be a 16-bit field.

The title text_length field may include a title text( ) field, a num_segment field, a segment_information_block( ) field, a num_show_descriptors field, and a descriptors field.

FIG. 63 is a view illustrating a segment information block according to an embodiment of the present invention.

The segment information block may include at least one of descriptors including a segment identifier for identifying a segment, information representing the start time of a segment, information representing the length of a segment, and specific information on a segment. In a specific embodiment, a segment identifier may be based on a program identifier for identifying a program including a segment and a domain name. In a specific embodiment, a segment identifier may be a combination of a program identifier for identifying a program including a segment and a domain name. In more detail, the start time of a segment may be a relative time from the start of a program including a segment.

According to a specific embodiment of the present invention, as shown in the embodiment of FIG. 63, the segment information block may include at least one of a segment_id field, a start time field, a time_span_length field, a num_segment_descriptors field, and a descriptor field.

The segment_id field represents a segment identifier for identifying a segment. According to a specific embodiment of the present invention, the segment_id field may be a 16-bit field.

The start_time field represents the start time of a segment. Even when a segment includes the same show, the start time for each segment may vary. Accordingly, each segment information may include information representing the start time of a segment. According to a specific embodiment of the present invention, the start time field may be a 32-bit field.

The time_span_length field represents the length of a segment. According to a specific embodiment of the present invention, the time_span_length field may be a 16-bit field.

The num_segment_descriptors field represents the number of descriptors that a segment information block includes. According to a specific embodiment of the present invention, the num_segment_descriptors field may be an 8-bit field.

The descriptor field includes specific information on a segment.

Although show information, a show information block, and a segment information block in a bit stream format are described, they are not limited to the bit stream format and may be in another format. In more detail, show information, a show information block, and a segment information block may be in an XML file format.

Figure 64:
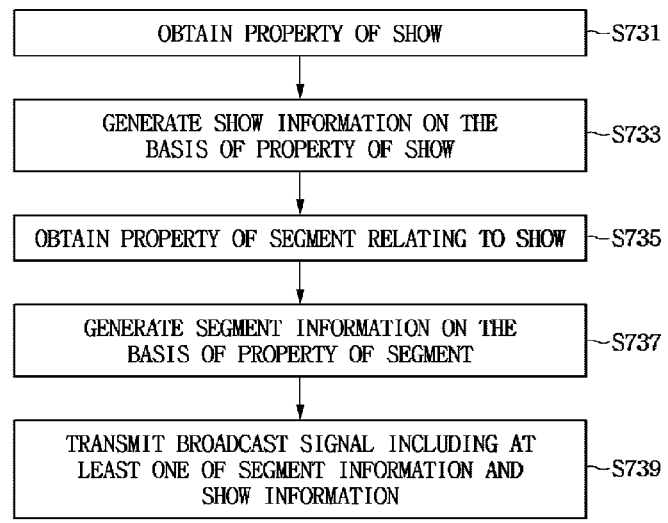
FIG. 64 is a view when a broadcast transmission device transmits broadcast signals including at least one of show information and segment information according to an embodiment of the present invention.

FIG. 64 is a view when a broadcast transmission device transmits broadcast signals including at least one of show information and segment information according to an embodiment of the present invention.

The broadcast transmission device obtains the property of a show that a broadcast service includes through a control unit in operation S731. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast transmission device generates program information signaling a program on the basis of the property of a show through a control unit in operation S733. The show information may include at least one of the show information and the show information block described through FIGS. 61 and 62.

The broadcast transmission device obtains the property of a segment relating to a show through a control unit in operation S735. The property of a segment may include at least one of a unique identifier for identifying a segment, a list of media components played during a time span of a corresponding segment, the start time and the duration of a segment, a segment type, and a targeting/personalization property, and a contents advisory rating.

The broadcast transmission device generates a segment information block on the basis of the property of a segment through a control unit in operation S737. The segment information block may be the above-mentioned segment information block in FIG. 63.

The broadcast transmission device transmits a broadcast signal including at least one of a segment information block and program information through a transmitting unit in operation S739.

Figure 65:
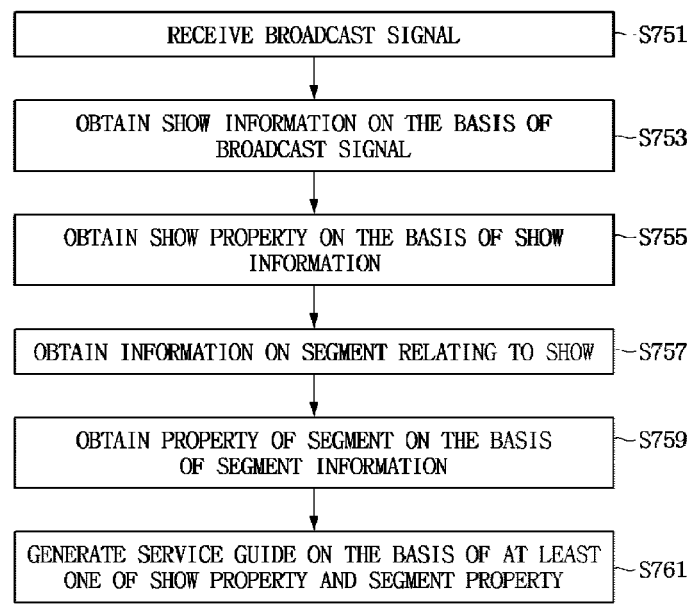
FIG. 65 is a view when a broadcast reception device receives broadcast signal including at least one of show information and segment information according to an embodiment of the present invention.

FIG. 65 is a view when a broadcast reception device receives broadcast signal including at least one of show information and segment information according to an embodiment of the present invention.

The broadcast reception device 100 receives a broadcast signal through the broadcast receiving unit 110 in operation S751.

The broadcast reception device 100 obtains program information on the basis of a broadcast signal through the control unit 150 in operation S753. In more detail, the broadcast reception device 100 may obtain show information from the broadcast signal. At this point, the show information may include at least one of the show information and the show information block described through FIGS. 61 and 62.

The broadcast reception device 100 obtains the property of a show on the basis of the show information through the control unit 150 in operation S755. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast reception device 100 obtains a segment information block relating to a show on the basis of a broadcast signal through the control unit 150 in operation S757. In more detail, the broadcast reception device 100 may obtain a segment information block relating to a show from the show information block. The segment information block may include the above-mentioned segment information block in FIG. 63.

The broadcast reception device 100 obtains the property of a segment on the basis of the segment information block through the control unit 150 in operation S759. The segment information block may be the above-mentioned segment information block in FIG. 63.

The broadcast reception device 100 generates a service guide displaying the property of a show on the basis of at least one of the property of a show and a segment property relating to a show in operation S761. According to a specific embodiment of the present invention, a service guide may display the property of a show and segments relating to a show together. For example, the service guide may display the properties of a plurality of segments including the same show. At this point, the property of a segment may include at least one of the start time of a segment and the property of a program including a segment. At this point, the property of a program may include at least one of the start time of a program and information of a service including a program.

A radio program, a TV program, and a data program may include at least one of a unique identifier, a list of media components in a program, the start time and length of a program, a show identifier for identifying a related show, a text for describing a title and a program, the genre of a program, a graphic icon, a contents advisory rating, a targeting/personalization property, a contents protection property, a list of related data services, and list of related segments. Properties included in an audio program, a TV program, and a data program may be signaled through program information. This will be described with reference to FIGS. 76 to 71.

Figure 76:
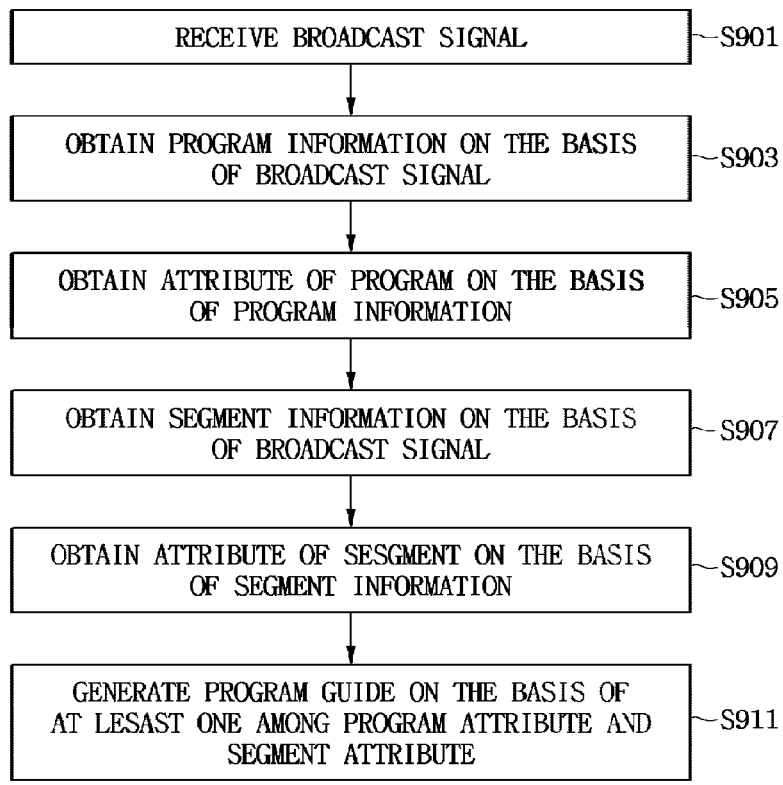
FIG. 76 is a view when a broadcast reception device receives broadcast signal including at least one of program information and segment information according to an embodiment of the present invention.

FIG. 76 is a view illustrating program information according to an embodiment of the present invention.

As shown in the embodiment of FIG. 76, the program information may include at least one of a table_id field, a section_syntax_indicator field, a private_indicator field, a section_length field, a table_id_extentsion field, a version_number field, a current_next_indicator field, a section_number field, a last_section_number field, a service_id field, and a program_information_block field.

The table_id field represents program information. According to a specific embodiment of the present invention, the table_id field may be an 8-bit field.

The section_syntax_indicator field represents whether program information is a private section table in the long formant of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying program information in combination with the table_id field. In more detail, the table_id_extension field may include at least one of the protocol_version field and the subnet_id field. The protocol_version field represents a protocol version of program information. In more detail, the protocol_version field may be an 8-bit field in which the upper four bits represent a major version number and the lower four bits represent a minor version number. When program information is transmitted through broadcast stream, the subnet_id field may represent a subnet identifier for identifying an IP subnet for transmitting program information. According to another specific embodiment of the present invention, a value of the subnet_id field may be 0. When program information is transmitted through internet network, the subnet_id field has the same value as the subnet_id field of program information transmitted through broadcast stream. According to a specific embodiment of the present invention, the subnet_id field may be an 8-bit field.

The version_number field represents a version of program information. The broadcast reception device 100 may determine the availability of program information on the basis of a value of the vserion_number field. In more detail, when a value of the version_number field is identical to a version of previously received service program information, the program information may not be used. According to a specific embodiment of the present invention, the version_number field may be a 5-bit field.

The current_next_indicator field represents whether program information is currently available. In more detail, when a value of the current_next_indicator field is 1, it may represent that program information is available. Moreover, when a value of the current_next_indicator field is 1, it may represent that the program information is available the next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_ number. When the size of a program information table is large, the program information may be divided into a plurality of sections and then transmitted. At this point, the broadcast reception device 100 determines whether all sections necessary for program information are received on the basis of the section_number field and the last_section_number field. According to a specific embodiment of the present invention, the last_section_number field may be an 8-bit field.

The service_id field represents a service identifier for identifying a broadcast service relating to program information. In more detail, the service_id field may represent a service identifier for identifying a broadcast service including a program that program information signals. According to a specific embodiment of the present invention, the service_id field may be an 8-bit field.

The program_information_block field represents a program information block including information on the property of a program. This will be described in more detail with reference to FIG. 67.

FIG. 67 is a view illustrating a program information block according to an embodiment of the present invention.

The program information block may include the number of programs that the program information block signals, a program identifier for identifying a signaling program, a start time of a program, the length of a program, a text for describing a program, and a descriptor for signaling a text for describing a program and a property of a program.

According to a specific embodiment of the present invention, as shown in the embodiment of FIG. 67, the program information block may include at least one of a num_program field, a program_id field, a time_span_start field, a time_span_length field, a title text_length field, a title text field, a num_program_descriptors field, and a descriptor field.

The num_program field represents the number of programs that a program information block signals. According to a specific embodiment of the present invention, the num_program field may be an 8-bit field.

The program id field represents a program identifier for identifying a corresponding program. According to a specific embodiment of the present invention, the program_id field may be an 8-bit field.

The time_span_start field represents a start time of a corresponding program. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding program. In more detail, a corresponding program may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The title text_length field represents the length of the title text field. According to a specific embodiment of the present invention, the title text field may be an 8-bit field.

The title text field represents each character that the title of a corresponding program includes. According to a specific embodiment of the present invention, each character may be in a UTF-8 encoding format. According to a specific embodiment of the present invention, the title text field may be an 8-bit field.

The num_program_descriptors field represents the number of descriptors that a program information block includes. According to a specific embodiment of the present invention, the num_program_descriptors field may be an 8-bit field.

The descriptor field represents a descriptor including information relating to a property of a program. For example, a descriptor that the descriptor field has may include information on a media component list. Additionally, a descriptor that the descriptor field has may include information on a contents advisory rating. Additionally, a descriptor that the descriptor field has may include information on a targeting property. Additionally, a descriptor that the descriptor field has may include information on a text for describing a program. Accordingly, the descriptor field may include at least one of the component_list_descriiptor field, the targeting_descriptor field, and the text_descriptor field. However, the program information block shown in FIG. 67 may not signal a show relating to a program. In more detail, the program information block in the embodiment of FIG. 67 may not signal a show in a program. A method for resolving the above issue will be described with reference to FIG. 68.

FIG. 68 is a view illustrating a program information block according to another embodiment of the present invention.

A program information block according to another embodiment of the present invention may further include at least one of information on whether information on a show relating to a program that the program information block signals is included and a show identifier for identifying a show relating to a program that the program information block signals.

According to a specific embodiment, the program information block may include at least one of an associated_show_flag field and a show id field as shown in FIG. 68.

The associated_show_flag field represents whether information on a show relating to a program that a program information block signals is included. According to an embodiment of the present invention, if there is a related show, the broadcast reception device 100 may receive show information. Accordingly, when associated_show_flag is 1, the broadcast reception device 100 may receive show information. At this point, the show information may be the show information or the show information block described with reference to FIGS. 70 and 72. According to a specific embodiment of the present invention, the associated_show_flag field may be a 1-bit field.

The show_id field represents a show identifier for identifying a show relating to a show that a program information block signals. According to a specific embodiment of the present invention, the show_id field may be a 16-bit field.

However, the program information block shown in FIG. 68 may not signal the property of a media component through component level information. Accordingly, a plurality of media components having various properties may not be signaled efficiently. A method for resolving the above issue will be described with reference to FIG. 98.

FIG. 69 is a view illustrating a program information block according to another embodiment of the present invention.

The program information block may include the number of media components that a corresponding program includes, a component identifier for identifying a corresponding media component, information for representing whether a corresponding media component is a media component necessary for corresponding program playback, and a component descriptor including an additional property of a media component.

According to a specific embodiment of the present invention, as shown in the embodiment of FIG. 69, the program information block may include at least one of a num_component field, a component_id field, an essential_conponent_indicator field, a num_component_descritpors field, and a component_descriptor field.

The num_component field represents the number of media components that a corresponding program includes. According to a specific embodiment of the present invention, the num_component field may be an 8-bit field.

The component_id field represents a component identifier for identifying a corresponding media component. According to a specific embodiment of the present invention, the component_id field may be an 8-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_descritpors field represents the number of component descriptor fields. According to a specific embodiment of the present invention, the num_component_descritpors field may be an 8-bit field.

The component_descriptor field represents a component descriptor including an additional property on a corresponding component.

However, in this case, information on a segment that a program includes may not be obtained. A method of resolving this will be described with reference to FIGS. 70 and 71.

FIGS. 70 and 71 are views illustrating a program information block according to another embodiment of the present invention.

The program information block may include information of a segment that a program signaled by the program information block includes. In more detail, the program information block may include a segment information block including the number of segments that a program signaled by the program information block includes and a specific property of a segment.

The program information block may include at least one of a num_segment field and a segment_information_block field as shown in FIGS. 70 and 71.

The num_segment field represents the number of segments that a program signaled by a program information block includes. According to a specific embodiment of the present invention, the num_segments field may be an 8-bit field.

The segment_infoamtion block field may include the segment information block described through the embodiment of FIG. 92 or a segment information block to be described with reference to FIGS. 72 and 73.

In the embodiment of FIG. 70, the broadcast reception device 100 may not obtain information of a show relating to a program that a program information block signals. In the embodiment of FIG. 72, like the embodiment of FIG. 39, information of a show relating to a program that a program information block signals is included so that the broadcast reception device 100 may obtain information of a show relating to a program.

The program information and the program information block in a bit stream format are described through FIGS. 65 to 71 but the present invention is not limited to the bit stream format. Especially, the program information and the program information block may be in an XML file format.

As described above, a broadcast service may include a plurality of programs. At this point, a program may include a plurality of segments. A segment is a time interval configuring a program. A segment may include a show segment broadcasting the primary content of a show and an interstitial segment broadcasting a content not relating to the primary content of the program between the primary contents of the program. At this point, the interstitial segment may include ads or public service announcement. The show segment and the interstitial segment of a radio service or a TV service may have a scheduled start time and duration.

The segment may include at least one as one property among a unique identifier for identifying a segment, a list of media components played during a time interval of a corresponding segment, a start time and the duration of a segment, a segment type, and a targeting/personalization property, and a contents advisory rating. As described above, the segment type may be one among a show segment and an interstitial segment. At this point, the start time of a segment may represent a relative time on the basis of the start time of a show. For example, the start time of a segment may be specified on the basis of the start time of a show, for example, 10 minutes before a show start time. An anchored segment represents a segment relating to a specific program and having a specified start time. On the other hand, an unanchored segment represents a segment not relating to a specific program and not having a specified start time. For example, since the broadcast reception device 100 receives a targeted advertisement but a corresponding advertisement segment is used in various programs and services several times, when a start time for a corresponding is not clearly specified, the targeted advertisement may be referred to as an unanchored segment. It is necessary to efficiently signal such a segment. Signaling a segment will be described with reference to FIGS. 72 to 76.

FIG. 72 is a view illustrating segment information program information according to an embodiment of the present invention.

The segment information may include a segment block including a specific segment property.

According to a specific embodiment of the present invention, as shown in the embodiment of FIG. 72, the segment information may include at least one of a table_id field, a section_syntax_indicator field, a private_indicator field, a section_length field, a table_id_extentsion field, a version_number field, a current_next_indicator field, a section_number field, a last_section_number field, and a segment_information_block field.

The table_id field represents segment information is included. According to a specific embodiment of the present invention, the table_id field may be an 8-bit field.

The section_syntax_indicator field represents whether broadcast service segment information is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying segment information in combination with the table_id field. In more detail, the table_id_extension field may include at least one of the protocol_version field and the subnet_id field. The protocol_version field represents a protocol version of segment information. In more detail, the protocol_version field may be an 8-bit field in which the upper four bits represent a major version_number and the lower four bits represent a minor version_number. When segment information is transmitted through broadcast stream, the subnet_id field may represent a subnet identifier for identifying an IP subnet for transmitting segment information. According to another specific embodiment of the present invention, a value of the subnet_id field may be 0. When segment information is transmitted through internet network, the subnet_id field has the same value as the subnet_id field of segment information transmitted through broadcast stream. According to a specific embodiment of the present invention, the subnet_id field may be an 8-bit field.

The version_number field represents a version of segment information. The broadcast reception device 100 may determine the availability of segment information on the basis of a value of the vserion_number field. In more detail, when a value of the version_number field is identical to a version of previously received service segment information, the segment information may not be used. According to a specific embodiment of the present invention, the version_number field may be a 5-bit field.

The current_next_indicator field represents whether segment information is currently available. In more detail, when a value of the current_next_indicator field is 1, it may represent that segment information is available. Moreover, when a value of the current_next_indicator field is 1, it may represent that segment information is available the next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_ number. When the size of a segment information table is large, the segment information may be divided into a plurality of sections and then transmitted. At this point, the broadcast reception device 100 determines whether all sections necessary for segment information are received on the basis of the section_number field and the last_section_number field. According to a specific embodiment of the present invention, the last_section_number field may be an 8-bit field.

The service_id field represents a service identifier for identifying a broadcast service relating to segment information. In more detail, the service_id field may represent a service identifier for identifying a broadcast service including a segment that segment information signals. According to a specific embodiment of the present invention, the service_id field may be an 8-bit field.

The program_information_block field represents a segment information block including information on the property of a segment. This will be described in more detail with reference to FIG. 73.

FIG. 73 is a view illustrating a segment information block according to an embodiment of the present invention.

The segment information block in segment information may include at least one of a segment identifier for identifying a signaling segment, a segment type, information representing whether there is a program relating to a segment, information representing whether a start time and the duration of a segment is specified, a program identifier for identifying a program relating to a segment, a start time of a segment, the number of media components in a segment, a media component identifier for identifying a corresponding media component, the number of descriptors including a property for a corresponding media component, a descriptor including a property for a corresponding media component, the number of descriptors including a property for a corresponding segment, and a descriptor including a corresponding segment.

Figure 102:
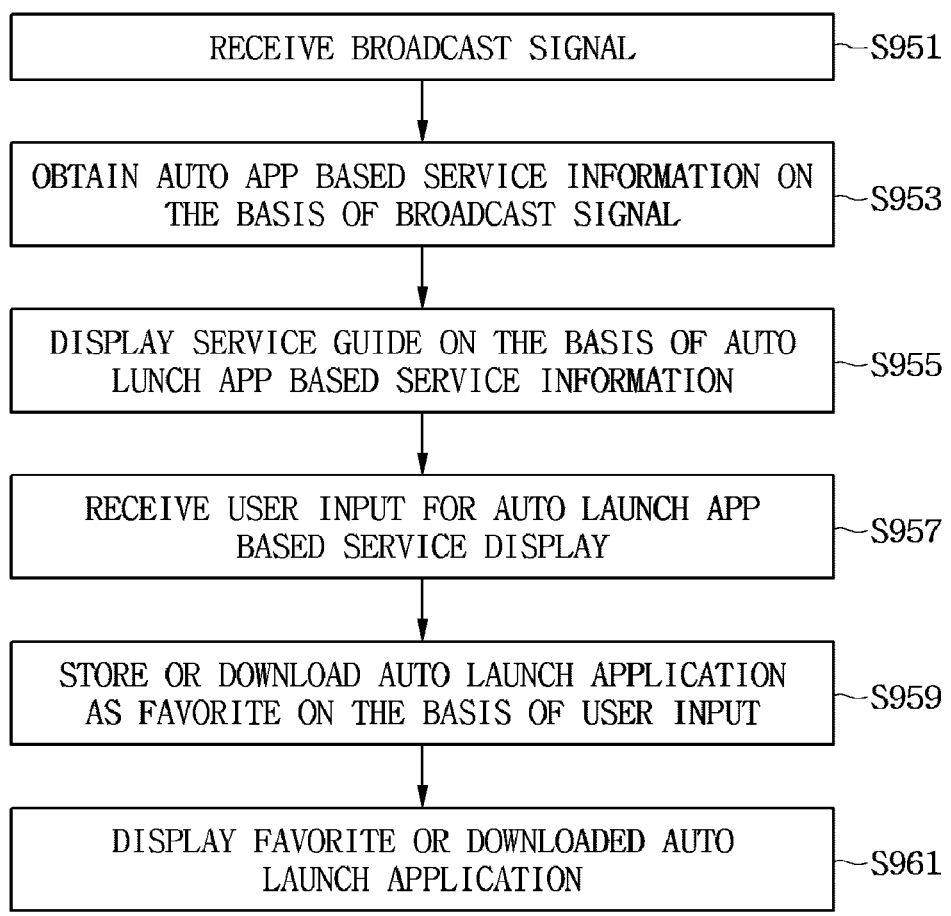
FIG. 102 is a flowchart illustrating operations when a broadcast reception device displays an auto-launch app based service through a broadcast service guide and stores it as a favorite or downloads it.

According to a specific embodiment of the present invention, as shown in the embodiment of FIG. 102, the segment information may include at least one of a segment_id field, a segment_type field, an associated_program_flag field, a time included field, a progmam_id field, a time_span_start field, a time_span_length field, a num_component field, a component_id field, a num_component_descirtors field, a component_descritpors field, a num_descritpor field, and a descriptor field.

The segment_id field represents a segment identifier for identifying a corresponding segment. According to a specific embodiment of the present invention, the segment_id field may be an 8-bit field.

The segment_type field represents the type of a corresponding segment. In more detail, it may represent a show segment or an interstitial segment. According to a specific embodiment of the present invention, when a value of the segment_type field is 0x02, it represents a show segment and when a value of the segment_type field is a value between 0x03 to 0x07, it represents an interstitial segment According to a specific embodiment of the present invention, the segment_type field may be a 3-bit field.

The associated_program_flag field represents whether there is a program relating to a corresponding segment. In more detail, when a value of the associated_program_flag field is 1, it represents that there is a program relating to a corresponding segment and when a value of the associated_program_flag field is 0, it represents that there is no program relating to a corresponding segment. According to a specific embodiment of the present invention, the associated_program_flag field may be a 1-bit field.

The time_included field represents whether a start time and duration of a corresponding segment is specified. In more detail, when a value of the time included field is 1, it represents that a start time and duration of a corresponding segment is specified and when a value of the time_included field is 0, it represents that a start time and duration of a corresponding segment is not specified. According to a specific embodiment of the present invention, the time_included field may be a 1-bit field.

The program_id field represents a program identifier for identifying a program relating to a corresponding program. According to a specific embodiment of the present invention, the program_id field may be a 16-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_component field represents the number of media components that a corresponding segment includes. According to a specific embodiment of the present invention, the num_component field may be an 8-bit field.

The component_id field represents a component identifier for identifying a corresponding media component. According to a specific embodiment of the present invention, the component_id field may be an 8-bit field.

The num_component_descritpors field represents the number of component_descriptor fields. According to a specific embodiment of the present invention, the num_component_descritpors field may be an 8-bit field.

The component_descriptor field represents a component descriptor including an additional property on a corresponding component.

The num_descritpor field represents the number of descriptor fields. According to a specific embodiment of the present invention, the num_desciptors field may be an 8-bit field.

The descriptor field represents a descriptor including an additional property. For example, the descriptor may include at least one of a contents advisory rating and a targeting property. Accordingly, the descriptor field may be the targeting_descirptor field.

When a program is divided into a plurality of segments, even when a viewer watches the same program, another segment may be provided according to the characteristics of each viewer. Especially, segments according the characteristics of each viewer may be provided to an interstitial segment instead of the show segment. Through this, broadcasters may provide the feature broadcast of the same content and also may provide a target advertisement to viewers according to the characteristics of each viewer. For this, it is necessary to provide a targeting segment set signaling the targeting information and property of each segment. This will be described with reference to FIG. 74.

FIG. 74 is a view illustrating a targeting segment set information according to an embodiment of the present invention.

The targeting segment set may signal targeting information on a plurality of segments. Especially, the targeting segment set information may signal targeting information on a plurality of segments having the same duration. According to a specific embodiment of the present invention, the targeting segment set information may signal targeting information on a plurality of segments relating to the same program. According to another specific embodiment of the present invention, targeting segment information may signal targeting information on a plurality of segments having the same start time.

The targeting segment set information may include at least one of a start time of a corresponding segment, the duration of a segment, the number of segments that a targeting segment set includes, a segment identifier for identifying a corresponding segment, the number of targeting criteria that targeting segment set information includes, targeting identification information for identifying a target criterion, targeting form information representing the form of targeting, and targeting criterion_value information representing a specific targeting criterion.

According to a specific embodiment of the present invention, as shown in the embodiment of FIG. 74, the targeting segment set information may include at least one of a descriptor_tag field, a descritpro_length field, a time_span_start field, a time_span_length field, a num_segment field, a segment_id field, a num_targeting_criteria field, a criterion_id_length field, a criterion_id field, a criterion_type_code field, a num_criterion_values field, a criterion_value_length field, and a criterion_value field.

The descriptor_tag field represents targeting segment set information. According to a specific embodiment of the present invention, the descriptor_tag field may be an 8-bit field.

The descriptor_length field represents the length of targeting segment information after the descriptor_tag field. The descriptor_length field may be an 8-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_segments field represents the number of segments that targeting segment set information signals. According to a specific embodiment of the present invention, the num_segments field may be an 8-bit field.

The num_targeting_criteria field represents the number of targeting segment set information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion_id field. According to a specific embodiment of the present invention, the criterion_id_length field may be an 8-bit field.

The criterion_id field represents a targeting criterion identifier for identifying a targeting criterion. According to a specific embodiment of the present invention, the criterion id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a segment may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion_value.

In consideration of a broadcast receiving situation or the capability of the broadcast reception device 100, if a specific segment cannot be received, the broadcast reception device 100 may receive or play another segment on the basis of targeting segment set information. For example, if the broadcast reception device 100 does not support the playback of a 3D image, it may receive or play a segment including a 2D image on the basis of a targeting segment set instead of a segment. According to another specific embodiment of the present invention, the broadcast reception device 100 may selectively receive or play only content suitable for a user on the basis of targeting segment set information. For example, if a viewer is youth, the broadcast reception device 100 may receive or play a trailer of a youth movie instead of a trailer of an adult movie.

The case in which segment information, a segment_information_block, segment targeting set information are in a bit stream format is described above with reference to FIGS. 72 to 74. However, the formats of segment information, a segment_information_block, and segment targeting set information are not limited to the bit stream format. Especially, segment information, a segment_information_block, and segment targeting set information may be in an XML file format. Additionally, according to a specific embodiment of the present invention, the above-described program information may include segment information, a segment_information_block, and segment targeting set information.

Operations of a broadcast transmission device and the broadcast reception device 100 transmitting/receiving the properties of a program and a segment will be described with reference to FIGS. 75 and 76.

Figure 75:
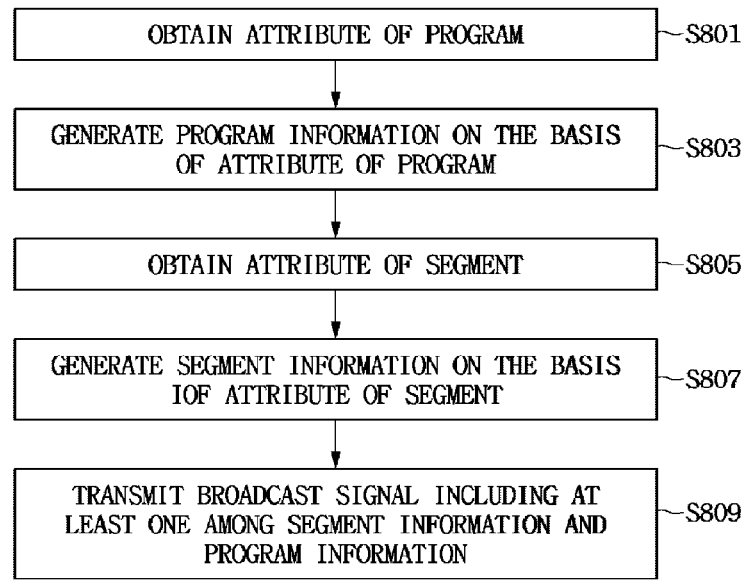
FIG. 75 is a view when a broadcast transmission device transmits broadcast signal including at least one of program information and segment information according to an embodiment of the present invention.

FIG. 75 is a view when a broadcast transmission device transmits broadcast signal including at least one of program information and segment information according to an embodiment of the present invention.

The broadcast transmission device obtains the property of a program that a broadcast service includes through a control unit in operation S101. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast transmission device generates program information signaling a program on the basis of the property of a program through a control unit in operation S803. The program information may include at least one of the program information and the program information block described through FIGS. 75 and 76.

The broadcast transmission device obtains the property of a segment that a program includes through a control unit in operation S805. As described above, the property of a segment may include at least one as one property among a unique identifier for identifying a segment, a list of media components played during a time interval of a corresponding segment, a start time and the duration of a segment, a segment type, and a targeting/personalization property, and a contents advisory rating.

The broadcast transmission device generates segment information on the basis of the property of a program through a control unit in operation S807. The segment information may include at least one of the above-mentioned segment information, segment information block, and segment targeting set information of FIGS. 72 to 76.

The broadcast transmission device transmits a broadcast signal including at least one of segment information and program information through a transmitting unit in operation S809.

FIG. 76 is a view when a broadcast reception device receives broadcast signal including at least one of program information and segment information according to an embodiment of the present invention.

The broadcast reception device 100 receives a broadcast signal through the broadcast receiving unit 110 in operation S901.

The broadcast reception device 100 obtains program information on the basis of a broadcast signal through the control unit 150 in operation S903. In more detail, the broadcast reception device 100 may obtain broadcast information from the broadcast signal. At this point, the program information may include at least one of the program information and the program information block described through FIGS. 78 and 79.

The broadcast reception device 100 obtains the property of a program on the basis of the program information through the control unit 150 in operation S905. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast reception device 100 obtains segment information on the basis of a broadcast signal through the control unit 150 in operation S907. In more detail, the broadcast reception device 100 may obtain segment information from the broadcast signal. The segment information may include at least one of the above-mentioned segment information, segment information block, and segment targeting set information of FIGS. 72 to 74.

The broadcast reception device 100 obtains the property of a segment on the basis of the segment information through the control unit 150 in operation S909. The segment information may include at least one of the above-mentioned segment information, segment information block, and segment targeting set information of FIGS. 72 to 74.

The broadcast reception device 100 generates a service guide for displaying the property of a program on the basis of at least one of the program property and the segment property in operation S911. According to an embodiment of the present invention, a service guide may also display the property of a segment that a program includes. In more detail, a service guide may display the property of a show segment in a program together. For example, a service guide may display the start time and length of a show segment in a program and another program information including the same show segment in addition to a program property.

As described above, a broadcast service according to an embodiment of the present invention divides the property of a media component and again divides a program representing a time span of the broadcast service into segments, so as to effectively signal the format of the broadcast service that become more complex and various. This will be described in more detail with reference to FIGS. 77 to 100.

A broadcast service according to an embodiment of the present invention may be described as an object model including a kind of class, an inheritance relationship between classes, a containment relationship between classes, and an another association between classes.

FIG. 77 is a view illustrating a continuous component class, an audio component class, a video component class, and a closed caption component class.

A continuous component class represents a continuous component. A continuous component class may include a component identifier componentID for identifying a component as a property.

An audio component class represents a continuous component whose content type is audio. The audio component class may have a "Sub-class relationship with Continuous Component class".

A video component class represents a continuous component whose content type is video. The video component class may have a Sub-class relationship with Continuous Component class.

A closed caption component class represents a continuous component whose content type is a closed caption. The closed caption component class may have a Sub-class relationship with Continuous Component class.

FIG. 78 is a view illustrating an elementary audio component class, an elementary video component class, and an elementary closed caption component class.

An elementary audio component class represents an elementary component whose content type is audio. The elementary audio component class may include at least one of codec, the number of audio channels, encoding bitrate, other encoding parameters, and the language and mode of an audio component, as attribute. In more detail, another encoding parameter may be determined according to codec. Additionally, the mode may represent the mode of a corresponding audio and also may represent at least one of "complete main", "music", "dialog", "effects", "visual impaired", and "hearing impaired", and "commentary". The audio component class may have a "Sub-class relationship with Audio Component class".

An elementary video component class represents an elementary component whose content type is video. The elementary video component class may include at least one of "codec", "resolution", "aspect ratio", "scanning method", "frame rate", "still picture mode", and "another encoding parameter", as attribute. The resolution may be represented by width×height pixel units. Additionally, the scanning method may be one of an interlaced method and a progressive method. Additionally, other encoding parameters may be determined according to codec. The elementary video component class may have a "Sub-class relationship with Video Component class".

An elementary closed caption class represents an elementary component whose content type is a closed caption. The elementary closed caption class may include at least one of "codec", "language", and "type". At this point, codec may represent the format of closed caption text. The language represents a language configuring a closed caption. The type may be a general closed caption and an easy-reader closed caption for low vision person. An elementary closed caption component class may have a "Sub-class relationship with Closed Caption Component class".

A complex component class represents a complex component. As described above, the complex component may be a composite component or a PickOne component.

Accordingly, a class for the composite component and the PickOne component will be described with reference to FIG. 79 and FIG. 80.

FIG. 79 is a view illustrating a composite audio component class and a composite video component class.

A composite audio component class represents a composite component whose content type is audio. The composite audio component class may include one of "ContainsAudio" and "Sub-class relationship with Audio Component class" as relationship. At this point "ContainsAudio" represents an audio component class included in a composite audio class. At this point, all objects included in "ContainsAudio" are limited as representing one sound scene.

A composite video component class represents a composite component whose content type is video. The composite video component class may include one of "ContainsVideo" and "Sub-class relationship with Video Component class" as relationship. At this point, the ContainsVideo represents a sub-class relationship with a video component class of a composite video component class. At this point, all objects in the ContainsVideo are limited as representing one video scene. Additionally, the property of the ContainsVideo may include "role". At this point, the role may represent an enhanced layer of variable video. Additionally, the role may represent the left view or right view of a 3D image. Additionally, the role may represent the depth information of a 3D image. Additionally, the role may represent part of a video array divided into a plurality of screens. At this point, the role may represent the xth in the yth line from the left if there is an n×m matrix. Additionally, the role may represent Follow-subject metadata.

FIG. 80 is a view illustrating a PickOne component class.

A PickOne component class represents a PickOne component. The PickOne component class may include one of "contains" and "Sub-class relationship with Continuous Component Class" as relationship. At this point, "contains" represents a relationship with a continuous component class of a PickOne component class. At this point, all components in "contains" are the same content type and is limited as representing all the same image scene or audio scene.

FIG. 81 is a view illustrating a presentable component class, a presentable video component class, a presentable audio component class, and a presentable closed caption component class.

A presentable component class represents a presentable component. A presentable component class may include as a property at least one of a targeting/personalization property, a content advisory rating, a content/service protection property, and a target device. At this point, the target device may be at least one of a primary screen, a companion screen, and a screen partially inserted into the primary screen.

A presentable video component class represents a presentable video component. The presentable video component class may include at least one of "AssociatedAudio", "Associated CC" and "Sub-class relationship with Video Component Class" as relationship. "AssociatedAudio" may represent a presentable audio component that is appropriate to be played with a presentable video component.

The presentable audio component class represents a presentable audio component. The presentable audio component class may have a Sub-class relationship with Audio Component class as relationship.

The presentable closed caption component class indicates a presentable closed caption component. The presentable closed caption component class may have a Sub-class relationship with closed caption component class as relationship.

FIG. 82 is a view illustrating an OnDemand component class.

An OnDemand component represents a content component transmitted by a user request. The OnDemand component may include as an attribute at least one of OnDemandComponentId representing the unique identifier of an OnDemand component, ComponentLocation representing a location where an OnDemand component can be accessed, ComponentName representing the name of a component, possibly in multiple languages, PlaybackLength representing the total playback time of a component, Availability Start representing a start time at which a component becomes available, AvailabilityDuration representing the length of a time that a component remains available, Targeting/personalization properties representing a device that a component targets or user's characteristics, Content/Service protection properties representing whether content or service is protected, and Content advisory rating representing a content advisory ration.

FIG. 83 is a view illustrating an NRT content item class and an NRT file class.

An NRT content item component class represents a content item of NRT data service. The NRT content item component class may include as a property at least one of the name of a content item for identifying a content item (ContentItemID), the name of a content item (ContentItemName), a display for representing whether the update of a content item is to be monitored, (Updateable), a download available window representing a download available time (Avaiblewindow), an expiration time representing a time at which a content item is discarded, a content item size (ContentItemSize), the playback length of a content item (PlaybackLength), a targeting/personalization property (TargetInfo), the protection property of a content item (ProtectionInfo), and the contents advisory rating of a content item (ContentAdvRating). Additionally, the NRT content item class may include an NRT file class as relationship.

The NRT file class represents a non-real time file. In more detail, the NRT file may represent a file used for NRT service. The NRT file class may include as an attribute at least one of ContentLocation representing the location of content and ContentType representing the type of content. At this point, ContentLocation and ContentType may be defined in IETF RFC 2616.

Classes for service will be described with reference to FIGS. 113 and 114.

A service class represents a service. The service class may include as a property at least one of a service identifier (ServiceId), a service name (ServiceName), a channel number (ChanNum), description of a service (Description), a graphic icon representing a service (Icon), a list of media components in a service, a property for broadcast service protection (Content/service protection properties for the service), a property for targeting/personalization (targeting properties for the service), a viewing advisory rating (contentAdvRating), service language (Language), and a property on broadcast service user report (UsageReportInfo). At this point, the channel number may be divided into a major number (MajorChanNum) and a minor number (MinorChanNum).

A radio service class represents a radio service scheduled to be broadcasted at a predetermined time. The radio service class may include at least one of "Containment Relationship with Presentable Video Component Class", "Containment Relationship with Presentable CC Component Class", and "Adjunct relationship with NRT Data Service Class" as relationship.

A TV service class represents a TV service scheduled to be broadcasted at a predetermined time. The TV service class may include at least one of "Containment Relationship with Presentable Video Component Class", "Containment Relationship with Presentable Audio Component Class", "Containment Relationship with Presentable CC Component Class", and "Adjunct relationship with NRT Data Service Class" as relationship. "Containment Relationship with Presentable Video Component Class" includes the role of a video component as a property. In more detail, the role of a video component may represent at least one of a primary video, an alternative camera view, another alternative video component, a sign language screen, and Follow Subject Video/metadata. Especially, the Follow Subject Video/metadata may include the name of a subject that follows. Such Follow Subject Video/metadata may be video stream. Or, a follow subject video may be rectangles of each frame for zoom-in of a subject of a video stream.

An OnDemand service class represents an OnDemand content service. The OnDemand service class may include "Containment relationship with OnDemand UI App Class", "Containment relationship with OnDemand Offering Class", and "containment relationship with OnDemand Catalog class" as relationship. "Containment relationship with OnDemand UI App Class" is to provide a user interface for OnDemand service. In a specific embodiment, the user interface of a user request service may be provided in a plurality of languages. An OnDemand offering may represent products of services provided by OnDemand. "Containment relationship with OnDemand Offering Class" is for a content item provided from an OnDemand service. "containment relationship with OnDemand Catalog class" is for an OnDemand offering catalog of an OnDemand service. In a specific embodiment, the OnDemand offering catalog may be provided in a plurality of languages.

An NRT data service class represents an NRT data service. The NRT data service class may include at least one of "Consumption Mode", "Essential capabilities", "Non-essential capabilities", "Target Device", and "containment relationship with data item component class" as a property. "Essential capabilities" represents a capability necessary to allow the broadcast reception device 100 to receive a service. "Non-essential capabilities" represents a capability necessary to allow the broadcast reception device 100 to receive a service's selection item. "Target Device" may represent at least one of a primary device or a companion device.

According to another specific embodiment, a service class may be classified into linear service and App-based service. This will be described with reference to FIGS. 113 to 116.

FIG. 84 is a view illustrating an OnDemand component class according to another embodiment of the present invention.

The OnDemand component class may include "Essential capabilities" and "Non-essential capabilities" as attributes. "Essential capabilities" represent a capability necessary for the broadcast reception device 100 to present an OnDemand component. "Non-essential capabilities" represent a capability necessary for the broadcast reception device 100 to present a selection item of an OnDemand component. The broadcast reception device 100 may determine whether to present an OnDemand component on the basis of "Essential capabilities". For example, when not supporting a device capability included in "Essential capabilities", the broadcast reception device 100 may not present an OnDemand component. Additionally, in a specific embodiment, when not supporting at least one of "Essential capabilities" and "Non-essential capabilities", the broadcast reception device 100 may display that it does not support at least one of "Essential capabilities" and "Non-essential capabilities".

FIG. 85 is a view illustrating an NRT content item class and an NRT file class according to another embodiment of the present invention.

The NRT content item class may include "Essential capabilities" and "Non-essential capabilities" as attributes. "Essential capabilities" represent a capability necessary for the broadcast reception device 100 to present an NRT content item. "Non-essential capabilities" represent a capability necessary for the broadcast reception device 100 to present a selection item of an NRT content item. The broadcast reception device 100 may determine whether to present an NRT content item on the basis of "Essential capabilities". For example, when not supporting a device capability included in "Essential capabilities", the broadcast reception device 100 may not present an NRT content item. Additionally, in a specific embodiment, when not supporting at least one of "Essential capabilities" and "Non-essential capabilities" of an NRT content item, the broadcast reception device 100 may display that it does not support at least one of "Essential capabilities" and "Non-essential capabilities" of an NRT content item.

The NRT file class may include "Essential capabilities" and "Non-essential capabilities" as attributes. "Essential capabilities" represent a capability necessary for the broadcast reception device 100 to present an NRT file. "Non-essential capabilities" represent a capability necessary for the broadcast reception device 100 to present a selection item of an NRT file. The broadcast reception device 100 may determine whether to present an NRT file on the basis of at least one of "Essential capabilities" and "Non-essential capabilities". For example, when not supporting a device capability included in "Essential capabilities", the broadcast reception device 100 may not present an NRT file. Additionally, in a specific embodiment, when not supporting at least one of "Essential capabilities" and "Non-essential capabilities" of an NRT file, the broadcast reception device 100 may display that it does not support at least one of "Essential capabilities" and "Non-essential capabilities" of an NRT file.

FIG. 86 is a view illustrating a linear service class.

Linear service represents a service in which primary content includes a continuous component. At this point, continuous components may be consumed according to a time base and schedule that a broadcaster defines. However, even when continuous components are consumed according to a time base and schedule that a broadcaster defines, a user may use various kinds of time shift methods on the continuous components. The TV service class may include as relationship at least one of Contains Relationship with Presentable Video Component Class, Contains Relationship with Presentable Audio Component Class, Contains Relationship with Presentable CC Component Class, Contains relationship with App-Based Enhancement class, and Sub-class relationship with Service class. Especially, the Contains Relationship with Presentable Video Component Class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component.

FIG. 87 is a view illustrating an App class and an App-based enhancement service.

The App class represents one type of a content item supporting interactivity. Sub-class relationship with NRT Content Item Class is included as relationship.

An App-based enhancement service class represents an App-based enhancement service. The App-based enhancement service may include as an attribute at least one of Essential capabilities representing a device capacity needed for performing enhancement service, Non-essential capabilities useful for performing enhancement service but no absolutely necessary, and a target device representing a device that enhancement service targets. The target device may represent at least one of a primary device and a companion device. At least one of Contains relationship with App Class, Contains relationship with NRT Content Item class, Contains relationship with Notification Stream class, and Contains relationship with OnDemand Component class may be included as relationship The Contains relationship with NRT Content Item class relates to an NRT content item used by App-based enhancement service. The Contains relationship with Notification Stream class relates to a notification stream delivering notifications to synchronize an action of application according to a linear time base. The Contains relationship with OnDemand Component class relates to an OnDemand component managed by application. A time base class that is the synchronization reference of components in service and a notification stream class will be described with reference to FIG. 88.

FIG. 88 is a view illustrating a time base class and a notification stream class.

The time base class is metadata used for generating a timeline to synchronize components of a linear service. At this point, the time line may represent a continuous reference time that is the synchronization reference. The time base class may include at least one of a time base identifier for identifying a time base and a clock rate representing the clock rate of a time base as an attribute.

The notification stream class represents a notification stream for transmitting a notification for an action to be performed. The notification stream class may include a notification stream identifier representing the identifier of a notification stream as an attribute.

FIG. 89 is a view illustrating an App-based service class.

The App-based service class represents an App-based service. At least one of Contains relationship with Time Base Class, Contains relationship with App-Based Enhancement class, and Sub-class relationship with Service class may be included as relationship.

Components of an NRT content item may have a similar structure to a program. However, the NRT content item is transmitted in a file format instead of a stream format. Additionally, the program may have an adjunct data service. In more detail, the adjunct data service may be an interactive service relating to the program. A program class representing a program, a show class representing a show that is a primary content included in a program, and a segment class representing a segment that is a temporal segment of a program will be described in more detail with reference to FIGS. 90 to 92.

FIG. 90 is a view illustrating a program class.

A program class represents a program. The program class may include at least one of a program identifier (ProgamIdentifier), the start time of a program (StartTime), the duration of a program (ProgramDuration), the title of a program (TextualTitle), a text describing a program (TextualTitle), the genre of a program (Genre), a graphic icon representing a program (GraphicalIcon), a content advisory rating (ContentAdvisoryRating), a targeting/personalization property (Targeting/personalization properties), and a content/service protection property representing the content/service protection of a program (Content/Service protection properties) as a property. The start time of a program may include a date and a time at which a program starts. The duration of a program is a duration from the start time to the end time of a program. The title of a program may be displayed in a plurality of languages. Additionally, when there is no title of a program, the image display device 100 may display the title of a related show as the title of a program. Additionally, when there is no genre of a program, the image display device 100 may display the genre of a related show as the genre of a program. Additionally, a graphic icon may be displayed in a plurality of sizes. When there is no graphic icon of a program, the image display device 100 may display the graphic icon of a related show as the graphic icon of a program. A viewing advisory rating may vary by region and may have different values by region. Additionally, if there is no viewing advisory rating, the broadcast reception device 100 may display the viewing advisory rating of a show relating to a program as a viewing advisory rating. If there is no targeting/personalizing property, the broadcast reception device 100 may display the targeting/personalizing property of a related show. If there is no content/service protection property, the broadcast reception device 100 may display the content/service protection property of a related show.

The program class may include, as relationship, at least one of ProgramOf relationship with Linear Service Class, ContentItemOf relationship with App-Based Service Class, Contains relationship with Presentable Video Component class, Contains with Presentable Video Component class, Contains relationship with Presentable Audio Component class, Contains relationship with Presentable CC Component class, Contains relationship with App-Based Enhancement class, Contains relationship with Time Base Class, Based-on relationship with Show class, and Contains relationship with Segment Class. At this point, the Contains relationship with Presentable Video Component class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component. Additionally, the Contains relationship with Segment Class may include RelativeSegmentStartTime representing the relative start time of a segment using the start of a program as a reference.

A radio program class represents a radio program. The radio service class may include at least one of "Containment relationship with Presentable Audio Component class", "Containment relationship with Presentable CC Component class", "Adjunct relationship with NRT Data Service class", and "Containment relationship with Radio Segment Class)" as relationship. Additionally, the radio program class may include the start time of a radio segment as a property. At this point, the start time of a radio segment may be a relative time from the start time of a program.

The TV program class may represent a TV program. The presentable video component class may have "Containment relationship with Presentable Video Component Class" as relationship. "Containment relationship with Presentable Video Component Class" may include at least one of the role of a video component, a containment relationship with presentable audio component class, a containment relationship with presentable closed caption component class, an adjunct relationship with NRT data service class, the base with TV show class, and a containment relationship with TV segment class as a property. The role of a video component may represent at least one of a primary video, an alternative camera view, another alternative video component, a sign language inset, and a Follow Subject Video including the name of a followed subject. The follow subject video may be supported by a separated video component. A containment relationship with TV segment class may include a segment start time (RelativeSegmentStartTime). At this point, the segment start time may be a relative time from the start of a program.

FIG. 91 is a view illustrating a show class.

A show class represents a show. At this point, the show may represent a primary content of a program as described above. Especially, the show may represent a primary content from a view's perspective view. The show class may include at least one of "ShowIdentifier", "ShowDuration", "TextualDescription", "Genre", "GraphicalIcon", "ContentAdvisoryRating", "Targeting/personalization properties", and "Content/Service protection properties" as attribute. The show class may have an "includes" relationship with show segments"

The TV show class may represent a primary content of a TV program. The TV show class may have "Containment relationship with Presentable TV Show Segment class" as relationship.

FIG. 92 is a view illustrating a segment class, a show segment class, and an interstitial segment class.

A segment class represents a segment. The segment class may include at least one of "SegmentId", "Duration", "Targeting/personalization properties", and "Content advisory rating".

The show segment class represents a segment of a show. The show segment class may have ShowSegmentRelativeStartTime representing a relative start time using the start time of a show as a reference, as an attribute. The show segment class may have a "Sub-class" relationship with segment class.

The interstitial segment class represents a segment that is not a show segment among segments of a program. The interstitial segment class may have a "Sub-class" relationship with segment class.

A radio segment class represents a segment of a radio program.

A TV segment class represents a segment of a TV program.

A radio show segment class represents a segment of a radio show. A radio show segment class may include "ShowSegmentRelativeStartTime" as a property. In more detail, the start time of a show segment may be a relative time on the basis of a radio program.

A TV show segment class represents a show segment including a content that is a TV program. A TV show segment class may include "S ShowSegmentRelativeStartTime" as a property. In more detail, the start time of a show segment may be a relative time on the basis of a TV program.

A Radio Interstitial Segment represents a segment instead of a show segment of a radio program.

A TV Interstitial Segment represents a segment instead of a show segment of a TV program.

An OnDemand UI App class represents an application providing a user interface for OnDemand service.

An OnDemand Offering class represents offering of OnDemand service.

An OnDemand Catalog class represents description on offerings of OnDemand service. At this point, offering may represent a service product provided by OnDemand. An OnDemand request catalog class may include "relationship with OnDemand offering class".

Figure 93:
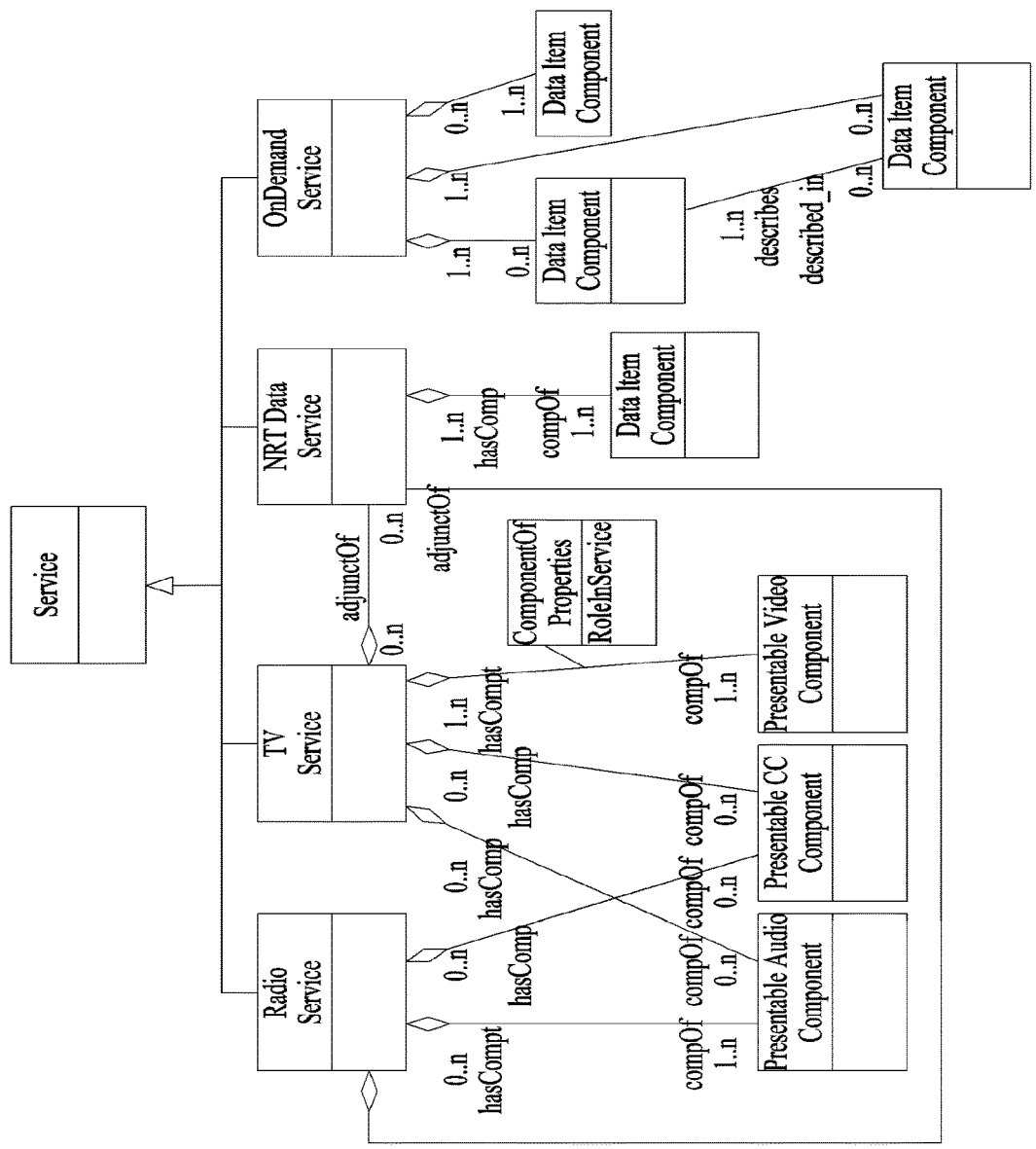
FIG. 93 is a view illustrating an inheritance relationship with a sub-property according to the type of broadcast service according to an embodiment of the present invention.

FIG. 93 is a view illustrating an inheritance relationship with sub-attribute according to the type of broadcast service according to an embodiment of the present invention.

FIG. 93 is a view illustrating an adjunct service relationship between the above-mentioned different types of services, different types of components included in each service, and each service. The radio service may include one or more presentable audio components. Additionally, the radio component may include one or more closed caption components. Additionally, the radio component may include one or more enhanced NRT data services. The TV service may include one or more presentable video components. Additionally, the TV service may include one or more presentable audio components. Additionally, the TV service may include one or more presentable closed caption components. Additionally, the TV service may include one or more enhanced NRT data services. The NRT data service may include one or more presentable data item components. Additionally, the NRT data service may be stand-alone data service. Additionally, the NRT data service may be an adjunct NRT data service of radio service or TV service. Additionally, the NRT data service may be an adjunct NRT data service of radio service or TV service. The OnDemand service may include one or more OnDemand offerings. Additionally, the OnDemand service may include one or more catalogs describing offering. Additionally, the OnDemand service may be a UI application service providing a user interface of a service. At this point, the user interface may be customized by a service provider. Additionally, the user interface may be customized by a user.

Figure 94:
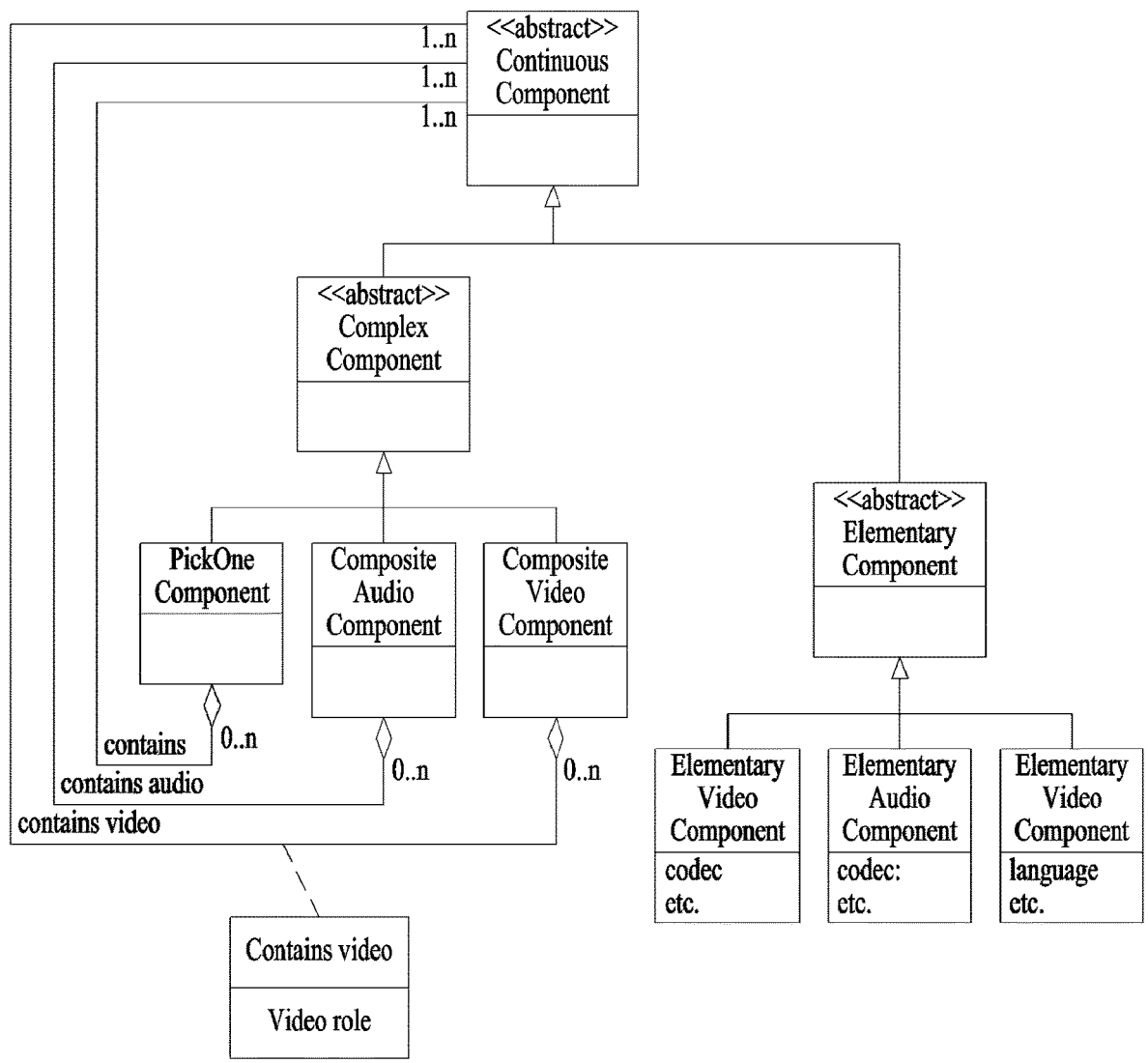
FIG. 94 is a view illustrating an inheritance relationship between a continuous component and components having a sub-property of the continuous component according to an embodiment of the present invention.

FIG. 94 is a view illustrating an inheritance relationship between a continuous component and components having a sub-property of the continuous component according to an embodiment of the present invention.

As shown in the embodiment of FIG. 94, a continuous component may be an elementary component or a complex component. The elementary component may be an elementary video component, an elementary audio component, or an elementary closed caption component. Additionally, the complex component may be a PickOne component or a composite component. The purpose of defining "relationship" between components is that distinguishing a component audio from a composite video is very important. This is because in the case of a composite video component, it needs to be displayed differently according to the role of a member component of the composite component. Accordingly, a complex component may include a plurality of "relationships" representing the property of a role of a composite audio component or a composite video component.

Figure 95:
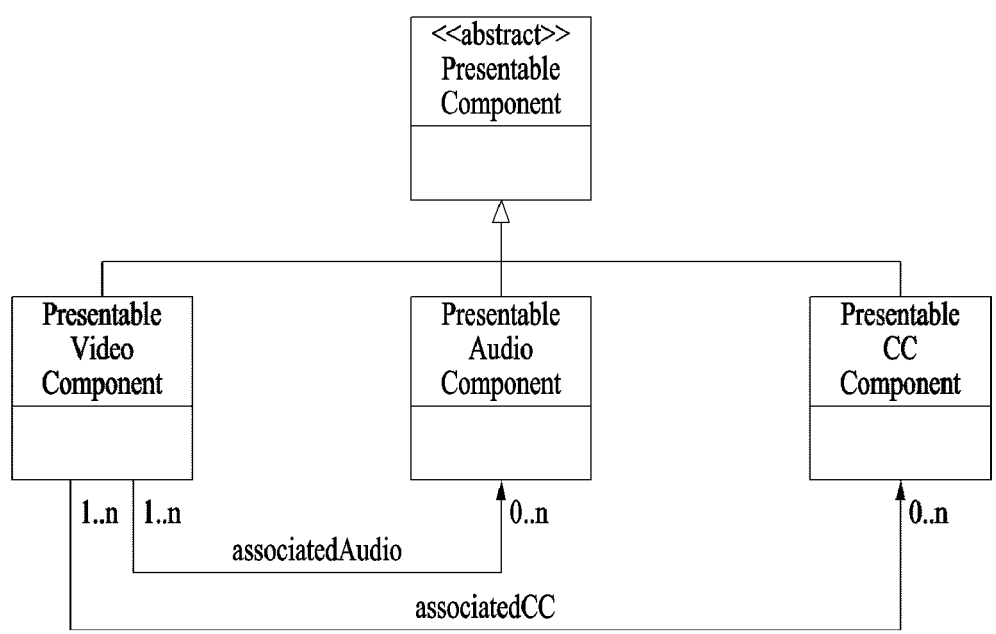
FIG. 95 is a view illustrating an inheritance relationship between a presentable component and components having a sub-property of the presentable component according to an embodiment of the present invention.

FIG. 95 is a view illustrating an inheritance relationship between a presentable component and components having a sub-property of the presentable component according to an embodiment of the present invention.

The presentable component, as described above, may be one of a presentable video component, a presentable audio component, and a presentable closed caption component. The presentable video component of TV service may have one or more related presentable audio components. Additionally, the presentable video component of TV service may have one or more related presentable closed caption components. At this point, the related presentable audio component and presentable closed caption component may be played together with the presentable video component. Since a TV service is a service including a video component, the presentable audio component and the presentable closed caption component of the TV service needs to be related to the presentable video component.

Figure 96:
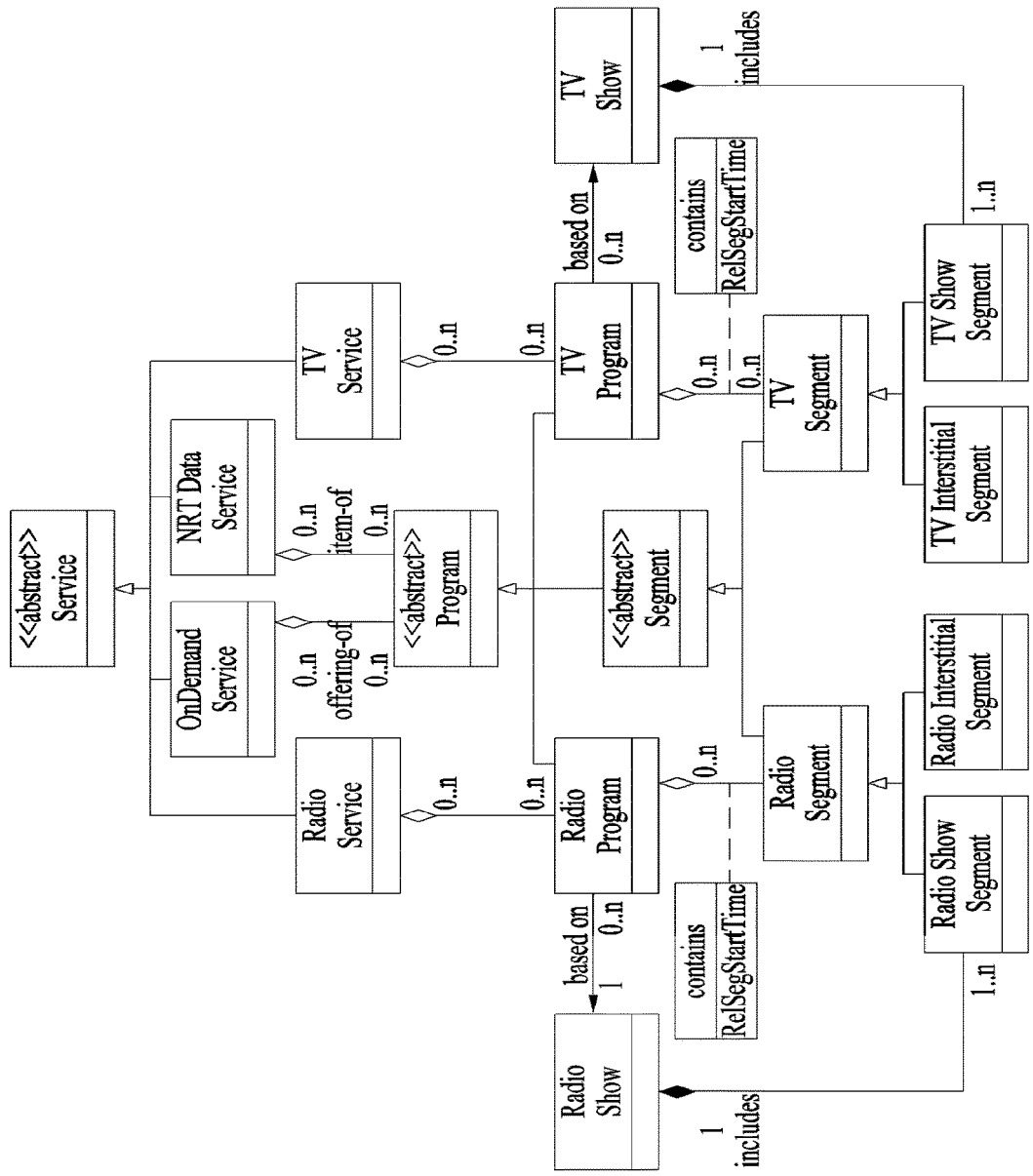
FIG. 96 is a view illustrating a relationship between a service, programs in the service, and segments in the programs according to an embodiment of the present invention.

FIG. 96 is a view illustrating a relationship between a service, programs in the service, and segments in the programs according to an embodiment of the present invention.

A radio service may include one or more radio programs. A radio program may be included in one or more radio services. A radio program may be offering of an NRT data service contents item or an OnDemand service. A radio program may include one or more radio segments. At this point, a radio segment may be a radio interstitial segment. A radio segment may be included in one or more radio programs. Each radio segment may be a radio show segment or a radio interstitial segment. A radio program may include one "radio show". At this point, "radio show" is not regarded as interstitial content by a service provider. A radio show may include one or more radio show segments. Such a relationship of a radio service, a radio program, a radio segment, and a radio show may be similarly applied to a relationship of a TV service, TV program, a TV segment, and a TV show.

Figure 97:
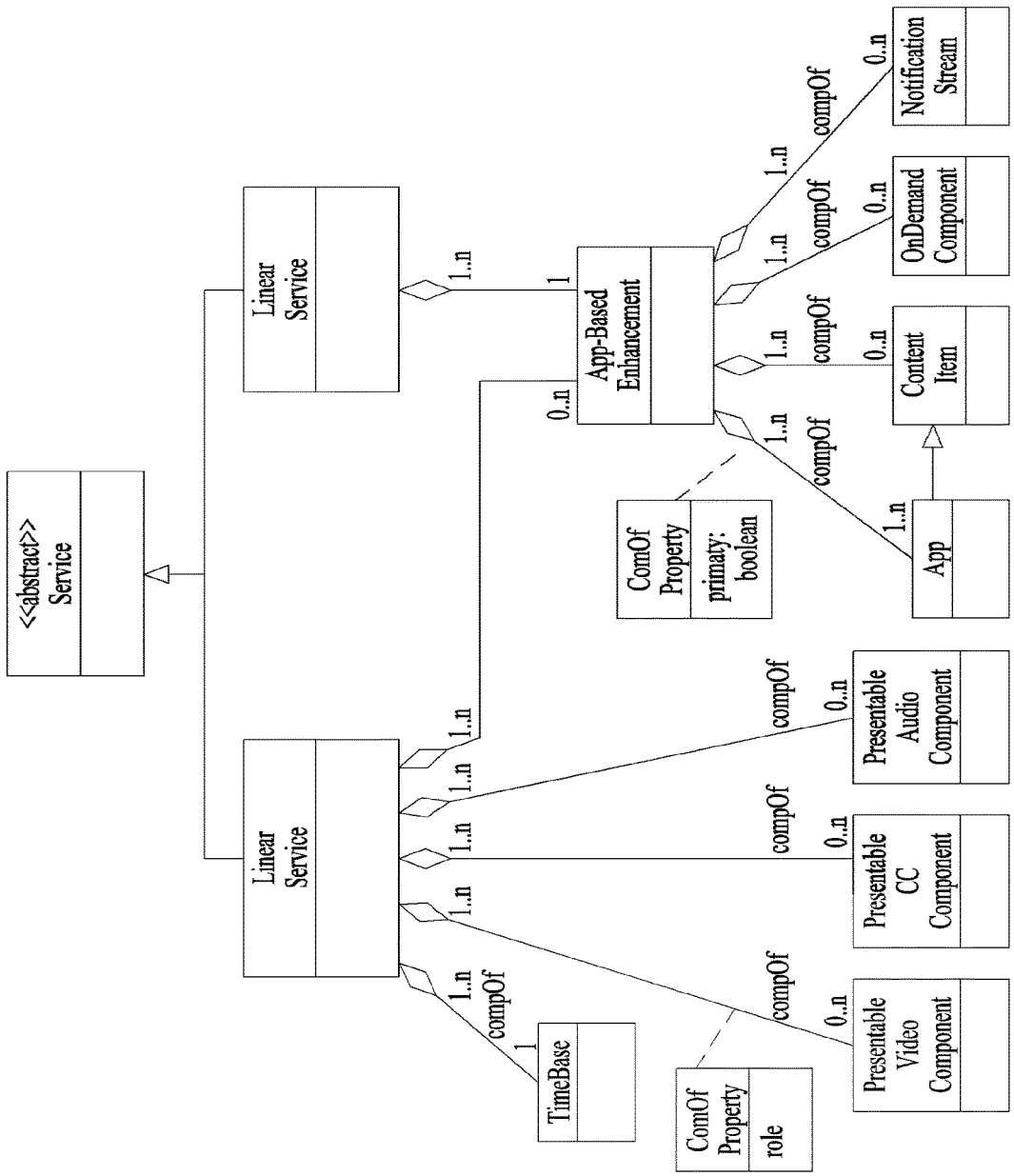
FIG. 97 is a view illustrating an inheritance relationship with sub-attribute according to the type of broadcast service according to another embodiment of the present invention.

FIG. 97 is a view illustrating an inheritance relationship with sub-attribute according to the type of broadcast service according to another embodiment of the present invention.

The service may include at least one of a linear service and an App-based service. The linear service may deliver TV service. Additionally, the linear service may deliver service to a device incapable of video decoding or having no display. In more detail, the linear service may deliver a service including only audio. The linear service may include one time base providing a reference time that is a synchronization reference. Or, the linear service may include one or more presentable video components. Or, the linear service may include one or more presentable video components. Or, the linear service may include one or more presentable audio components. Or, the linear service may include one or more App-based enhancement services. At this point, a presentable video component, as described above, may have a role representing the role of a presentable video component as a property.

The App-based enhancement service may include one or more Apps. Additionally, the app-based enhancement service may include one or more content items. Additionally, the App-based enhancement service may include one or more OnDemand components.

Additionally, the app-based enhancement service may include one or more notification streams. At this point, an app may have a primary property representing a primary application necessary for App-based enhancement service. At this point, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

The app-based service may include one or more app-based enhancement services. The app-based enhancement service that an app based service includes may include one primary app. Additionally, the app-based service may selectively include a time base for providing a synchronization reference time. Additionally, an app may be in a format of a content item or a data item. At this point, the content item may be referred to as a set of files constituting one app.

Figure 98:
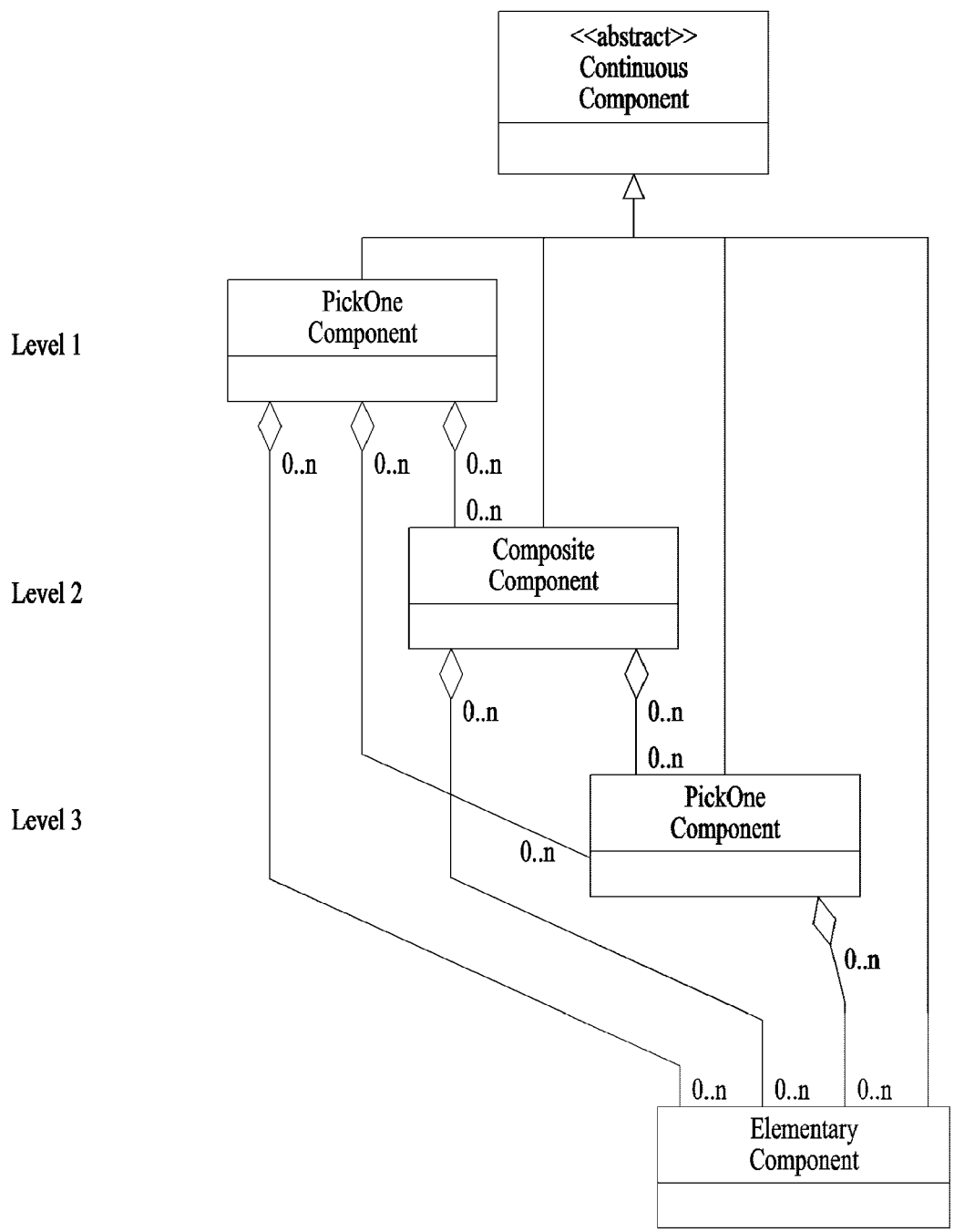
FIG. 98 is a view illustrating an inheritance relationship between a continuous component and components having a sub-attribute of the continuous component according to an embodiment of the present invention.

FIG. 98 is a view illustrating an inheritance relationship between a continuous component and components having a sub-attribute of the continuous component according to an embodiment of the present invention.

All continuous components may have a layer structure divided into a plurality of levels. In a specific embodiment, continuous components may have a layer structure divided into three levels. The continuous component may be one of a PickOne component, a composite component, and an elementary component. The PickOne component may include one or more composite components. The PickOne component may include one or more PickOne components. The PickOne component may include one or more elementary components. At least two components are included on the definition of a PickOne component. Additionally, the PickOne component may correspond to the top level in a layer structure.

The composite component may include one or more components. Additionally, the composite component may include one or more elementary components. At least two components are included on the definition of a composite component. The composite component may be included in the PickOne component of the top level.

A PickOne component not in the top level may include more than two elementary components. At this point, the elementary component may be one of an elementary video component, an elementary audio component, and an elementary closed caption component. A PickOne component not in the top level may be included in one or more PickOne components. A PickOne component not in the top level may be included in one or more composite components.

Figure 99:
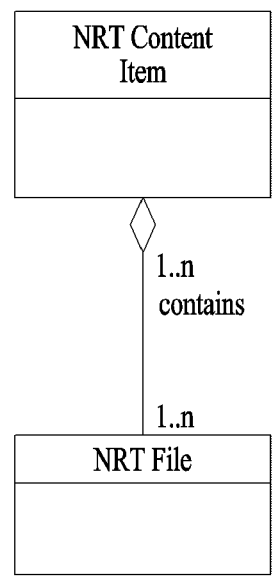
FIG. 99 is a view illustrating an inheritance relationship of an NRT content item class and an NRT file.

FIG. 99 is a view illustrating an inheritance relationship of an NRT content item class and an NRT file.

The NRT content item may include one or more NRT files. Additionally, one NRT file may be include in one or more NRT content items. The NRT content item may be a presentable NRT file based component. For example, the NRT content item may be a set of NRT files not combined with other files and consumed. Additionally, the NRT content item may be an elementary NRT file based component. For example, the NRT content item may be an atomic unit. In more detail, the NRT content item may be the smallest file unit. The NRT content item may include at least one of a continuous component and a non-continuous component. Especially, the NRT content item may include a combination of a continuous component and a non-continuous component.

Figure 100:
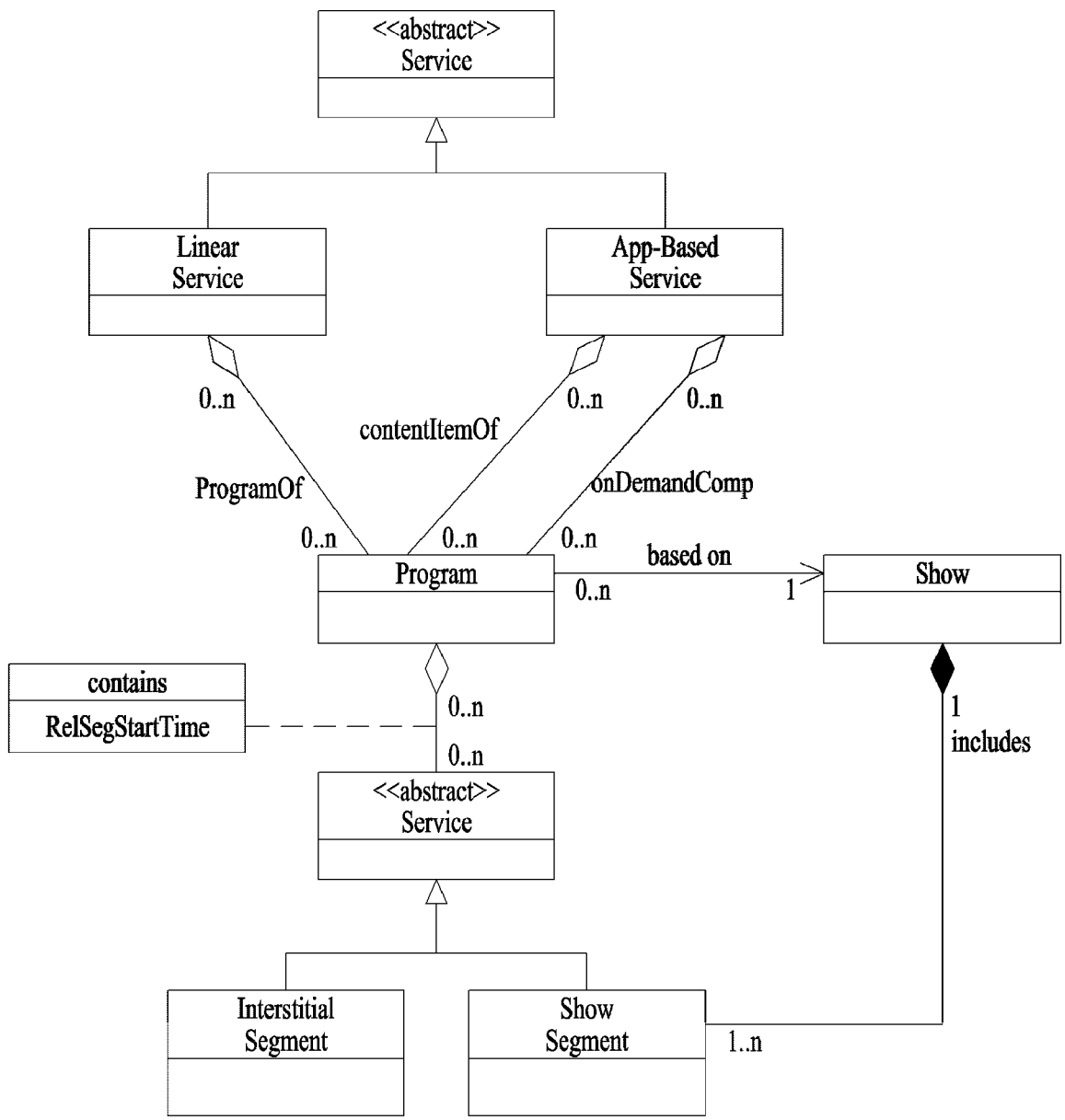
FIG. 100 is a view illustrating a relationship between a service, programs in the service, and segments in the programs according to another embodiment of the present invention.

FIG. 100 is a view illustrating a relationship between a service, programs in the service, and segments in the programs according to another embodiment of the present invention.

A linear service may include one or more programs. At this point, the program, as described above, is in a temporal segment format of a linear content. The program may be included in one or more linear services.

The linear service may include one or more App-based enhancement services. The app-based service may include one or more app-based enhancement services. The App-based enhancement service may include one or more programs. At this point, the program is in the format of an NRT content item. Or, the program may be in a format of an OnDemand component.

The program may include one or more segments. A segment may be included in one or more programs. Each segment may be a show segment or an interstitial segment. The program may share many properties with a linear service. The reason is that the program is a time slice of a linear service, an NRT content having the same structure as a temporal segment of a linear service, or an OnDemand request component having the same structure as a temporal segment of a linear service.

The program is based on one show by definition. The reason is that the show is a portion that a service providers does not consider as an interstitial material.

The show may include one or more show segments.

Figure 101:
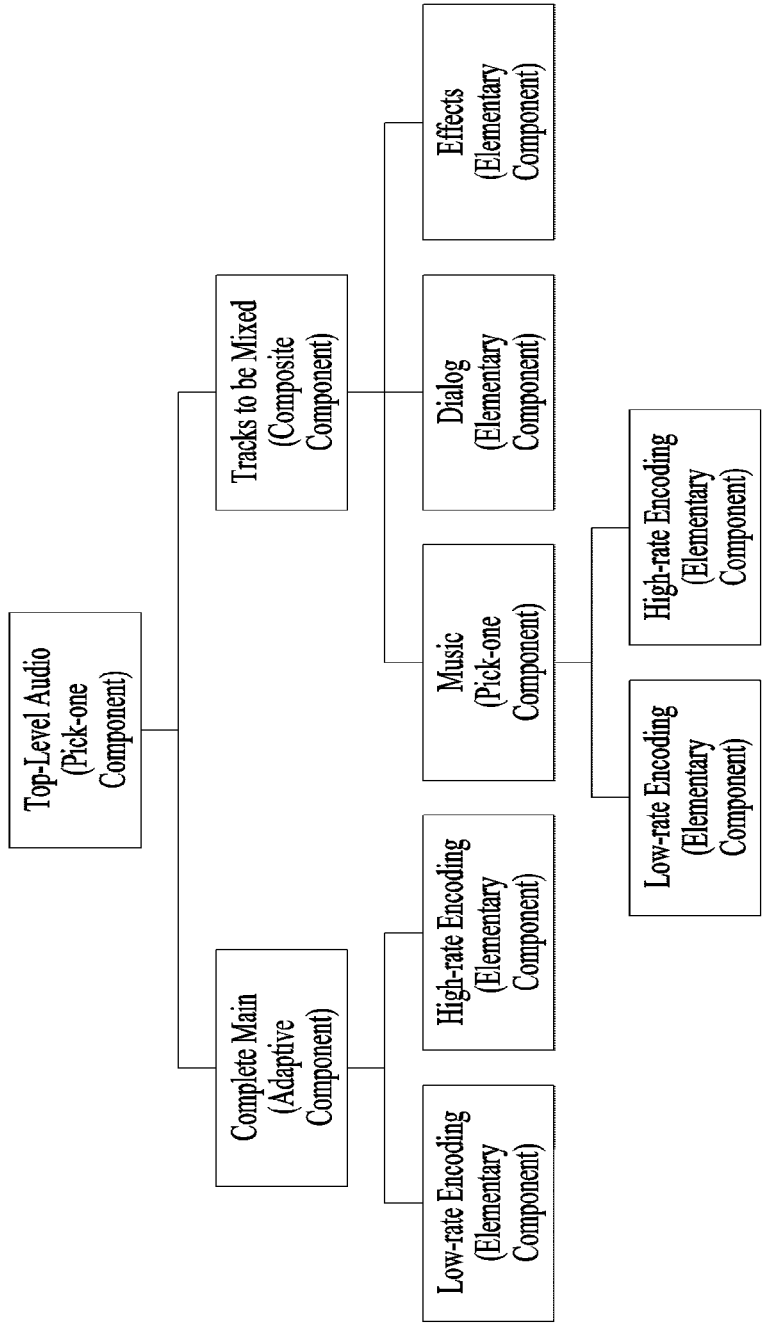
FIG. 101 is a view illustrating a layer hierarchy of a presentable audio component.

FIG. 101 is a view illustrating a level hierarchy of a presentable audio component.

A continuous component may be divided by three level hierarchies. The top level is a PickOne component. A middle level may include a composite component. A bottom level may include a PickOne component. All continuous components may include such three levels. However, a continuous component may be a simple elementary component not including a bottom level. In a specific embodiment, as shown in FIG. 101, a presentable audio component may be a PickOne component. At this point, the PickOne component may include a component having music, dialog, and sound effect, which are mixed with complete main music of a complete main audio component. At this point, a complete main audio component may be a PickOne component including a plurality of replaceable elementary components encoded with different bitrates. A component having music, dialog, and sound effect, which are mixed with complete main music, may be a composite component in which each of music, dialog, and sound effect is one component. At this point, a component including dialog and a component including sound effect may be an elementary component. A music component may be a PickOne component including a plurality of replaceable elementary components encoded with different bitrates.

A broadcast via a typical broadcast network is a linear service in which one broadcast is broadcasted continuously. As a broadcast via a typical broadcast network becomes a hybrid broadcast, a broadcast service may be divided into a typical linear service and an app-based service.

As described above, the linear service is a service in which a continuous component is presented according to a predetermined schedule. At this point, the linear service may be based on a time determined by a broadcast station. Additionally, the linear service may include an app triggered to be synchronized with a broadcast service.

In more detail, the linear service may include one or more video components.

Additionally, the linear service may include one or more audio components.

Additionally, the linear service may include one or more closed caption components.

Furthermore, the linear service may include a time base component that is the basis for the synchronization with at least one of a component and an adjunct service.

Additionally, the linear service may include one or more triggered app based enhancements as a component. Each adjunct service may include one or more applications. At this point, an application may be synchronized with activation notification and may then be activated. An app based adjunct service component may include a series of activation notifications. Additionally, the app based adjunct service component may include one or more content items. Additionally, the App-based enhancement service component may include one or more OnDemand components. At described above, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

Additionally, the linear service may include one or more auto-launch app-based enhancements as a component. Each adjunct service may include an application auto-launched when service is selected. The auto-launch app-based enhancements include an auto-launched application as a component. Additionally, one or more content items may be included as a component. Additionally, the app-based enhancement service may include one or more notification streams as a component. Additionally, the auto launch app-based enhancement service may include one more content items as a component.

The linear service may include may include both auto-launch app-based enhancements and triggered app based enhancements as a component. In a specific embodiment, auto-launch app-based enhancements are inserted as a target advertisement and triggered app based enhancements provide interactive viewing experience to a user.

An app based service is that a specified application is launched when service is selected. The app-based service may include one app-based enhancement services. At this point, an app based service including an app-based enhancement service may include one specified primary app. The app may be in a format of a content item or a data item. At this point, the content item may be referred to as a set of files constituting one app. At this point, a service may include an auto-launched application as a property. Additionally, the app based service may include one or more content items as a property.

Components of a service may be shared between a plurality of different components. Additionally, an application of an app based service may initiate the playback of OnDemand content.

In relation to the linear service, a program and a segment are described again. The program is a temporal section of the linear service. At this point, the program has a scheduled start time and duration. Additionally, the program may be defined by a broadcast station so as to be consumed by one program unit.

Additionally, the program may refer to an OnDemand content having the same structure as a content item or a program of a linear service. At this point, the OnDemand content does not have a scheduled start time unlike a program of a linear service. Additionally, the OnDemand does not include a time base defined by a broadcast station.

Each program relates to "show". At this point, the show includes the primary content of a program. As described above, ma properties of a program are properties of a show. For example, properties such as a text describing a program, actors, and a release data in the program are properties of a show. Program properties other than show properties are properties of a program itself. The properties of a program itself may vary even when the program including the same show. For example, a start time in a program and a service including a program may vary for each program.

A program includes one or more temporal sections including a show. Additionally, a program may include one or more temporal sections including an interstitial content. Such a temporal section is called a segment. In more detail, a temporal section may be divided into a show segment and an interstitial segment.

A segment may have a predetermined start time and length as part of a program. Such a segment is called an anchored segment. Additionally, there is a non-anchored segment that is dynamically inserted into a program. In more detail, a non-anchored segment is a segment in which a specific program to be inserted or a specific time to be inserted is not defined. For example, a targeting advertisement in which a program and time to be inserted are not defined and received by the broadcast reception device 100 may be a non-anchored segment.

The broadcast reception device 100 may display an application relating to a program by the control unit 150 through a service guide. Additionally, the broadcast reception device 100 may add an application relating to a program to a favorite list or download it on the basis of a user input. In more detail, when an auto-launch app based service is provided with a packaged app, the broadcast reception device 100 may display it through a service guide displaying a broadcast program. This will be described with reference to FIG. 102.

FIG. 102 is a flowchart illustrating operations when a broadcast reception device displays an auto-launch app based service through a broadcast service guide and stores it as a favorite or downloads it.

The broadcast reception device 100 receives a broadcast signal through the broadcast receiving unit 110 in operation S951.

The broadcast reception device 100 obtains auto-launch app based service information through the control unit 150 on the basis of the broadcast signal in operation S953. In a specific embodiment, the broadcast reception device 100 may obtain the auto-launch app based service information from the broadcast signal. For example, the broadcast reception device 100 may obtain the auto-launch app based service information from the above-described service information or program information.

The broadcast reception device 100 displays a service guide through the control unit 150 on the basis of the auto-launch app based service information in operation S955. In a specific embodiment, the broadcast reception device 100 may display the auto-launch app based service information in addition to the program information. Especially, the broadcast reception device 100 may display both the auto-launch app based service information and the program information relating to auto-launch app based service.

The broadcast reception device 100 receives a user input for auto-launch app based service through the control unit 150 in operation S957. In more detail, the broadcast reception device 100 may receive a user input for selecting auto-launch app based service. In more detail, the broadcast reception device 100 may receive a user input for storing an auto-launch application as a favorite. In another specific embodiment, the broadcast reception device 100 may receive a user input for downloading an auto-launch application.

The broadcast reception device 100 stores an auto-launch application as a favorite or downloads it through the control unit 150 on the basis of a user input in operation S959. In more detail, the broadcast reception device 100 may store an auto-launch application of a selected auto-launch app based service as a favorite or may download it.

The broadcast reception device 100 displays an auto-launch application stored as a favorite or a downloaded auto-launch application through the control unit 150 in operation S961. In more detail, the broadcast reception device 100 may display an auto-launch application stored as a favorite or a downloaded auto-launch application. In a specific embodiment, the broadcast reception device 100 may display an auto-launch application stored as a favorite or a downloaded auto-launch application through an icon. Additionally, the broadcast reception device 100 may receive a user input for an auto-launch application stored as a favorite or a downloaded auto-launch application and may then download or launch an auto-launch application. Through this, the broadcast reception device 100 may allow a broadcast service guide to serve as an application store of a smartphone.

In conventional broadcasting, a sign language screen for hearing-impaired person is directly inserted to a broadcast video. Accordingly, users that have no hearing impairment and thus do not need to see a sign language screen are forced to view the sign language inconveniently. Additionally, the sign language screen is fixed constantly so that this may block a scene that general users want to see intensively. Broadcasters may need to perform an encoding process for inserting a sign language screen into general content in order to transmit the sign language screen. In order to solve this inconvenience, required are a broadcast transmission device and an operating method thereof, and a broadcast reception device and an operating method thereof. This will be described with reference to FIGS. 103 to 108.

A broadcast transmission device may transmit a sign language screen through an additional video different from a video including a general content. The broadcast reception device 100 may overlay an additional video including a sign language screen on a video not including a general content and a sign language screen. Additionally, the broadcast reception device 100 may receive information representing a location at which a sign language screen is displayed and may display an additional video including a sign language screen on the basis of the information representing the location. Or, the broadcast reception device 100 may display an additional video including a sign language screen on the basis of a user input for a location at which a sign language is to be displayed. Additionally, there are various kinds of sign languages used in many countries in addition to general languages. Accordingly, a broadcast transmission device may transmit a plurality of videos respectively including a plurality of sign language screens for one general content. At this point, the broadcast reception device 100 may display one of a plurality of videos respectively including a plurality of sign language screens. At this point, the broadcast reception device 100 may display one of a plurality of videos respectively including a plurality of sign language screens on the basis of a user input. A method of signaling the transmission of such a sign language screen is required.

In a specific embodiment, a video signaling a sign language screen may be signaled as an additional component. Especially, a sign language screen may be signaled efficiently through the above-mentioned object model.

Especially, a sign language component may include information representing a location at which a sign component is to be displayed. Additionally, a sign language component may include information representing the type of a sign language.

A continuous component transmitting a sign language screen may be referred to as a sign language component. At this point, a sign language component class may include as an attribute at least one of a codec representing encoding codec of a sign language screen, a resolution representing the resolution of a sign language screen, coordinates representing a location at which a sign language screen is displayed, an aspect ratio of a sign language screen representing the aspect ratio of a sign language screen, a scanning method representing a scanning method of an image, a frame rate representing the frame rate of a sign language screen, a still picture mode, other encoding parameters, and the type of a sign language. The resolution may be expressed by pixel units of width×height. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920X1080, the coordinates may represent a pixel corresponding to the horizontal 192 and the vertical 108. Additionally, the scanning method may be one of an interlaced method and a progressive method. Additionally, other encoding parameters may be determined according to codec. Additionally, the type of a sign language may represent one of American Sign Language (ASL), Panamanian Sign Language (LSP), Mexican Sign Language (LSM), and Korean Sign Language (KSL).

At this point, the presentable video component class may have AssociatedSignLanguage relationship with Presentable SignLanguage Component class as relationship. AssociatedSignLanguage relationship with Presentable SignLanguage Component class may represent that displaying a presentable video component and a presentable sign language component simultaneously is suitable. In more detail, the presentable sign language component may overlay on a presentable video component.

The presentable sign language component class represents a presentable component including a sign language content.

Additionally, the above-mentioned TV service class may include Containment Relationship with Presentable Sign Language Component Class as relationship.

Additionally, the above-mentioned TV program class may include Containment relationship with Presentable Sign Language Component Class as relationship.

Figure 103:
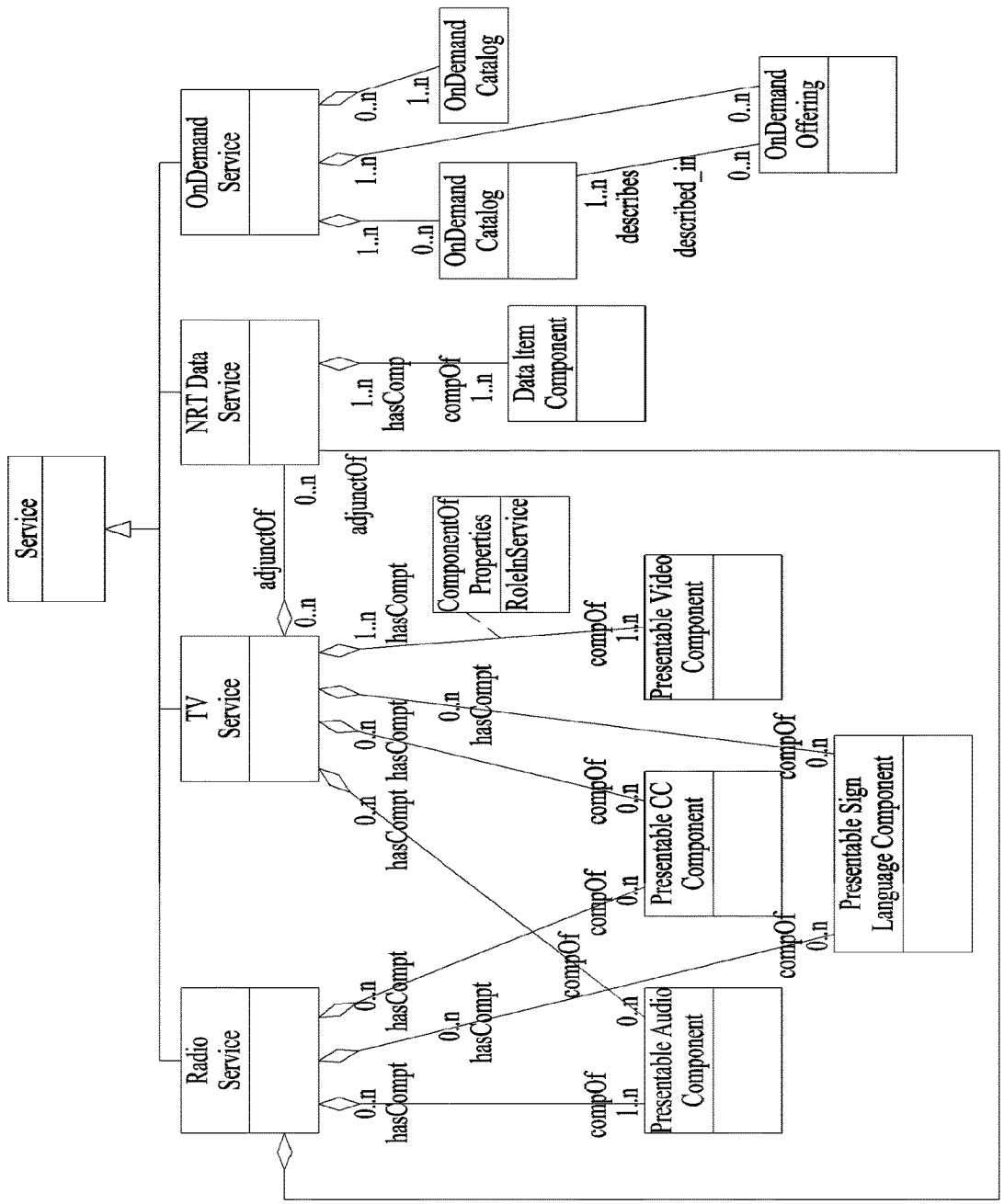
FIG. 103 is a view illustrating an inheritance relationship with sub-attribute according to the type of broadcast service according to another embodiment of the present invention.

FIG. 103 is a view illustrating an inheritance relationship with sub-attribute according to the type of broadcast service according to another embodiment of the present invention. As described above, a service may include one or more sign language components. In more detail, a plurality of sign language components may be different types of sign languages representing the same content. The broadcast reception device 100 may display one of a plurality of sign language components according to a user input by receiving the user input. Accordingly, the TV service may include one or more sign language components. Additionally, a radio service may include one or more sign language components. Accordingly, a TV service class may include one or more sign language component classes. Additionally, a radio service class may include one or more sign language component classes.

Figure 104:
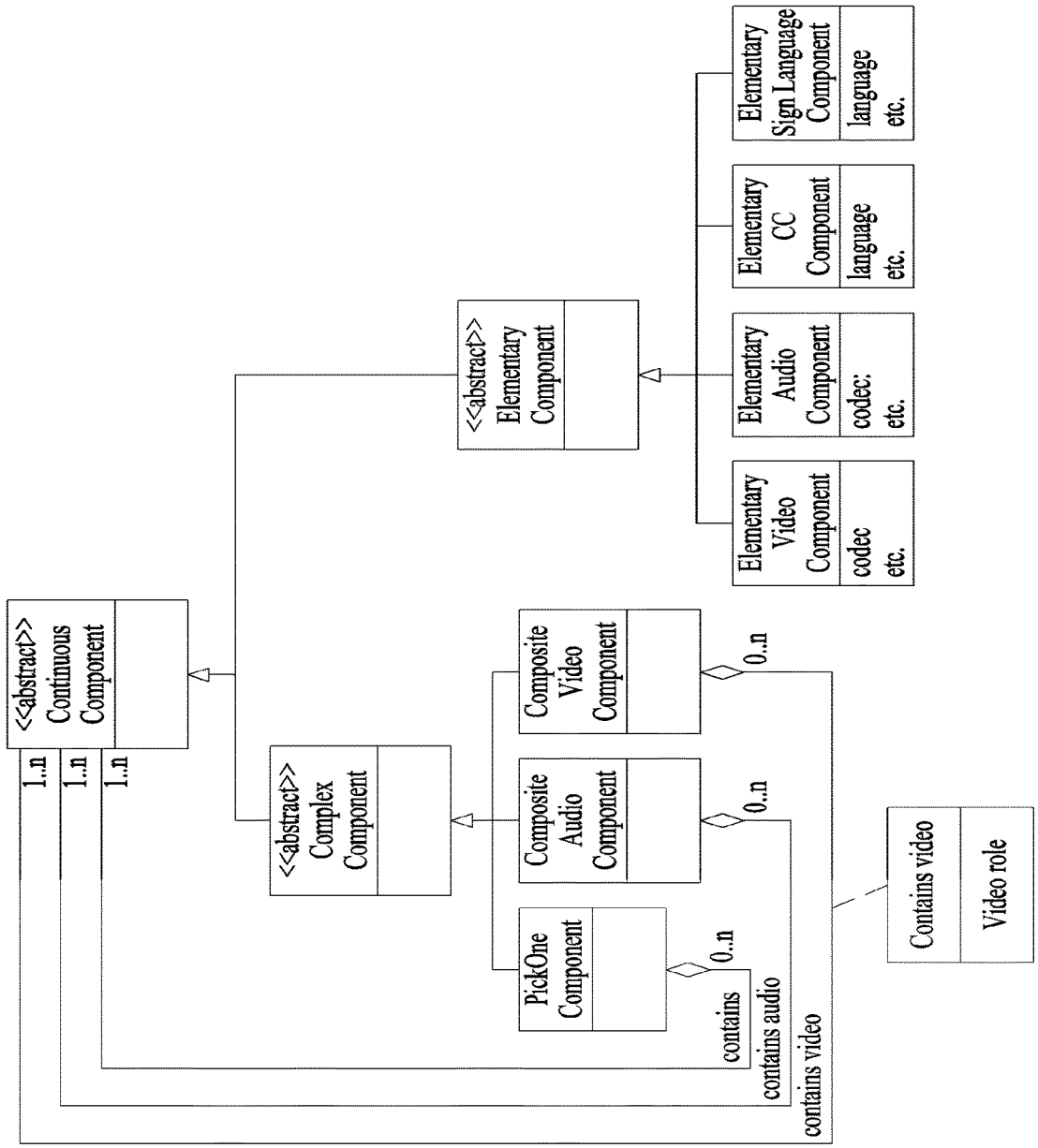
FIG. 104 is a view illustrating an inheritance relationship between a continuous component and components having a sub-attribute of the continuous component according to an embodiment of the present invention.

FIG. 104 is a view illustrating an inheritance relationship between a continuous component and components having a sub-attribute of the continuous component according to an embodiment of the present invention.

As described above, the continuous component may be a complex component or an elementary component. The elementary component may be an elementary sign language component.

Figure 105:
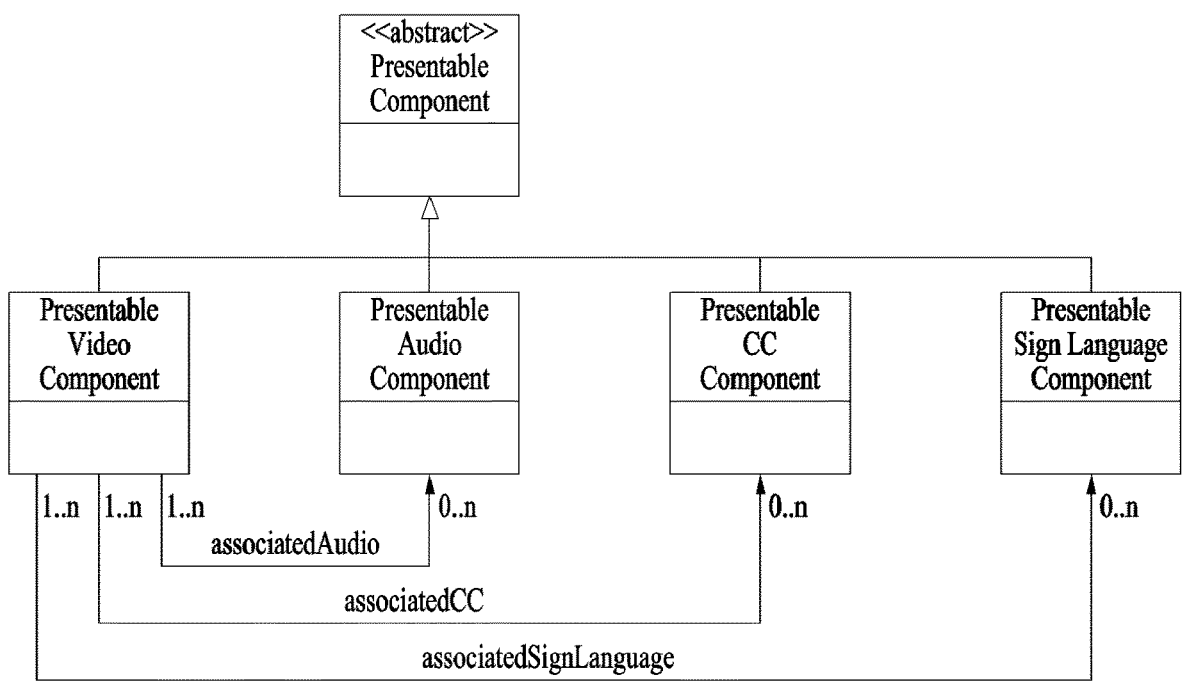
FIG. 105 is a view illustrating an inheritance relationship between a presentable component and components having a sub-attribute of the presentable component according to another embodiment of the present invention.

FIG. 105 is a view illustrating an inheritance relationship between a presentable component and components having a sub-attribute of the presentable component according to another embodiment of the present invention.

A presentable component may be a presentable sign language component. The presentable video component of each TV service may have one or more presentable sign language components. At this point, the presentable sign language component should be associated with a presentable video component.

In another specific embodiment, a broadcast transmission device may signal a video including a sign language screen by using the property of an elementary video component. In more detail, the elementary video component may include a mode property representing the type of video. At this point, the mode may represent one of a normal representing a general video instead of a sign language screen and a sign language. At this point, when the video component is a sign language, it may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920X1080, the coordinates may represent a pixel corresponding to the horizontal 192 and the vertical 108.

In another specific embodiment, a broadcast transmission device may modify information representing the role of a video that is a property that a service, a program, or a composite video component includes and may then signal a video including a sign language screen. In more detail, information representing the role of a video that a service, a program, or a composite video component includes may represent a sign language. At this point, a service, a program, or a composite video component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920X1080, the coordinates may represent a pixel corresponding to the horizontal 192 and the vertical 108. In a specific object model, a role attribute that a service class, a program class, or a composite video component class includes may represent a sign language.

In another specific embodiment, a broadcast transmission device may signal a video including a sign language screen through information representing accessibility to content. In more detail, a broadcast transmission device may signal a video including a sign language screen by using information representing the accessibility to content as the property of at least one of a presentable component, a content item component, a service, a program, a show, a segment, an app, an app-based enhancement service, and an app-based service. Additionally, a broadcast transmission device may allow a targeting property representing a user or a broadcast reception device that a service targets to include information representing the accessibility to content and may then transmit it. In a specific embodiment, the information representing the accessibility to content may include the property of a video including a sign language screen. At this point, a video including a sign language screen component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920X1080, the coordinates may represent a pixel corresponding to the horizontal 192 and the vertical 108. In a specific object model, at least one of a presentable component class, a content item component class, a service class, a program class, a show class, a segment class, an app class, an app-based enhancement service class, and an app-based service class may include information representing the accessibility as an attribute. Additionally, a targeting attribute of a service class may include accessibility representing the accessibility to content as an attribute.

Figure 106:
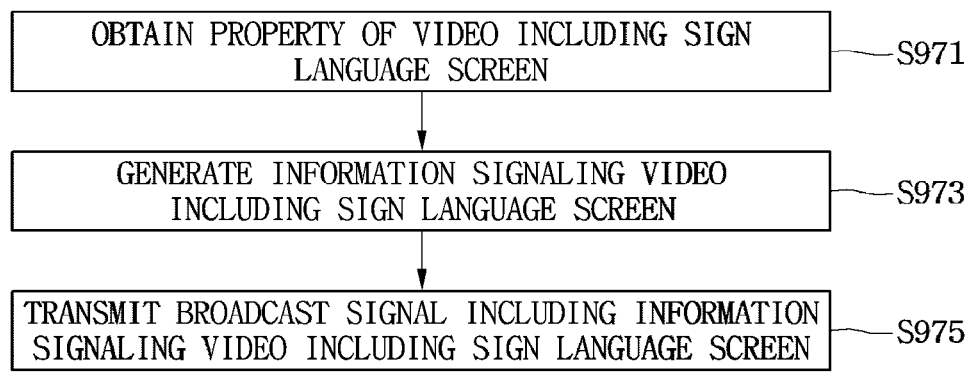
FIG. 106 is a flowchart illustrating operations of a broadcast transmission device to transmit information signaling a video including a sign language screen according to an embodiment of the present invention.

FIG. 106 is a flowchart illustrating operations of a broadcast transmission device to transmit information signaling a video including a sign language screen according to an embodiment of the present invention.

The broadcast transmission device obtains the property of a video including a sign language screen through a control unit in operation S971. The property of a video including a sign language screen, as described above, may include at least one of coordinates representing a location at which the video including the sign language screen is displayed and information representing the type of a sign language.

The broadcast transmission device generates information signaling a video including a sign language screen through the control unit in operation S973. As described above, the broadcast transmission device may signal a video including a sign language screen through at least one of an additional component, the property of an elementary video component, information representing the role of a video that is the property that a service, a program, or a composite video component includes, and information representing the accessibility to content.

The broadcast transmission device transmits a broadcast signal signaling a video including a sign language screen through a transmission unit in operation S975.

Figure 107:
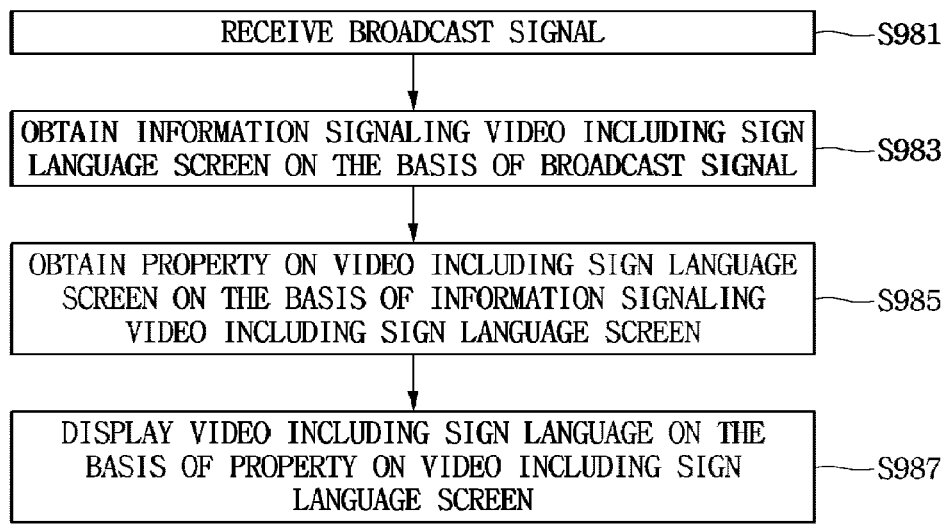
FIG. 107 is a flowchart illustrating operations of a broadcast reception device to display a video including a sign language screen according to an embodiment of the present invention.

FIG. 107 is a flowchart illustrating operations of a broadcast reception device to display a video including a sign language screen according to an embodiment of the present invention.

The broadcast reception device 100 receives a broadcast signal through the broadcast reception unit 110 in operation S981.

The broadcast reception device 100 obtains information signaling a video including a sign language screen on the basis of broadcast signals through the control unit 150 in operation S983. As described above, the information signaling a video including a sign language screen may be signaled through at least one of an additional component, the property of an elementary video component, information representing the role of a video that is the property that a service, a program, or a composite video component includes, and information representing the accessibility to content.

The broadcast reception device 100 obtains the property on a video including a sign language screen on the basis of information signaling the video including the sign language screen through the control unit 150 in operation S985. The property of a video including a sign language screen, as described above, may include at least one of coordinates representing a location at which the video including the sign language screen is displayed and information representing the type of a sign language.

The broadcast reception device 100 displays a video including a sign language screen on the basis of the property on a video including a sign language screen through the control unit 150 in operation S987. In more detail, the broadcast reception device 100 may display a video including a sign language screen on the basis of the coordinates representing a location at which a video including sign language screen is displayed. Additionally, the broadcast reception device 100 may overlay a video including a sign language screen on a video not including a sign language screen and may then display it. Additionally, in a specific embodiment, the broadcast reception device 100 may display a video including a sign language screen on the basis of a user input. This will be described with reference to FIG. 108.

Figure 108:
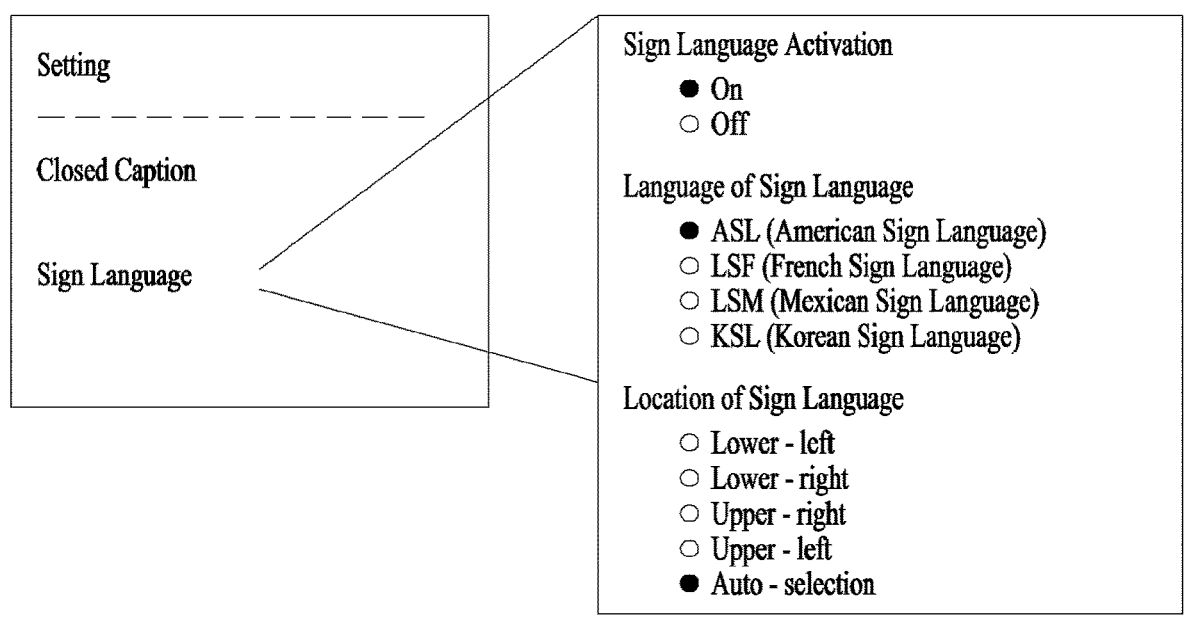
FIG. 108 is a view illustrating an interface of a user input for setting a sign language by a broadcast reception device according to an embodiment of the present invention.

FIG. 108 is a view illustrating an interface of a user input for setting a sign language by a broadcast reception device according to an embodiment of the present invention.

The broadcast reception device 100 may display a video including a sign language screen on the basis of a user input. At this point, the user input may be a user input on whether to display a video displaying a sign language screen. Additionally, the user input may be a user input on a location at which a video including a sign language screen is displayed. Additionally, the user input may be a user input for the type of a sign language of a sign language screen. When a broadcast service or a program includes a plurality of videos including a sign language screen, the broadcast reception device 100 may receive a user input for selecting one of a plurality of videos including a sign language screen. At this point, the broadcast reception device 100 may display a video including a sign language screen selected according to a user input for selecting one of a plurality of videos including a sign language screen. In a specific embodiment, the broadcast reception device 100 may receive such a user input through a setting menu for setting an operation of the broadcast reception device 100 as shown in the embodiment of FIG. 108.

According to embodiments of the present invention, it is described that a broadcast transmission device transmits broadcast service together with service signaling information and the broadcast reception device 100 receives broadcast service on the basis of service signaling information. Then, providing, by the broadcast reception device 100, information to a companion device interworking with broadcast service and an operation of a companion device will be described.

Figure 109:
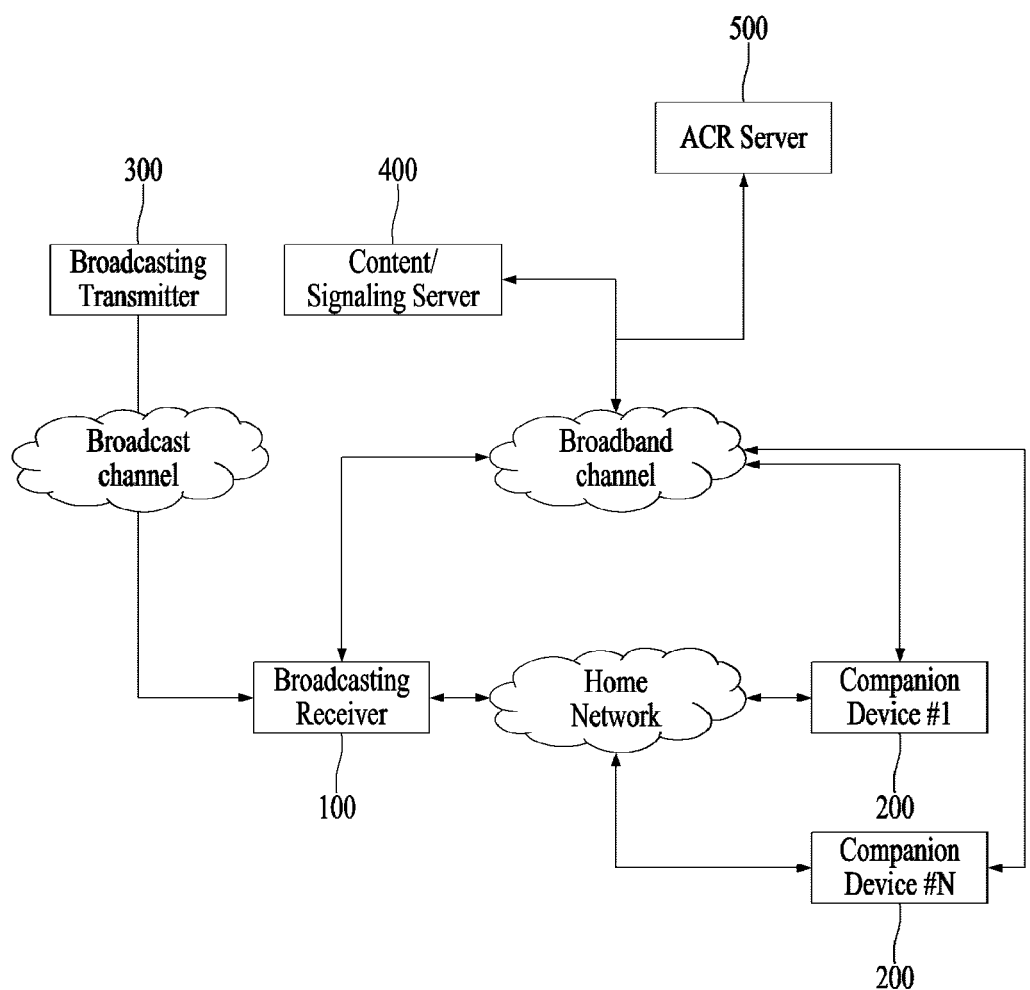
FIG. 109 is a view showing a broadcast system for providing a broadcast service interoperating with a companion device according to an embodiment of the present invention.

FIG. 109 is a view showing a broadcast system for providing a broadcast service interoperating with a companion device according to an embodiment of the present invention.

The broadcast system according to the embodiment includes a broadcasting receiver 100, a companion device 200, a broadcasting transmitter 300, a content/signaling server 400 and an automatic content recognition (ACR) server 500. Hereinafter, the broadcasting receiver 100 may be referred to as a primary device (PD) and the companion device 200 may be referred to as a companion device (CD).

The broadcasting transmitter 300 indicates a broadcast server for transmitting a broadcast service. At this time, the broadcasting receiver 100 receives the broadcast service from the broadcasting transmitter 300 through a broadcast channel. In addition, the broadcasting receiver 100 may receive information for signaling the broadcast service from the broadcasting transmitter 300 through the broadcast channel. In addition, the broadcasting receiver 100 may receive supplementary information for the broadcast service, such as a trigger, a trigger parameter table (TPT) or a trigger declarative object (TDO) from the broadcasting transmitter 300 through the broadcast channel.

The content/signaling sever 400 generates and manages content of the broadcast service. At this time, the broadcasting receiver 100 may receive at least one of supplementary information of the broadcast service and signaling information of the broadcast service from the content/signaling server 400 through a broadband channel.

The ACR server 500 manages ACR related data of the broadcast service. At this time, the broadcasting receiver 100 may receive at least one of an application of the broadcast service and a trigger from the ACR server 500 through the broadband channel.

The companion device 200 interoperates with the broadcasting receiver 100 over a home network and executes a supplementary function related to the broadcast service. More specifically, the companion device 200 may acquire at least one of an application and file related to the broadcast service. In addition, the companion device 200 may execute the application and file related to the broadcast service. At this time, the companion device 200 may use a mobile communication network such as 3GPP or an HTTP proxy server instead of a home network. In addition, in a detailed embodiment, if the application and file related to the broadcast service are transmitted through file delivery over unidirectional transport (FLUTE), the companion device 200 may receive at least one of the application and file related to the broadcast service from the broadcasting receiver 100. In addition, the companion device 200 may be a second screen device. In addition, the companion device 200 may include at least one of a smartphone, a tablet and a laptop. More specifically, the companion device 200 may be a terminal device not having a broadcast reception function through a broadcast channel and having a communication function of a network. In addition, there may be one or a plurality of companion devices 200. The companion device 200 may include a controller for controlling overall operation of the companion device 200 and a communication unit for performing communication with an external device. The controller may include one or a plurality of processors, one or a plurality of circuits and one or a plurality of hardware modules, for performing a plurality of functions. More specifically, the controller may be a system on chip (SOC) in which various semiconductor parts are integrated. At this time, the SOC may be a semiconductor device in which various multimedia parts for graphics, audio and video, a modem, a processor and a DRAM are integrated. In addition, the communication unit may be a system on chip (SOC) in which various semiconductor parts are integrated. At this time, the SOC may be a semiconductor device in which various multimedia parts for graphics, audio and video, a modem, a processor and a DRAM are integrated.

In addition, the broadcasting receiver 100 may be referred to as a primary device.

In addition, according to an embodiment, at least two of the broadcasting transmitter 300, the content/signaling server 400 and the ACR server 500 may be integrated into one server.

As described above, the broadcasting receiver 100 may receive the signaling information of the broadcast service from the broadcasting transmitter 300. Alternatively, the broadcasting receiver 100 may receive the signaling information of the broadcast service from the content/signaling server 400. At this time, the signaling information of the broadcast service may include properties of the broadcast service, which will be described in detail with reference to FIG. 110.

FIG. 110 is a view showing properties of a broadcast service signaled according to an embodiment of the present invention.

The signaling information of the broadcast service received by the broadcasting receiver 100 may include the properties of the broadcast service. At this time, the properties of the broadcast service may include at least one of a broadcast service ID for identifying the broadcast service, a name of the broadcast service, a channel number of the broadcast service, a description of the broadcast service, a genre of the broadcast service, an icon indicating the broadcast service, a primary language of the broadcast service, usage report information of the broadcast service, targeting properties indicating information on a device capable of providing the broadcast service, protection properties of the broadcast service, an advisory rating and information on a media component included in the broadcast service. The targeting properties indicate a device for providing a service and may indicate at least one of the primary device or the companion device 200. The channel number of the broadcast service may include a major channel and a minor channel. The information on the media component may include at least one of an ID for identifying the media component, a type of the media component, a name of the media component, a start time of the media component, a presentation duration of the media component, information indicating a screen targeted by the media component, a URL capable of receiving the media component, an advisory rating of the media component and a genre of the media component. At this time, the screen targeted by the media component may represent the companion device 200. More specifically, the screen targeted by the media component may represent at least one of no companion device, all devices, a smartphone, a tablet PC, a TV and a PC. The tablet PC may indicate a mobile device having no communication function through a mobile communication network, such as LTE, and having a display.

The properties of the broadcast service may be signaled in XML as shown in FIG. 110. The signaling format of the properties of the broadcast service is not limited thereto and the properties of the broadcast service may be signaled in other formats such as a bit stream. FIG. 110 shows an embodiment of an XML schema for a service signaling service properties, which may be an embodiment of an XML schema structure for service properties according to the following embodiments of the present invention. In some embodiments, fields may be omitted or new fields may be added. The service signaling service properties may include information on the properties of the provided service. The broadcasting transmitter 300 or the content/signaling server 400 may deliver the XML schema to the broadcasting receiver 100. The broadcasting receiver 100 may deliver the received XML schema to the companion device 200. The broadcasting receiver 100 may deliver the XML scheme to the companion device 200 with or without change or may deliver only desired fields or changed fields to the companion device 200.

More specifically, the information for signaling the properties of the broadcast service may include at least one of ServiceID, ServiceName, MajorChanNum, MinorChanNum, Description, Genre, Icon, Language, UsageReportingInfo, Targeting, ServiceProtection, AdvisoryRating and ComponentItem. This information may be defined at the serviceInfo level.

The ServiceID indicates a broadcast service identifier for identifying a service. At this time, there may be only one ServiceID. In addition, in a detailed embodiment, the ServiceID may have an unsigned short data type. More specifically, the broadcasting receiver 100 and the companion device 200 may identify the broadcast service based on the ServiceID.

The ServiceName indicates the name of the broadcast service. There may not be ServiceName or there may be one or a plurality of ServiceNames. In a detailed embodiment, the ServiceName may have a string data type. More specifically, the broadcasting receiver 100 and the companion device 200 may represent the name of the broadcast service based on the ServiceName.

The MajorChanNum and the MinorChanNum indicate the major number and the minor number of the channel number of the broadcast service, respectively. In an embodiment, there may not be MajorChanNum and MinorChanNum and there are one MajorChanNum and one MinorChanNum. Each of the MajorChanNum and the MinorChanNum may be an integer in a range of 0 to 15. The MajorChanNum and the MinorChanNum may be used to enable a user to easily select a broadcast service. More specifically, the broadcasting receiver 100 and the companion device 200 may represent the channel number of the broadcast service based on the MajorChanNum and the MinorChanNum.

The Description indicates the description of the broadcast service. There may not be a Description or there may be one or a plurality of descriptions. The Description may have a string data type. A user may presume the content of the broadcast service through the Description. More specifically, the broadcasting receiver 100 and the companion device 200 may represent the description of the broadcast service based on the Description.

The Genre indicates the genre of the broadcast service. There may not be a genre or there may be one or a plurality of genres. In a detailed embodiment, the Genre may have a string data type. A user may confirm the genre of the broadcast service. More specifically, the broadcasting receiver 100 and the companion device 200 may represent the genre of the broadcast service based on the Genre.

The Icon indicates an icon indicating the broadcast service. There may not be an icon or there may be one or a plurality of icons. The Icon may have a base 64-binary data type. A user may easily confirm the content of the broadcast service through the icon of the broadcast service. More specifically, the broadcasting receiver 100 and the companion device 200 may represent the icon of the broadcast service based on the Icon.

The Language indicates the primary language of the broadcast service. There may not be a language or there may be one or a plurality of languages. The Language may have a string data type. More specifically, the broadcasting receiver 100 and the companion device 200 may represent the language of the broadcast service based on the Language.

The UsageReportingInfo indicates usage report information related to the broadcast service. There may not be UsageReportingInfo or there may be one or a plurality of pieces of UsageReportingInfo. More specifically, the UsageReportingInfo may be used as a parameter for a usage information report. For example, the UsageReportingInfo may include at least one of a URL for a usage information report and a report period. A broadcast service provider may acquire usage information of the broadcast service and payment information of the broadcast service through the usage information report. More specifically, the broadcasting receiver 100 and the companion device 200 may report the usage information of the broadcast service based on the UsageReportingInfo.

The Targeting indicates the targeting properties of the broadcast service. There may not be a targeting property or there may be one or a plurality of targeting attributes. More specifically, the Targeting may have a string data type. More specifically, the Targeting may indicate whether the broadcast service is for the primary device such as the broadcasting receiver 100 or for the companion device 200. If the broadcast service is for the companion device 200, the broadcasting receiver 100 may deliver the XML schema received from the service provider to the companion device 200. More specifically, the broadcasting receiver 100 and the companion device 200 may determine whether the broadcast service is displayed based on the Targeting.

The ServiceProtection indicates the protection properties of the broadcast service. There may not be ServiceProtection property or there may be one ServiceProtection property. More specifically, the ServiceProtection may have a string data type.

The AdvisoryRating indicates the advisory rating of the service. There may not be an AdvisoryRating or there may be one or a plurality of AdvisoryRatings. More specifically, the AdvisoryRating may have a string data type. More specifically, the broadcasting receiver 100 and the companion device 200 may interrupt the broadcast service based on the advisory rating and personalization information. A user may not select an undesired service through the AdvisoryRating information. A user may interrupt a service of a specific rating through personalization.

The ComponentItem indicates information on a media component included in the broadcast service. Here, the component means content and indicates information on content provided by the service corresponding to service information. One ComponentItem may have information on one piece of content. More specifically, the ComponentItem may include at least one of componentId, ComponentType, ComponentName, StartTime, Duration, TargetScreen, URL, ContentAdvisory and Genre.

The ComponentId indicates an identifier for identifying the media component. More specifically, there may be one componentId. The ComponentId is a unique identifier of the component in a service range corresponding to service information. More specifically, the ComponentId may have an unsigned data type. More specifically, the broadcasting receiver 100 and the companion device 200 may identify the media component based on the ComponentId.

The ComponentType indicates the type of the media component. More specifically, there may be one ComponentType. The ComponentType may have a string data type. More specifically, the broadcasting receiver 100 and the companion device 200 may represent the type of the media component based on the ComponentType.

The ComponentName indicates the name of the media component. More specifically, there may not be ComponentName or there may be one or a plurality of ComponentNames. The ComponentName may have a string data type. More specifically, the broadcasting receiver 100 and the companion device 200 may represent the name of the media component based on the ComponentName.

The StartTime indicates the start time of the media component. More specifically, there may not be StartTime or there may be one StartTime. More specifically, the StartTime may have an unsigned short data type. More specifically, the broadcasting receiver 100 and the companion device 200 may determine the start time of the media component based on the StartTime.

The Duration indicates the presentation duration of the media component. More specifically, there may not be a duration or there may be one duration. More specifically, the Duration may have an unsigned short data type. More specifically, the broadcasting receiver 100 and the companion device 200 may determine the presentation duration of the media component based on the Duration.

The TargetScreen indicates a target screen of the media component. More specifically, there may not be a target screen or there may be one or a plurality of target screens. More specifically, the TargetScreen may have a string data type. More specifically, the broadcasting receiver 100 and the companion device 200 may determine whether the media component needs to be presented based on the TargetScreen. The TargetScreen indicates whether the component is for the primary device (PD) including the broadcasting receiver 100 or the companion device (the companion device (CD)). If the component is for the CD, the PD may deliver the XML schema received from the service provider to the CD. In a detailed embodiment, the TargetScreen may indicate that there is no CD corresponding to the media component or that the media component is for all devices. In addition, the TargetScreen may indicate that the media component is for any one of a smartphone, a tablet PC, a TV and a PC. More specifically, the TargetScreen attribute of the component information of the service signaling information received by the PD from the broadcaster or the content provider may be designated and used as in the embodiment of FIG. 111. In the embodiment of FIG. 111, if the value of the TargetScreen is 0x00, this may mean a reserved URI. The TargetScreen may indicate that there is no CD corresponding to the media component. At this time, the URI may identify a resource of a remote server capable of downloading information on a companion device application. In this case, the broadcasting receiver may recognize the URI as a location and acquire the resource from the location. If the value of the TargetScreen is 0x01, the TargetScreen may indicate that the media component is targeted at all device classes. Here, the TargetScreen may be a generic URI. If the value of the TargetScreen is 0x02, the TargetScreen may indicate that the media component is targeted at a smartphone class. Here, the TargetScreen may be a specific URI. If the value of the TargetScreen is 0x03, the TargetScreen may indicate that the media component is targeted at a tablet PC class. Here, the TargetScreen may be a specific URI. If the value of the TargetScreen is 0x04, the TargetScreen may indicate that the media component is targeted at a TV class. Here, the TargetScreen may be a specific URI. If the value of the TargetScreen is 0x05, the TargetScreen may indicate that the media component is targeted at a PC class. Here, the TargetScreen may be a specific URI.

The URL may indicate an address for receiving the media component. More specifically, there may not be URL or there may be one or a plurality of URLs. More specifically, the URL may have a URL data type. More specifically, the URL may indicate the address of the content/signaling server 400. More specifically, the broadcasting receiver 100 and the companion device 200 may receive the media component based on the URL.

The ContentAdvisory indicates the advisory rating of the media component. If the value of the ContentAdvisory conflicts with the AdvisoryRating, the value of ContentAdvisory may have higher priority. More specifically, there may not be a ContentAdvisory or there may be one or a plurality of pieces of ContentAdvisory. More specifically, the ContentAdvisory may have a string data type. More specifically, the broadcasting receiver 100 and the companion device 200 may determine whether the media component is presented based on the ContentAdvisory.

The Genre indicates the genre of the media component. More specifically, there may not be genre or there may be one or a plurality of genres. The Genre may have a string data type. More specifically, the Genre may have a string data type. If the Genre conflicts with the Genre of the serviceInfo level, the Genre information of the component level may be set to have a higher priority. If the Genre conflicts with the Genre indicating the genre of the service, the Genre indicating the genre of the media component may have a higher priority. More specifically, the broadcasting receiver 100 and the companion device 200 may represent the genre of the media component based on the Genre.

Next, a protocol applicable between the PD and the CD will be described. One embodiment of the present invention is not limited to a specific protocol.

A. In the present invention, device-to-device communication is represented by exchange of a message, a command, a call, an action or a request/response.

B. In the present invention, in order to stably deliver a message used upon device-to-device communication to a desired target device, various protocols such as Internet protocol (IP), Internet control message protocol (ICMP), and Internet group management protocol (IGMP) are applicable, without being limited to a specific protocol.

C. In the present invention, in order to stably deliver a message used upon device-to-device communication, control a message flow, solve collision or congestion among a plurality of messages or support multiplexing, various protocols such as transmission control protocol (TCP), user datagram protocol (UDP), datagram congestion control protocol (DCCP) and stream control transmission protocol (SCTP) are applicable without being limited to a specific protocol.

D. In the present invention, in order to deliver a variety of information included in a message used upon device-to-device communication for various purposes, various protocols such as hypertext transfer protocol (HTTP), real-time transport protocol (RTP), extensible messaging and presence protocol (XMPP) and file transfer protocol (FTP) are applicable without being limited to a specific protocol.

E. In the present invention, when a message used upon device-to-device communication is delivered through the various protocols, desired message data may be included and delivered in the various message components such as a message header or a message body among the message components defined in each protocol without being limited to a specific message component.

F. In the present invention, when a message used upon device-to-device communication is delivered through the various protocols, data to be delivered may be delivered in various types defined in each protocol (string, integer, floating point, Boolean, character, array, list, etc.). In order to structurally express, deliver and store complex data, a markup format such as extensible markup language (XML), hypertext markup language (HTML), extensible hypertext markup language (XHTML), javascript object notation (JSON), etc. or a text or image format is applicable without being limited to a specific format.

G. In the present invention, data included in a message used upon device-to-device communication may be delivered by applying various data compression technologies such as "gzip" (RFC 1952), "deflate" (RFC 1950), "compress" (RFC 2616), without being limited to specific technology.

A UPnP protocol which is a device-to-device communication protocol applied to the embodiment of the present invention is a device-to-device communication protocol which is a combination of TCP/IP and UDP-HTTP among technologies of various layers of B to G.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method. This will be described with reference to the figure related to a UPnP action mechanism.

As another embodiment, device-to-device communication proposed by the present invention is applicable without defining an action name, when several methods such as GET, HEAT, PUT, DELETE, TRACE, OPTIONS, CONNECT and PATCH are used in addition to POST among HTTP methods and a plurality of URIs accessing the communication target device is defined. Data which needs to be delivered may be appended to a corresponding URI or may be included in an HTTP body in various formats. This will be described below with reference to the figure related to an REST MECHANISM. The plurality of URIs necessary for such an REST mechanism may be acquired in a discovery or description process.

All UPnP actions proposed by the present invention are applicable through various combinations of technologies of various layers of B to G and all proposals of the present invention are not limited to the UPnP protocol.

As described above, the broadcasting receiver 100 and the companion device 200 may interoperate through at least one of a home network, a mobile communication network such as 3GPP and an HTTP proxy server. At this time, communication between the broadcasting receiver 100 and the companion device 200 may be performed using various protocols. More specifically, communication between the broadcasting receiver 100 and the companion device 200 may be performed using a universal plug and play (UPnP) protocol.

UPnP distinguishes between a control point (CP) and controlled devices (CDs). The control point controls the controlled devices using the UPnP protocol. In a detailed embodiment, the broadcasting receiver 100 may be one of the controlled devices. In addition, the companion device 200 may be a control point. In UPnP, discovery, description, control and eventing protocols are defined. The discovery protocol refers to a protocol for enabling a control point to find controlled devices. The description protocol refers to a protocol for enabling a control point to acquire information on controlled devices. The control protocol refers to a protocol for enabling a control point to invoke a predetermined action with respect to controlled devices. The eventing protocol refers to a protocol for enabling a controlled device to deliver asynchronous notifications to a control point. The broadcasting receiver 100 and the companion device 200 according to the embodiment of the present invention may interoperate with at least one of the discovery, description, control and eventing protocols of the UPnP protocol. For example, the broadcasting receiver 100 may find the companion device 200 using the discovery protocol.

Figure 112:
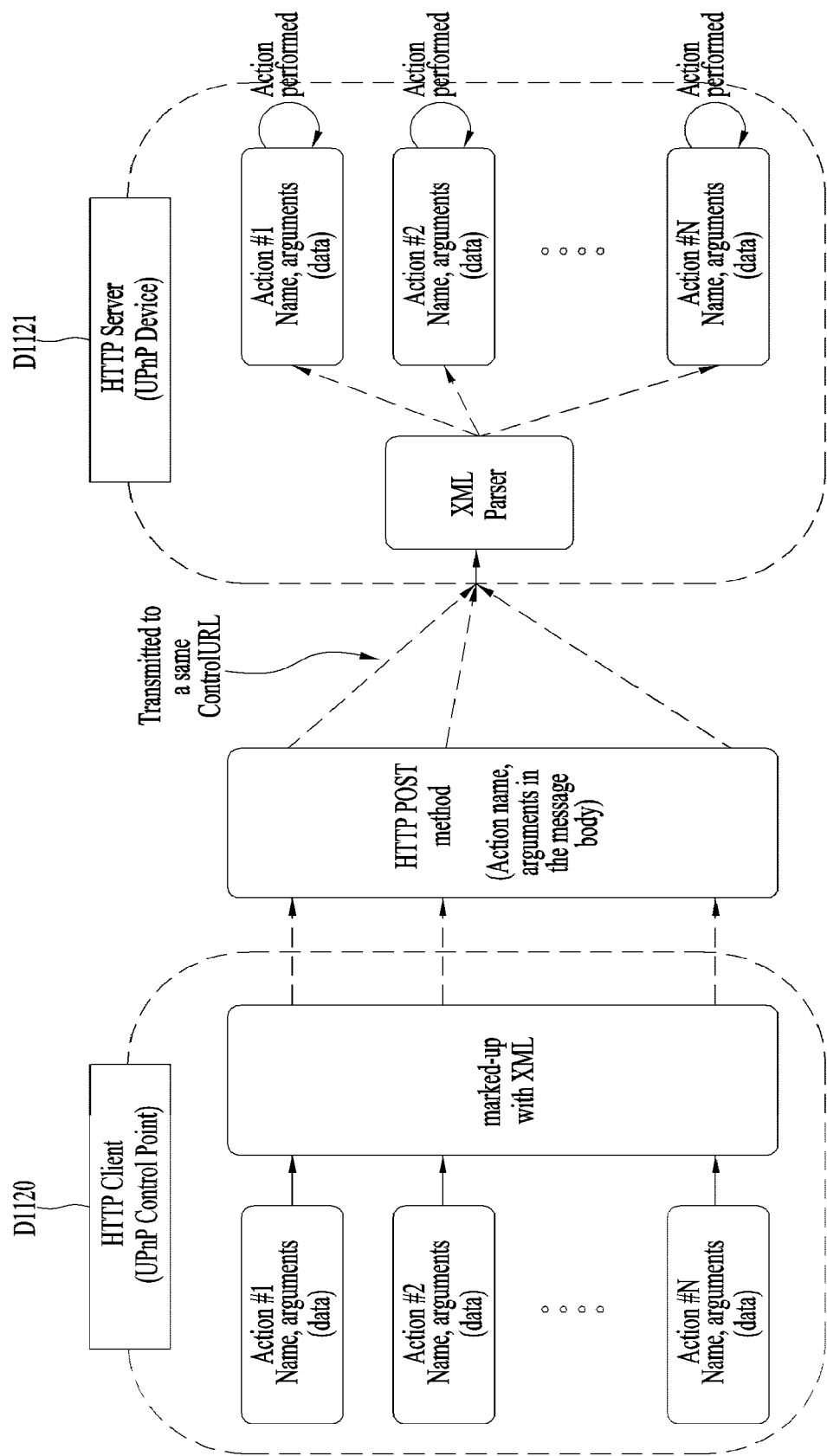
FIG. 112 is a view showing a UPnP action mechanism according to an embodiment of the present invention.

FIG. 112 is a view showing a UPnP action mechanism according to an embodiment of the present invention.

The UPnP protocol which is a device-to-device communication protocol applied to the embodiment of the present invention is a device-to-device communication protocol obtained by combining TCP/IP and UDP-HTTP.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method.

An HTTP client D1120 is a UPnP control point and may control an HTTP server D1121. At this time, the HTTP server may operate as a UPnP device. The HTTP client D1120 may define each action using a name and arguments in order to deliver various actions. At least one action may include a name corresponding to an identifier and arguments corresponding to data. As shown in the figure, each of action 1 to action N may include a name and arguments, which may be described in XML. The described XML message may be delivered to the HTTP server D1121 using an HTTP POST method. The name and arguments of each action may be included and delivered in the body of an HTTP POST message. At this time, the HTTP POST message including at least one action may be delivered to the same controlURL and each action may be identified by the name.

The HTTP server D1121 may parse the XML message included in the received HTTP POST message using an XML parser. The HTTP server D1121 may identify at least one action included in the XML message and perform actions according to the arguments of each action.

Figure 113:
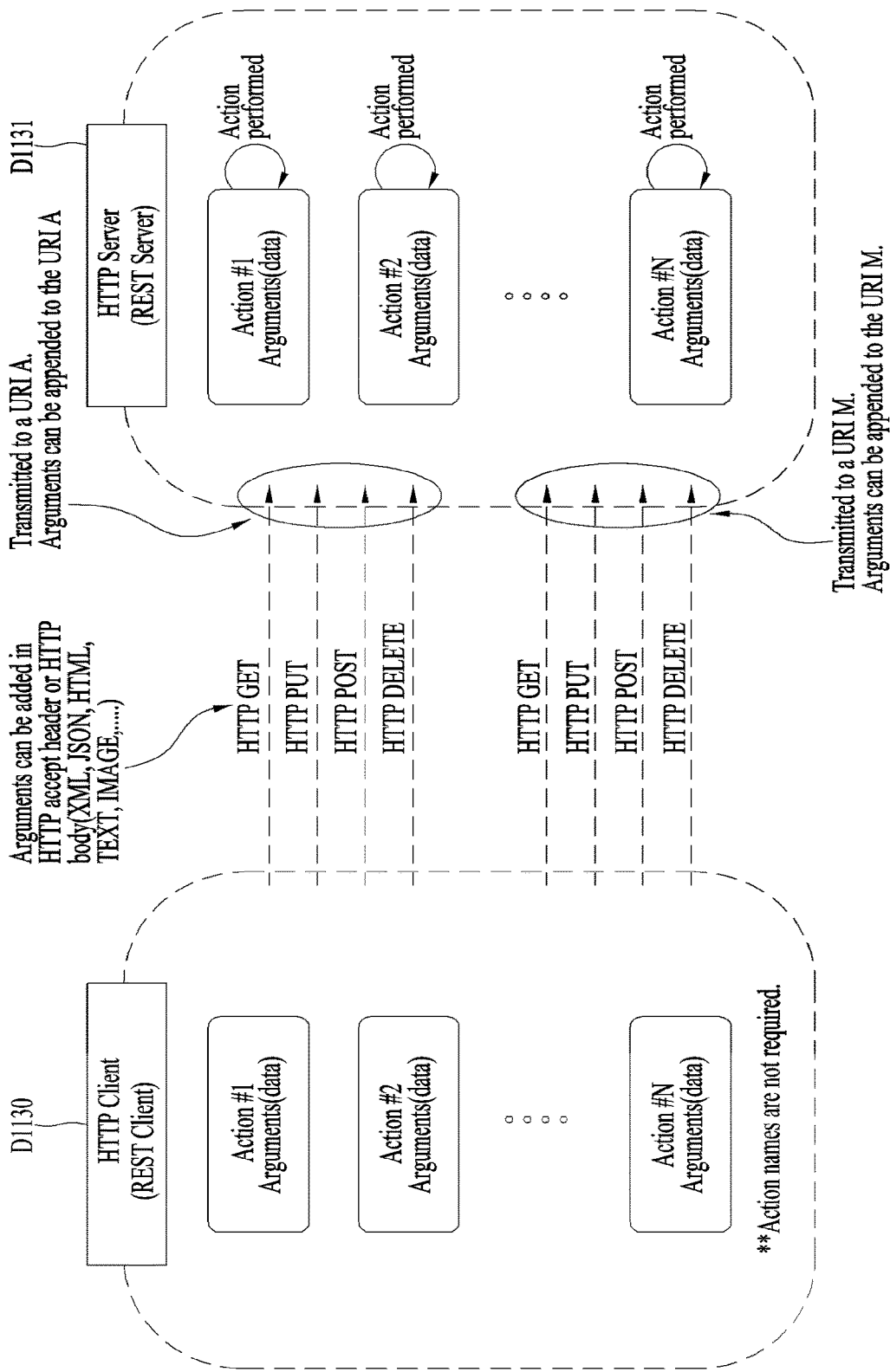
FIG. 113 is a view showing a representational state transfer (REST) action mechanism according to an embodiment of the present invention.

FIG. 113 is a view showing a representational state transfer (REST) action mechanism according to an embodiment of the present invention. As another embodiment, device-to-device communication proposed by the present invention is applicable without defining an action name, when several methods such as GET, HEAT, PUT, DELETE, TRACE, OPTIONS, CONNECT and PATCH are used in addition to POST among HTTP methods and a plurality of URIs accessing the communication target device is defined. Data which needs to be delivered may be appended to a corresponding URI or may be included in an HTTP body in various formats. The plurality of URIs necessary for such an REST mechanism may be acquired in a discovery or description process.

An HTTP client D1130 is an REST client and may control an HTTP server D1131. At this time, the HTTP server may operate an REST server. The HTTP client D1130 may define each action using arguments in order to deliver various actions. Here, the above-described name is not required. The arguments of each action may correspond to data. As shown in the figure, each of action 1 to action N may include arguments. Each action may be delivered to the HTTP server D1131 using HTTP GET, HTTP PUT, HTTP POST, and HTTP DELETE methods. The arguments of each action may be added to an HTTP acceptalbeheader or HTTP body. Here, the HTTP body may be described in XML, JSON, HTML, TEXT or IMAGE. Each HTTP method is transmitted to a URI and a plurality of URIs may be defined with respect to a plurality of actions. The plurality of URIs may be used to access one HTTP server D1131.

HTTP server D1131 may receive actions using the plurality of URIs and perform the received actions. Therefore, each action may be delivered from the HTTP client D1130 to the HTTP server D1131 without the NAME identifier.

FIG. 114 is a view showing service signaling messages of a broadcast receiving device and a companion device using an eventing method according to an embodiment of the present invention.

The eventing method may be based on the UPnP protocol. A service type and a service ID defined in the eventing method are shown in (a) of FIG. 114. That is, the service type of service signaling may be atsc3.0servicesignaling:1 and the service ID may be defined as urn:atsc.org:serviceId:atsc3.0servicesignaling. The service type and the service ID may have different values according to transmission method.

The broadcast receiving device 100 may transmit the properties of a broadcast service to the companion device 200 using one variable indicating the properties of the broadcast service. One variable indicating the properties of the broadcast service may include the properties of a current broadcast service. More specifically, in the embodiment shown in (b) of FIG. 114, the properties of the broadcast service may be transmitted using a variable "ServiceProperty". In an embodiment, ServiceProperty is a required variable and may have a string data type. For example, ServiceProperty may be described in XML, JSON, HTML or TEXT. That is, ServiceProperty may correspond to ServiceInfo defined in XML schema of the above-described Service Signaling Service. In an embodiment, ServiceProperty may not have an action related thereto.

In addition, the Service Signaling Service may have an action and an argument as shown in (c) and (d) of FIG. 114. A GetServiceProperty action may be used for the companion device 200 to acquire service property information of the currently provided service when the companion device 200 is connected to the broadcast receiving device 100 while a service is being provided by the broadcast receiving device 100. A GetServiceProperty argument may have the format shown in (d) of FIG. 114. The broadcast receiving device 100 may include and return information on the currently provided service in a ServiceProperty argument as a return value in response to the GetServiceProperty action from the companion device 200.

If subscription to the ServiceProperty is requested, the broadcast receiving device 100 may transmit a ServiceProperty to the companion device.

Figure 115:
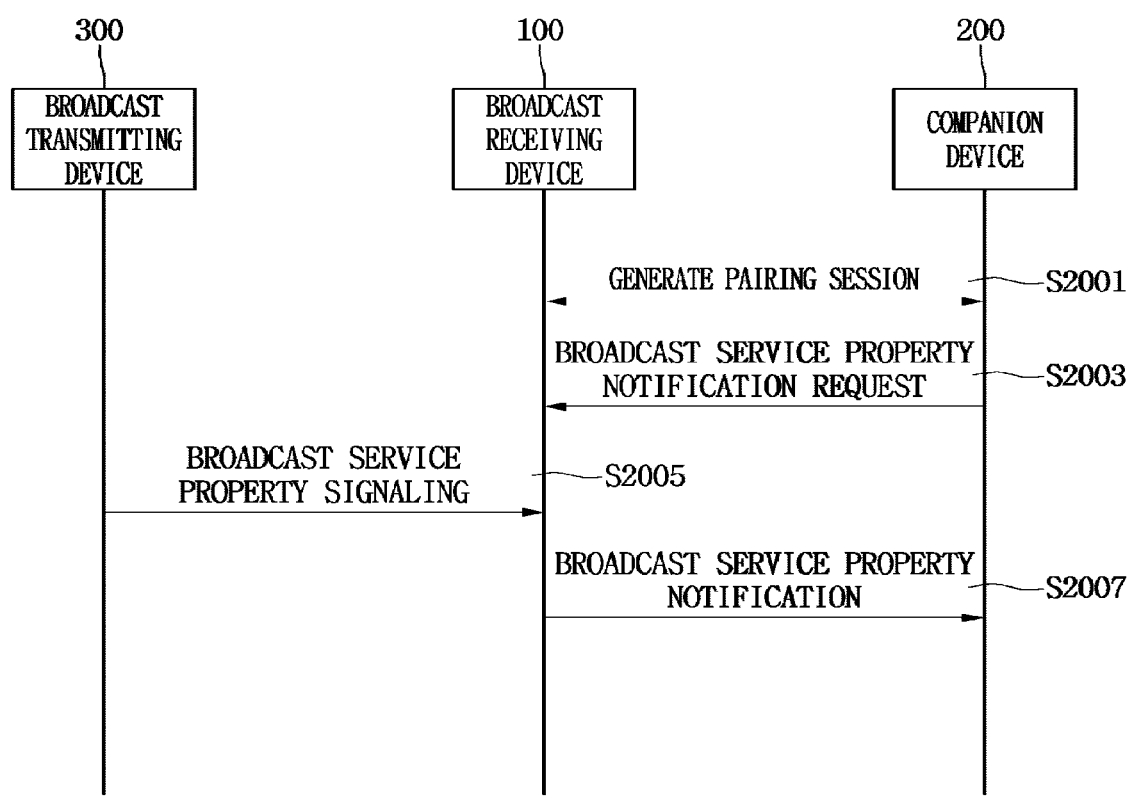
FIG. 115 is a ladder diagram showing operation for signaling a broadcast service property from a broadcast receiving device to a companion device according to an embodiment of the present invention.

FIG. 115 is a ladder diagram showing operation for signaling a broadcast service property from a broadcast receiving device to a companion device according to an embodiment of the present invention.

The broadcast receiving device 100 and the companion device 200 generate a pairing session (S2001). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. More specifically, the broadcast receiving device 100 and the companion device 200 may generate a pairing session using a UPnP protocol. In a detailed embodiment, the broadcast receiving device 100 may find the companion device 200 using the discovery protocol of a UPnP. For example, the broadcast receiving device 100 may multicast a discovery message for finding a companion device for interoperation through a well-known IP address. At this time, the companion device 200, which has received the multicast message, may request a description from the broadcast receiving device 100. The broadcast receiving device 100 may provide the description to the companion device 200 based on the request for the description of the companion device 200. The companion device 200 may access the broadcast receiving device based on the description. In another detailed embodiment, the companion device 200 may find the broadcast receiving device 100 using the discovery protocol of the UPnP. For example, the companion device 200 may multicast a message for finding the broadcast receiving device 100 for interoperation through a well-known IP address. At this time, the broadcast receiving device may respond to the multicast message using a discovery message. At this time, the companion device 200, which has received the discovery message, may request a description from the broadcast receiving device 100. The broadcast receiving device 100 may provide the description to the companion device 200 based on the request for the description of the companion device 200. The companion device 200 may access the broadcast receiving device 100 based on the description.

The companion device 200 may request broadcast service property notification from the broadcast receiving device 100 (S2003). More specifically, the companion device 200 may request broadcast service property notification from the broadcast receiving device 100 through a controller. More specifically, the companion device 200 may request broadcast service property notification from the broadcast receiving device 100 using a UPnP protocol. In a detailed embodiment, the companion device 200 may request subscription to an event for the broadcast service property from the broadcast receiving device 100 based on an eventing protocol.

The broadcast receiving device 100 receives information for signaling the broadcast service property based on the broadcast service (S2005). More specifically, the broadcast receiving device 100 may receive information for signaling the broadcast service property from the broadcast transmitting device 300 through a broadcast reception unit 110.

The broadcast receiving device 100 notifies the companion device 200 of the broadcast service property based on the information for signaling the broadcast service property (S2007). In the case of a UPnP based architecture, the broadcast service property may be notified according to the eventing protocol. More specifically, the broadcast receiving device 100 notifies the companion device 200 of the broadcast service property through a controller 150 based on the information for signaling the broadcast service property. More specifically, the broadcast receiving device 100 may determine whether the broadcast service property is changed. If the broadcast service property is changed, the broadcast receiving device 100 may notify the companion device 200 of the broadcast service property. In a detailed embodiment, the broadcast receiving device 100 may notify the companion device 200 of the broadcast service property through a variable indicating the broadcast service property. In a detailed embodiment, the variable indicating the broadcast service property may be the ServiceProperty of FIG. 114. The data format of the variable indicating the broadcast service property will be described in detail with reference to FIG. 16.

FIG. 116 is a view showing the data format of a broadcast service property signaled from a broadcast receiving device to a companion device according to an embodiment of the present invention.

The data of the broadcast service property may be an XML as shown in FIG. 116. However, the data format of the broadcast service property is not limited thereto. That is, as shown in (a) of FIG. 116, the broadcast service property may be defined in a propertyset with respect to each property. In addition, as shown in (b) of FIG. 116, the broadcast service property may be defined as a ServiceID, a ServiceName, a Content ID, and a ContentName in the ServiceProperty. In addition, as shown in (c) of FIG. 116, the broadcast service property may be described such that a ServiceProperty (ServiceInfo) element and a ComponentItem element included therein include respective properties.

In the embodiment of FIG. 116, the data format of the broadcast service property may include all the properties of the broadcast service described with reference to FIG. 110. Accordingly, even when only some of the properties of the broadcast service are changed, the broadcast receiving device 100 should transmit all the properties of the broadcast service and the companion device 200 should receive all the properties of the broadcast service. In this case, the amount of data exchanged between the broadcast receiving device 100 and the companion device 200 increases. In addition, the companion device 200 should check which property of the broadcast service is changed. Accordingly, there is a need for a method of efficiently signaling the broadcast service property from the broadcast receiving device 100 to the companion device 200. This will be described with reference to FIGS. 117 to 119.

FIG. 117 is a view showing a variables indicating the state of a broadcast service property signaled from a broadcast receiving device to a companion device, an action for the broadcast service property and an action argument according to an embodiment of the present invention.

The service type and the service ID of the broadcast service signaled from the broadcast receiving device to the companion device may be equal to those of the above-described embodiment. That is, the service type of service signaling may be atsc3.0servicesignaling:1 and the service ID may be defined as urn:atsc.org:serviceId: atsc3.0servicesignaling. The service type and the service ID may have different values according to the transmission method.

In another embodiment of the present invention, the variable indicating the broadcast service property may include at least one of a variable indicating a broadcast service property, a variable indicating a broadcast service property name and a variable indicating whether the broadcast service property is changed. More specifically, if the companion device 200 requests a specific broadcast service property, the broadcast receiving device 100 may transmit the broadcast service property based on the request of the companion device 200. More specifically, the broadcast receiving device 100 may transmit the specific broadcast service property requested by the companion device 200. For example, the broadcast receiving device 100 may notify the companion device 200 of whether the broadcast service property is changed through the variable indicating whether the broadcast service property is changed. At this time, the companion device 200 may request a necessary broadcast service property through the variable indicating the broadcast service property name. The broadcast receiving device 100 may notify the companion device of the broadcast service property through the variable indicating the broadcast service property.

In a detailed embodiment, the variable indicating the broadcast service property may include any one of a ServiceProperty, a ServicePropertyName and a ServicePropertyChangeFlag. The ServiceProperty includes the broadcast service property. In a detailed embodiment, the ServiceProperty is a required variable and may have a string data type. In particular, the ServiceProperty may be described in XML.

The ServicePropertyName indicates the name of the broadcast service property. That is, this may indicate the name of the XML element as each field included in the ServiceProperty. The ServicePropertyName is a required variable and may have a string data type. In particular, the ServicePropertyName may be described in CSV. The variable ServicePropertyChangeFlag indicates whether the broadcast service property is changed. In a detailed embodiment, the ServicePropertyChangeFlag is a required variable and may have a Boolean data type or an integer type. The ServicePropertyChangeFlag is a variable indicating whether the service property is changed. If the ServicePropertyChangeFlag is of a Boolean data type, true indicates that the service property is changed and false indicates that the service property is not changed. Alternatively, if the ServicePropertyChangeFlag is of an integer type, the value thereof increases by 1 whenever the service property is changed and is evented. In addition, if the companion device 200 requests subscription to the ServicePropertyChangeFlag, the broadcast receiving device 100 may transmit the ServicePropertyChangeFlag to the companion device.

The companion device 200 may use an action called GetServiceProperty in order to request the broadcast service property through the variable indicating the name of the broadcast service property. The GetServiceProperty is a required action. At this time, the GetServiceProperty may have a ServiceProgpertyName as an input argument. In addition, the GetServiceProperty may have a ServiceProperty as an output argument. In a detailed embodiment, if the companion device 200 sets the broadcast service property to be acquired from the broadcast receiving device 100 to a SevicePropertyName and transmits a GetServiceProperty action, the companion device 200 may receive the broadcast service property corresponding to the ServicePropertyName as the ServiceProperty. That is, ServicePropertyName is an input argument and may be used when the companion device 200 acquires the service property value of a desired property name. The ServiceProperty may be used when the broadcast receiving device 100 returns service information, that is, a service property to the companion device 200 in response to the desired property name.

Figure 118:
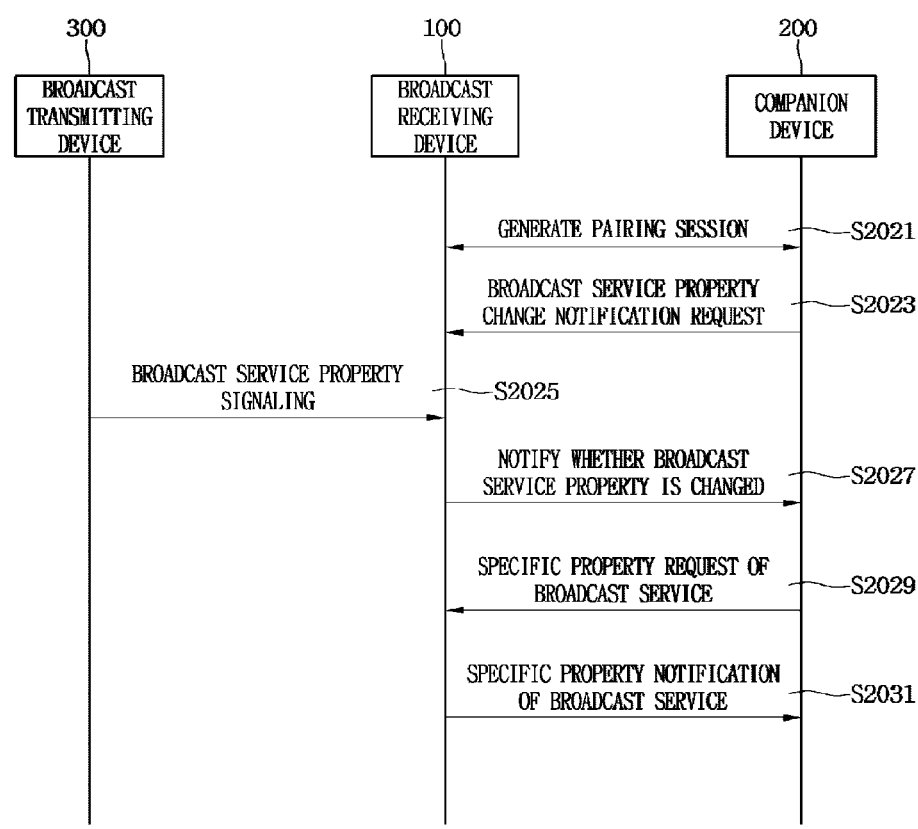
FIG. 118 is a ladder diagram showing operation for signaling a broadcast service property from a broadcast receiving device to a companion device according to another embodiment of the present invention.

FIG. 118 is a ladder diagram showing operation for signaling a broadcast service property from a broadcast receiving device to a companion device according to another embodiment of the present invention.

The broadcast receiving device 100 and the companion device 200 generate a pairing session (S2021). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (S2023). More specifically, the companion device 200 may request broadcast service property change notification from the broadcast receiving device 100 through a controller. Detailed operation of the companion device 200 may be equal to that of the above-described embodiment. That is, the companion device 200 may subscribe to the service signaling service of the broadcast receiving device 100.

The broadcast receiving device 100 receives information for signaling the broadcast service property from the broadcast receiving device 100 based on the broadcast service (S2025). More specifically, the broadcast receiving device 100 may receive information for signaling the broadcast service property from the broadcast receiving device 100 through a broadcast reception unit 110. A broadcast transmitting device 300 may notify the broadcast receiving device 100 that the service property is changed.

The broadcast receiving device 100 notifies the companion device 200 of whether the broadcast service property is changed based on the information for signaling the broadcast service property (S2027). In the case of a UPnP based architecture, the broadcast receiving device 100 may notify the companion device of whether the broadcast service property is changed according to an "eventing" protocol. More specifically, the broadcast receiving device 100 may notify the companion device 200 of whether the broadcast service property is changed based on the information for signaling the broadcast service property through a controller 150. More specifically, the broadcast receiving device 100 may determine whether the broadcast service property is changed. If the broadcast service property is changed, the broadcast receiving device 100 may notify the companion device 200 that the broadcast service property is changed. More specifically, the broadcast receiving device 100 may determine whether the broadcast service property is changed depending on whether the version of the information for signaling the broadcast service property is changed. In addition, in a detailed embodiment, the broadcast receiving device 100 may notify the companion device 200 of whether the broadcast service property is changed through the variable indicating whether the broadcast service property is changed. In a detailed embodiment, the variable indicating whether the broadcast service property is changed may be a ServicePropertyChangedFlag.

The companion device 200 requests a specific broadcast service property from the broadcast receiving device 100 (S2029). The companion device 200 may request a changed service property field using "GetServiceProperty" if the changed property field is an interesting field. At this time, the name of the changed service property field may be included in the ServiceProPertyName argument to make a request from the broadcast receiving device 100. For example, if the field to be acquired by the companion device 200 is a genre and a language, a request is made using GetServiceProperty ("genre, language").

The specific broadcast service property may be any one or a plurality of properties of the broadcast service properties included in the information for signaling the broadcast service property. The companion device 200 may request a specific broadcast service property from the broadcast receiving device 100 through a controller. More specifically, if the broadcast receiving device 100 transmits broadcast service property change notification, the companion device 200 may request the specific broadcast service property from the broadcast receiving device 100. At this time, the specific broadcast service property may be a broadcast service property necessary for the companion device 200 to provide supplementary services related to the broadcast service. In addition, the companion device 200 may request the specific broadcast service property based on the type of the changed broadcast service property. More specifically, the companion device 200 may request the specific broadcast service property if the specific broadcast service property is changed. The specific broadcast service property may be a property necessary for the companion device 200 to provide supplementary services related to the broadcast service. For example, if the companion device 200 determines whether the broadcast service is presented based on the targeting properties of the broadcast service, the companion device 200 may request the targeting properties of the broadcast service when the targeting properties of the broadcast are changed.

The broadcast receiving device 100 notifies the companion device 200 of the specific broadcast service property (S2031). That is, the companion device 200 may receive the changed field information from the broadcast receiving device 100 in response to the "GetServiceProperty" action. The ServiceProperty argument may be delivered to the companion device 200 as the output of the "GetServiceProperty" action. Here, the companion device 200 may receive information on the field for the specific property requested thereby. That is, the companion device 200 may receive information indicating that the changed genre is Sports and the language is KOR.

More specifically, the broadcast receiving device 100 may notify the companion device 200 of the specific broadcast service property through the controller 150. More specifically, the broadcast receiving device 100 may notify the companion device 200 of the specific broadcast service property based on the request of the companion device 200. For example, the broadcast receiving device 100 may transmit the specific broadcast service property requested by the companion device 200 to the companion device 200.

Such an embodiment may require continuous communication between the broadcast receiving device 100 and the companion device 200. In particular, if the broadcast receiving device 100 interoperates with a plurality of companion devices 200, continuous communication may cause overload of the operation of the broadcast receiving device 100. This problem may be solved by enabling the companion device 200 to receive the broadcast service property from the content/signaling server 400.

FIG. 119 is a view showing a data format indicating whether a broadcast service property signaled from a broadcast receiving device to a companion device is changed according to another embodiment of the present invention.

(a) to (c) of FIG. 119 show the data format indicating whether the broadcast service property is changed. Whether the broadcast service property is changed may be signaled using a ServicePropertyChangeFlag. The data format indicating whether the broadcast service property is changed may be XML. However, the data format indicating whether the broadcast service property is changed is not limited thereto. As the ServicePropertyChangeFlag, a ServicePropertyChangeFlag which is one type of the property information included in propertyset is used as shown in (a) of FIG. 119, a separate ServicePropertyChangeFlag may be transmitted as shown in (b) of FIG. 119 or data having a different format indicating true or false may be transmitted as shown in (c) of FIG. 119.

In a detailed embodiment, the broadcast receiving device 100 may notify the companion device 200 only of whether the broadcast service property is changed. In the embodiment of FIG. 119, the broadcast receiving device 100 may notify the companion device 200 of whether the broadcast service property is changed using a Boolean variable having a true value or a false value. For example, if the broadcast service property is changed, the broadcast receiving device 100 may transmit data, in which a variable indicating whether the broadcast service property is changed has a true value, to the companion device 200. Therefore, as compared to the above-described embodiment in which all data of the service property is always transmitted, since data is transmitted according to the request of the companion device 200 only when the service property is changed, efficient data transmission is possible.

(d) of FIG. 119 shows an embodiment of the ServiceProperty argument delivered to the companion device 200 as described above. As described above, if the companion device 200 requests genre and language fields, the companion device 200 may receive the changed information of the genre and language fields in XML as shown in the figure. That is, the companion device 200 may receive a ServiceProperty argument indicating that the changed genre is Sports and the language is KOR.

However, in this embodiment, the companion device 200 cannot check which broadcast service property is changed and may check only whether a broadcast service property is changed. Accordingly, the companion device 200 requests the broadcast service property even when an undesired broadcast service property is changed. Accordingly, this embodiment may cause unnecessary operation of the broadcast receiving device 100 and the companion device 200 and unnecessary data exchange. In order to solve this problem, the broadcast receiving device 100 needs to notify the companion device 200 of a changed broadcast service property.

FIG. 120 is a view showing a variable indicating the state of a broadcast service property signaled from a broadcast receiving device to a companion device according to another embodiment of the present invention.

The service type and the service ID information of the broadcast service signaled from the broadcast receiving device to the companion device may be equal to those of the above-described embodiment. That is, the service type of the service signaling may be atsc3.0servicesignaling:1 and the service ID may be defined as urn:atsc.org:serviceId: atsc3.0servicesignaling. The service type and the service ID may have different values according to the transmission method.

As shown in (a) of FIG. 120, the variable indicating the state of the broadcast service property may include service property information, service property name information, service property change information and service property location information.

The service property information and the service property name information may be equal to the above-described service property information and service property name information.

The service property change information may include a binary hexadecimal type unlike the above-described embodiment and indicate which information is changed. This will be described in detail below.

The companion device 200 may download the service property through a broadband network and the variable indicating the state of the broadcast service property may include the broadband location information. That is, the variable indicating the state of the broadcast service property is optional and may further include a ServicePropertyURL state variable. Here, the broadband location information may have an XML string or a URI format. The ServicePropertyURL may have the data format shown in (b) of FIG. 120 and may indicate the location of the service property information on the content server.

If the broadcast service property is changed, the broadcast receiving device 100 may notify the companion device 200 of the changed property and whether the broadcast service property is changed. To this end, the variable indicating the state of the broadcast service property may include information indicating the changed service property. To this end, the variable indicating whether the broadcast service property is changed may have a string type represented by a binary hexadecimal type. If a request for subscription to the ServicePropertyChangedFlag is made, the broadcast receiving device 100 may transmit the ServicePropertyChangedFlag to the companion device.

FIG. 121 is a view showing data format indicating whether a broadcast service property signaled from a broadcast receiving device to a companion device is changed according to another embodiment of the present invention.

Data indicating whether the broadcast service property is changed may mean a ServicePropertyChangeFlag. The data indicating whether the broadcast service property is changed may be described in XML. However, the data indicating whether the broadcast service property is changed is not limited thereto. The broadcast receiving device 100 may allocate a specific bit to the broadcast service property, set the bit to 1 if the broadcast service property is changed and set the bit to 0 when the broadcast service property is not changed. That is, each digit of a binary code may correspond to each property included in the service property. In one embodiment, the ServicePropertyChangeFlag may be defined in a propertyset. A hexadecimal value 90080004 which is the value of the ServicePropertyChangeFlag corresponds to a binary value "1001 0000 0000 1000 0000 0000 0100". At this time, the first four bits indicate the primary language, genre, advisory rating and targeting property of the broadcast service, respectively. In this case, the companion device 200 may confirm that the primary language and targeting property of the broadcast service are changed. The ServicePropertyChangeFlag value represented by the binary value may have a format in which a first service property matches an MSB and a second service property matches a next bit. In the above embodiment, it can be seen that, among the language, the genre, the advisory rating and the targeting property corresponding to 1001, the language and the targeting property are changed.

In addition, in another embodiment, the ServicePropertyChangeFlag may be present as an independent element and the value of the ServicePropertyChangeFlag may match the properties such as the language, the genre, the AdvisoryRating and the targeting in the ServiceProperty element. The hexadecimal value 90080004 which is the value of the ServicePropertyChangeFlag corresponds to a binary value of 1001 0000 0000 1000 0000 0000 0100. The first four bits of the binary value may respectively match properties such as the language, the genre, the AdvisoryRating and the targeting, and the language and targeting property having a value of 1 indicate that the language and the targeting property are changed. FIG. 122 is a view showing the variable indicating that the state of a broadcast service property signaled from a broadcast receiving device to a companion device is changed according to another embodiment of the present invention.

As shown in (a) of FIG. 122, the variable indicating the state of the broadcast service property may include service property information, service property name information, service property change information and service property location information.

The service property information and the service property name information may be equal to the above-described service property information and service property name information.

The service property change information may include a string (XML) type, a list-of-strings (XML) type or a CSV-of-strings type unlike the above-described embodiment and indicate which information of the service property information (ServiceProperty) is changed. This will be described in detail below.

As shown in (b) of FIG. 122, if the service property change information is of a string type (XML), the changed service property information (ServiceProperty) may be indicated using a changedfield in the service property change information (ServicePropertyChangeFlag). If the genre and the targeting information of the ServiceProperty are changed, the changedfield in the service property change information (ServicePropertyChangeFlag) may include the genre and the targeting property.

As shown in (c) of FIG. 122, if the service property change information is of a list-of-strings (XML) type, the service property change information (ServicePropertyChangeFlag) may include changed service property change information. If the genre and the targeting information of the ServiceProperty are changed, the service property change information may include the genre and the targeting property.

As shown in (d) of FIG. 122, if the service property change information is of a CSV (comma separated value)-of-strings type, the changed property of the service property change information may be distinguished by a comma and represented in a text file format. If the genre and the targeting information of the ServiceProperty are changed, the ServicePropertyChangeFlag may be represented by "genre", "targeting".

The property location information may have a string (XML) or a URI format. The property location information may be represented by a ServicePropertyURL and may indicate the location of the service property information on the content server. In some embodiments, the property location information may be optional.

(e) of FIG. 122 shows the format of service property data. As shown in the figure, the ServiceProperty data may include a language, a genre, an AdvisoryRating and a targeting. If the genre value of the service property is changed to MBC Music and the targeting value is changed to Pop Chart, the broadcast receiving device 100 may deliver a ServicePropertyChangeFlag including the genre and the targeting to the companion device 200 to indicate that the genre and the targeting are changed, as shown in (b) to (d) of FIG. 122.

Figure 123:
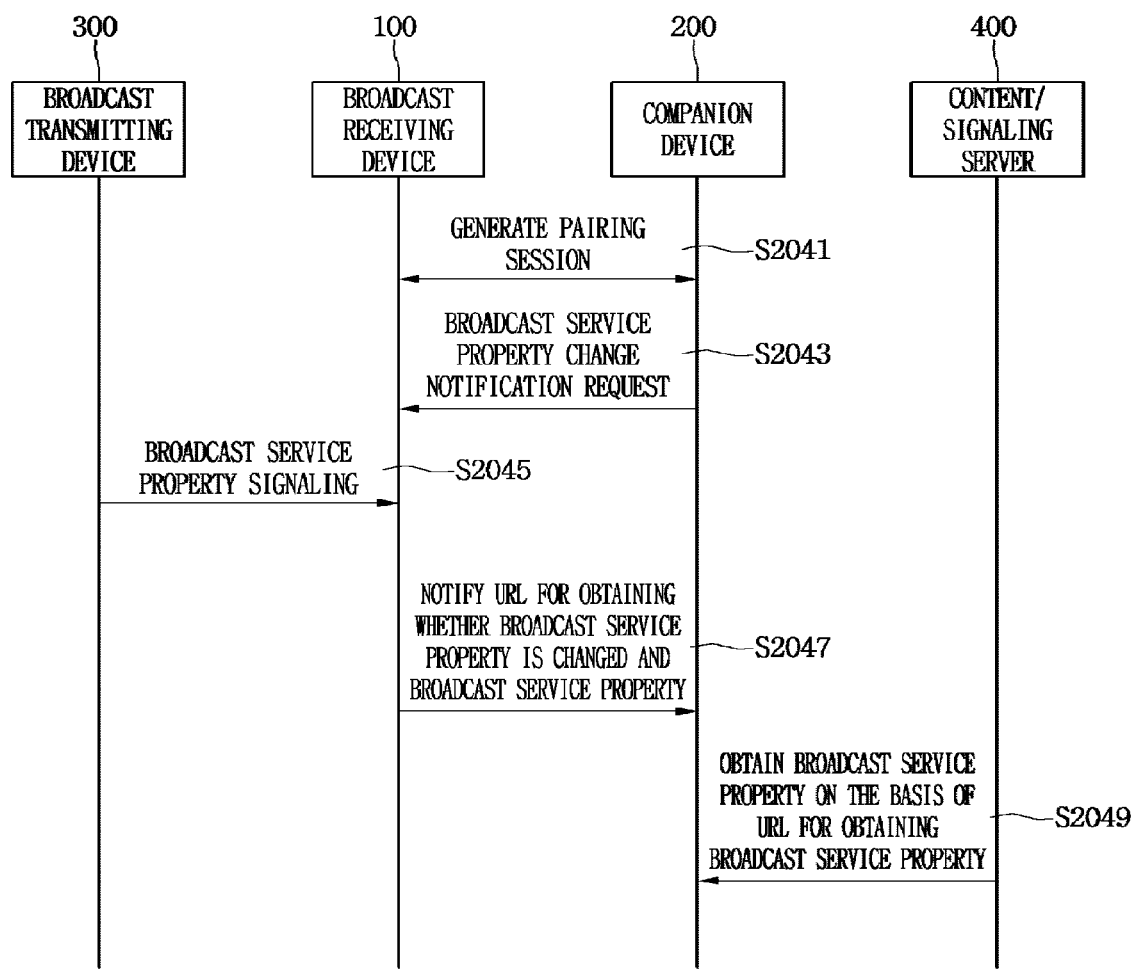

FIG. 123 is a ladder diagram showing operation for signaling a broadcast service property from a broadcast receiving device to a companion device according to another embodiment of the present invention.

The broadcast receiving device 100 and the companion device 200 generate a pairing session (S2041). More specifically, the broadcast receiving device 100 may generate a pairing session with the companion device 200 through an IP communication unit 130. More specifically, the companion device 200 may generate a pairing session with the broadcast receiving device 100 through a communication unit. As described above, the broadcast receiving device 100 and the companion device 200 may generate a pairing session for bidirectional communication. The detailed operation of the broadcast receiving device 100 and the companion device 200 may be equal to that of the embodiment of FIG. 118.

The companion device 200 requests broadcast service property notification from the broadcast receiving device 100 (S2043). More specifically, the companion device 200 may request broadcast service property notification from the broadcast receiving device 100 through a controller. The detailed operation of the companion device 200 may be equal to that of the embodiment of FIG. 118.

The broadcast receiving device 100 receives information for signaling the broadcast service property based on the broadcast service (S2045). More specifically, the broadcast receiving device 100 may receive the information for signaling the broadcast service property from a broadcast transmitting device 300 through a broadcast reception unit 110.

The broadcast receiving device 100 notifies the companion device 200 of whether the broadcast service property is changed and of a URL capable of acquiring the broadcast service property based on the information for signaling the broadcast service property (S2047). More specifically, the broadcast receiving device 100 may notify the companion device 200 of whether the broadcast service property is changed and of a URL capable of acquiring the broadcast service property based on the information for signaling the broadcast service property through the controller 150. Here, the URL may mean location information capable of acquiring service property information on a content server. More specifically, a ServicePropertyURL which is the above-described property location information may be used. In the case of a UPnP based architecture, the broadcast receiving device 100 may notify the companion device of the ServicePropertyURL according to an "eventing" protocol.

More specifically, the broadcast receiving device 100 may determine whether the broadcast service property is changed. More specifically, the broadcast receiving device 100 may determine whether the broadcast service property is changed depending on whether the version of the information for signaling the broadcast service property is changed. In addition, if the broadcast service property is changed, the broadcast receiving device 100 may notify the companion device 200 that the broadcast service property is changed and of the URL capable of acquiring the broadcast service property. In a detailed embodiment, the broadcast receiving device 100 may notify the companion device 200 of whether the broadcast service property is changed through a variable indicating whether the broadcast service property is changed. In a detailed embodiment, the variable indicating whether the broadcast service property is changed may be the ServicePropertyChangeFlag of FIG. 120. In addition, the broadcast receiving device 100 may notify the companion device 200 of whether the broadcast service property is changed through the variable indicating the URL capable of acquiring the broadcast service property. In a detailed embodiment, the variable indicating the URL capable of acquiring the broadcast service property may be the above-described ServicePropertyURL.

The companion device 200 acquires the broadcast service property based on the URL capable of acquiring the broadcast service property (S2049). More specifically, the companion device 200 may acquire the broadcast service property based on the URL capable of acquiring the broadcast service property through a controller. More specifically, the companion device 200 may acquire the broadcast service property from the content/signaling server 400 based on the URL capable of acquiring the broadcast service property. More specifically, the companion device 200 may request the broadcast service property from the content/signaling server 400 based on the URL capable of acquiring the broadcast service property and acquire the broadcast service property from the content/signaling server 400. Therefore, it is possible to reduce the load of the broadcast receiving device 100 due to communication between the broadcast receiving device 100 and the companion device 200. However, in this case, the broadcast receiving device 100 should notify the companion device whether the broadcast service property is changed even when the broadcast service property which is not required by the companion device 200 is changed. Accordingly, the broadcast receiving device 100 should perform unnecessary operation. If the companion device 200 pre-sets a necessary broadcast service property upon requesting notification from the broadcast receiving device 100, the unnecessary operation of the broadcast receiving device 100 can be reduced. This will be described with reference to FIGS. 122 to 123.

FIG. 124 is a view showing a variable indicating the state of a broadcast service property signaled from a broadcast receiving device to a companion device according to another embodiment of the present invention. In this embodiment, the broadcast receiving device 100 may notify the companion device 200 of only updated property names.

The service type and the service ID signaled from the broadcast receiving device to the companion device may be equal to those of the above-described embodiment. That is, the service type of service signaling may be atsc3.0servicesignaling:1 and the service ID may be defined as urn:atsc.org:serviceId:atsc3.0servicesignaling. The service type and the service ID may have different values according to transmission method.

(a) of FIG. 124 shows the variable indicating the state of the broadcast service property. The variable indicating the state of the broadcast service property may include a service property variable, a service property name variable, an updated service property variable and an updated property name variable.

The service property variable may be represented by a ServiceProperty. The service property variable is equal to the above-described service property variable and, in the present embodiment, an eventing method may not be used.

The service property name variable may be expressed by an A_ARG_TYPE_ServicePropertyName. The service property name variable is a state variable associated with a ServicePropertyName which is an input argument of a GetServicePropertyValue action.

The updated service property variable may be represented by an A_ARG_TYPE_UpdatedServicePropertyValue. The updated service property variable is a state variable associated with an UpdatedServiceProperty which is an output argument of a GetServicePropertyValue action.

The updated property name variable may be represented by UpdatedPropertyNames. The updated property name variable may indicate the names of the service properties. This may be delivered from the broadcast receiving device to the CD using the eventing method and the data format may be equal to (b) or (c) of FIG. 124.

That is, as shown in (b) of FIG. 124, the updated property name variable may include the name of the changed property in the property list. For example, the updated property name variable may include property names such as ContentId, ContentName and MajorChanNum.

In addition, in another embodiment, as shown in (c) of FIG. 124, the updated property name variable may also include information on a method of updating the property names. For example, the name of an added property may be included in an added syntax, the name of a modified property may be included in a modified syntax and the name of a deleted property may be included in a deleted syntax.

FIG. 125 is a view showing an action for acquiring a broadcast service property according to an embodiment of the present invention.

A GetServiceProperty shown in (a) of FIG. 125 is a required action and may be used for the companion device 200 to acquire service property information which is being provided by the broadcast receiving device 100. This is an action used for the companion device 200 to initially acquire currently provided service property information if the companion device 200 is connected to the broadcast receiving device 100 while the service is currently being provided by the broadcast receiving device 100.

A GetServicePropertyValue is a required action and may be used for the companion device 200 to acquire a value of a specific service property name.

(b) of FIG. 125 shows an output argument for a GetServiceProperty action. In response to the GetServiceProperty action from the companion device 200, the broadcast receiving device 100 may include and return the currently provided service information in a ServiceProperty argument as a return value.

(c) of FIG. 125 shows input and output arguments for a GetServicePropertyValue action. The companion device 200 may use a ServicePropertyName argument in order to acquire a value corresponding to a specific property among property names acquired through a GetServicePropertyNames action. That is, the companion device 200 may include and transmit a ServicePropertyName in a GetServicePropertyValue action as an input argument and return the value of the corresponding property as a ServiceProperty.

The embodiment of the ServicePropertyName input argument is as follows.

GetServicePropertyValue ("ContentId, ContentName, MajorChanNum").

(d) of FIG. 125 shows the embodiment of the output argument of an UpdatedServicePropertyValue. That is, the UpdatedServicePropertyValue may include the values of ContentId, ContentName and MajorChanNum in propertyList.

Figure 126:
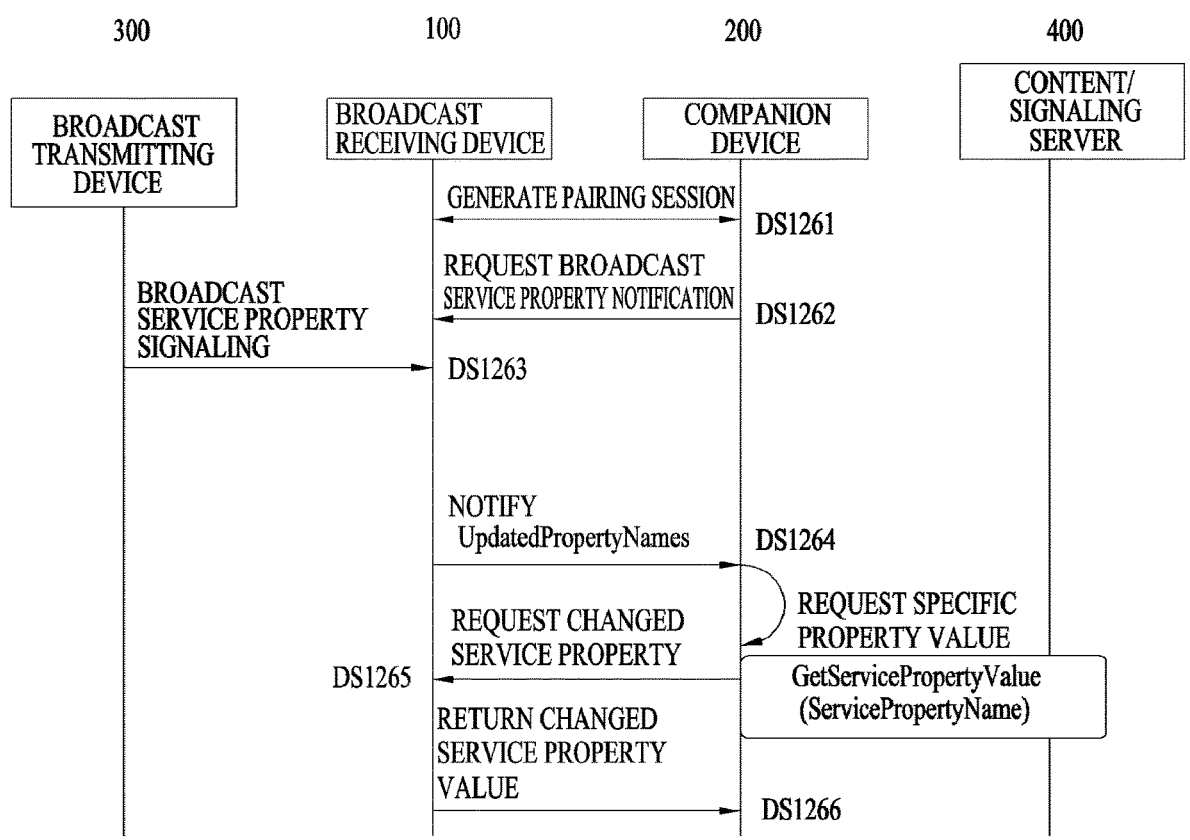

FIG. 126 is a ladder diagram showing operation for signaling a broadcast service property from a broadcast receiving device to a companion device according to another embodiment of the present invention. In this embodiment, an updated property name variable and a GetServicePropertyValue among the variables indicating the state of the broadcast service property may be used.

The broadcast receiving device 100 and the companion device 200 generate a pairing session (DS1261). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (DS1262). More specifically, the companion device 200 may request broadcast service property notification from the broadcast receiving device 100 through a controller. Detailed operation of the companion device 200 may be equal to that of the above-described embodiment.

The broadcast receiving device 100 receives information for signaling the broadcast service property from the broadcast receiving device 100 based on the broadcast service (DS1263). More specifically, the broadcast receiving device 100 may receive information for signaling the broadcast service property from the broadcast transmitting device 300 through a broadcast reception unit 110. The broadcast transmitting device 300 may notify the broadcast receiving device 100 that the service property is changed. The broadcast receiving device 100 may change an existing broadcast service property based on the received broadcast service property. In addition, the broadcast receiving device 100 may change the variable indicating the state of the broadcast service property.

The broadcast receiving device 100 may notify the companion device 200 of an UpdatedPropertyNames state variable (DS1264). This may be notified according to an "eventing" protocol in the case of a UPnP based architecture. Here, the broadcast receiving device 100 may deliver only the changed property to the companion device 200 through UpdatedPropertyNames, if the service property is changed.

The companion device 200 may request the value of a changed service property (DS1264). That is, the companion device may request the value of a desired service property using a GetServicePropertyValue. The companion device 200 may include the name of a service property field, which desires to be acquired, in a ServicePropertyName argument and request the service property field from the broadcast receiving device 100. The companion device 200 may acquire a desired property value among the changed property fields. In addition, there may be a plurality of fields in which the companion device 200 is interested. For example, the companion device 200 may be interested in @advisoryRating and @language. If at least one of the plurality of interesting fields is changed, the companion device 200 requests and receives all changed fields.

For example, a request is made using a GetServiceProperty ("advisoryRating", "language"). The broadcast receiving device 100 may receive the GetServicePropertyValue from the companion device 200.

The companion device 200 may receive changed field information from the broadcast receiving device 100 in response to the "GetServicePropertyValue" action. An UpdatedServicePropertyValue argument may be delivered to the companion device 200 as an output of the "GetServicePropertyValue" action.

FIG. 127 is a view showing a variable indicating the state of a broadcast service property signaled from a broadcast receiving device to a companion device, an action for the broadcast service property and an action argument according to another embodiment of the present invention.

As shown in (a) of FIG. 127, the variable indicating the state of the broadcast service property may include a variable indicating the service property (ServiceProperty) and a variable indicating the name of the service property (ServicePropertyName). The ServiceProperty may be a required variable and represented in XML or JSON as a string type. The ServicePropertyName may be a required variable and represented in XML, JSON or CSV as a string type.

As shown in (b) of FIG. 127, an action for a broadcast service property may include a service property request action (GetServiceProperty) and a service property setting action (SetServiceProperty). The GetServiceProperty may be equal to the above-described action having the same name. The SetServiceProperty is a required action and may be used for the companion device to register the value of a desired property field with the broadcast receiving device.

The companion device 200 may specify a broadcast service property to be notified, while requesting broadcast service property change notification from the broadcast receiving device 100. To this end, the companion device 200 may include an action for specifying a broadcast service property to be notified. At this time, the action may have a variable indicating the broadcast service property to be notified as an input argument. Such an action may be the SetServiceProperty of the embodiment of FIG. 122. In a detailed embodiment, the SetServiceProperty may be a required action. In addition, the SetServiceProperty may have a ServicePropertyName indicating the type of the broadcast service property as an input argument. When the desired property field is delivered to and registered with the broadcast receiving device, the broadcast receiving device may notify the companion device that the registered field has changed through eventing only when the registered field is changed.

As shown in (c) of FIG. 127, the argument of the action for requesting the broadcast service property may include a ServicePropertyName and a ServiceProperty. For example, the GetServiceProperty argument may include the arguments of the ServicePropertyName and the ServiceProperty.

The ServicePropertyName may include and request the ServicePropertyName in the GetServiceProperty action as a parameter in order to acquire the value of the service property field desired by the companion device.

The ServiceProperty may be used when the values of the service property fields requested as the parameter of the GetServiceProperty action are returned.

As shown in (d) of FIG. 127, the argument of the action for setting the broadcast service property may include ServicePropertyName. For example, the SetServiceProperty argument may include a ServicePropertyName argument.

The ServicePropertyName may be an argument which may be delivered as the parameter of the SetServiceProperty action when the companion device registers desired service property fields with respect to the broadcast reception device.

Figure 128:
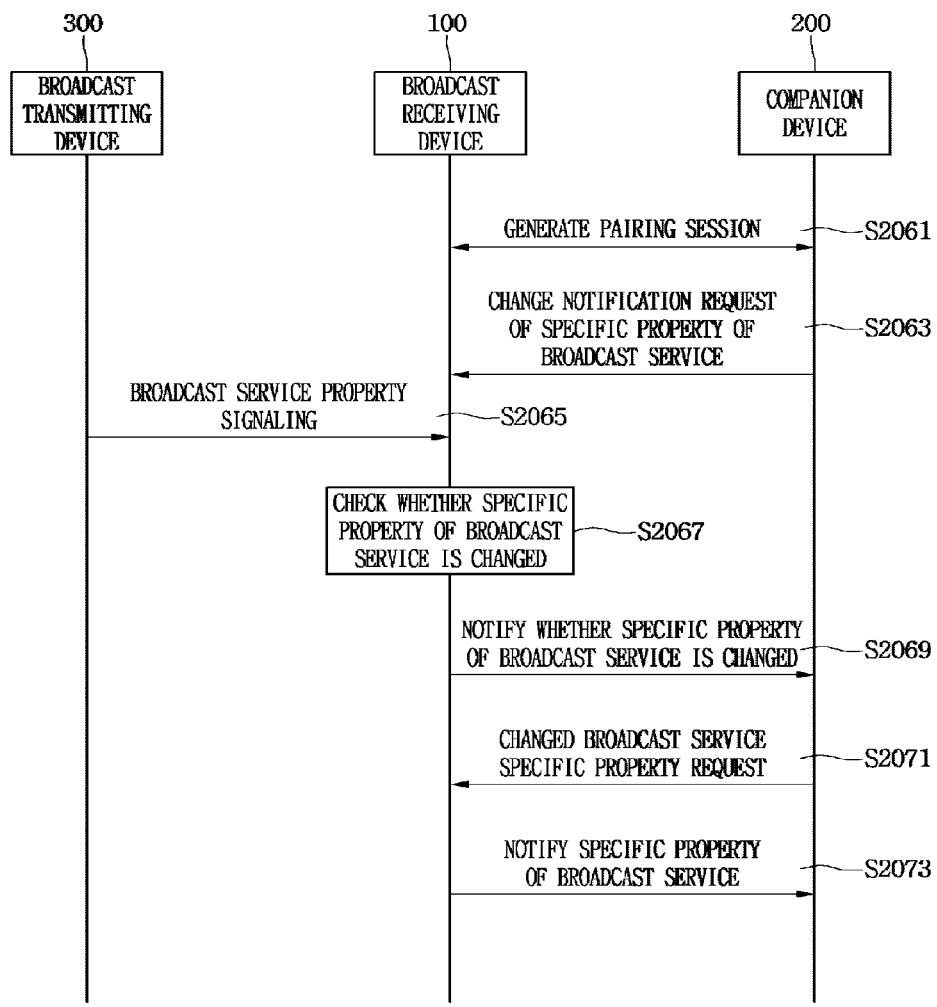

FIG. 128 is a ladder diagram showing operation for signaling a broadcast service property from a broadcast receiving device to a companion device according to another embodiment of the present invention.

The broadcast receiving device 100 and the companion device 200 generates a pairing session (S2061). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the embodiment of FIG. 121.

The companion device 200 may request specific broadcast service property change notification from the broadcast receiving device 100 (S2063). More specifically, the companion device 200 may request specific broadcast service property change notification from the broadcast receiving device 100 through a controller. The companion device 200 may request specific broadcast service property change notification necessary to provide supplementary information associated with the broadcast service. In a detailed embodiment, the companion device 200 may request specific broadcast service property change notification through an action for requesting only specific property change notification. At this time, an action for requesting only specific property change notification may be the above-described SetServiceProperty. Operation for requesting specific property change notification from the broadcast receiving device 100 at the companion device 200 may include the following operations. The companion device 200 may request subscription to service property change notification from the broadcast receiving device 100. The broadcast receiving device 100 may transmit an acceptance message and a subscription ID (SID) for identifying a subscription request to the companion device 200 if the request for subscription to service property change notification is accepted. The companion device 200 may request only specific broadcast service property change notification from the broadcast receiving device 100 based on the SID. More specifically, the companion device 200 may transmit a specific broadcast service property, change of which desires to be notified, along with the SID. At this time, the companion device may use the above-described SetServiceProperty action. In an embodiment, the SetServiceProperty( ) delivered from the companion device 200 to the broadcast receiving device 100 may be represented by SetServiceProperty (SID, "genre", "language"). That is, the SID, that is, a SessionID may also be transmitted as the parameter of the SetServiceProperty action.

As another embodiment, SetServiceProperty( ) delivered from the companion device 200 to the broadcast receiving device 100 may be represented by SetServiceProperty ("genre", "language"). Since the broadcast receiving device 100 may confirm the SID upon pairing with the companion device 200, the SID may not be transmitted as a separate parameter.

Since the SID of the companion device 200 is mapped to the ServicePropertyName, the broadcast receiving device 100 may notify the companion device 200 that the service property is changed like the following data format.

```
<?xml Version="1.0"?>
<ServiceProperty>
<genre>Sports</genre>
<language>KOR</language>
</ServiceProperty>
```

In addition, the companion device 200 may request notification of change of a plurality of specific properties of the broadcast service from the broadcast receiving device 100. At this time, the companion device 200 may request the plurality of specific properties of the broadcast service in the form of a list.

The broadcast receiving device 100 receives information for signaling the broadcast service property based on the broadcast service (S2065). More specifically, the broadcast receiving device 100 may receive information for signaling the broadcast service property from the broadcast transmitting device 300 through the broadcast reception unit 110.

The broadcast receiving device 100 checks whether the specific broadcast service property is changed (S2067). More specifically, the broadcast receiving device 100 may check whether the specific broadcast service property is changed through a controller 150. More specifically, the broadcast receiving device 100 may determine whether the specific broadcast service property is changed. More specifically, the broadcast receiving device 100 may compare previous and current values of the specific broadcast service property and determine whether the specific broadcast service property is changed.

If the specific broadcast service property is changed, the broadcast receiving device 100 notifies the companion device 200 of whether the specific broadcast service property is changed based on information for signaling the broadcast service property (S2069). More specifically, if the specific broadcast service property is changed, the broadcast receiving device 100 may notify the companion device 200 of whether the specific broadcast service property is changed based on information for signaling the broadcast service property through the controller 150.

The companion device 200 requests the specific broadcast service property from the broadcast receiving device 100 (S2071). More specifically, the companion device 200 may request the specific broadcast service property from the broadcast receiving device 100 through a controller. More specifically, if the broadcast receiving device 100 transmits specific broadcast service property notification, the companion device 200 may request the specific broadcast service property from the broadcast receiving device 100.

The broadcast receiving device 100 notifies the companion device 200 of the specific broadcast service property (S2073). The broadcast receiving device 100 may notify the companion device 200 of the specific broadcast service property through the controller 150. More specifically, the broadcast receiving device 100 may notify the companion device of the specific broadcast service property based on the request of the companion device 200. For example, the broadcast receiving device 100 may transmit the specific broadcast service property requested by the companion device 200 to the companion device 200.

In addition, the companion device 200 may acquire a URL capable of acquiring the broadcast service property and acquire the specific broadcast service property based on the URL capable of acquiring the broadcast service property, instead of acquiring the specific broadcast service property from the broadcast receiving device 100. Through such operation, it is possible to prevent the broadcast receiving device 100 from unnecessarily notifying the companion device 200 that the broadcast service property is changed.

The broadcast receiving device 100 may receive an emergency alert of natural disaster, terrorist attack or war through a broadcast network. In addition, the broadcast receiving device 100 may notify a user of the emergency alert of natural disaster, terrorist attack or war. Accordingly, several persons can rapidly and efficiently confirm national disaster. However, if a user does not continuously view the broadcast receiving device 100, the user may not confirm such an emergency alert. Even when the user does not continuously view the broadcast receiving device 100, the user is highly likely to always hold the companion device such as a mobile phone or a tablet. Accordingly, if the broadcast receiving device 100 transmits an emergency alert to the companion device 200 and the companion device 200 displays the emergency alert, the user can rapidly and efficiently confirm the national disaster.

Figure 129:
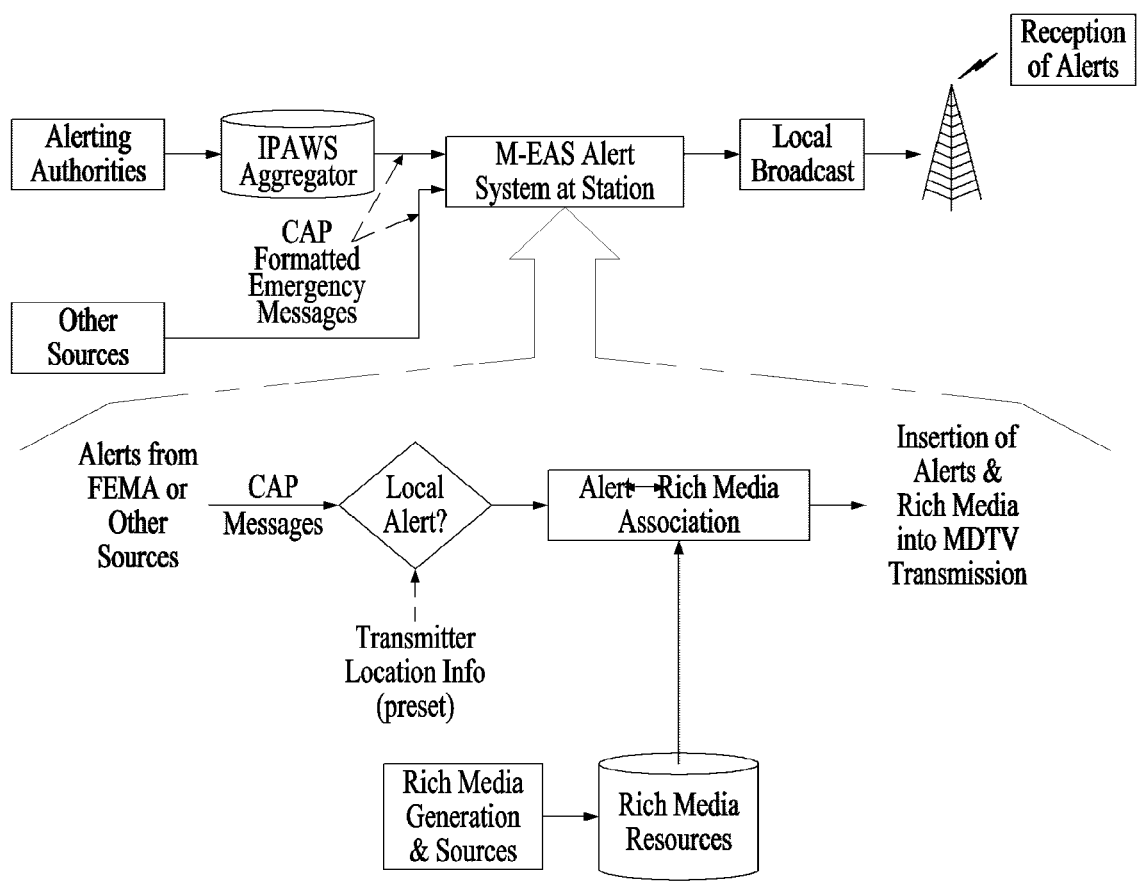

FIG. 129 is a view showing a process of generating and transmitting an emergency alert over a broadcast network according to an embodiment of the present invention.

An alert system for managing an emergency alert through a broadcast service enables authorities having rights to issue an emergency alert to input emergency information through an integrated public alert & warning system (IPWS) or to receive a common alerting protocol (CAP) message from the other sources. The alert system determines whether the CAP message corresponds to a current area. If the CAP message corresponds to the current area, the CAP message is inserted into a broadcast signal. Accordingly, the CAP message is transmitted through the broadcast signal. Operation for receiving the broadcast signal and transmitting the emergency alert to the user at the broadcast receiving device 100 will now be described.

Figure 130:
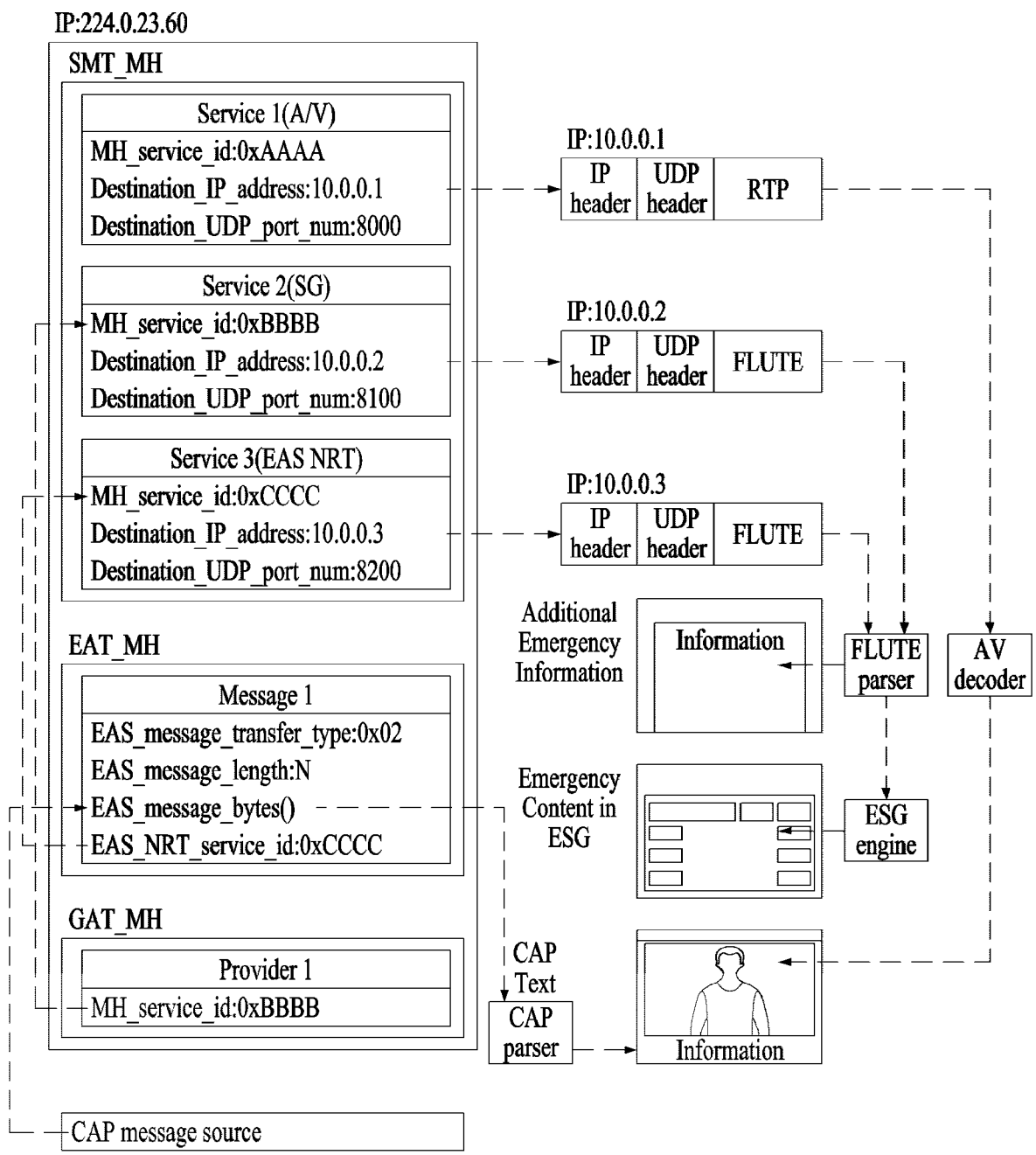

FIG. 130 is a view showing extraction and display of an emergency alert signaled by a broadcast receiving device over a broadcast network according to an embodiment of the present invention.

A broadcast transmitting device 300 may extract an emergency alert table (EAT) based on a broadcast signal and extract a CAP message from the EAT. In addition, the broadcast transmitting device 300 may acquire additional information related to the emergency alert based on a non-real-time service identifier included in the EAT. More specifically, the broadcast receiving device 100 may acquire the additional information related to the emergency alert based on an EAS_NRT_service_id field in the EAT. More specifically, the broadcast receiving device 100 may acquire information on a FLUTE session for transmitting the additional information related to the emergency alert from a table for signaling a non-real-time service based on the non-real-time service identifier included in the EAT. At this time, the table for signaling the non-real-time service may be a service map table (SMT). The broadcast receiving device 100 may receive the additional information related to the emergency alert from the FLUTE session based on the information on the FLUTE session. The broadcast receiving device 100 may receive an emergency alert and display the emergency alert in a service guide for displaying information on a broadcast service and a broadcast service program. More specifically, the broadcast receiving device 100 may extract a service identifier from a guide access table (GAT), extract information corresponding to the service identifier from the table for signaling the non-real-time service, and receive the emergency alert. In a detailed embodiment, the broadcast receiving device 100 may acquire the information on the FLUTE session of the service corresponding to the service identifier extracted from the GAT. Thereafter, the broadcast receiving device 100 may receive an emergency alert message based on the information on the FLUTE session and display the emergency alert message in the service guide. The format of the CAP is shown in FIG. 131.

FIG. 132 is a view showing a service type, a service ID, a variable indicating an emergency alert state, an emergency alert action and an action argument of an emergency alert service signaled by a broadcast receiving device according to an embodiment of the present invention.

The broadcast receiving device 100 may deliver an emergency alert message to the companion device 200 and the broadcast receiving device 100 may deliver the received message to the companion device 200 without change or deliver only some of the messages received by the broadcast receiving device 100 to the companion device 200.

A UPnP device type of an embodiment of the present invention may be "urmatsc.org"device:atsc3.0rcvr" and a service type of an EAS UPnP capable of receiving EAS data may be "urn:atsc.org:service:atsc3.0:eas:1".

As shown in (a) of FIG. 132, in an embodiment of the present invention, the service type of an emergency alert service signaled from the broadcast receiving device to the companion device may have a value of atsc3.0:atsc3.0eas:1. In addition, the Service ID information may have a value of urn:atsc.org:service:atsc3.0eas.

As a first embodiment, there is a method of delivering an emergency alert message received by a broadcast receiving device to a companion device without change. The broadcast receiving device may deliver the whole of the received message to the companion device. In this case, the companion device needs to parse the message according to Emergency Alert Message Type.

(b), (d) and (e) of FIG. 132 show the state variable, the action and the argument of the EAS UPnP service of the first embodiment.

As shown in (b) of FIG. 132, in the first embodiment, the state variable may include a variable (EmergencyAlert) indicating an emergency alert and a variable (EmergencyAlertProperty) indicating an emergency alert property. The EmergencyAlert is a required string type state variable and may be described in XML or JSON, like elements shown in (c) of FIG. 132. In (c) of FIG. 132, the EmergencyAlert may include received time information, message type information and version information.

The received time information may be represented by <dateTime> and may store information on a time when the broadcast receiving device receives the emergency message. The message type information may be represented by <messageType> and may indicate whether the message is of a CAP type or a CMAS type. The version information may be represented by <version> and indicate version information per message type.

The broadcast receiving device may receive and parse the emergency alert message and notify the companion device of the EmergencyAlert state variable in the above-described data format using the eventing protocol. Using the above-described element information, the companion device may parse the emergency alert message according to type.

The EmergencyAlertProperty state variable is a required string type state variable and may be represented in XML or JSON. The EmergencyAlertProperty may have information on the emergency alert property of the emergency alert service. That is, in addition to the type information of the message described in the embodiment of the above-described emergency alert message format, the EmergencyAlertProperty may have actual emergency alert message information. When the EmergencyAlertProperty is delivered to the companion device, an eventing protocol may or may not be used.

As shown in (d) of FIG. 132, the action of the first embodiment may include an action for requesting all emergency alert properties. This action may be represented by a GetAllEmergencyAlertProperty. This action is a required action and is used to acquire all emergency alert messages. This action may be used to acquire a changed emergency alert property. Since the action for requesting all emergency alert properties is used to acquire the content of the emergency alert message, the name of this action may be a GetAllEmergencyAlertMessage.

As shown in (e) of FIG. 132, the argument for the action of the first embodiment may include an emergency alert property. This may be represented by an EmergencyAlertProperty argument. In the above-described GetAllEmergencyAlertMessage, there may be an EmergencyAlertProperty argument. When the companion device uses a GetAllEmergencyAlertMessage action in order to acquire the content of the emergency alert message received by the broadcast receiving device, the broadcast receiving device may return the content of the emergency alert message through the EmergencyAlertProperty argument.

FIG. 133 is a ladder diagram showing operation for signaling an emergency alert from a broadcast receiving device to a companion device according to an embodiment of the present invention.

The broadcast receiving device 100 and the companion device 200 generates a pairing session (S2101). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the embodiment of FIG. 113.

The companion device 200 requests emergency alert reception notification from the broadcast receiving device 100 (S2103). More specifically, the companion device 200 may request emergency alert reception notification from the broadcast receiving device 100 through a controller. More specifically, the companion device 200 may request emergency alert reception notification from the broadcast receiving device 100 using a UPnP protocol. In a detailed embodiment, the companion device 200 may request subscription to an event for emergency alert reception notification from the broadcast receiving device 100 based on an eventing protocol, in order to receive information indicating that the emergency alert state variable of the emergency alert service is changed.

The broadcast receiving device 100 receives a message including the emergency alert from the broadcast transmitting device 300 (S2105). More specifically, the broadcast receiving device 100 may receive the emergency alert message from the broadcast transmitting device 300 through the broadcast reception unit 110.

The broadcast receiving device 100 notifies the companion device 200 of information on the emergency alert message based on the emergency alert message (S2107). More specifically, the broadcast receiving device 100 may notify the companion device 200 of information on the emergency alert message based on the emergency alert message through the controller 150. In a detailed embodiment, the broadcast receiving device 100 may notify the companion device 200 of the information on the emergency alert message through a variable indicating the information on the emergency alert message. In a detailed embodiment, a variable indicating the information on the emergency alert message may be EmergencyAlert.

The companion device 200 requests the information on the emergency alert from the broadcast receiving device 100 (S2109). More specifically, the companion device 200 may request the information on the emergency alert from the broadcast receiving device 100 through the controller. In a detailed embodiment, the companion device 200 may request the emergency alert through an action for requesting the emergency alert. In a detailed embodiment, the action for requesting the emergency alert may be GetAllEmergencyAlertMessage.

The broadcast receiving device 100 notifies the companion device 200 of information on the emergency alert including all emergency alert messages (S2111). More specifically, the broadcast receiving device 100 may notify the companion device 200 of information on the emergency alert including all emergency alert messages through the controller 150. However, in this case, since all the emergency alert messages should be received, a load may be caused in operation of the broadcast receiving device 100 and the companion device 200. Accordingly, there is a need for a method of efficiently transmitting the emergency alert message to the companion device 200.

The broadcast receiving device 100 may extract and transmit information necessary for the companion device 200 from the emergency alert message. In a detailed embodiment, the broadcast receiving device 100 may extract at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating the certainty of disaster causing the emergency alert, from the emergency alert message. In a detailed embodiment, the broadcast receiving device 100 may extract at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating the severity of disaster causing the emergency alert and certainty which is an element indicating the certainty of disaster causing the emergency alert, from the emergency alert message.

FIG. 134 is a view showing information included in an emergency alert notification message of a broadcast receiving device according to an embodiment of the present invention. In the ladder diagram of the first embodiment, the companion device may request the emergency alert from the broadcast receiving device and may deliver a GetAllEmergencyAlertMessage( ) for example. The broadcast receiving device may return all information included in the emergency alert message to the companion device in response to the GetAllEmergencyAlertMessage( ) FIGS. 135 to 137 are views showing criteria for determining priority of an emergency alert at a broadcast reception device according to another embodiment of the present invention.

The companion device 200 may determine priority based on the values of the information indicating the urgency of the emergency alert, the information on the severity of disaster causing the emergency alert and the information indicating the certainty of disaster causing the emergency alert. At this time, the companion device 200 may determine the priority of the emergency alert according to information having highest priority among the information indicating the urgency of the emergency alert, the information on the severity of disaster causing the emergency alert and the information indicating the certainty of disaster causing the emergency alert. In a detailed embodiment, the companion device 200 may divide the priority of the emergency alert into three urgency levels according to the information indicating the urgency of the emergency alert, the information on the severity of disaster causing the emergency alert and the information indicating the certainty of disaster causing the emergency alert. For example, the companion device 200 may determine that an urgency element corresponding to Immediate or Expected has highest priority, an urgency element corresponding to Future has middle priority lower than highest priority and higher than lowest priority, an urgency element corresponding to Past has lowest priority and an urgency element corresponding to Unknown corresponds to an initial value, in the embodiment of FIG. 135. At this time, the initial value may be middle priority lower than highest priority and higher than lowest priority. In addition, the companion device 200 may determine that a severity element corresponding to Extreme or Severe has highest priority, a severity element corresponding to Moderate has middle priority lower than highest priority and higher than lowest priority, a severity element corresponding to Minor has lowest priority and a severity element corresponding to Unknown corresponds to an initial value, in the embodiment of FIG. 135. At this time, the initial value may be middle priority lower than highest priority and higher than lowest priority. In addition, the companion device 200 may determine that a certainty element corresponding to Very likely or likely has highest priority, a certainty element corresponding to Possible has middle priority lower than highest priority and higher than lowest priority, a certainty element corresponding to Unlikely has lowest priority and an urgency element corresponding to Unknown corresponds to an initial value, in the embodiment of FIG. 135. At this time, the initial value may be middle priority lower than highest priority and higher than lowest priority.

In another embodiment, the companion device 200 may give a point of the priority of the emergency alert based on the values of the information indicating the urgency of the emergency alert, the information on the severity of disaster causing the emergency alert and the information indicating the certainty of disaster causing the emergency alert and determine the priority of the emergency alert according to a sum of points. In a detailed embodiment, the companion device 200 may give a point to the information indicating the urgency of the emergency alert, the information on the severity of disaster causing the emergency alert and the information indicating the certainty of disaster causing the emergency alert with the same weight. For example, the companion device 200 may give a point of 5 to the urgency element corresponding to Immediate, give a point of 4 to the urgency element corresponding to Expected, give a point of 3 to the urgency element corresponding to Future, give a point of 2 to the urgency element corresponding to Past, and give a point of 1 to the urgency element corresponding to Unknown in the embodiment of FIG. 136. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 1 to the urgency element corresponding to Unknown as in the embodiment of FIG. 136. In addition, the companion device 200 may give a point of 5 to the certainty element corresponding to Very likely, give a point of 4 to the certainty element corresponding to likely, give a point of 3 to the certainty element corresponding to Possible, give a point of 2 to the certainty element corresponding to Unlikely, and give a point of 1 to the certainty element corresponding to Unknown in the embodiment of FIG. 136. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

In another detailed embodiment, the companion device may give a point to the information indicating the urgency of the emergency alert, the information on the severity of disaster causing the emergency alert and the information indicating the certainty of disaster causing the emergency alert with different weights. For example, the companion device 200 may give a point of 9 to the urgency element corresponding to Immediate, give a point of 8 to the urgency element corresponding to Expected, give a point of 7 to the urgency element corresponding to Future, give a point of 5 to the urgency element corresponding to Past, and give a point of 0 to the urgency element corresponding to Unknown in the embodiment of FIG. 137. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 0 to the urgency element corresponding to Unknown in the embodiment of FIG. 137. In addition, the companion device 200 may give a point of 6 to the certainty element corresponding to Veri likely, give a point of 5 to the certainty element corresponding to likely, give a point of 4 to the certainty element corresponding to Possible, give a point of 3 to the certainty element corresponding to Unlikely, and give a point of 0 to the certainty element corresponding to Unknown in the embodiment of FIG. 137. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

The companion device 200 may display the emergency alert based on the priority of the emergency alert. In a detailed embodiment, the companion device 200 may change at least one of alarm sound, alarm duration, the number of alarms and an emergency alert display time based on the priority of the emergency alert. For example, the companion device 200 may increase alarm sound as the priority of the emergency alert increases. In addition, the companion device 200 may maintain alarm for a longer period of time as the priority of the emergency alert increases.

In the first embodiment of the present invention, the broadcast receiving device 100 should transmit the whole of the emergency alert message to the companion device. However, the companion device 200 may need some information of the emergency alert message. Accordingly, there is a method of, at the broadcast receiving device 200, transmitting only some information required by the companion device 200 of the emergency alert message. This will be described in the following second embodiment.

FIG. 138 is a view showing a variable indicating the state of an emergency alert signaled by a broadcast reception device, an emergency alert action and an action argument according to another embodiment of the present invention. The following description may correspond to the second embodiment. The UPnP device type of the present invention may be "urmatsc.org"device:atsc3.0rcvr" and the service type of the EAS UPnP service capable of receiving EAS data may be "urn:atsc.org:service:atsc3.0:eas:1". The Service Type and the Service ID are equal to those of the first embodiment.

The companion device 200 may specify specific information of the emergency alert to be acquired while requesting information on the emergency alert from the broadcast receiving device 100. The specific information of the emergency alert may be one or more of a plurality of pieces of information included in an emergency alert message. At this time, the broadcast receiving device 100 may transmit the specific information of the emergency alert to the companion device 200. To this end, the companion device 200 may use an action for requesting the specific information of the emergency alert. At this time, the action may have a variable for identifying the specific information of the emergency alert as an input argument.

(a) of FIG. 138 shows state variables belonging to the EAS UPnP service of the second embodiment. As shown in the figure, the state variables belonging to the EAS UPnP service may include EmergencyAlert, EmergencyAlertProperty and EmergencyAlertField state variables.

The EmergencyAlert is a required string type state variable and is equal to that of the first embodiment. The EmergencyAlert may have an XML or JSON string type.

The EmergencyAlertProperty is a required string type state variable and a desired field of the message may be received as the EmergencyAlertProperty by inputting the desired field in the EmergencyAlertField. The EmergencyAlertProperty may have an XML or JSON string type.

One or more fields may be input to the EmergencyAlertField, the value of the input field may be received as EmergencyAlertProperty, the whole of the message may be received as EmergencyAlertProperty if the value of the EmergencyAlertField is not given. If the whole of the message is returned, the EmergencyAlertProperty is equal to that of the first embodiment. The EmergencyAlertField may have a CSV, XML or JSON string type.

As shown in (b) of FIG. 138, in the second embodiment, the action for requesting the specific information of the emergency alert may be a GetEmergencyAlertProperty. The GetEmergencyAlertProperty is a required action and is an action for acquiring the whole of the message of the emergency alert. This action may be used to acquire a changed Emergency Alert Property. If this action is used to acquire information included in the emergency alert message, the name of the action may be represented by a GetEmergencyAlertMessage.

As shown in (c) of FIG. 138, in the second embodiment, the GetEmergencyAlertMessage may include EmergencyAlertProperty and EmergencyAlertField arguments. If the GetEmergencyAlertMessage action is used for the companion device to acquire the whole or some of the information included in the emergency alert message received by the broadcast receiving device, only desired alert message information may be requested using an EmergencyAlertField parameter. The broadcast receiving device may return the whole or some of the information included in the emergency alert message through the EmergencyAlertProperty argument.

FIG. 139 is a ladder diagram showing operation for signaling an emergency alert from a broadcast receiving device to a companion device according to another embodiment of the present invention, that is, the method of receiving the emergency alert state variable at the broadcast receiving device and the companion device according to the second embodiment.

The broadcast receiving device 100 and the companion device 200 generate a pairing session (S2121). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described first embodiment.

The companion device 200 requests emergency alert reception notification from the broadcast receiving device 100 (S2123). More specifically, the companion device 200 may request emergency alert reception notification from the broadcast receiving device 100 through the controller, in order to receive information indicating that the emergency alert state variable has changed. Detailed operation of the companion device 200 is equal to that of the first embodiment.

The broadcast receiving device 100 receives an emergency alert message including an emergency alert based on the broadcast service (S2125). More specifically, the broadcast receiving device 100 may receive the emergency alert message including an emergency alert from the broadcast transmitting device 300 through broadcast reception unit 110.

The broadcast receiving device 100 notifies the companion device 200 of information on the emergency alert message based on the emergency alert message (S2127). More specifically, the broadcast receiving device 100 may notify the companion device 200 of the information on the emergency alert message based on the emergency alert message through the controller 150. In addition, in a detailed embodiment, the broadcast receiving device 100 may notify the companion device 200 of the information on the emergency alert message through a variable indicating the information on the emergency alert message. In a detailed embodiment, the broadcast receiving device 100 may notify the companion device 200 of the information on the emergency alert message through a variable indicating the information on the emergency alert message. In a detailed embodiment, the variable indicating the information on the emergency alert message may be the EmergencyAlert of FIG. 128.

The companion device 200 requests the specific information of the emergency alert from the broadcast receiving device 100 (S2129). The companion device 200 may request the specific information of the emergency alert from the broadcast receiving device 100 through the controller. At this time, the specific information of the emergency alert may be information on the emergency alert necessary for the companion device 200 to provide an additional function for the emergency alert. In a detailed embodiment, the companion device 200 may request at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating a certainty of disaster causing the emergency alert of the emergency alert message, from the broadcast receiving device 100. In a detailed embodiment, the broadcast receiving device 100 may request at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating severity of disaster causing the emergency alert and certainty which is an element indicating the certainty of disaster causing the emergency alert of the emergency alert message, from the broadcast receiving device 100. In a detailed embodiment, the companion device 200 may request the specific information of the emergency alert from the broadcast receiving device 100 using the above-described GetEmergencyAlertMessage and the EmergencyAlertField. For example, the companion device may include a desired field name in an input parameter like a GetEmergencyAlertMessage ("identifier, category, urgency, severity, certainty, description") to perform the GetEmergencyAlertMessage action in order to request some of the emergency alert message from the broadcast receiving device, for example.

The companion device may perform the GetEmergencyAlertMessage action without including a desired field name in an input parameter like a GetEmergencyAlertMessage in order to request some of the emergency alert message from the broadcast receiving device. That is, an empty string may be used. The broadcast receiving device 100 extracts the specific information of the emergency alert based on the emergency alert message (S2131). More specifically, the broadcast receiving device 100 may extract the specific information of the emergency alert based on the emergency alert message through the controller 150. More specifically, the broadcast receiving device 100 may request the specific information of the emergency alert from the emergency alert message through the controller 150. If the companion device requests the whole of the emergency alert message, the broadcast receiving device may not perform the step of extracting the specific information.

The broadcast receiving device 100 notifies the companion device 200 of the specific information of the emergency alert (S2133). More specifically, the broadcast receiving device 100 may notify the companion device 200 of the specific information of the emergency alert through the controller 150. More specifically, the broadcast receiving device 100 may notify the companion device 200 of the specific information of the emergency alert based on the request of the companion device 200. That is, in response to the GetEmergencyAlertMessage( ) which is the request for the information of the emergency alert of the companion device 200, the broadcast receiving device may deliver the whole or some of the emergency alert message to the companion device. The operation for returning the whole of the emergency alert message at the broadcast receiving device is equal to that of the first embodiment. In addition, the whole of the emergency alert message returned from the broadcast receiving device is shown in FIG. 140. FIG. 140 is a view showing an emergency alert message in XML returned from a broadcast receiving device according to an embodiment of the present invention. The broadcast receiving device may return information on the identifier, category, urgency, severity, certainty and description requested by the companion device.

FIG. 141 is a view showing a variable indicating the state of an emergency alert signaled by a broadcast receiving device, an emergency alert action and an action argument according to another embodiment of the present invention. The following description may correspond to a third embodiment of the present invention.

In addition to delivery of the emergency alert message described in the first and second embodiments, the broadcast receiving device may deliver emergency alert related supplementary information to the companion device. The broadcast receiving device may receive supplementary information other than the message through a service provided by a next-generation hybrid broadcast system. The broadcast receiving device may deliver a Service ID and an Emergency Message ID to the companion device. In addition, the broadcast receiving device may deliver an URL to the companion device and the companion device may receive the emergency alert related supplementary information through a content provider or a broadcast server using the received URL. The service Type and the Service ID are equal to those of the first embodiment.

As shown in (a) of FIG. 141, the state variable may include an EmergencyAlert. The EmergencyAlert is a required variable and may have an XML or JSON string type. For example, the EmergencyAlert may be XML having the element shown in (b) of FIG. 141. <ServiceId> may indicate the ID of the service which is being provided by the PD. <MessageId> may indicate the ID of the emergency alert message received by the PD. <MessageURl> may indicate the URL of the emergency alert related supplementary information on the content server. In addition, <MessageURl> may indicate the location of the emergency alert related supplementary information in the broadcast receiving device when the broadcast receiving device receives the emergency alert related supplementary information through a protocol such as FLUTE. In this case, the embodiment of the URI may be equal to "file://EAS/messageFiles/". If the start of the URI is http:// or https://, the URL of the content server may be indicated and, otherwise the location of the PD may be indicated.

As shown in (c) of FIG. 141, the action for the emergency alert may include an action for requesting the emergency alert information. This may be represented by GetEmergencyAlertInfo. The GetEmergencyAlertInfo action may be used for the companion device to request a ServiceId, a MessageId and a MessageURl for the emergency alert message related supplementary information from the broadcast receiving device after the broadcast receiving device is paired with the companion device.

As shown in (d) of FIG. 141, the action argument may include an emergency alert argument. When the companion device requests a GetEmergencyAlertInfo action, the broadcast receiving device may return the ServiceId, the MessageId and the MessageURl for the emergency alert message related supplementary information through the EmergencyAlert argument.

FIG. 142 is a ladder diagram showing operation for signaling an emergency alert from a broadcast receiving device to a companion device according to another embodiment of the present invention, that is, the method of, at the broadcast receiving device and the companion device, receiving the emergency alert state variable according to the third embodiment.

The broadcast receiving device 100 may generate a pairing session through discovery of and pairing with the companion device 200 such as a mobile phone (DS1421). Discovery and pairing may be equal to those of the above-described embodiment.

The companion device 200 may request subscription to the emergency alert information from the broadcast receiving device 100 (DS1422). The companion device may make a request for notifying the companion device of the emergency alert state variable of the emergency alert service from the broadcast receiving device.

The broadcast transmitting device 300 may notify the broadcast receiving device 100 of the emergency alert message (DS1423).

The broadcast receiving device 100 may notify the companion device 200 of an emergency alert state variable (EmergencyAlert state variable) (DS1424). In the case of a UPnP based architecture, the broadcast receiving device 100 may notify the companion device of the emergency alert state variable according to an "eventing" protocol. Here, the emergency alert state variable may include a messageId, a ServiceId and a messageURL as described above.

The companion device 200 may request supplementary information stored in the broadcast receiving device 100 using the received messageId and ServiceId (DS1425). In addition, the companion device 200 may request the supplementary information through the URL of the content server 400 using the messageURL (DS1426).

The method of delivering the emergency alert message related supplementary information from the companion device 200 through the URI of the content server 400 or the URI of the broadcast receiving device 100 may be equal to that of the above-described embodiment.

FIG. 143 is a view showing a variable indicating the state of an emergency alert signaled by a broadcast receiving device according to another embodiment of the present invention. The following description may correspond to a fourth embodiment.

The broadcast receiving device may configure a UI to be displayed to a user after receiving the emergency alert message. In addition, the emergency alert UI configured by the broadcast receiving device may be displayed on the companion device. In this case, the broadcast receiving device may configure a separate UI for the companion device. An embodiment of using a UPnP will be described.

The fourth embodiment is different from the third embodiment in that the UI configured by the broadcast receiving device may be displayed on the companion device without delivering the emergency alert message received by the broadcast receiving device.

After the broadcast receiving device configures the UI, for example, the broadcast receiving device delivers a UI page configured in relation to the emergency alert message, that is, the URI of a html page, to the companion device and then companion device may access the html page and view the UI related to the emergency alert message.

The service type and the service ID are equal to those of the first embodiment.

(a) of FIG. 143 shows the state variable belonging to the EAS UPnP service of the fourth embodiment. The state variable may include a state variable indicating an emergency alert. This may be represented by an EmergencyAlert. The EmergencyAlert is a required state variable and may have an XML string type. The EmergencyAlert may be used to notify the companion device that the broadcast receiving device receives the emergency alert message. The EmergencyAlert may be XML having the element shown in (b) of FIG. 143. The state variable indicating the emergency alert may include information on a service identifier, a message identifier and a location list.

The service identifier may be represented by <ServiceId> and may indicate the identifier of the service which is being provided by the broadcast receiving device. The message identifier may be represented by <MessageId> and may indicate the identifier of the emergency alert message received by the broadcast receiving device. The location list may be represented by <URIList> and may indicate the list of URIs indicating the location of the html page using the emergency alert message received by the broadcast receiving device. The location information included in the location list may be represented by <URI> and may indicate the location of the html page configuring the UI using the emergency alert message received by the broadcast receiving device. The location information may be included in <URIList> and there may be one or more pieces of location information. The state variable indicating the emergency alert may be used for the broadcast receiving device to receive and deliver the emergency alert message to the companion device.

In addition, the state variable may include a state variable indicating an emergency alert location. The state variable indicating the emergency alert location may be represented by an A_ARG_TYPE_EmergencyAlertURI. The A_ARG_TYPE_EmergencyAlertURI may be associated with an output argument of an action for the location of the emergency alert and the embodiment of the data format is shown in (c) of FIG. 143.

FIG. 144 is a view showing an action and action argument of an emergency alert signaled by a broadcast receiving device according to another embodiment of the present invention. The following description may correspond to the action and action argument for the emergency alert used in the fourth embodiment of the present invention.

As shown in (a) of FIG. 144, the action for the emergency alert used in the fourth embodiment may include an action for requesting the emergency alert and an action for requesting the location of the emergency alert.

The action for requesting the emergency alert may be represented by a GetEmergencyAlert action. The companion device may check whether the broadcast receiving device receives the emergency using the GetEmergencyAlert action alert message after pairing. The companion device may use the GetEmergencyAlert action after the broadcast receiving device has received the emergency alert message.

The action for requesting the location of the emergency alert may be represented by GetEmergencyAlertURI action. The companion device may acquire the URI of the UI page configured by the broadcast receiving device using the GetEmergencyAlertURI action.

As shown in (b) and (c) of FIG. 144, the argument of the action for emergency alert used in the fourth embodiment may include an emergency alert argument and an emergency alert location argument.

The emergency alert argument may be represented by an EmergencyAlert argument. When the companion device executes the GetEmergencyAlert action, the broadcast receiving device may deliver emergency alert message related information through the EmergencyAlert argument.

The emergency alert location argument may be represented by an EmergencyAlertURI argument. When the companion device executes the GetEmergencyAlertURI action, the broadcast receiving device may deliver URI information of the UI configured by the broadcast receiving device to the companion device through the EmergencyAlertURI argument. Although this URI information may be obtained through eventing of GetEmergencyAlert( ) action or EmergencyAlert state variable, since the GetEmergencyAlertURI( ) action does not deliver information other than the URI, transmission efficiency may increase. Alternatively, an A_ARG_TYPE_Emergency AlertURl state variable may be defined as an eventing variable and may be delivered to the companion device without a separate action.

FIG. 145 is a ladder diagram showing operation for signaling an emergency alert from a broadcast receiving device to a companion device according to another embodiment of the present invention, that is, a ladder diagram according to the fourth embodiment.

The broadcast receiving device 100 and the companion device 200 generates a pairing session (S2161). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (S2163). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message based on the broadcast service (S2165). More specifically, the broadcast receiving device 100 may receive the emergency alert message from the broadcast transmitting device 300 through the broadcast reception unit 110.

The broadcast receiving device 100 notifies the companion device 200 of the information on the emergency alert message and the UI information of the emergency alert based on the emergency alert message (S2167). More specifically, the broadcast receiving device 100 may notify the companion device 200 of the information on the emergency alert message and the UI information of the emergency alert based on the emergency alert message through the controller 150. At this time, the UI information of the emergency alert may include a list of UIs of the emergency alert.

The companion device 200 requests the UI of the emergency alert from the broadcast receiving device 100 based on the UI information of the emergency alert (S2169). More specifically, the companion device 200 may request the UI information of the emergency alert from the broadcast receiving device 100 through the controller based on the UI information of the emergency alert.

The broadcast receiving device 100 may transmit a URI capable of acquiring the UI of the emergency alert to the companion device 200 based on the request of the companion device 200 (S2171). The broadcast receiving device 100 may transmit a URI capable of acquiring the UI of the emergency alert to the companion device 200 through the controller 150 based on the request of the companion device 200.

The companion device 200 displays the UI of the emergency alert based on the URI capable of acquiring the UI of the emergency alert (S2173). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

FIG. 146 is a ladder diagram showing operation for signaling an emergency alert from a broadcast receiving device to a companion device according to another embodiment of the present invention, that is, a ladder diagram of the case of using a GetEmergencyAlertURI action in the fourth embodiment.

The broadcast receiving device 100 and the companion device 200 generate a pairing session (DS1461). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (DS1462). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message including the emergency alert based on the broadcast service (DS1463). More specifically, the broadcast receiving device 100 may receive the emergency alert message including the emergency alert from the broadcast transmitting device 300 through the broadcast reception unit 110.

The broadcast receiving device 100 may change the emergency alert state after receiving the emergency alert message including the emergency alert (DS1464). More specifically, the broadcast receiving device 100 may configure a UI for representing the emergency alert message and related supplementary information using a remote UI service after receiving the emergency alert message including the emergency alert. As another embodiment of this method, there is a method of using a remote UI service of a UPnP. The broadcast receiving device may notify the companion device that the emergency alert is generated by changing the emergency alert state.

The broadcast receiving device 100 may notify the companion device 200 of the information on the emergency alert message and the URI information of the emergency alert based on the emergency alert message (DS1465). More specifically, the broadcast receiving device 100 may notify the companion device 200 of the information on the emergency alert message and the URI information of the emergency alert through the controller 150 based on the emergency alert message.

The companion device 200 displays the UI of the emergency alert based on the URI capable of acquiring the UI of the emergency alert (DS1466). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

The companion device 200 may provide an additional service associated with the broadcast service. To this end, the broadcast receiving device 100 may transmit NRT data to the companion device 200. In particular, the broadcast receiving device 100 may transmit information for signaling a content item for an NRT service to the companion device 200. The content item is a set of one or a plurality of files necessary for NRT service presentation. More specifically, the content item is a set of one or a plurality of files intended to be treated by an NRT service provider as a single unit for NRT service presentation.

FIG. 147 is a view showing NRT data signaling information for a companion device according to an embodiment of the present invention.

In the present invention, an embodiment of using a UPnP in a method of signaling content items of an NRT service received by a broadcast receiving device to a companion device through a broadcast will be described. A module for signaling NRT items delivered from the broadcast receiving device to the companion device may be referred to as an NRT data signaling service. In an embodiment of using a UPnP, an NRTDataSignaling Service may be defined as shown in (a) of FIG. 47. The service type of the NRT data signaling service may be defined as atsc3.0:nrtdatasignaling:1 and a service identifier may be defined as urn:atsc.org:serviceId:atsc3.0:nrtdatasignaling.

(b) of FIG. 147 shows an XML schema structure of NRT data properties used in the embodiment of NRT data signaling. The NRT data signaling information for the companion device 200 may include at least one of an identifier for identifying NRT data, consumption model information indicating a consumption model of NRT data, downloading status information indicating a status in which the broadcast receiving device 100 downloads NRT data and information on a content item configuring NRT data. The information on the content item may include at least one of an identifier for identifying a content item, a content item name indicating the name of the content item, size information indicating the size of the content item, playback length information indicating a playback time of the content item and URL information indicating an URL capable of downloading the content item from a content server. The NRT data signaling information for the companion device 200 may be described in XML.

The NRT data signaling information for the companion device 200 may be described in XML in the embodiment of FIG. 147. In addition, in the embodiment of FIG. 147, the NRT data signaling information for the companion device 200 may include at least one of a DataId, a ConsumptionModel, a DownloadingStatus and a ContentItem.

The DataId indicates the unique identifier of the NRT. In a detailed embodiment, only one DataId may be present. In a detailed embodiment, there may be one DataId. The DataId may have an unsigned short data type.

The ConsumptionModel indicates the consumption model of the NRT data. The ConsumptionModel may indicate at least one of Browse & Download, Portal, Push, Triggered, Push Scripted, Portal Scripted and Electronic Program Guide (EPG). More specifically, Browse & Download indicates that the NRT services provides downloadable content. In addition, Portal indicates that the NRT service provides an experience similar to a web browser. In addition, Push indicates that the NRT service provides content based on a user request. Triggered indicates that the NRT services provides an application synchronized with an A/V program. Push Scripted indicates that a declarative object (DO) indicating the application of the NRT service provides a specific UI while providing content based on a user request. Portal Scripted indicates that the DO provides a specific UI while providing an experience similar to the web browser. EPG indicates that the NRT service provides content consumed by an EPG application of the broadcast receiving device 100. In a detailed embodiment, there may be one ConsumptionModel. In a detailed embodiment, the ConsumptionModel may have a string data type.

The DownloadingStatus indicates the downloading status of the NRT data of the broadcast receiving device 100. The downloading status of the NRT data may indicate at least one of Downloading indicating that downloading is being performed, Completed indicating that downloading is completed and Error indicating downloading failure. In a detailed embodiment, there may be one DownloadingStatus. In a detailed embodiment, DownloadingStatus may have a string data type.

The ContentItem indicates a content item included in the NRT data. In a detailed embodiment, the NRT data may include one or a plurality of content items. Accordingly, there may be one or a plurality of ContentItems.

The ContentItem may include at least one of a ContentItemId, a ContentItemName, a ContentItemSize, a PlaybackLength and an URL as attributes.

The ContentItemId is an identifier for identifying the content item. In a detailed embodiment, there may be one ContentItemId. In a detailed embodiment, contentItemId may have an unsigned short data type.

The ContentItemName indicates the name of the content item. In a detailed embodiment, there may be one or a plurality of ContentItemNames. In a detailed embodiment, ContentItemName may have a string data type.

The ContentItemSize indicates the size of the content item. In a detailed embodiment, the ContentItemSize may be represented in byte units. In a detailed embodiment, there may be one ContentItemSize. In addition, in a detailed embodiment, the ContentItemSize may have an unsigned short data type.

The PlaybackLength indicates the playback length of the content item. The PlaybackLength may be present only when the content item is video or audio. In a detailed embodiment, there may be one or a plurality of PlaybackLengths. In a detailed embodiment, PlaybackLength may have an unsigned short data type.

The URL indicate an URL capable of receiving the content item from the content server.

FIG. 148 is a view showing a broadcast receiving apparatus generating NRT data signaling information for a companion device based on NRT data signaling information for the broadcast receiving device according to an embodiment of the present invention.

The broadcast receiving device 100 may receive NRT data signaling information for broadcast receiving device 100 based on the broadcast signal. The broadcast receiving device 100 may transmit the NRT data signaling information for the companion device 200 based on the NRT data signaling information for the broadcasting receiving device 100. More specifically, the broadcast receiving device 100 may generate NRT signaling information for the companion device 200 based on the NRT data signaling information for the broadcasting receiving device 100. The broadcast receiving device 100 may transmit the generated NRT data signaling information to the companion device 200. At this time, the broadcast receiving device 100 may extract at least one of an identifier for identifying NRT data, consumption model information indicating a consumption model of NRT data and information on a content item included in NRT data from the NRT data signaling information for the broadcasting receiving device 100. The information on the content item may include at least one of a content item name indicating the name of the content item, an identifier for identifying a content item, playback length information indicating a playback length of the content item and size information indicating the size of the content item.

In a detailed embodiment, the signaling information for the broadcast receiving device 100 may be divided into information for signaling NRT data and information for signaling the content item included in the NRT data. More specifically, the information for signaling the NRT data may be a service map table (SMT) of the ATSC standard. In addition, the information for signaling the content item may be a non-real-time information table (NRT-IT) of the ATSC standard. For example, the broadcast receiving device 100 may extract a service identifier corresponding to the NRT data from the SMT and map the service identifier to the identifier of the NRT data. In addition, the broadcast receiving device 100 may extract a consumption model corresponding to the NRT data from the SMT and map the consumption model to consumption model information. In addition, the broadcast receiving device 100 may extract a content item from the NRT IT and map the content item to a content item name. In addition, the broadcast receiving device 100 may extract linkage from the NRT IT and map the linkage to a content identifier. In addition, the broadcast receiving device 100 may extract a playback length from the NRT IT and map the playback length to playback length information. In addition, the broadcast receiving device 100 may extract a content length from the NRT IT and map the content length to a content item size. In addition, the broadcast receiving device 100 may extract an Internet location from the NRT IT and map the Internet location to an URL.

In addition, in a detailed embodiment, the broadcast receiving device 100 may generate the NRT data signaling information for the companion device 200 based on the request of the companion device 200. More specifically, the broadcast receiving device 100 may generate NRT data signaling information for the companion device 200 including the properties of the NRT data requested by the companion device 200.

The broadcast receiving device 100 may extract only information necessary for the companion device 200 from the NRT signaling for the broadcast receiving device 100 and generate the NRT signaling information for the companion device 200, thereby reducing communication traffic with the companion device 200. Therefore, the broadcast receiving device 100 can reduce the load of the companion device 200 for processing the NRT data signaling information.

FIG. 149 is a view showing a variable for NRT data, an action for acquiring NRT data and an action argument according to an embodiment of the present invention.

The broadcast receiving device 100 may signal the NRT data to the companion device 200 using the variable indicating the properties of the NRT data and a variable for identifying the NRT data. The broadcast receiving device 100 may deliver the variable indicating the properties of the NRT data to the companion device 200 when the NRT data is changed. In addition, the companion device 200 may request the properties of the NRT data, which desire to be acquired, from the broadcast receiving device 100 using the variable for identifying the NRT data.

In a detailed embodiment, the variable indicating the properties of the NRT data may be NRTDataProperty as shown in (a) of FIG. 149. The NRTDataProerty is a required variable and may have an XML string data type. If the companion device 200 requests NRT data signaling notification from the broadcast receiving device 100, the broadcast receiving device 100 may transmit the NRTDataProerty to the companion device 200. The data format for representing the XML schema structure for the NRTDataProperty is shown in (b) of FIG. 149. The variable for identifying the NRT data may be NRTDataID as shown in (a) of FIG. 149. The NRTDataID is a required variable and may have a string data type.

The companion device 200 may use an action for requesting the NRT data signaling information in order to request the signaling information of the NRT data from the broadcast receiving device 100. The action for requesting the NRT data signaling information may be defined as shown in (c) of FIG. 149. The action for requesting the NRT data signaling information may use the variable for identifying the NRT data as an input argument and use the variable indicating the properties of the NRT data as an output argument, as shown in (d) of FIG. 149. At this time, the action for requesting the NRT data signaling information may be GetNRTDataProperty as shown in (c) of FIG. 149. The input argument of the GetNRTDatProperty may be an NRTDataID. The output argument of the GetNRTDatProperty may be an NRTDataProperty. That is, when the companion device uses the GetNRTDataProperty action, an NRTDataID may be included as an input parameter. In addition, the companion device may receive the NRTDataProperty of a desired NRTDataID from the broadcast receiving device through the NRTDataProperty argument.

FIG. 150 is a view showing signaling of NRT data from a broadcast receiving device to a companion device according to an embodiment of the present invention.

The broadcast receiving device 100 and the companion device 200 generate a pairing session (S2181). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. In addition, the broadcast receiving device 100 may generate the pairing session based on compatibility with the application of the companion device 200 in the process of generating the pairing session. More specifically, the broadcast receiving device 100 generate the pairing session when compatibility with the application of the companion device 200 is possible. More specifically, in order to check compatibility, the broadcast receiving device 100 may check at least one of the application version and application identifier of the companion device 200. In another detailed embodiment, the companion device 200 may check compatibility with the application of the broadcast receiving device 100 in the process of generating the pairing session. More specifically, the companion device 200 generate the pairing session when compatibility with the application of the broadcast receiving device 100 is possible. More specifically, in order to check compatibility, the companion device 200 may check at least one of the application version and application identifier of the broadcast receiving device 100.

The companion device 200 requests NRT data signaling information notification from broadcast receiving device 100 (S2183). More specifically, the companion device 200 may request NRT data signaling information notification from broadcast receiving device 100 through the controller. More specifically, the companion device 200 may notify NRT data signaling information notification from broadcast receiving device 100 using a UPnP protocol. In a detailed embodiment, the companion device 200 may request subscription to the properties of the NRT data from the broadcast receiving device 100 based on an eventing protocol.

The broadcast receiving device 100 receives the NRT data signaling information for the broadcasting receiving device 100 based on the broadcast service (S2185). More specifically, the broadcast receiving device 100 may receive the NRT data signaling information from the broadcast transmitting device 300 through the broadcast reception unit 110.

The broadcast receiving device 100 receives the NRT data based on the NRT data signaling information (S2187, S2189). More specifically, the broadcast receiving device 100 may receive the NRT data from the broadcast network based on the NRT data signaling information through the broadcast reception unit 110. In addition, the broadcast receiving device 100 may receive the NRT data from the Internet protocol network based on the NRT data signaling information through the IP communication unit 130.

The broadcast receiving device 100 notifies the companion device 200 of the NRT data signaling information for the companion device 200 based on the NRT data signaling information for the broadcasting receiving device 100 (S2191). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

As described above, the companion device 200 requests the NRT data signaling information for the companion device 200 from the broadcast receiving device 100 and acquire the NRT data signaling information for the companion device 200 (S2193, S2195). More specifically, the companion device 200 may transmit the identifier for identifying the NRT data and receive NRT data signaling information corresponding to the identifier. At this time, the broadcast receiving device 100 and the companion device 200 may the above-described actions and variables.

The companion device 200 may receive the NRT data based on the NRT data signaling information. More specifically, the companion device 200 may receive the NRT data based on the NRT data signaling information through the Internet protocol network. In another detailed embodiment, the companion device 200 may receive the NRT data from the broadcast receiving device 100 based on the NRT data signaling information. Even when the companion device 200 cannot directly receive the broadcast service and cannot access a server for providing the NRT data through the Internet protocol network, the companion device 200 can receive the NRT data.

FIG. 151 is a view showing signaling of NRT data from a broadcast receiving device to a companion device according to another embodiment of the present invention.

The broadcast receiving device 100 and the companion device 200 generate a pairing session (S2201). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 requests NRT data signaling information notification from the broadcast receiving device 100 (S2203). More specifically, the companion device 200 may request NRT data signaling information notification from the broadcast receiving device 100 through the controller. More specifically, the companion device 200 may request NRT data signaling information notification from the broadcast receiving device 100 using a UPnP protocol. In a detailed embodiment, the companion device 200 may request subscription to an event for NRT data properties from the broadcast receiving device 100 based on an eventing protocol.

The broadcast receiving device 100 receives the NRT data signaling information for the broadcasting receiving device 100 based on the broadcast service (S2205). More specifically, the broadcast receiving device 100 may receive the NRT data signaling information from the broadcast transmitting device 300 through the broadcast reception unit 110.

The broadcast receiving device 100 notifies the companion device 200 of NRT data signaling information for the companion device 200 based on the NRT data signaling information for the broadcasting receiving device 100 (S2207, S2209). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

The broadcast receiving device 100 begins to receive the NRT data based on the NRT data signaling information (S2211). More specifically, the broadcast receiving device 100 may begin to receive the NRT data from a broadcast network through the broadcast reception unit 110 based on the NRT data signaling information. In addition, the broadcast receiving device 100 may begin to receive the NRT data from an Internet protocol network through the IP communication unit 130 based on the NRT data signaling information The broadcast receiving device 100 notifies the companion device 200 of the downloading status of the NRT data (S2213). The broadcast receiving device 100 may notify the companion device 200 of the downloading status of the NRT data through the controller 150. The broadcast receiving device 100 may display the downloading status as Downloading indicating that downloading is being performed, Completed indicating that downloading is completed or Error indicating downloading failure. At this time, the broadcast receiving device 100 may display a percentage of downloading completed if the NRT data is being downloaded. For example, the broadcast receiving device 100 may display the downloading status "30% completed" during downloading. In addition, the broadcast receiving device 100 may notify the companion device 200 of the downloading status of the NRT data at a predetermined interval. For example, the broadcast receiving device 100 may notify the companion device 200 of the downloading status of the NRT data at an interval of 10 seconds. At this time, a notification period may be determined based on the request of the companion device 200. For example, the companion device 200 may transmit the notification period while requesting NRT data signaling information notification from the broadcast receiving device 100. In addition, the broadcast receiving device 100 notify the companion device 200 of the downloading status of the NRT data according to the notification period requested by the companion device 200. In addition, the broadcast receiving device 100 notify the companion device 200 of the downloading status of the NRT data based on the percentage of downloading completed. For example, when downloading of the NRT data is completed by 30%, 60% and 100%, the broadcast receiving device 100 notify the companion device 200 of the downloading status of the NRT data.

The companion device 200 may receive the NRT data based on the NRT data signaling information. In a detailed embodiment, upon receiving information indicating that downloading of the NRT data is completed from the broadcast receiving device 100, the companion device 200 may receive the NRT data from the broadcast receiving device 100 based on the NRT data signaling information. Therefore, even when the companion device 200 cannot directly receive the broadcast service and cannot access the server for providing the NRT server through the Internet protocol network, the companion device 200 may receive the NRT data. In addition, as soon as downloading of the NRT data of the broadcast receiving device 100 is completed, the companion device 200 may request the NRT data from the broadcast receiving device 100.

The broadcast receiving device 100 may signal or transmit a media component to the companion device 200. There are many types of companion devices 200 capable of interoperating with the broadcast receiving device 100. The various types of companion device 200 have different capabilities. Accordingly, it is difficult to provide media components presentable by all companion devices 200. In addition, if the companion device 200 cannot present the received media component, a user experiences inconvenience. In order to solve this problem, the broadcast receiving device 100 needs to signal device capability information indicating the capability of the device used to present the media component to the companion device 200.

FIG. 152 is a view showing device capability information signaled from a broadcast receiving device to a companion device according to an embodiment of the present invention. In an embodiment of using a UPnP, a device capability signaling service for signaling device capabilities from the broadcast receiving device 100 to the companion device 200 (DeviceCapabilitySignlaing Service) may be defined as shown in (a) of FIG. 152. That is, the service type of the DeviceCapabilitySignlaing Service may be defined as atsc3.0:devservicesignaling:1 and the service identifier thereof may be defined as urn:atsc.org:serviceId:atsc3.0:devservicesignaling.

The device capability information indicating the capabilities of the device necessary to present the media component may be signaled from the broadcast receiving device 100 to the companion device 200. The device capability information may include information on a plurality of media components. The device capability information may include at least one of a media component identifier for identifying the media component, a media component_type indicating the type of the media component, information on video if the media component includes video, audio codec information indicating the codec of audio if the media component includes audio, closed caption codec information indicating the encoding format for the closed caption if the media component includes closed caption, application version information indicating the version of an application if the media component includes the application, capability code if the media component is an NRT content item, an NRT file or user request component and a media component URL indicating the URL capable of acquiring the media component. The information on the video included in the media component may include at least one of video codec information indicating the codec of video, video resolution information including the resolution of video and aspect ratio information indicating the aspect ratio of video.

The device capability information may be described in an XML in the embodiment of (b) or (c) of FIG. 152. The device capability information may include one or a plurality of ComponentItems indicating one media component as attributes. The ComponentItem may include at least one of a ComponentID, a ComponentType, Video, a AudioCodec, a CCCodec, an AppVersion, a CapabilityCode and an AvailComponentURL as shown in (b) of FIG. 152. Here, the Video may include at least one of a VideoCodec, Resolution and an AspectRatio as substtributes.

In addition, the ComponentItem may include at least one of a ComponentID, a ComponentType, Video, Audio, a CC, an App, a CapabilityCode and an AvailComponentURL as shown in (c) of FIG. 152. Here, the Video may include at least one of a VideoCodec, Resolution and an AspectRatio as subattributes. In addition, the Audio may include an AudioCodec as a subattribute, the CC may include a CCCodec as a subattribute, the App may include an AppVersion as a subattribute.

The ComponentID indicates an identifier for identifying the media component. In a detailed embodiment, one ComponentID may be present per ComponentItem. In a detailed embodiment, the ComponentID may have an unsignedShort data type.

The ComponentType indicates the type of the media component. In a detailed embodiment, one ComponentType may be present per ComponentItem. In a detailed embodiment, the ComponentType may have a string data type.

The Video indicates information on video included in the media component. The Video may include at least one of a VideoCodec, Resolution and an AspectRatio as attributes.

The VideoCodec indicates the codec of video included in the media component. In a detailed embodiment, one VideoCodec may be present per Video. In a detailed embodiment, the VideoCodec may have a string data type.

The Resolution indicates the resolution of video included in the media component. In a detailed embodiment, one Resolution may be present per Video. In a detailed embodiment, The Resolution may have a string data type.

The AspectRatio indicates the aspect ratio of video included in the media component. In a detailed embodiment, one AspectRatio may be present per Video. In a detailed embodiment, the AspectRatio may have a string data type.

The Audio indicates information on audio included in the media component.

The AudioCodec indicates the codec of audio included in the media component. In a detailed embodiment, the AudioCodec may have a string data type.

The CC indicates information on the closed caption included in the media component.

The CCCodec indicates the format of the closed caption included in the media component. In a detailed embodiment, the CCCodec may have a string data type.

The App indicates information on an application included in the media component.

The AppVersion indicates the version of the application included in the media component. In a detailed embodiment, the AppVersion may have an integer type.

The CapabilityCode indicates the capability code corresponding to a user request component, an NRT content item or an NRT file if the media component includes the user request component, the NRT content item or the NRT file. At this time, the value of the capability code may indicate the value defined in the ATSC NRT standard. In a detailed embodiment, the CapabilityCode may have a string data type.

The AvailComponentURL indicates an URL capable of acquiring the media component. In a detailed embodiment, the AvailComponentURL includes the same information as the media component and may indicate an URL capable of receiving an alternate media component having different device capabilities necessary for presentation. In a detailed embodiment, the AvailComponentURL may have a Boolean data type.

FIG. 153 is a view showing a state variable indicating device capability information according to an embodiment of the present invention. This embodiment relates to the state variable in the case of using a UPnP.

The broadcast receiving device 100 may transmit the device capability information to the companion device 200. More specifically, the companion device 200 may request device capability information notification from the broadcast receiving device 100. The broadcast receiving device 100 may signal the device capability information to the companion device 200 upon receiving the capability information. In addition, the companion device 200 may request the capability information from the broadcast receiving device 100 to acquire the capability information. At this time, the broadcast receiving device 100 and the companion device 200 may use the state variable of the embodiment of FIG. 153.

In the present embodiment, a device capability property state variable and a component URL state variable may be used to signal the device capability information. The device capability property state variable may be represented by a DeviceCapabilityProperty and the component URL state variable may be represented by a ComponentURL.

As shown in (a) of FIG. 153, the DeviceCapabilityProperty may have an XML or JSON string type. The DeviceCapabilityProperty may be a required state variable. The DeviceCapabilityProperty may have information on the companion device. In addition, the companion device may subscribe to the DeviceCapabilityProperty and the broadcast receiving device may notify the companion device that the device capability information is changed in an Event format.

The DeviceCapabilityProperty state variable may indicate the property of the service for signaling the above-described device capabilities and the data format thereof is shown in (b) of FIG. 153.

The ComponentURL state variable may be used to deliver URL information from the broadcast receiving device to the companion device if a component suitable for the device capabilities of the companion device is included in the broadcast receiving device (server). The data format of the ComponentURL is shown in (c) of FIG. 153. In some embodiments, the data format of the ComponentURL state variable may be a URI type.

In order to signal the information on the device capabilities, the state variable shown in (d) of FIG. 153 may be further defined in addition to the above-described state variables. The state variable for the component may be represented by an A_ARG_TYPE_ComponentId. The A_ARG_TYPE_ComponentId may be used to deliver the ComponentId which is an input argument of a GetComponentItem action for requesting a component item. The A_ARG_TYPE_ComponentId state variable may be a required variable and may have an XML or JSON string type. The state variable for the component item may be represented by an A_ARG_TYPE_ComponentItem. The A_ARG_TYPE_ComponentItem may be used to deliver a ComponentItem which is an output argument of a GetComponentItem action for requesting a component item. The A_ARG_TYPE_ComponentItem state variable may be a required variable and may have an XML or JSON string type.

FIG. 154 is a view showing an action for acquiring device capability information and an action argument according to an embodiment of the present invention. The present embodiment relates to the action and argument in the case of using a UPnP.

As shown in (a) of FIG. 154, the action for acquiring the device capability information may include at least one of an action for requesting a component item, an action for requesting the location of a component and an action for requesting device capabilities.

The action for requesting a component item may be represented by a GetComponentItem. The GetComponentItem may be used when the companion device requests a component suitable for the device capabilities thereof from the broadcast receiving device. "Suitable for the device capabilities" may mean that the companion device may render the component or meaningful presentation is possible. The GetComponentItem may be a required action.

The action for requesting the location of the component may be represented by a GetComponentURL. The GetComponentURL may be used when the companion device requests a location capable of acquiring information on a program or a component through a content server, e.g., a URL. The GetComponentURL may be optional.

The action for requesting device capabilities may be represented by a GetDeviceCapability. The GetDeviceCapability may be used when the companion device acquires device capability information for rendering or meaningfully presenting the program or the component. The GetDeviceCapability may be a required action.

(b) of FIG. 154 shows the argument of each action for acquiring the device capability information.

The GetDeviceCapability action may receive the device capability information of the companion device necessary to render or meaningfully present the component corresponding to a ComponentID or a specific program through the GetDeviceCapability action as a DeviceCapabilityProperty argument, after pairing with the broadcast receiving device. When this action is requested in a state in that the ComponentID which is an input argument is empty, the device capability information of the program or component which is being provided by the broadcast receiving device may be received as the DeviceCapabilityProperty argument.

A GetComponentURL action may receive the location of the content server capable of acquiring information on the component corresponding to the ComponentID or a specific program through the GetComponentURL action as a ComponentURL argument. Here, the information on the component may include access URL and additional information of content enabling presentation.

If the GetComponentURL action is requested in a state in which the ComponentID which is the input argument is empty, the location of the content server capable of acquiring information on the program or component which is being provided by the broadcast receiving device may be received as the ComponentURL argument. The content server may be present in the broadcast receiving device and may be an external Internet server or a broadcast transmitting device. The companion device may request the GetComponentURL action only when the TargetScreen of the program or component requested by the GetComponentURL action is set to the companion device, that is, only when presentation is possible or permitted in the companion device. Alternatively, the ComponentURL which is the output argument may be returned only when presentation of the requested program or component is possible or permitted after the broadcast receiving device receives the request for the GetComponentURL action.

A method of requesting a component content at a companion device using a GetComponentURL action and delivering the component content from the broadcast receiving device to the companion device may use a general communication method in the second screen field.

The companion device may include the ComponentId in GetComponentItem action as an input argument to download or stream the component. The broadcast receiving device may return the ComponentItem as an output argument in response to the GetComponentItem action.

FIG. 155 is a view showing signaling of device information from a broadcast reception device to a companion device according to an embodiment of the present invention.

The broadcast receiving device 100 and the companion device 200 establish a pairing session (S2301). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information notification from the broadcast reception device 100 (S2303). More specifically, the companion device 200 may request device capability information notification from the broadcast reception device 100 through the controller. As described above, the companion device 200 may request device capability information notification from the broadcast reception device 100 using a UPnP eventing protocol.

The broadcast reception device 100 receives broadcast service signaling information based on the broadcast service (S2305). More specifically, the broadcast reception device 100 may receive broadcast service signaling information from the broadcast transmission device 300 through the broadcast reception unit 110.

The broadcast reception device 100 extracts device capability information for signaling device capabilities necessary to present the media component from the service signaling information (S2307). The broadcast reception device 100 may extract device capability information for signaling device capabilities necessary to present the media component from the service signaling information through the controller 150. In a detailed embodiment, the device capability information extracted by the broadcast reception device 100 may be equal to the above-described device capability information.

The broadcast reception device 100 notifies the companion device 200 of the device capability information (S2309). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200. In a detailed embodiment, the device capability information for the companion device 200 may include the property requested by the companion device 200. In a detailed embodiment, a variable indicating the device capability information may be the above-described DeviceCapabilityProperty.

The companion device 200 requests the media component from the broadcast reception device 100 based on the device capability information (S2311). The companion device 200 may request the media component from the broadcast reception device 100 based on the device capability information through the controller. More specifically, the companion device 200 may determine whether the specification of the companion device 200 satisfies the device capabilities included in the device capability information. For example, if the media component includes video, whether the companion device 200 has a codec capable of present video may be determined. Alternatively, if the media component includes audio, whether the companion device 200 has a codec capable of present audio may be determined. Alternatively, if the media component includes an application, whether the companion device 200 supports the version of the application may be determined. Alternatively, if the media component includes a closed caption, whether the companion device 200 supports the type of the closed caption may be determined. At this time, if the device capabilities are satisfied, the companion device 200 may request the media component from the broadcast reception device 100.

The action for requesting the component at the companion device may be divided into two actions.

As a first embodiment, the companion device may request a component URL from the broadcast reception device. This is possible when information indicating the component URL included in the DeviceCapabilityProperty is TRUE. The companion device may receive the URL information from the broadcast reception device and download or stream the component from the broadcast reception device or an external content provider (S2313).

As a second embodiment, the companion device may request the component from the broadcast reception device (GetComponent action). This is possible when information indicating the component URL included in the DeviceCapabilityProperty is FALSE. The companion device may download or stream the component from the broadcast reception device (S2313). Here, the action for requesting the component at the companion device (GetComponent action) may be equal to the above-described GetComponentItem action.

The companion device 200 present the media component (S2315). The companion device 200 may present the media component through the controller.

FIG. 156 is a view showing signaling of device information from a broadcast reception device to a companion device according to an embodiment of the present invention. The companion device may not include device capabilities necessary to present the media component. This will now be described.

Operations for establishing a pairing session between the broadcast receiving device 100 and the companion device 200 and, at the broadcast receiving device 100, notifying the companion device 200 of the device capability information is equal to those described with reference to the previous figures and thus a description thereof will be omitted.

The companion device 200 displays that the media component is not presentable to the user based on the device capability information (S2331). The companion device 200 may display that the media component is not presentable to the user through the controller based on the device capability information. More specifically, the companion device 200 may display that the media component is not presentable if the specification of the companion device 200 does not satisfy the device capabilities included in the device capability information. For example, if the media component includes video and the companion device 200 does not have a codec necessary to present video, the companion device 200 may display that video is not presentable. Alternatively, if the media component includes audio and the companion device 200 does not have a codec necessary to present audio, the companion device 200 may display that audio is not presentable. Alternatively, if the media component includes an application and the version of the application of the companion device 200 is not supported, the companion device 200 may display that the application of the companion device 200 is not executable. Alternatively, if the media component includes a closed caption and the companion device 200 does not support the closed caption, the companion device 200 may display that the closed caption is not presentable.

FIG. 157 is a view showing signaling of device information from a broadcast reception device to a companion device according to another embodiment of the present invention. Next, an embodiment in which the companion device 200 provides an opportunity to select presentation of the media component to the user if the companion device does not satisfy capabilities unnecessary to present the media component will be described.

Operations for establishing a pairing session between the broadcast receiving device 100 and the companion device 200 and, at the broadcast receiving device 100, notifying the companion device 200 of the device capability information is equal to those described with reference to FIG. 144 and thus a description thereof will be omitted.

If the companion device 200 does not satisfy device capabilities included in the device capability information, the companion device 200 receives user input on whether to present the media component (S2351). The companion device 200 may receive user input on whether to present the media component through the controller. More specifically, the companion device 200 may display that the display capabilities required to present the media component are not satisfied and receive user input on whether to present the media component from the user. For example, if the media component includes scalable video encoding and the companion device 200 does not support an enhancement layer, the companion device 200 may display that only a base layer is presentable and receive user input. Alternatively, if the media component includes multi-channel audio and the companion device 200 does not support presentation of multi-channel audio, the companion device 200 may display that only audio of some channels is presentable and receive user input. The companion device 200 may receive user input on whether to present the media component even when necessary device capabilities are not satisfied in addition to the case where unnecessary device capabilities are not satisfied.

The companion device 200 requests the media component from the broadcast reception device 100 based on user input (S2353). The companion device 200 may request the media component from the broadcast reception device 100 based on user input through the controller.

The action for requesting the component at the companion device may be divided into two actions.

As a first embodiment, the companion device may request a component URL from the broadcast reception device. This is possible when information indicating the component URL included in DeviceCapabilityProperty is TRUE. The companion device may receive the URL information from the broadcast reception device and download or stream the component using the URL information from the broadcast reception device or an external content provider (S2353).

As a second embodiment, the companion device may request the component from the broadcast reception device (GetComponent action). This is possible when the component URL included in the DeviceCapabilityProperty is FALSE. The companion device may download or stream the component from the broadcast reception device (S2353). Here, the action for requesting the component at the companion device (GetComponent action) may be equal to the above-described GetComponentItem action.

The companion device 200 receives the media component from the broadcast reception device 100 (S2355). The companion device 200 may receive the media component from the broadcast reception device 100 through the controller.

The companion device 200 may present the media component (S2357). The companion device 200 may present the media component through the controller.

Therefore, the companion device 200 may give the user a choice for presentation of the media component even when the companion device 200 does not satisfy the device capabilities for presentation of the media component.

FIG. 158 is a view showing signaling of device information from a broadcast reception device to a companion device according to another embodiment of the present invention. If the companion device 200 does not satisfy device capabilities, the media component may not be properly presented. In order to property present the media component, the companion device 200 should receive a media component which may be properly presented. To this end, the companion device 200 may receive an alternative media component including the same information as the media component and having different capabilities for presentation from the content/signaling server 400. This will be described below.

Operations for establishing a pairing session between the broadcast receiving device 100 and the companion device 200 and, at the broadcast receiving device 100, notifying the companion device 200 of the device capability information is equal to those described with reference to FIG. 144 and thus a description thereof will be omitted.

Based on the device capability information, the companion device 200 requests a media component URL indicating a URL capable of receiving the media component from the broadcast reception device 100 (S2381). Based on the device capability information, the companion device 200 may request the media component URL from the broadcast reception device 100 through the controller. More specifically, if the companion device 200 does not satisfy the device capabilities included in the device capability information, the companion device 200 may request the media component URL. In addition, the media component URL may indicate an URL capable of receiving an alternative media component having the same information as the media component and having different device capabilities necessary for presentation.

The broadcast reception device 100 transmits the media component URL to the companion device 200 (S2383). The broadcast reception device 100 may transmit the media component URL to the companion device 200 through the controller 150.

The companion device 200 receives the alternative media component from the content/signaling server 400 based on the alternative media component URL. More specifically, the companion device 200 performs the following operations.

The companion device 200 requests the alternative media component from the content/signaling server 400 based on the media component URL (S2385). The companion device 200 may request the media component from the content/signaling server 400 through the controller based on the media component URL. More specifically, the companion device 200 may transmit at least one of the capabilities of the companion device 200 and a component identifier for identifying the media component to request the alternative media component. In a detailed embodiment, the content/signaling server 400 may check which media component is replaced with the alternative media component requested by the companion device 200 through the component identifier. In addition, the content/signaling server 400 may find the alternative media component capable of being presented by the component device 200 from a plurality of alternative media components through the capabilities of the companion device 200 transmitted by the companion device 200.

The companion device 200 receives the alternative media component from the content/signaling server 400 (S2387). The companion device 200 may receive the alternative media component from the content/signaling server 400 through the controller. However, if there is no alternative media component satisfying the capabilities of the companion device 200 in the content/signaling server 400, a message indicating that there is no alternative media component may be received. At this time, the message indicating that there is no alternative media component may be delivered through a Boolean variable having a value TRUE or FALSE. In addition, the companion device 200 may display the message indicating that there is no alternative media component to the user.

The companion device 200 present the media component (S2389). The companion device 200 may present the media component through the controller. Therefore, the companion device 200 may receive the alternative media component having the same information as the media component and capable of being presented. Accordingly, the broadcast reception device 100 and more companion devices 200 may interoperate.

FIG. 159 is a view showing device capability information signaled from a broadcast reception device to a companion device according to an embodiment of the present invention.

The device capability information indicating the capabilities of the device necessary to present the media component may be signaled from the broadcast reception device 100 to the companion device 200. The device capability information may include information on a plurality of media components. The device capability information may include at least one of a media component identifier for identifying the media component, a media component type indicating the type of the media component, information on video if the media component includes video, audio codec information indicating the codec of audio if the media component includes audio, closed caption codec information indicating the encoding format for the closed caption if the media component includes closed caption, application version information indicating the version of an application if the media component includes the application, capability code if the media component is an NRT content item, an NRT file or user request component and a media component URL indicating the URL capable of acquiring the media component. The information on the video included in the media component may include at least one of video codec information indicating the codec of video, video resolution information including the resolution of video and aspect ratio information indicating the aspect ratio of video The device capability information may be described in an XML in the embodiment of (b) or (a) of FIG. 159. The device capability information may include one or a plurality of ComponentItems indicating one media component as attributes. The ComponentItem may include at least one of a ComponentID, a ComponentType, Video, Audio, a CC, an App, a CapabilityCode and an AvailComponentURL. Here, the Video may include at least one of a VideoCodec, Resolution and an AspectRatio as substtributes. In addition, the Audio may include an AudioCodec as a subattribute, the CC may include a CCCodec as a subattribute, the App may include an AppVersion as a subattribute.

The ComponentID indicates an identifier for identifying the media component. In a detailed embodiment, one ComponentID may be present per ComponentItem. In a detailed embodiment, the ComponentID may have an unsignedShort data type.

The ComponentType indicates the type of the media component. In a detailed embodiment, one ComponentType may be present per ComponentItem. In a detailed embodiment, the ComponentType may have a string data type.

The Video indicates information on video included in the media component. The Video may include at least one of a VideoCodec, Resolution and an AspectRatio as attributes.

The VideoCodec indicates the codec of video included in the media component. In a detailed embodiment, one VideoCodec may be present per Video. In a detailed embodiment, the VideoCodec may have a string data type.

The Resolution indicates the resolution of video included in the media component. In a detailed embodiment, one Resolution may be present per Video. In a detailed embodiment, The Resolution may have a string data type.

The AspectRatio indicates the aspect ratio of video included in the media component. In a detailed embodiment, one AspectRatio may be present per Video. In a detailed embodiment, the AspectRatio may have a string data type.

The Audio indicates information on audio included in the media component.

The AudioCodec indicates the codec of audio included in the media component. In a detailed embodiment, the AudioCodec may have a string data type.

The CC indicates information on the closed caption included in the media component.

The CCCodec indicates the format of the closed caption included in the media component. In a detailed embodiment, the CCCodec may have a string data type.

The App indicates information on an application included in the media component.

The AppVersion indicates the version of the application included in the media component. In a detailed embodiment, the AppVersion may have an integer type.

The CapabilityCode indicates the capability code corresponding to a user request component, an NRT content item or an NRT file if the media component includes the user request component, the NRT content item or the NRT file. At this time, the value of the capability code may indicate the value defined in the ATSC NRT standard. In a detailed embodiment, the CapabilityCode may have a string data type.

The AvailComponentURL indicates an URL capable of acquiring the media component. In a detailed embodiment, the AvailComponentURL includes the same information as the media component and may indicate an URL capable of receiving an alternate media component having different device capabilities necessary for presentation. In a detailed embodiment, the AvailComponentURL may have a Boolean data type. That is, as shown in (b) of FIG. 159, the device capability information may not define a Boolean data type but may define a string data type with respect to the AvailComponentURL property and may directly include URL information capable of receiving the alternative media component. If this device capability information is defined, the companion device may check an accessible URL without using the GetComponentURL.

FIG. 160 is a view showing signaling of device information from a broadcast reception device to a companion device according to an embodiment of the present invention. This embodiment relates to the case where the above-described string type AvailComponentURL property includes location information. (a) of FIG. 160 is a ladder diagram showing a method of signaling device information from the broadcast reception device to the companion device.

The broadcast receiving device 100 and the companion device 200 establish a pairing session (DS1601). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information from the broadcast reception device 100 (DS1602). More specifically, the companion device 200 may request device capability information from the broadcast reception device 100 through the controller. As described above, the companion device 200 may request device capability information from the broadcast reception device 100 using a UPnP eventing protocol.

The broadcast reception device 100 receives the broadcast service signaling information based on the broadcast service (DS1603). More specifically, the broadcast reception device 100 may receive the broadcast service signaling information from the broadcast transmitting device 300 through the broadcast reception unit 110.

The broadcast reception device 100 may extract (parse) the device capability information for signaling the capabilities of the device necessary to present the media component from the service signaling information. The broadcast reception device 100 may extract the device capability information for signaling the capabilities of the device necessary to present the media component from the service signaling information through the controller 150. In a detailed embodiment, the device capability information extracted by the broadcast reception device 100 may be equal to the above-described device capability information.

The broadcast reception device 100 may notify the companion device 200 of the device capability information (DS1604). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200.

Alternatively, the broadcast reception device 100 may receive a device capability information request action from the companion device instead of notifying the companion device 200 of the device capability information (DS1605). In this case, the broadcast reception device 100 may return the device capability information in response to the request for the device capability information (DS1606). The device capability information request action and the action argument may be equal to those described in the above-described embodiment.

The companion device may check the device capability information received from the broadcast reception device 100. In a detailed embodiment, the variable indicating the device capability information may be the above-described DeviceCapabilityProperty. The received device capability information may be described in an XML shown in (b) of FIG. 160. The received device capability information may include the AvailComponentURL property indicating the location information of a replaceable media component. In this embodiment, the AvailComponentURL may include specific location information, e.g., URL information.

The companion device 200 may request the media component based on the location information of the replaceable media component (DS1607). The location information of the replaceable media component may indicate the location of the replaceable media component in the broadcast reception device 100 or the location of the replaceable media component in the content/signaling server 400. Accordingly, the companion device may request the replaceable media component from the broadcast reception device 100 or the content/signaling server 400.

The companion device 200 may receive the replaceable media component from the broadcast reception device 100 or the content/signaling server 400 and present the media component through streaming or downloading (DS1608).

FIG. 161 is a view showing signaling of device information from a broadcast reception device to a companion device according to an embodiment of the present invention. This embodiment relates to the case where the above-described string type AvailComponentURL property does not include location information or the AvailComponentURL property is not present in the device capability property information. (a) of FIG. 161 is a ladder diagram showing a method of signaling device information from the broadcast reception device to the companion device.

The broadcast receiving device 100 and the companion device 200 establish a pairing session (DS1611). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information from the broadcast reception device 100 (DS1612). More specifically, the companion device 200 may request device capability information from the broadcast reception device 100 through the controller. As described above, the companion device 200 may request device capability information from the broadcast reception device 100 using a UPnP eventing protocol.

The broadcast reception device 100 receives the broadcast service signaling information based on the broadcast service (DS1613). More specifically, the broadcast reception device 100 may receive the broadcast service signaling information from the broadcast transmission device 300 through the broadcast reception unit 110.

The broadcast reception device 100 may extract (parse) the device capability information for signaling the capabilities of the device necessary to present the media component from the service signaling information. The broadcast reception device 100 may extract the device capability information for signaling the capabilities of the device necessary to present the media component from the service signaling information through the controller 150. In a detailed embodiment, the device capability information extracted by the broadcast reception device 100 may be equal to the above-described device capability information.

The broadcast reception device 100 may notify the companion device 200 of the device capability information (DS1614). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200.

Alternatively, the broadcast reception device 100 may receive a device capability information request action from the companion device instead of notifying the companion device 200 of the device capability information (DS1615). In this case, the broadcast reception device 100 may return the device capability information in response to the request for the device capability information (DS1616). The device capability information request action and the action argument may be equal to those described in the above-described embodiment.

The companion device may check the device capability information received from the broadcast reception device 100. In a detailed embodiment, the variable indicating the device capability information may be the above-described DeviceCapabilityProperty. The received device capability information may be described in an XML shown in (b) of FIG. 161. The received device capability information may include a component identifier. The received device capability information includes the AvailComponentURL property indicating the location information of the replaceable media component but the content of the AvailComponentURL is empty. Alternatively, the device capability information may not include the AvailComponentURL property.

The companion device 200 cannot know the location information of replaceable media component and thus request the media component based on the component identifier (DS1617). The companion device may request the media component from the broadcast reception device 100 using the component identifier.

The companion device 200 may receive the replaceable media component from the broadcast reception device 100 and present the media component through streaming or downloading (DS1618).

FIG. 162 is a flowchart illustrating operation of a companion device according to an embodiment of the present invention. The companion device according to the embodiment of the present invention may interoperate with the broadcast reception device for receiving the broadcast service.

The broadcast reception device 100 and the companion device 200 generate a pairing session (DS1621). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The companion device may transmit a request for notification of signaling information to the broadcast reception device (DS1623). More specifically, the companion device 200 may request signaling information notification from the broadcast reception device 100 through the controller. More specifically, the companion device 200 request signaling information notification from the broadcast reception device 100 using a UPnP protocol. In a detailed embodiment, the companion device 200 may request subscription to an event for the signaling information from the broadcast reception device 100 based on an eventing protocol. Here, the signaling information may include broadcast service property information, emergency alert service information, NRT data information or device capability information. The request for notification of each information may use a state variable corresponding to each of the above-described information.

The companion device may receive the signaling information (DS1625). Here, the signaling information may include broadcast service property information, emergency alert service information, NRT data information or device capability information. Reception of each information may be performed using the action and action argument corresponding to each of the above-described information.

The companion device may perform functions related to the received signaling information (DS1627). The companion device may update broadcast service property information upon receiving the broadcast service property information. The companion device may display an emergency alert message upon emergency alert service information. The companion device may update the property information of the NRT data upon receiving NRT data information. The companion device may request and receive a media component, display an unpresentable message, request and receive a replaceable medium component, or display a message for asking for user's consent, upon receiving the device capability information.

Operation of the companion device may be performed according to the embodiments described in the above figures.

FIG. 163 is a flowchart illustrating operation of a broadcast reception device according to an embodiment of the present invention.

The broadcast reception device 100 and the companion device 200 generate a pairing session (DS1631). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The broadcast reception device may receive signaling information for signaling the broadcast service based on the broadcast service (DS1633). Here, the signaling information may include broadcast service property information, emergency alert service information, NRT data information or device capability information. Reception of each information may be performed using the action and action argument corresponding to each of the above-described information. The broadcast reception device may receive the signaling information from the broadcast transmission device or the content/signaling server.

The broadcast reception device may notify the companion device of the signaling information (DS1635). The broadcast reception device may notify the companion device for delivering a request for subscription to the signaling information thereto of the signaling information. The broadcast reception device may selectively notify the companion device of the signaling information only when the signaling information is changed. In some embodiments, only changed information or all signaling information may be notified.

Operation of the broadcast reception device may be performed according to the embodiments described with reference to the above figures.

The broadcast reception device may notify the companion device of the signaling information received by the broadcast reception device in a state of interoperating the companion device. In addition, the companion device may perform operation corresponding thereto using the signaling information received from the broadcast reception device. Therefore, signaling and content presentation considering the properties of the companion device are possible.

Features, structures, effects, and the like as described above in the embodiments are included in at least one embodiment of the present invention and should not be limited to only one embodiment. In addition, the features, structures, effects, and the like described in the respective embodiments may be combined or modified even with respect to the other embodiments by those skilled in the art.

Accordingly, contents related to these combinations and modifications should be construed as within the scope of the present invention.

Although the preferred embodiments of the present invention have been disclosed for illustrative purposes, the embodiments are only exemplified, but do not limit the present invention. Those skilled in the art will appreciate that various modifications and applications are possible, without departing from the scope and spirit of the invention as disclosed in the accompanying claims. Further, differences related to such modifications and applications should be interpreted as being included in the scope of the present invention defined by the accompanying claims.

What is claimed is:

1. A companion device interoperating with a broadcast reception device for receiving a broadcast service, the companion device comprising:

a communication device configured to connect the companion device with the broadcast reception device, wherein the broadcast service includes a transport packet comprising a header and a payload and the header of the transport packet includes information indicating that a packet type of the transport packet is an Internet Protocol (IP) packet type, wherein the transport packet includes emergency alert information; and a controller configured to receive the emergency alert information from the broadcast reception device, the emergency alert information including identifier information for the emergency alert information, category information of the emergency alert information, and priority information for the emergency alert information, a value of the priority information representing one of 5 levels of priority of the emergency alert information, the 5 levels representing the priority from low priority to high priority, and the controller receiving service guide information including information for components of the broadcast service, in response to a request of the companion device, wherein the information for components includes capability information for components, the capability information including at least one of capability information for a video component and capability information for an audio component, and wherein the information for components further includes information describing a closed caption component and information describing an application component.

2. A method of a companion device interoperating with a broadcast reception device for receiving a broadcast service, the method comprising:

connecting the companion device with the broadcast reception device, wherein the broadcast service includes a transport packet comprising a header and a payload and the header of the transport packet includes information indicating that a packet type of the transport packet is an Internet Protocol (IP) packet type, wherein the transport packet includes emergency alert information;

receiving, by the companion device, the emergency alert information from the broadcast reception device, the emergency alert information including identifier information for the emergency alert information, category information of the emergency alert information, and priority information for the emergency alert information, a value of the priority information representing one of 5 levels of priority of the emergency alert information, the 5 levels representing the priority from low priority to high priority; and receiving, by the companion device, service guide information including information for components of the broadcast, in response to a request of the companion device, wherein the information for components includes capability information for components and the capability information includes at least one of capability information for a video component and capability information for an audio component, and wherein the information for components further includes information describing a closed caption component and information describing an application component.

3. A broadcast reception device for transmitting a broadcast service to a companion device, the broadcast reception device comprising:

a receiver configured to receive a broadcast service, wherein the broadcast service includes a transport packet comprising a header and a payload and the header of the transport packet includes information indicating that a packet type of the transport packet is an Internet Protocol (IP) packet type, and wherein the transport packet includes emergency alert information; and a processor configured to connect the broadcast reception device with the companion device, and to transmit the emergency alert information to the companion device, the emergency alert information including identifier information for the emergency alert information, category information of the emergency alert information, and priority information for the emergency alert information, wherein a value of the priority information representing one of 5 levels of priority of the emergency alert information, the 5 levels representing the priority from low priority to high priority, wherein the processor is further configured to transmit service guide information including information for components of the broadcast, in response to a request of the companion device, wherein the information for components includes capability information for the component and the capability information includes at least one of capability information for a video component and capability information for an audio component, and wherein the information for components further includes information describing a closed caption component and information describing an application component.

4. A method for transmitting a broadcast service from a broadcast reception device to a companion device, the method comprising:

receiving a broadcast service, wherein the broadcast service includes a transport packet comprising a header and a payload and the header of the transport packet includes information indicating that a packet type of the transport packet is an Internet Protocol (IP) packet type, and wherein the transport packet includes emergency alert information;

connecting the broadcast reception device with the companion device;

transmitting the emergency alert information to the companion device, the emergency alert information including identifier information for the emergency alert information, category information of the emergency alert information, and priority information for the emergency alert information, wherein a value of the priority information representing one of 5 levels of priority of the emergency alert information, the 5 levels representing the priority from low priority to high priority; and transmitting service guide information including information for components of the broadcast service, in response to a request of the companion device, wherein the information for components includes capability information for the component and the capability information includes at least one of capability information for a video component and capability information for an audio component, and wherein the information for components further includes information describing a closed caption component and information describing an application component.

* * * * *